US012694636B2

(12) United States Patent
Mezerowsky et al.

(10) Patent No.: US 12,694,636 B2
(45) Date of Patent: Jul. 28, 2026

(54) SYSTEMS AND METHODS FOR CONFIGURING AND/OR PARTICIPATING IN VIRTUAL EVENTS

(71) Applicant: Monday.com LTD., Tel Aviv (IL)

(72) Inventors: Ilya Mezerowsky, Giv'atayim (IL); Gal Spiegler, Tel Aviv (IL)

(73) Assignee: Monday.com LTD., Tel Aviv (IL)

( * ) Notice: Subject to any disclaimer, the term of this patent is extended or adjusted under 35 U.S.C. 154(b) by 0 days.

(21) Appl. No.: 19/420,123

(22) Filed: Dec. 15, 2025

(65) Prior Publication Data

US 2026/0170711 A1     Jun. 18, 2026

Related U.S. Application Data

(63) Continuation of application No. 19/419,782, filed on Dec. 15, 2025.

(Continued)

(51) Int. Cl.
G06T 11/00          (2026.01)

(52) U.S. Cl.
CPC .......... G06T 11/00 (2013.01); G06T 2200/24 (2013.01); G06T 2210/04 (2013.01)

(58) Field of Classification Search
None
See application file for complete search history.

(56) References Cited

U.S. PATENT DOCUMENTS

| | | | |
|---|---|---|---|
| 4,972,314 A | 11/1990 | Getzinger et al. | |
| 5,220,657 A | 6/1993 | Bly et al. | |

(Continued)

FOREIGN PATENT DOCUMENTS

| | | |
|---|---|---|
| CA | 2828011 A1 | 9/2012 |
| CN | 103064833 A | 4/2013 |

(Continued)

OTHER PUBLICATIONS

Abor Jr., C., "Low-Code and No-Code AI: New AI Development— What is code anymore?!?!" Linkedin, Published Jul. 15, 2023, Retrieved from <https://www.linkedin.com/pulse/ low-code-no-code-ai-new-development-what-code-anymore-c-l-abor-jr>, 15 pages.

(Continued)

*Primary Examiner* — Daniel F Hajnik
*Assistant Examiner* — Jed-Justin Imperial
(74) *Attorney, Agent, or Firm* — Finnegan, Henderson, Farabow, Garrett & Dunner LLP

(57)          ABSTRACT

Systems, methods, and computer-readable media for generating a virtual event space visualization for media consumption in a hybrid 2D/3D manner may involve at least one processor configured to: receive virtual event space data including definition of a virtual display object associated with a virtual presentation location; render an event space based on the virtual event space data including an avatar; when the avatar is positioned at a location distinct from the virtual presentation location, render portions of the event space in a first viewing state displaying the event space from an isometric view; upon receiving a trigger for impending interaction with the virtual display object, switch to a second viewing state, displaying the virtual display object from a non-isometric, object-focused view; maintain the object-focused view while the avatar interacts with the virtual display object; upon receiving a reversion signal revert the second viewing state to the first viewing state.

23 Claims, 32 Drawing Sheets

Related U.S. Application Data

(60) Provisional application No. 63/733,578, filed on Dec. 13, 2024.

(56) References Cited

U.S. PATENT DOCUMENTS

| | | | |
|---|---|---|---|
| 5,479,602 A | 12/1995 | Baecker et al. |
| 5,517,663 A | 5/1996 | Kahn |
| 5,632,009 A | 5/1997 | Rao et al. |
| 5,657,437 A | 8/1997 | Bishop et al. |
| 5,682,469 A | 10/1997 | Linnett et al. |
| 5,696,702 A | 12/1997 | Skinner et al. |
| 5,726,701 A | 3/1998 | Needham |
| 5,734,837 A | 3/1998 | Flores et al. |
| 5,787,411 A | 7/1998 | Groff et al. |
| 5,844,555 A | 12/1998 | Menaker et al. |
| 5,880,742 A | 3/1999 | Rao et al. |
| 5,933,145 A | 8/1999 | Meek |
| 5,987,469 A | 11/1999 | Lewis et al. |
| 5,999,911 A | 12/1999 | Berg et al. |
| 6,016,438 A | 1/2000 | Wakayama |
| 6,016,553 A | 1/2000 | Schneider et al. |
| 6,023,695 A | 2/2000 | Osborn et al. |
| 6,034,681 A | 3/2000 | Miller et al. |
| 6,049,622 A | 4/2000 | Robb et al. |
| 6,088,707 A | 7/2000 | Bates et al. |
| 6,108,573 A | 8/2000 | Debbins et al. |
| 6,111,573 A | 8/2000 | Mccomb et al. |
| 6,157,381 A | 12/2000 | Bates et al. |
| 6,167,405 A | 12/2000 | Rosensteel et al. |
| 6,169,534 B1 | 1/2001 | Raffel et al. |
| 6,182,127 B1 | 1/2001 | Cronin, III et al. |
| 6,185,582 B1 | 2/2001 | Zellweger et al. |
| 6,195,794 B1 | 2/2001 | Buxton |
| 6,222,541 B1 | 4/2001 | Bates et al. |
| 6,252,594 B1 | 6/2001 | Xia et al. |
| 6,266,067 B1 | 7/2001 | Owen et al. |
| 6,275,809 B1 | 8/2001 | Tamaki et al. |
| 6,330,022 B1 | 12/2001 | Seligmann |
| 6,377,965 B1 | 4/2002 | Fries et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,510,459 B2 | 1/2003 | Cronin et al. |
| 6,522,347 B1 | 2/2003 | Tsuji et al. |
| 6,527,556 B1 | 3/2003 | Koskinen |
| 6,567,830 B1 | 5/2003 | Madduri |
| 6,606,740 B1 | 8/2003 | Lynn et al. |
| 6,626,959 B1 | 9/2003 | Moise et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 6,874,010 B1 | 3/2005 | Sargent |
| 6,988,248 B1 | 1/2006 | Tang et al. |
| 7,027,052 B1 | 4/2006 | Thorn et al. |
| 7,027,997 B1 | 4/2006 | Robinson et al. |
| 7,034,860 B2 | 4/2006 | Lia et al. |
| 7,043,529 B1 | 5/2006 | Simonoff |
| 7,054,891 B2 | 5/2006 | Cole |
| 7,086,007 B1 | 8/2006 | Bushey et al. |
| 7,228,492 B1 | 6/2007 | Graham |
| 7,237,188 B1 | 6/2007 | Leung |
| 7,249,042 B1 | 7/2007 | Doerr et al. |
| 7,272,637 B1 | 9/2007 | Himmelstein |
| 7,274,375 B1 | 9/2007 | David |
| 7,379,934 B1 | 5/2008 | Forman et al. |
| 7,380,202 B1 | 5/2008 | Lindhorst et al. |
| 7,383,320 B1 | 6/2008 | Silberstein et al. |
| 7,389,473 B1 | 6/2008 | Sawicki et al. |
| 7,415,664 B2 | 8/2008 | Aureglia et al. |
| 7,417,644 B2 | 8/2008 | Cooper et al. |
| 7,461,077 B1 | 12/2008 | Greenwood |
| 7,464,366 B2 | 12/2008 | Shukla et al. |
| 7,489,976 B2 | 2/2009 | Adra |
| 7,565,270 B2 | 7/2009 | Bramwell et al. |
| 7,617,443 B2 | 11/2009 | Mills et al. |
| 7,685,152 B2 | 3/2010 | Chivukula et al. |
| 7,707,514 B2 | 4/2010 | Forstall et al. |
| 7,710,290 B2 | 5/2010 | Johnson |
| 7,747,782 B2 | 6/2010 | Hunt et al. |
| 7,770,100 B2 | 8/2010 | Chamberlain et al. |
| 7,827,476 B1 | 11/2010 | Roberts et al. |
| 7,827,615 B1 | 11/2010 | Allababidi et al. |
| 7,836,408 B1 | 11/2010 | Ollmann et al. |
| 7,885,847 B2 | 2/2011 | Wodtke et al. |
| 7,916,157 B1 | 3/2011 | Kelley et al. |
| 7,921,360 B1 | 4/2011 | Sundermeyer et al. |
| 7,933,952 B2 | 4/2011 | Parker et al. |
| 7,945,622 B1 | 5/2011 | Pegg |
| 7,954,043 B2 | 5/2011 | Bera |
| 7,954,064 B2 | 5/2011 | Forstall et al. |
| 8,046,703 B2 | 10/2011 | Busch et al. |
| 8,060,518 B2 | 11/2011 | Timmons |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,407,217 B1 | 3/2013 | Zhang |
| 8,413,261 B2 | 4/2013 | Nemoy et al. |
| 8,423,909 B2 | 4/2013 | Zabielski |
| 8,543,566 B2 | 9/2013 | Weissman et al. |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,621,652 B2 | 12/2013 | Slater |
| 8,635,520 B2 | 1/2014 | Christiansen et al. |
| 8,660,881 B2 | 2/2014 | Wood et al. |
| 8,677,448 B1 | 3/2014 | Kauffman et al. |
| 8,689,131 B2 | 4/2014 | Ali et al. |
| 8,694,981 B2 | 4/2014 | Federighi et al. |
| 8,719,071 B2 | 5/2014 | Macintyre et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,825,758 B2 | 9/2014 | Bailor et al. |
| 8,838,533 B2 | 9/2014 | Kwiatkowski et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,910,062 B2 | 12/2014 | Bangor |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,021,118 B2 | 4/2015 | John et al. |
| 9,026,897 B2 | 5/2015 | Zarras |
| 9,043,362 B2 | 5/2015 | Weissman et al. |
| 9,063,958 B2 | 6/2015 | Muller et al. |
| 9,129,234 B2 | 9/2015 | Campbell et al. |
| 9,159,246 B2 | 10/2015 | Rodriguez et al. |
| 9,172,738 B1 | 10/2015 | Dacosta |
| 9,177,238 B2 | 11/2015 | Windmueller et al. |
| 9,183,303 B1 | 11/2015 | Goel et al. |
| 9,223,770 B1 | 12/2015 | Ledet |
| 9,239,719 B1 | 1/2016 | Feinstein et al. |
| 9,244,917 B1 | 1/2016 | Sharma et al. |
| 9,253,130 B2 | 2/2016 | Zaveri |
| 9,268,604 B1 | 2/2016 | Herzberg et al. |
| 9,286,246 B2 | 3/2016 | Saito et al. |
| 9,286,475 B2 | 3/2016 | Li et al. |
| 9,292,587 B2 | 3/2016 | Kann et al. |
| 9,336,502 B2 | 5/2016 | Mohammad et al. |
| 9,342,579 B2 | 5/2016 | Cao et al. |

(56)         References Cited

U.S. PATENT DOCUMENTS

| | | |
|---|---|---|
| 9,361,287 B1 | 6/2016 | Simon et al. |
| 9,372,592 B1 | 6/2016 | Goodspeed et al. |
| 9,390,059 B1 | 7/2016 | Gur et al. |
| 9,395,959 B2 | 7/2016 | Hatfield et al. |
| 9,424,287 B2 | 8/2016 | Schroth |
| 9,424,333 B1 | 8/2016 | Bisignani et al. |
| 9,424,545 B1 | 8/2016 | Lee |
| 9,430,458 B2 | 8/2016 | Rhee et al. |
| 9,449,031 B2 | 9/2016 | Barrus et al. |
| 9,495,386 B2 | 11/2016 | Tapley et al. |
| 9,519,699 B1 | 12/2016 | Kulkarni et al. |
| 9,558,172 B2 | 1/2017 | Rampson et al. |
| 9,569,511 B2 | 2/2017 | Morin |
| 9,613,086 B1 | 4/2017 | Sherman |
| 9,635,091 B1 | 4/2017 | Laukkanen et al. |
| 9,659,284 B1 | 5/2017 | Wilson et al. |
| 9,679,456 B2 | 6/2017 | East |
| 9,686,086 B1 | 6/2017 | Nguyen et al. |
| 9,720,602 B1 | 8/2017 | Chen et al. |
| 9,727,376 B1 | 8/2017 | Bills et al. |
| 9,760,271 B2 | 9/2017 | Persaud |
| 9,779,150 B1 | 10/2017 | Sherman et al. |
| 9,794,256 B2 | 10/2017 | Kiang et al. |
| 9,798,829 B1 | 10/2017 | Baisley |
| 9,811,676 B1 | 11/2017 | Gauvin |
| 9,866,561 B2 | 1/2018 | Psenka et al. |
| 9,870,136 B2 | 1/2018 | Pourshahid |
| 9,911,092 B2 | 3/2018 | Goja |
| 10,001,908 B2 | 6/2018 | Grieve et al. |
| 10,043,296 B2 | 8/2018 | Li |
| 10,057,246 B1 | 8/2018 | Drozd et al. |
| 10,067,928 B1 | 9/2018 | Krappe |
| 10,078,668 B1 | 9/2018 | Woodrow et al. |
| 10,169,306 B2 | 1/2019 | O'Shaughnessy et al. |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,318,624 B1 | 6/2019 | Rosner et al. |
| 10,327,712 B2 | 6/2019 | Beymer et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,419,469 B1 | 9/2019 | Singh et al. |
| 10,423,758 B2 | 9/2019 | Kido et al. |
| 10,445,702 B1 | 10/2019 | Hunt |
| 10,452,360 B1 | 10/2019 | Burman et al. |
| 10,453,118 B2 | 10/2019 | Smith et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,505,825 B1 | 12/2019 | Bettaiah et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,546,001 B1 | 1/2020 | Nguyen et al. |
| 10,564,622 B1 | 2/2020 | Dean et al. |
| 10,573,407 B2 | 2/2020 | Ginsburg |
| 10,579,724 B2 | 3/2020 | Campbell et al. |
| 10,581,675 B1 | 3/2020 | Iyer et al. |
| 10,587,714 B1 | 3/2020 | Kulkarni et al. |
| 10,602,332 B2 | 3/2020 | Dong et al. |
| 10,628,002 B1 | 4/2020 | Kang et al. |
| 10,649,739 B2 | 5/2020 | Burges et al. |
| 10,698,594 B2 | 6/2020 | Sanches et al. |
| 10,706,061 B2 | 7/2020 | Sherman et al. |
| 10,719,220 B2 | 7/2020 | Ouellet et al. |
| 10,719,311 B2 | 7/2020 | Foskett et al. |
| 10,733,256 B2 | 8/2020 | Fickenscher et al. |
| 10,740,117 B2 | 8/2020 | Ording et al. |
| 10,747,764 B1 | 8/2020 | Plenderleith |
| 10,747,950 B2 | 8/2020 | Dang et al. |
| 10,748,312 B2 | 8/2020 | Ruble et al. |
| 10,754,688 B2 | 8/2020 | Powell |
| 10,761,691 B2 | 9/2020 | Anzures et al. |
| 10,762,471 B1 | 9/2020 | Wang et al. |
| 10,795,555 B2 | 10/2020 | Burke et al. |
| 10,795,649 B2 | 10/2020 | Drake et al. |
| 10,809,696 B1 | 10/2020 | Principato |
| 10,817,660 B2 | 10/2020 | Rampson et al. |
| D910,077 S | 2/2021 | Naroshevitch et al. |
| 10,955,992 B2 | 3/2021 | Hooton et al. |
| 10,963,578 B2 | 3/2021 | More et al. |
| 10,997,531 B2 | 5/2021 | Leonelli et al. |
| 11,010,371 B1 | 5/2021 | Slomka et al. |
| 11,030,259 B2 | 6/2021 | Mullins et al. |
| 11,042,363 B1 | 6/2021 | Krishnaswamy et al. |
| 11,042,699 B1 | 6/2021 | Sayre et al. |
| 11,044,257 B1 | 6/2021 | Heuts et al. |
| 11,048,499 B2 | 6/2021 | Foskett et al. |
| 11,048,714 B2 | 6/2021 | Sherman et al. |
| 11,080,636 B1 | 8/2021 | Son |
| 11,086,894 B1 | 8/2021 | Srivastava et al. |
| 11,128,464 B1 | 9/2021 | Loladia |
| 11,144,854 B1 | 10/2021 | Mouawad |
| 11,182,218 B2 | 11/2021 | Sanchez et al. |
| 11,190,516 B1 | 11/2021 | Loladia |
| 11,222,167 B2 | 1/2022 | Gehrmann et al. |
| 11,231,862 B1 | 1/2022 | Vig et al. |
| 11,240,278 B1 | 2/2022 | Wang et al. |
| 11,243,688 B1 | 2/2022 | Remy et al. |
| 11,301,623 B2 | 4/2022 | Helft et al. |
| 11,341,705 B1 | 5/2022 | Isaacs et al. |
| 11,356,485 B2 | 6/2022 | Hegde et al. |
| 11,360,765 B2 | 6/2022 | Miller et al. |
| 11,372,380 B2 | 6/2022 | Iyer et al. |
| 11,405,504 B1 | 8/2022 | Tripathy et al. |
| 11,429,384 B1 | 8/2022 | Navert et al. |
| 11,443,390 B1 | 9/2022 | Caligaris et al. |
| 11,481,228 B2 | 10/2022 | Rangasamy et al. |
| 11,494,171 B1 | 11/2022 | Acharya et al. |
| 11,513,772 B1 | 11/2022 | Gross |
| 11,531,446 B1 | 12/2022 | Kakaire |
| 11,570,182 B1 | 1/2023 | Tran et al. |
| 11,593,096 B1 | 2/2023 | Chaptini et al. |
| 11,593,477 B1 | 2/2023 | Thimmegowda et al. |
| 11,620,615 B2 | 4/2023 | Jiang et al. |
| 11,663,023 B2 | 5/2023 | Syed et al. |
| 11,681,445 B2 | 6/2023 | Vohra et al. |
| 11,682,091 B2 | 6/2023 | Sukman et al. |
| 11,714,612 B2 | 8/2023 | Accardo et al. |
| 11,720,410 B2 | 8/2023 | Culp et al. |
| 11,750,475 B1 | 9/2023 | Gonzalez et al. |
| 11,799,951 B1 | 10/2023 | Maloo et al. |
| 11,823,269 B2 | 11/2023 | Aisen et al. |
| 11,882,117 B1 | 1/2024 | Kumar |
| 11,922,222 B1 | 3/2024 | Chawla et al. |
| 11,977,858 B2 | 5/2024 | Kulkarni et al. |
| 12,034,613 B2 | 7/2024 | Gupta et al. |
| 12,056,255 B1 | 8/2024 | Mystetskyi et al. |
| 12,094,018 B1 | 9/2024 | O'Malley |
| 12,105,939 B1 | 10/2024 | Rank et al. |
| 12,118,490 B1 | 10/2024 | Hooks et al. |
| 2001/0008998 A1 | 7/2001 | Tamaki et al. |
| 2001/0032248 A1 | 10/2001 | Krafchin |
| 2001/0039551 A1 | 11/2001 | Saito et al. |
| 2002/0002459 A1 | 1/2002 | Lewis et al. |
| 2002/0019827 A1 | 2/2002 | Shiman et al. |
| 2002/0065848 A1 | 5/2002 | Walker et al. |
| 2002/0065849 A1 | 5/2002 | Ferguson et al. |
| 2002/0065880 A1 | 5/2002 | Hasegawa et al. |
| 2002/0069207 A1 | 6/2002 | Alexander et al. |
| 2002/0075309 A1 | 6/2002 | Michelman et al. |
| 2002/0082892 A1 | 6/2002 | Raffel et al. |
| 2002/0099777 A1 | 7/2002 | Gupta et al. |
| 2002/0138528 A1 | 9/2002 | Gong et al. |
| 2003/0004771 A1 | 1/2003 | Yaung |
| 2003/0033196 A1 | 2/2003 | Tomlin |
| 2003/0041113 A1 | 2/2003 | Larsen |
| 2003/0051377 A1 | 3/2003 | Chirafesi |

(56) References Cited

U.S. PATENT DOCUMENTS

| | | |
|---|---|---|
| 2003/0052912 A1 | 3/2003 | Bowman et al. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0101416 A1 | 5/2003 | Mcinnes et al. |
| 2003/0135558 A1 | 7/2003 | Bellotti et al. |
| 2003/0137536 A1 | 7/2003 | Hugh |
| 2003/0187864 A1 | 10/2003 | Mcgoveran |
| 2003/0200215 A1 | 10/2003 | Chen et al. |
| 2003/0204490 A1 | 10/2003 | Kasriel |
| 2003/0233224 A1 | 12/2003 | Marchisio et al. |
| 2004/0010514 A1 | 1/2004 | Agarwal et al. |
| 2004/0032432 A1 | 2/2004 | Baynger |
| 2004/0078105 A1 | 4/2004 | Moon et al. |
| 2004/0078257 A1 | 4/2004 | Schweitzer et al. |
| 2004/0078373 A1 | 4/2004 | Ghoneimy et al. |
| 2004/0098284 A1 | 5/2004 | Petito et al. |
| 2004/0111666 A1 | 6/2004 | Hollcraft |
| 2004/0119713 A1 | 6/2004 | Meyringer |
| 2004/0133441 A1 | 7/2004 | Brady et al. |
| 2004/0138939 A1 | 7/2004 | Theiler |
| 2004/0139400 A1 | 7/2004 | Allam et al. |
| 2004/0162833 A1 | 8/2004 | Jones et al. |
| 2004/0168115 A1 | 8/2004 | Bauernschmidt et al. |
| 2004/0172592 A1 | 9/2004 | Collie et al. |
| 2004/0212615 A1 | 10/2004 | Uthe |
| 2004/0215443 A1 | 10/2004 | Hatton |
| 2004/0230940 A1 | 11/2004 | Cooper et al. |
| 2004/0268227 A1 | 12/2004 | Brid |
| 2005/0010454 A1 | 1/2005 | Falk et al. |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0060342 A1 | 3/2005 | Farag |
| 2005/0063615 A1 | 3/2005 | Siegel et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0091596 A1 | 4/2005 | Anthony et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0149908 A1 | 7/2005 | Klianev |
| 2005/0165600 A1 | 7/2005 | Kasravi et al. |
| 2005/0171881 A1 | 8/2005 | Ghassemieh et al. |
| 2005/0210371 A1 | 9/2005 | Pollock et al. |
| 2005/0216830 A1 | 9/2005 | Turner et al. |
| 2005/0228250 A1 | 10/2005 | Bitter et al. |
| 2005/0251021 A1 | 11/2005 | Kaufman et al. |
| 2005/0257204 A1 | 11/2005 | Bryant et al. |
| 2005/0278297 A1 | 12/2005 | Nelson |
| 2005/0289170 A1 | 12/2005 | Brown et al. |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0013462 A1 | 1/2006 | Sadikali |
| 2006/0015499 A1 | 1/2006 | Clissold et al. |
| 2006/0015806 A1 | 1/2006 | Wallace |
| 2006/0031148 A1 | 2/2006 | O'Dell et al. |
| 2006/0031764 A1 | 2/2006 | Keyser et al. |
| 2006/0036568 A1 | 2/2006 | Moore et al. |
| 2006/0044307 A1 | 3/2006 | Song |
| 2006/0047553 A1 | 3/2006 | Fuhrmann et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0074735 A1 | 4/2006 | Shukla et al. |
| 2006/0074736 A1 | 4/2006 | Shukla et al. |
| 2006/0080594 A1 | 4/2006 | Chavoustie et al. |
| 2006/0085744 A1 | 4/2006 | Hays et al. |
| 2006/0090169 A1 | 4/2006 | Daniels et al. |
| 2006/0095276 A1 | 5/2006 | Axelrod et al. |
| 2006/0101324 A1 | 5/2006 | Goldberg et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0112123 A1 | 5/2006 | Clark et al. |
| 2006/0129415 A1 | 6/2006 | Thukral et al. |
| 2006/0129913 A1 | 6/2006 | Vigesaa et al. |
| 2006/0136828 A1 | 6/2006 | Asano |
| 2006/0150090 A1 | 7/2006 | Swamidass |
| 2006/0173762 A1 | 8/2006 | Clater |
| 2006/0173908 A1 | 8/2006 | Browning et al. |
| 2006/0190313 A1 | 8/2006 | Lu |
| 2006/0212299 A1 | 9/2006 | Law |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0271859 A1 | 11/2006 | Gorzela |
| 2006/0282348 A1 | 12/2006 | Greenfield et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0032993 A1 | 2/2007 | Yamaguchi et al. |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0050710 A1 | 3/2007 | Redekop |
| 2007/0067373 A1 | 3/2007 | Higgins et al. |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0143736 A1 | 6/2007 | Moriarty et al. |
| 2007/0150389 A1 | 6/2007 | Aamodt et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0192729 A1 | 8/2007 | Downs |
| 2007/0220119 A1 | 9/2007 | Himmelstein |
| 2007/0233647 A1 | 10/2007 | Rawat et al. |
| 2007/0239746 A1 | 10/2007 | Masselle et al. |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0010615 A1 | 1/2008 | Curtis et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0040181 A1 | 2/2008 | Freire et al. |
| 2008/0046816 A1 | 2/2008 | Cao et al. |
| 2008/0052291 A1 | 2/2008 | Bender |
| 2008/0059312 A1 | 3/2008 | Gern et al. |
| 2008/0059539 A1 | 3/2008 | Chin et al. |
| 2008/0065460 A1 | 3/2008 | Raynor |
| 2008/0077530 A1 | 3/2008 | Banas et al. |
| 2008/0088628 A1 | 4/2008 | Lu et al. |
| 2008/0097748 A1 | 4/2008 | Haley et al. |
| 2008/0104091 A1 | 5/2008 | Chin |
| 2008/0126389 A1 | 5/2008 | Mush et al. |
| 2008/0126945 A1 | 5/2008 | Munkvold et al. |
| 2008/0127205 A1 | 5/2008 | Barros |
| 2008/0133736 A1 | 6/2008 | Wensley et al. |
| 2008/0148140 A1 | 6/2008 | Nakano |

(56) References Cited

U.S. PATENT DOCUMENTS

| | | |
|---|---|---|
| 2008/0155547 A1 | 6/2008 | Weber et al. |
| 2008/0163075 A1 | 7/2008 | Beck et al. |
| 2008/0183593 A1 | 7/2008 | Dierks |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0221946 A1 | 9/2008 | Balon |
| 2008/0222192 A1 | 9/2008 | Hughes |
| 2008/0256014 A1 | 10/2008 | Gould et al. |
| 2008/0256429 A1 | 10/2008 | Penner et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons et al. |
| 2009/0006171 A1 | 1/2009 | Blatchley et al. |
| 2009/0006283 A1 | 1/2009 | Labrie et al. |
| 2009/0007157 A1 | 1/2009 | Ward et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0043814 A1 | 2/2009 | Faris et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0075694 A1 | 3/2009 | Kim et al. |
| 2009/0077164 A1 | 3/2009 | Phillips et al. |
| 2009/0077217 A1 | 3/2009 | Mcfarland et al. |
| 2009/0083140 A1 | 3/2009 | Phan |
| 2009/0088875 A1 | 4/2009 | Baier et al. |
| 2009/0094514 A1 | 4/2009 | Dargahi et al. |
| 2009/0113310 A1 | 4/2009 | Appleyard et al. |
| 2009/0129596 A1 | 5/2009 | Chavez et al. |
| 2009/0132331 A1 | 5/2009 | Cartledge et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0222760 A1 | 9/2009 | Halverson et al. |
| 2009/0234699 A1 | 9/2009 | Steinglass et al. |
| 2009/0248710 A1 | 10/2009 | Mccormack et al. |
| 2009/0256972 A1 | 10/2009 | Ramaswamy et al. |
| 2009/0262690 A1 | 10/2009 | Breuer et al. |
| 2009/0271696 A1 | 10/2009 | Bailor et al. |
| 2009/0276692 A1 | 11/2009 | Rosner |
| 2009/0292690 A1 | 11/2009 | Culbert |
| 2009/0313201 A1 | 12/2009 | Huelsman et al. |
| 2009/0313537 A1 | 12/2009 | Fu et al. |
| 2009/0313570 A1 | 12/2009 | Po |
| 2009/0319542 A1 | 12/2009 | Le Brazidec et al. |
| 2009/0319623 A1 | 12/2009 | Srinivasan et al. |
| 2009/0319882 A1 | 12/2009 | Morrison et al. |
| 2009/0327240 A1 | 12/2009 | Meehan et al. |
| 2009/0327301 A1 | 12/2009 | Lees et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0031135 A1 | 2/2010 | Naghshin et al. |
| 2010/0070845 A1 | 3/2010 | Facemire et al. |
| 2010/0070895 A1 | 3/2010 | Messer |
| 2010/0077260 A1 | 3/2010 | Pillai et al. |
| 2010/0082705 A1 | 4/2010 | Ramesh et al. |
| 2010/0083164 A1 | 4/2010 | Martin et al. |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | Mckeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0169853 A1 | 7/2010 | Jain et al. |
| 2010/0174678 A1 | 7/2010 | Massand |
| 2010/0205521 A1 | 8/2010 | Folting |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241968 A1 | 9/2010 | Tarara et al. |
| 2010/0241972 A1 | 9/2010 | Spataro et al. |
| 2010/0241990 A1 | 9/2010 | Gabriel et al. |
| 2010/0251090 A1 | 9/2010 | Chamberlain et al. |
| 2010/0251386 A1 | 9/2010 | Gilzean et al. |
| 2010/0257015 A1 | 10/2010 | Molander |
| 2010/0262625 A1 | 10/2010 | Pittenger |
| 2010/0268705 A1 | 10/2010 | Douglas et al. |
| 2010/0268773 A1 | 10/2010 | Hunt et al. |
| 2010/0281462 A1 | 11/2010 | Festa |
| 2010/0287163 A1 | 11/2010 | Sridhar et al. |
| 2010/0287221 A1 | 11/2010 | Battepati et al. |
| 2010/0313119 A1 | 12/2010 | Baldwin et al. |
| 2010/0324964 A1 | 12/2010 | Callanan et al. |
| 2010/0332973 A1 | 12/2010 | Kloiber et al. |
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0041140 A1 | 2/2011 | Harm et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0154192 A1 | 6/2011 | Yang et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez Veron et al. |
| 2011/0225500 A1 | 9/2011 | Casalaina et al. |
| 2011/0225525 A1 | 9/2011 | Chasman et al. |
| 2011/0231273 A1 | 9/2011 | Buchheit |
| 2011/0238716 A1 | 9/2011 | Amir et al. |
| 2011/0258040 A1 | 10/2011 | Gnanasambandam |
| 2011/0269424 A1 | 11/2011 | Multer |
| 2011/0288900 A1 | 11/2011 | Mcqueen et al. |
| 2011/0289397 A1 | 11/2011 | Eastmond et al. |
| 2011/0289439 A1 | 11/2011 | Jugel |
| 2011/0292046 A1 | 12/2011 | Gotz |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036423 A1 | 2/2012 | Haynes et al. |
| 2012/0036462 A1 | 2/2012 | Schwartz et al. |
| 2012/0050802 A1 | 3/2012 | Masuda |
| 2012/0066587 A1 | 3/2012 | Zhou et al. |
| 2012/0072821 A1 | 3/2012 | Bowling |
| 2012/0079408 A1 | 3/2012 | Rohwer |
| 2012/0081762 A1 | 4/2012 | Yamada |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0120086 A1 | 5/2012 | Dang et al. |
| 2012/0124749 A1 | 5/2012 | Lewman |
| 2012/0130907 A1 | 5/2012 | Thompson et al. |
| 2012/0131445 A1 | 5/2012 | Oyarzabal et al. |
| 2012/0137238 A1 | 5/2012 | Abeln |
| 2012/0151173 A1 | 6/2012 | Shirley et al. |
| 2012/0158744 A1 | 6/2012 | Tseng et al. |
| 2012/0166980 A1 | 6/2012 | Yosef et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |

(56)  References Cited

U.S. PATENT DOCUMENTS

| | | |
|---|---|---|
| 2012/0215578 A1 | 8/2012 | Swierz et al. |
| 2012/0229867 A1 | 9/2012 | Takagi |
| 2012/0233150 A1 | 9/2012 | Naim et al. |
| 2012/0233533 A1 | 9/2012 | Yucel et al. |
| 2012/0234907 A1 | 9/2012 | Clark et al. |
| 2012/0236368 A1 | 9/2012 | Uchida et al. |
| 2012/0239454 A1 | 9/2012 | Taix et al. |
| 2012/0244891 A1 | 9/2012 | Appleton |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Sitrick et al. |
| 2012/0284643 A1 | 11/2012 | Sitrick et al. |
| 2012/0297307 A1 | 11/2012 | Rider et al. |
| 2012/0300931 A1 | 11/2012 | Ollikainen et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2012/0311672 A1 | 12/2012 | Connor et al. |
| 2012/0324348 A1 | 12/2012 | Rounthwaite |
| 2013/0015954 A1 | 1/2013 | Thorne et al. |
| 2013/0018952 A1 | 1/2013 | Mcconnell et al. |
| 2013/0018953 A1 | 1/2013 | Mcconnell et al. |
| 2013/0018960 A1 | 1/2013 | Knysz et al. |
| 2013/0024418 A1 | 1/2013 | Sitrick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0054514 A1 | 2/2013 | Barrett-Kahn et al. |
| 2013/0055113 A1 | 2/2013 | Chazin et al. |
| 2013/0059598 A1 | 3/2013 | Miyagi et al. |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0158964 A1 | 6/2013 | Hall et al. |
| 2013/0159832 A1 | 6/2013 | Ingargiola et al. |
| 2013/0159907 A1 | 6/2013 | Brosche et al. |
| 2013/0179209 A1 | 7/2013 | Milosevich |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0215475 A1 | 8/2013 | Noguchi |
| 2013/0238363 A1 | 9/2013 | Ohta et al. |
| 2013/0238968 A1 | 9/2013 | Barrus |
| 2013/0246384 A1 | 9/2013 | Victor |
| 2013/0262527 A1 | 10/2013 | Hunter et al. |
| 2013/0268331 A1 | 10/2013 | Bitz et al. |
| 2013/0297468 A1 | 11/2013 | Hirsch et al. |
| 2013/0307997 A1 | 11/2013 | O'Keefe et al. |
| 2013/0318424 A1 | 11/2013 | Boyd |
| 2013/0339051 A1 | 12/2013 | Dobrean |
| 2014/0002863 A1 | 1/2014 | Hasegawa et al. |
| 2014/0006326 A1 | 1/2014 | Bazanov |
| 2014/0012616 A1 | 1/2014 | Moshenek |
| 2014/0019842 A1 | 1/2014 | Montagna et al. |
| 2014/0033307 A1 | 1/2014 | Schmidtler |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0058801 A1 | 2/2014 | Deodhar et al. |
| 2014/0059017 A1 | 2/2014 | Chaney et al. |
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0078557 A1 | 3/2014 | Hasegawa et al. |
| 2014/0082525 A1 | 3/2014 | Kass et al. |
| 2014/0095237 A1 | 4/2014 | Ehrler et al. |
| 2014/0100884 A1 | 4/2014 | Hamilton et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1 | 4/2014 | Hall et al. |
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Jarvenpaa et al. |
| 2014/0143252 A1 | 5/2014 | Silverstein et al. |
| 2014/0172475 A1 | 6/2014 | Olliphant et al. |
| 2014/0173401 A1 | 6/2014 | Oshlag et al. |
| 2014/0181155 A1 | 6/2014 | Homsany |
| 2014/0188546 A1 | 7/2014 | Goja |
| 2014/0188748 A1 | 7/2014 | Cavoue et al. |
| 2014/0195933 A1 | 7/2014 | Rao Dv |
| 2014/0214404 A1 | 7/2014 | Kalia et al. |
| 2014/0215303 A1 | 7/2014 | Grigorovitch et al. |
| 2014/0229816 A1 | 8/2014 | Yakub |
| 2014/0240735 A1 | 8/2014 | Salgado |
| 2014/0249877 A1 | 9/2014 | Hull et al. |
| 2014/0257568 A1 | 9/2014 | Czaja et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0280377 A1 | 9/2014 | Frew |
| 2014/0281868 A1 | 9/2014 | Vogel et al. |
| 2014/0281869 A1 | 9/2014 | Yob |
| 2014/0282417 A1 | 9/2014 | Paveza et al. |
| 2014/0289223 A1 | 9/2014 | Colwell et al. |
| 2014/0297828 A1 | 10/2014 | Voltmer et al. |
| 2014/0304174 A1 | 10/2014 | Scott et al. |
| 2014/0306837 A1 | 10/2014 | Hauck |
| 2014/0310345 A1 | 10/2014 | Megiddo et al. |
| 2014/0324497 A1 | 10/2014 | Verma et al. |
| 2014/0324501 A1 | 10/2014 | Davidow et al. |
| 2014/0325552 A1 | 10/2014 | Evans et al. |
| 2014/0337085 A1 | 11/2014 | Li et al. |
| 2014/0359580 A1 | 12/2014 | Boissy et al. |
| 2014/0365938 A1 | 12/2014 | Black et al. |
| 2014/0372856 A1 | 12/2014 | Radakovitz et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0035918 A1 | 2/2015 | Matsumoto et al. |
| 2015/0039387 A1 | 2/2015 | Akahoshi et al. |
| 2015/0046209 A1 | 2/2015 | Choe |
| 2015/0046900 A1 | 2/2015 | Eldridge et al. |
| 2015/0058619 A1 | 2/2015 | Sweet et al. |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0088822 A1 | 3/2015 | Raja et al. |
| 2015/0095752 A1 | 4/2015 | Studer et al. |
| 2015/0100336 A1 | 4/2015 | Ford et al. |
| 2015/0106736 A1 | 4/2015 | Torman et al. |
| 2015/0125834 A1 | 5/2015 | Mendoza Tascon |
| 2015/0142676 A1 | 5/2015 | Mcginnis et al. |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0178657 A1 | 6/2015 | Kleehammer et al. |
| 2015/0188964 A1 | 7/2015 | Sharma et al. |
| 2015/0205830 A1 | 7/2015 | Bastide et al. |
| 2015/0212717 A1 | 7/2015 | Nair et al. |
| 2015/0213397 A1 | 7/2015 | Arena |
| 2015/0220491 A1 | 8/2015 | Cochrane et al. |
| 2015/0234887 A1 | 8/2015 | Greene et al. |
| 2015/0242091 A1 | 8/2015 | Lu et al. |
| 2015/0248214 A1 | 9/2015 | Gilger et al. |
| 2015/0249864 A1 | 9/2015 | Tang et al. |
| 2015/0261796 A1 | 9/2015 | Gould et al. |
| 2015/0262121 A1 | 9/2015 | Riel-Dalpe et al. |
| 2015/0278699 A1 | 10/2015 | Danielsson |
| 2015/0281292 A1 | 10/2015 | Kim et al. |

(56) References Cited

U.S. PATENT DOCUMENTS

| | | |
|---|---|---|
| 2015/0295877 A1 | 10/2015 | Roman et al. |
| 2015/0310126 A1 | 10/2015 | Steiner et al. |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370776 A1 | 12/2015 | New |
| 2015/0370904 A1 | 12/2015 | Joshi et al. |
| 2015/0378542 A1 | 12/2015 | Saito et al. |
| 2015/0378556 A1 | 12/2015 | Ramanathan et al. |
| 2015/0378711 A1 | 12/2015 | Cameron et al. |
| 2015/0378979 A1 | 12/2015 | Hirzel et al. |
| 2015/0379472 A1 | 12/2015 | Gilmour et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0035546 A1 | 2/2016 | Platt et al. |
| 2016/0041736 A1 | 2/2016 | Schulz |
| 2016/0055134 A1 | 2/2016 | Sathish et al. |
| 2016/0055374 A1 | 2/2016 | Zhang et al. |
| 2016/0057163 A1 | 2/2016 | Boffa et al. |
| 2016/0063435 A1 | 3/2016 | Shah et al. |
| 2016/0068960 A1 | 3/2016 | Jung et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0098574 A1 | 4/2016 | Bargagni |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0196310 A1 | 7/2016 | Dutta |
| 2016/0210572 A1 | 7/2016 | Shaaban et al. |
| 2016/0216948 A1 | 7/2016 | Mcpherson et al. |
| 2016/0224532 A1 | 8/2016 | Miller et al. |
| 2016/0224676 A1 | 8/2016 | Miller et al. |
| 2016/0224939 A1 | 8/2016 | Chen et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253061 A1 | 9/2016 | Nitsan et al. |
| 2016/0253982 A1 | 9/2016 | Cheung et al. |
| 2016/0259856 A1 | 9/2016 | Ananthapur Bache et al. |
| 2016/0275150 A1 | 9/2016 | Bournonnais et al. |
| 2016/0292206 A1 | 10/2016 | Ruiz Velazquez et al. |
| 2016/0299655 A1 | 10/2016 | Migos et al. |
| 2016/0308963 A1 | 10/2016 | Kùng |
| 2016/0321235 A1 | 11/2016 | He et al. |
| 2016/0321604 A1 | 11/2016 | Imaeda et al. |
| 2016/0335302 A1 | 11/2016 | Wright et al. |
| 2016/0335303 A1 | 11/2016 | Madhalam et al. |
| 2016/0335604 A1 | 11/2016 | Reminick et al. |
| 2016/0335731 A1 | 11/2016 | Hall |
| 2016/0335903 A1 | 11/2016 | Mendoza Tascon |
| 2016/0344828 A1 | 11/2016 | Hausler et al. |
| 2016/0350950 A1 | 12/2016 | Ritchie et al. |
| 2016/0381099 A1 | 12/2016 | Keslin et al. |
| 2017/0017779 A1 | 1/2017 | Huang et al. |
| 2017/0031967 A1 | 2/2017 | Chavan et al. |
| 2017/0038919 A1 | 2/2017 | Moss et al. |
| 2017/0041296 A1 | 2/2017 | Ford et al. |
| 2017/0052937 A1 | 2/2017 | Sirven et al. |
| 2017/0061342 A1 | 3/2017 | Lore et al. |
| 2017/0061360 A1 | 3/2017 | Rucker et al. |
| 2017/0061820 A1 | 3/2017 | Firoozbakhsh |
| 2017/0063722 A1 | 3/2017 | Cropper et al. |
| 2017/0075557 A1 | 3/2017 | Noble et al. |
| 2017/0076101 A1 | 3/2017 | Kochhar et al. |
| 2017/0090734 A1 | 3/2017 | Fitzpatrick |
| 2017/0090736 A1 | 3/2017 | King et al. |
| 2017/0091337 A1 | 3/2017 | Patterson |
| 2017/0093876 A1 | 3/2017 | Feng et al. |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0124740 A1 | 5/2017 | Campbell et al. |
| 2017/0126772 A1 | 5/2017 | Campbell et al. |
| 2017/0132296 A1 | 5/2017 | Ding |
| 2017/0132652 A1 | 5/2017 | Kedzlie et al. |
| 2017/0139874 A1 | 5/2017 | Chin |
| 2017/0139884 A1 | 5/2017 | Bendig et al. |
| 2017/0139891 A1 | 5/2017 | Ah-Soon et al. |
| 2017/0139992 A1 | 5/2017 | Morin |
| 2017/0140047 A1 | 5/2017 | Bendig et al. |
| 2017/0140219 A1 | 5/2017 | King et al. |
| 2017/0153771 A1 | 6/2017 | Chu |
| 2017/0161246 A1 | 6/2017 | Klima |
| 2017/0177556 A1 | 6/2017 | Fay et al. |
| 2017/0177888 A1 | 6/2017 | Arora et al. |
| 2017/0185575 A1 | 6/2017 | Sood et al. |
| 2017/0185592 A1 | 6/2017 | Frei et al. |
| 2017/0185668 A1 | 6/2017 | Convertino et al. |
| 2017/0200122 A1 | 7/2017 | Edson et al. |
| 2017/0201428 A1 | 7/2017 | Normandin |
| 2017/0206366 A1 | 7/2017 | Fay et al. |
| 2017/0212924 A1 | 7/2017 | Semlani et al. |
| 2017/0220813 A1 | 8/2017 | Mullins et al. |
| 2017/0221072 A1 | 8/2017 | Athulurutlrumala et al. |
| 2017/0221238 A1 | 8/2017 | Limberger |
| 2017/0228421 A1 | 8/2017 | Sharma et al. |
| 2017/0228445 A1 | 8/2017 | Chiu et al. |
| 2017/0228460 A1 | 8/2017 | Amel et al. |
| 2017/0229152 A1 | 8/2017 | Loganathan et al. |
| 2017/0236081 A1 | 8/2017 | Grady Smith et al. |
| 2017/0242921 A1 | 8/2017 | Rota |
| 2017/0257517 A1 | 9/2017 | Panda |
| 2017/0262786 A1 | 9/2017 | Khasis |
| 2017/0269805 A1 | 9/2017 | Demaris et al. |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0277620 A1 | 9/2017 | Kadioglu |
| 2017/0277669 A1 | 9/2017 | Sekharan |
| 2017/0285879 A1 | 10/2017 | Pilkington et al. |
| 2017/0285890 A1 | 10/2017 | Dolman |
| 2017/0289619 A1 | 10/2017 | Xu et al. |
| 2017/0300545 A1 | 10/2017 | Lee et al. |
| 2017/0301039 A1 | 10/2017 | Dyer et al. |
| 2017/0315683 A1 | 11/2017 | Boucher et al. |
| 2017/0315714 A1 | 11/2017 | Shyamsundar et al. |
| 2017/0315974 A1 | 11/2017 | Kong et al. |
| 2017/0315979 A1 | 11/2017 | Boucher et al. |
| 2017/0316355 A1 | 11/2017 | Shrestha et al. |
| 2017/0322963 A1 | 11/2017 | Ramamurthi et al. |
| 2017/0324692 A1 | 11/2017 | Zhou |
| 2017/0329479 A1 | 11/2017 | Rauschenbach et al. |
| 2017/0336940 A1 | 11/2017 | Townsend et al. |
| 2017/0344895 A1 | 11/2017 | Roy |
| 2017/0351252 A1 | 12/2017 | Kleifges et al. |
| 2017/0351974 A1 | 12/2017 | Rose et al. |
| 2017/0372442 A1 | 12/2017 | Mejias |
| 2017/0374205 A1 | 12/2017 | Panda |
| 2018/0011827 A1 | 1/2018 | Avery et al. |
| 2018/0025084 A1 | 1/2018 | Conlan et al. |
| 2018/0026954 A1 | 1/2018 | Toepke et al. |
| 2018/0032492 A1 | 2/2018 | Altshuller et al. |
| 2018/0032570 A1 | 2/2018 | Miller et al. |
| 2018/0039651 A1 | 2/2018 | Tobin et al. |
| 2018/0055434 A1 | 3/2018 | Cheung et al. |
| 2018/0068470 A1 | 3/2018 | Croft |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0077143 A1 | 3/2018 | Sridharan et al. |
| 2018/0081505 A1 | 3/2018 | Ron et al. |
| 2018/0081863 A1 | 3/2018 | Bathla |
| 2018/0081868 A1 | 3/2018 | Willcock et al. |
| 2018/0082072 A1 | 3/2018 | Hosie et al. |
| 2018/0088753 A1 | 3/2018 | Viegas et al. |

(56) References Cited

U.S. PATENT DOCUMENTS

| | | |
|---|---|---|
| 2018/0088989 A1 | 3/2018 | Nield et al. |
| 2018/0089299 A1 | 3/2018 | Collins et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0121028 A1 | 5/2018 | Kuscher et al. |
| 2018/0121994 A1 | 5/2018 | Matsunaga et al. |
| 2018/0128636 A1 | 5/2018 | Zhou |
| 2018/0129651 A1 | 5/2018 | Latvala et al. |
| 2018/0143967 A1 | 5/2018 | Anbazhagan et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0157633 A1 | 6/2018 | He et al. |
| 2018/0173715 A1 | 6/2018 | Dunne |
| 2018/0174104 A1 | 6/2018 | Schikora et al. |
| 2018/0181650 A1 | 6/2018 | Komatsuda et al. |
| 2018/0181716 A1 | 6/2018 | Mander et al. |
| 2018/0189734 A1 | 7/2018 | Newhouse et al. |
| 2018/0210936 A1 | 7/2018 | Reynolds et al. |
| 2018/0213286 A1 | 7/2018 | Roman et al. |
| 2018/0225270 A1 | 8/2018 | Bhide et al. |
| 2018/0232422 A1 | 8/2018 | Park et al. |
| 2018/0260371 A1 | 9/2018 | Theodore et al. |
| 2018/0260435 A1 | 9/2018 | Xu |
| 2018/0262705 A1 | 9/2018 | Park et al. |
| 2018/0276417 A1 | 9/2018 | Cerezo Sanchez |
| 2018/0285149 A1 | 10/2018 | Bhandari et al. |
| 2018/0285918 A1 | 10/2018 | Staggs |
| 2018/0293217 A1 | 10/2018 | Callaghan |
| 2018/0293587 A1 | 10/2018 | Oda |
| 2018/0293669 A1 | 10/2018 | Jackson et al. |
| 2018/0329930 A1 | 11/2018 | Eberlein et al. |
| 2018/0330320 A1 | 11/2018 | Kohli |
| 2018/0357047 A1 | 12/2018 | Brown et al. |
| 2018/0357305 A1 | 12/2018 | Kinast et al. |
| 2018/0365429 A1 | 12/2018 | Segal |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2018/0374479 A1 | 12/2018 | Hall et al. |
| 2019/0004773 A1 | 1/2019 | Hoberman |
| 2019/0005094 A1 | 1/2019 | Yi et al. |
| 2019/0011310 A1 | 1/2019 | Turnbull et al. |
| 2019/0012306 A1 | 1/2019 | Dvorak |
| 2019/0012342 A1 | 1/2019 | Cohn |
| 2019/0028360 A1 | 1/2019 | Douglas et al. |
| 2019/0034395 A1 | 1/2019 | Curry et al. |
| 2019/0036989 A1 | 1/2019 | Eirinberg et al. |
| 2019/0042628 A1 | 2/2019 | Rajpara |
| 2019/0050445 A1 | 2/2019 | Griffith et al. |
| 2019/0050466 A1 | 2/2019 | Kim et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0068703 A1 | 2/2019 | Vora et al. |
| 2019/0073350 A1 | 3/2019 | Shiotani |
| 2019/0079751 A1 | 3/2019 | Foskett et al. |
| 2019/0095413 A1 | 3/2019 | Davis et al. |
| 2019/0097909 A1 | 3/2019 | Puri et al. |
| 2019/0102425 A1 | 4/2019 | Obeidat |
| 2019/0108046 A1 | 4/2019 | Spencer-Harper et al. |
| 2019/0113935 A1 | 4/2019 | Kuo et al. |
| 2019/0114308 A1 | 4/2019 | Hancock |
| 2019/0114589 A1 | 4/2019 | Voss et al. |
| 2019/0123924 A1 | 4/2019 | Embiricos et al. |
| 2019/0130413 A1 | 5/2019 | Nelson et al. |
| 2019/0130611 A1 | 5/2019 | Black et al. |
| 2019/0138583 A1 | 5/2019 | Silk et al. |
| 2019/0138588 A1 | 5/2019 | Silk et al. |
| 2019/0138653 A1 | 5/2019 | Roller et al. |
| 2019/0147030 A1 | 5/2019 | Stein et al. |
| 2019/0155821 A1 | 5/2019 | Dirisala |
| 2019/0166110 A1 | 5/2019 | Miu |
| 2019/0179501 A1 | 6/2019 | Seeley et al. |
| 2019/0199823 A1 | 6/2019 | Underwood et al. |
| 2019/0208058 A1 | 7/2019 | Dvorkin et al. |
| 2019/0213557 A1 | 7/2019 | Dotan-Cohen et al. |
| 2019/0220161 A1 | 7/2019 | Loftus et al. |
| 2019/0236188 A1 | 8/2019 | Mckenna |
| 2019/0238636 A1 | 8/2019 | Li et al. |
| 2019/0243879 A1 | 8/2019 | Harley et al. |
| 2019/0251884 A1 | 8/2019 | Burns et al. |
| 2019/0258461 A1 | 8/2019 | Li et al. |
| 2019/0258706 A1 | 8/2019 | Li et al. |
| 2019/0286839 A1 | 9/2019 | Mutha et al. |
| 2019/0306009 A1 | 10/2019 | Makovsky et al. |
| 2019/0312899 A1 | 10/2019 | Shulman et al. |
| 2019/0324840 A1 | 10/2019 | Malamut et al. |
| 2019/0325012 A1 | 10/2019 | Delaney et al. |
| 2019/0327294 A1 | 10/2019 | Subramani Nadar et al. |
| 2019/0340550 A1 | 11/2019 | Denger et al. |
| 2019/0347077 A1 | 11/2019 | Huebra |
| 2019/0349447 A1 | 11/2019 | Adams et al. |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2019/0377791 A1 | 12/2019 | Abou Mahmoud et al. |
| 2019/0391707 A1 | 12/2019 | Ristow et al. |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019548 A1 | 1/2020 | Agnew et al. |
| 2020/0019595 A1 | 1/2020 | Azua Garcia |
| 2020/0026352 A1 | 1/2020 | Wang et al. |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez Salgado et al. |
| 2020/0117908 A1 | 4/2020 | Pavetic et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0175094 A1 | 6/2020 | Palmer |
| 2020/0176089 A1 | 6/2020 | Jones et al. |
| 2020/0192646 A1 | 6/2020 | Yerramreddy et al. |
| 2020/0192785 A1 | 6/2020 | Chen |
| 2020/0193388 A1 | 6/2020 | Tran-Kiem et al. |
| 2020/0236110 A1 | 7/2020 | Metzler et al. |
| 2020/0247661 A1 | 8/2020 | Rao et al. |
| 2020/0250259 A1 | 8/2020 | Nanavati et al. |
| 2020/0265112 A1 | 8/2020 | Fox et al. |
| 2020/0279315 A1 | 9/2020 | Manggala |
| 2020/0293337 A1 | 9/2020 | Rangasamy et al. |
| 2020/0293616 A1 | 9/2020 | Nelson et al. |
| 2020/0301678 A1 | 9/2020 | Burman et al. |
| 2020/0301902 A1 | 9/2020 | Maloy et al. |
| 2020/0310835 A1 | 10/2020 | Momchilov |
| 2020/0310888 A1 | 10/2020 | Gopalan et al. |
| 2020/0326824 A1 | 10/2020 | Magahern et al. |
| 2020/0327244 A1 | 10/2020 | Blass et al. |
| 2020/0334019 A1 | 10/2020 | Bosworth et al. |
| 2020/0341947 A1 | 10/2020 | Aziz et al. |
| 2020/0348809 A1 | 11/2020 | Drescher |
| 2020/0349320 A1 | 11/2020 | Owens |
| 2020/0356740 A1 | 11/2020 | Principato |
| 2020/0356873 A1 | 11/2020 | Nawrocke et al. |
| 2020/0372055 A1 | 11/2020 | Joko et al. |
| 2020/0374146 A1 | 11/2020 | Chhabra et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2020/0401583 A1 | 12/2020 | Church et al. |
| 2020/0409949 A1 | 12/2020 | Saxena et al. |
| 2020/0410395 A1 | 12/2020 | Ray et al. |
| 2021/0014136 A1 | 1/2021 | Rath |
| 2021/0019287 A1 | 1/2021 | Prasad et al. |
| 2021/0019374 A1 | 1/2021 | Donaldson et al. |
| 2021/0021603 A1 | 1/2021 | Gibbons |
| 2021/0026598 A1 | 1/2021 | Zinsmeyer et al. |

(56) References Cited

U.S. PATENT DOCUMENTS

| | | |
|---|---|---|
| 2021/0034058 A1 | 2/2021 | Subramanian et al. |
| 2021/0034443 A1 | 2/2021 | Lowin et al. |
| 2021/0035069 A1 | 2/2021 | Parikh |
| 2021/0042796 A1 | 2/2021 | Khoury et al. |
| 2021/0049524 A1 | 2/2021 | Nachum et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0065203 A1 | 3/2021 | Billigmeier et al. |
| 2021/0072883 A1 | 3/2021 | Migunova et al. |
| 2021/0073526 A1 | 3/2021 | Zeng et al. |
| 2021/0075870 A1 | 3/2021 | Kempf et al. |
| 2021/0081404 A1 | 3/2021 | Kempf et al. |
| 2021/0084120 A1 | 3/2021 | Fisher et al. |
| 2021/0096852 A1 | 4/2021 | Stump et al. |
| 2021/0117864 A1 | 4/2021 | Weast et al. |
| 2021/0117893 A1 | 4/2021 | Sohum et al. |
| 2021/0124749 A1 | 4/2021 | Suzuki et al. |
| 2021/0124872 A1 | 4/2021 | Lereya |
| 2021/0136027 A1 | 5/2021 | Barbitta et al. |
| 2021/0141923 A1 | 5/2021 | Wu et al. |
| 2021/0149553 A1 | 5/2021 | Lereya et al. |
| 2021/0149688 A1 | 5/2021 | Newell et al. |
| 2021/0149925 A1 | 5/2021 | Mann et al. |
| 2021/0150489 A1 | 5/2021 | Haramati et al. |
| 2021/0157978 A1 | 5/2021 | Haramati et al. |
| 2021/0158214 A1 | 5/2021 | Witt et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0174006 A1 | 6/2021 | Stokes |
| 2021/0192126 A1 | 6/2021 | Gehrmann et al. |
| 2021/0203549 A1 | 7/2021 | Snehashis et al. |
| 2021/0232484 A1 | 7/2021 | Keneally et al. |
| 2021/0248311 A1 | 8/2021 | Helft et al. |
| 2021/0257065 A1 | 8/2021 | Gehrmann et al. |
| 2021/0264220 A1 | 8/2021 | Wei et al. |
| 2021/0271726 A1 | 9/2021 | Trainor |
| 2021/0273957 A1 | 9/2021 | Boyer et al. |
| 2021/0281428 A1 | 9/2021 | Kempf et al. |
| 2021/0304020 A1 | 9/2021 | Kaplan |
| 2021/0319135 A1* | 10/2021 | Hwang .................... G06T 11/00 |
| 2021/0326519 A1 | 10/2021 | Lin et al. |
| 2021/0328888 A1 | 10/2021 | Rath |
| 2021/0342145 A1 | 11/2021 | Miller et al. |
| 2021/0342785 A1 | 11/2021 | Mann et al. |
| 2021/0357579 A1 | 11/2021 | Lereya et al. |
| 2021/0365446 A1 | 11/2021 | Srivastava et al. |
| 2021/0374197 A1 | 12/2021 | Chauhan |
| 2021/0382611 A1 | 12/2021 | Gan |
| 2021/0397585 A1 | 12/2021 | Seward |
| 2022/0011732 A1 | 1/2022 | Hall |
| 2022/0066847 A1 | 3/2022 | Liu et al. |
| 2022/0099454 A1 | 3/2022 | Decrop et al. |
| 2022/0103589 A1 | 3/2022 | Shen et al. |
| 2022/0114044 A1 | 4/2022 | Singh |
| 2022/0121325 A1 | 4/2022 | Roberts et al. |
| 2022/0121478 A1 | 4/2022 | Chivukula et al. |
| 2022/0122183 A1 | 4/2022 | Jacob et al. |
| 2022/0129283 A1 | 4/2022 | Sharma et al. |
| 2022/0138004 A1 | 5/2022 | Nandakumar et al. |
| 2022/0147934 A1 | 5/2022 | Chandrashekar et al. |
| 2022/0191251 A1 | 6/2022 | Gavish et al. |
| 2022/0206864 A1 | 6/2022 | Nadathur et al. |
| 2022/0221591 A1 | 7/2022 | Smith et al. |
| 2022/0222242 A1 | 7/2022 | Spranger et al. |
| 2022/0222427 A1 | 7/2022 | Mann et al. |
| 2022/0229928 A1 | 7/2022 | Shachar et al. |
| 2022/0237550 A1 | 7/2022 | Jennings et al. |
| 2022/0245328 A1 | 8/2022 | Tsabba |
| 2022/0253347 A1 | 8/2022 | Jones et al. |
| 2022/0261288 A1 | 8/2022 | Viswanathan et al. |
| 2022/0291666 A1 | 9/2022 | Cella et al. |
| 2022/0292180 A1 | 9/2022 | Chauhan |
| 2022/0300850 A1 | 9/2022 | Mendez et al. |
| 2022/0308918 A1 | 9/2022 | Pandey et al. |
| 2022/0335362 A1 | 10/2022 | Nikain et al. |
| 2022/0343010 A1 | 10/2022 | Ghafoor et al. |
| 2022/0343258 A1 | 10/2022 | Wilde et al. |
| 2022/0351564 A1 | 11/2022 | Sahani et al. |
| 2022/0357905 A1 | 11/2022 | Dohmae |
| 2022/0358190 A1 | 11/2022 | Baghani et al. |
| 2022/0375145 A1 | 11/2022 | Herath et al. |
| 2022/0382522 A1 | 12/2022 | Heynemann Nascentes Da Silva et al. |
| 2022/0413846 A1 | 12/2022 | Clarke et al. |
| 2023/0004832 A1 | 1/2023 | Sahasi et al. |
| 2023/0004900 A1 | 1/2023 | Gleave |
| 2023/0014233 A1 | 1/2023 | Xiang et al. |
| 2023/0016946 A1 | 1/2023 | Wouhaybi et al. |
| 2023/0035600 A1 | 2/2023 | Holzman et al. |
| 2023/0036114 A1 | 2/2023 | Whitehill et al. |
| 2023/0075183 A1 | 3/2023 | Copty et al. |
| 2023/0081880 A1 | 3/2023 | Mathur et al. |
| 2023/0083891 A1 | 3/2023 | Achin et al. |
| 2023/0093470 A1 | 3/2023 | Dvornik et al. |
| 2023/0107316 A1 | 4/2023 | Ripa et al. |
| 2023/0108808 A1 | 4/2023 | Lerman |
| 2023/0113369 A1 | 4/2023 | Wang et al. |
| 2023/0142774 A1 | 5/2023 | Hashemi et al. |
| 2023/0153651 A1 | 5/2023 | Bi et al. |
| 2023/0153724 A1 | 5/2023 | Thampy et al. |
| 2023/0171241 A1 | 6/2023 | Amichay et al. |
| 2023/0188516 A1 | 6/2023 | Danilov et al. |
| 2023/0214461 A1 | 7/2023 | Brooks |
| 2023/0230006 A1 | 7/2023 | Bosch et al. |
| 2023/0259390 A1 | 8/2023 | Howley et al. |
| 2023/0259839 A1 | 8/2023 | Manalo et al. |
| 2023/0281023 A1 | 9/2023 | Bienfait et al. |
| 2023/0281040 A1 | 9/2023 | Cao |
| 2023/0316382 A1 | 10/2023 | Faricy et al. |
| 2023/0385042 A1 | 11/2023 | Obando Chacon et al. |
| 2023/0385085 A1 | 11/2023 | Singh |
| 2023/0385814 A1 | 11/2023 | Gauthier et al. |
| 2023/0393832 A1 | 12/2023 | Touati et al. |
| 2023/0396641 A1 | 12/2023 | Hebbagodi et al. |
| 2023/0419161 A1 | 12/2023 | Dines |
| 2024/0046142 A1 | 2/2024 | Marks et al. |
| 2024/0053727 A1 | 2/2024 | Timisescu et al. |
| 2024/0054035 A1 | 2/2024 | Bhargav |
| 2024/0054526 A1 | 2/2024 | Horwitz et al. |
| 2024/0078724 A1 | 3/2024 | Brehmer et al. |
| 2024/0094861 A1* | 3/2024 | Chou ...................... G06T 19/20 |
| 2024/0154967 A1 | 5/2024 | Mcguinness et al. |
| 2024/0169519 A1 | 5/2024 | Tjon |
| 2024/0202405 A1 | 6/2024 | Lang et al. |
| 2024/0250977 A1 | 7/2024 | Shulman et al. |
| 2024/0265408 A1 | 8/2024 | Singh et al. |
| 2024/0283759 A1 | 8/2024 | Adams |
| 2024/0333705 A1 | 10/2024 | Sanchala et al. |
| 2024/0345807 A1 | 10/2024 | Duggal et al. |
| 2024/0361995 A1 | 10/2024 | Somasundaram et al. |
| 2024/0362743 A1 | 10/2024 | Jung et al. |
| 2024/0370708 A1 | 11/2024 | Raghavan et al. |
| 2024/0403328 A1 | 12/2024 | Hecht et al. |
| 2024/0419423 A1 | 12/2024 | Chen et al. |
| 2025/0028743 A1 | 1/2025 | Massoudian et al. |
| 2025/0063083 A1 | 2/2025 | Grinberg et al. |
| 2025/0094884 A1 | 3/2025 | Sigwart et al. |
| 2025/0130705 A1 | 4/2025 | Kimhi et al. |
| 2025/0148115 A1 | 5/2025 | Ghafoor et al. |
| 2025/0173162 A1 | 5/2025 | Mystetskyi et al. |
| 2025/0173450 A1 | 5/2025 | Mystetskyi et al. |
| 2025/0245030 A1 | 7/2025 | Cyjon et al. |
| 2025/0251847 A1 | 8/2025 | Pham |
| 2025/0324019 A1* | 10/2025 | Huang ................... H04N 7/157 |
| 2025/0370777 A1 | 12/2025 | Luo |
| 2026/0024037 A1 | 1/2026 | Mystetskyi et al. |

FOREIGN PATENT DOCUMENTS

| | | |
|---|---|---|
| CN | 107123424 A | 9/2017 |
| CN | 107422666 A | 12/2017 |

(56)　　　References Cited

FOREIGN PATENT DOCUMENTS

| CN | 107623596 | A | 1/2018 |
|---|---|---|---|
| CN | 107885656 | A | 4/2018 |
| CN | 108717428 | A | 10/2018 |
| CN | 112929172 | A | 6/2021 |
| DE | 102013104892 | A1 | 11/2014 |
| EP | 3443466 | B1 | 12/2021 |
| JP | H0756821 | A | 3/1995 |
| KR | 1020150100760 | A | 9/2015 |
| KR | 1020220016276 | A | 2/2022 |
| WO | 2004100015 | A2 | 11/2004 |
| WO | 2006116580 | A2 | 11/2006 |
| WO | 2008109541 | A1 | 9/2008 |
| WO | 2014088393 | A1 | 6/2014 |
| WO | 2017202159 | A1 | 11/2017 |
| WO | 2018023798 | A1 | 2/2018 |
| WO | 2018042424 | A1 | 3/2018 |
| WO | 2020139865 | A1 | 7/2020 |
| WO | 2020187408 | A1 | 9/2020 |
| WO | 2020215123 | A1 | 10/2020 |
| WO | 2021096944 | A1 | 5/2021 |
| WO | 2021144656 | A1 | 7/2021 |
| WO | 2021161104 | A1 | 8/2021 |
| WO | 2021183312 | A1 | 9/2021 |
| WO | 2021220058 | A1 | 11/2021 |
| WO | 2022153122 | A1 | 7/2022 |
| WO | 2023186048 | A1 | 10/2023 |
| WO | 2024101001 | A1 | 5/2024 |

OTHER PUBLICATIONS

Anupam et al., "Personalizing the Web Using Site Descriptions," In: Proceedings of the Tenth International Workshop on Database and Expert Systems Applications, Sep. 1999, 7 pages.

Aylward, Grant, "Drag-and-Drop AI Enables Digital Workforce Deployment at Scale Share," Blue Prism, Mar. 19, 2020, Retrieved from <https://www.blueprism.com/resources/ blog/drag-and-drop-ai-enables-digital-workforce-deployment-at-scale/>, 10 pages.

Baarslag et al., "Negotiation as an Interaction Mechanism for Deciding App Permissions," In: Proceedings of the 2016 CHI Conference Extended Abstracts on Human Factors in Computing Systems, 2016, pp. 2012-2019.

Bahrebar et al.,■"A Novel Type-2 Fuzzy Logic for Improved Risk Analysis of Proton Exchange Membrane Fuel Cells in Marine Power Systems Application;" Energies, Mar. 22, 2018, vol. 11, No. 721, pp. 1-16.

Barai et al., "Image Annotation System Using Visual and Textual Features," In: Proceedings of the 16th International Conference on Distributed Multi-media Systems, 2010, 8 pages.

Basic Walkthrough, Aug. 9, 2019, Retrieved from <https://www.youtube.com/watch?v=VpbgWyPf74g>, 16 pages.

Breitgand et al., "Serverless Data Analytics Platform: D3.1 Intital specs of the Serverless Compute and Execution Engine," CloudButton, Jul. 22, 2019, Retrieved from <https://cloudbutton.eu/docs/deliverables/CloudButton_D3.1_Public.pdf>, 56 pages.

Chen et al., "Artificial Intelligence in Education: A Review," IEEEAccess, Apr. 2020, vol. 8, pp. 75264-75278.

Demonstracion en espanol de Monday.com, Published Feb. 20, 2019, Retrieved from <https://www.youtube.com/watch?v=zOqydTgof1A>, 53 pages.

Desmedt et al., "Function-Based Access Control (FBAC) From Access Control Matrix to Access Control Tensor," In: Proceedings of the 8th ACM CCS International Workshop on Managing Insider Security Threats, 2016, 12 pages.

Donath, Judith, "Interfaces Make Meaning," Chapter 3 from the Social Machine: Designs for Living Online, 2014, pp. 41-76.

Dorn et al., "Efficient Full-Field Vibration Measurements and Operational Modal Analysis Using Neuromorphic Event-Based Imaging," Journal of Engineering Mechanics, Jul. 1, 2018, vol. 144, No. 7, 25 pages.

Features, daPulse, Nov. 2021, Retrieved from <web.archive.org/web/2014091818421/https://dapulse.com/features>, 22 pages.

Freund, Karl, "SiMa.ai Creates Drag-And-Drop Platform for Building AI Workflows," Forbes, Sep. 12, 2023, Retrieved from <https://www.forbes.com/sites/karlfreund/2023/09/12/simaai-creates-drag-and-drop-platform-for-building-ai-workflows/?sh=789de8466046>, 6 pages.

Genfer et al. "Visualizing metric trends for software portfolio quality management." 2021 Working Conference on Software Visualization (VISSOFT). IEEE, 2021, 12 pages.

Gutwin et al., "Supporting Informal Collaboration in Shared-Workspace Groupware," Journal of Universal Computer Science, 2008, vol. 14, No. 9, pp. 1411-1434.

High Level Overview, daPulse, 2016, Retrieved from <https://web.archive.org/web/20161104170936/https://dapulse.com>, 12 pages.

Hupfer et al., "Introducing collaboration into an application development environment," In: Proceedings of the 2004 ACM Conference on Computer Supported Cooperative Work, Nov. 2004, vol. 6, No. 3, pp. 21-24.

International Search Report and Written Opinion in PCT/IB2020/000024, mailed Jun. 9, 2020, 10 pages.

International Search Report and Written Opinion in PCT/IB2020/000658, mailed Nov. 11, 2020, 8 pages.

International Search Report and Written Opinion in PCT/IB2020/000974, mailed May 3, 2021, 15 pages.

International Search Report and Written Opinion in PCT/IB2021/000090, mailed Jul. 27, 2021, 12 pages.

International Search Report and Written Opinion in PCT/IB2021/000297, mailed Oct. 12, 2021, 17 pages.

International Search Report and Written Opinion in PCT/IB2023/061991, mailed Feb. 26, 2024, 6 pages.

International Search Report and Written Opinion in PCT/IB2023/061992, mailed Mar. 19, 2024, 7 pages.

International Search Report and Written Opinion in PCT/IB2023/061994, mailed Apr. 25, 2024, 11 pages.

International Search Report and Written Opinion in PCT/IL2024/050822, mailed Dec. 30, 2024, 9 pages.

International Search Report and Written Opinion in PCT/IB2024/055803, mailed Sep. 30, 2024, 13 pages.

Ionescu et al., "A chat-centric collaborative environment for web-based real-time collaboration," 2015 IEEE 10th Jubilee International Symposium on Applied Computational Intelligence and Informatics, May 21-23, 2015, pp. 105-110.

Kantorovitz, Isaiah, "Lexical Analysis Tool," May 2004, Retrieved from <https://dl.acm.org/doi/pdf/10.1145/997140.997147>, vol. 39, No. 5, pp. 66-74.

Kollmann, Franz, "Realizing Fine-Granular Read and Write Rights on Tree Structured Documents," in: The Second International Conference on Availability, Reliability and Security, 2007, 7 pages.

Larson, Stephen, "Introducing Data Mining Concepts Using Microsoft Excel's Table Analysis Tools," Oct. 2015, Retrieved from <https://dl.acm.org/doi/pdf/10.5555/2831373.2831394>, pp. 127-129.

Lins et al., "Artificial Intelligence as a Service," Business & Information Systems Engineering, vol. 63, 2021, pp. 441-456.

List et al., "An Evaluation of Conceptual Business Process Modelling Languages," In: Proceedings of the 2006 ACM symposium on Applied Computing, Apr. 2006, pp. 1532-1539.

Monday.com Walkthrough 2018/All Features, Platforms & Thoughts, Transcription Provided, Mar. 1, 2018, pp. 1-55.

Ni et al., "Asynchronous Event-Based Visual Shape Tracking for Stable Haptic Feedback in Microrobotics," IEEE Transactions on Robotics, vol. 28, No. 5, Oct. 1, 2012, pp. 1081-1089.

Oey et al. "Developing integrated performance dashboards with Power.BI a case study in a medium-size Manufacturer." 2021 International Conference on Information Management and Technology (ICIMTech). vol. 1. IEEE, (2021): 265-270.

Pedersen et al., "Tivoli: an electronic whiteboard for informal workgroup meetings," Conference on Human Factors in Computing Systems: Proceedings of the INTERACT '93 and CHI '93 conference on Human factors in computing systems, Apr. 24-29, 1993, pp. 391-398.

Peltier, J., "Clustered and Stacked Column and Bar Charts," Peltier Technical Services, Inc., Aug. 2011, 128 pages.

(56)            References Cited

OTHER PUBLICATIONS

Pivot table, Wikipedia, Jul. 2021, Retrieved from <https://en. wikepedia .org/w/index.php?title=Pivottable&oldid=857163289>, 5 pages.

Rodrigo, A., "Project Management with Monday.com: A 101 Introduction," Envato Tuts+, Jul. 22, 2019, Retrieved from <https://business.tutsplus.com/tutorials/project-management-with-mondaycom--cms-33586>, 11 pages.

Singh et al., "A Theoretical Framework of a BIM-based MultiDisciplinary Collaboration Platform," Automation in Construction, Nov. 2011, vol. 20, pp. 134-144.

Sreenath et al., "Agent-based service selection," Journal of Web Semantics 1.3, Oct. 2003, 29 pages.

Stancu et al., "SecCollab—Improving Confidentiality for Existing Cloud-Based Collaborative Editors," In: 2017 21st International Conferences on Control Systems and Computer Science, 2017, pp. 324-331.

Stohr, E., "Workflow Automation: Overview and Research Issues," Information Systems Frontiers, 2001, pp. 281-296.

Sun et al., "Geoweaver: Advanced Cyberinfrastructure for Managing Hybrid Geoscientific AI Workflows," International Journal of Geo-Information, Feb. 2020, vol. 9, 20 pages.

Switch Presenter While Using ShowMyPC, ShowMyPC, Aug. 2016, Retrieved from <The Wayback Machine>, 1 page.

Using Filters in Overview, Published Mar. 7, 2017, Retrieved from <https://www.youtube.com/watch?v=hycANhz7gww> 1 page.

Veenendaal, A. "How to Use Generative AI for Document Extraction & Processing." SS&C Blue Prism. (2023): 1-8.

Wilson et al., "Beyond Social Graphs: User Interactions in Online Social Networks and their Implications," ACM Transactions on the Web, Nov. 2012, vol. 6, No. 4, 31 pages.

Yamada et al., "A Software Tag Generation System to Realize Software Traceability," 2010 Asia Pacific Software Engineering Conference, pp. 423-432.

Zhang et al. "Artificial intelligence in recommender systems." Complex & intelligent systems 7.1 (2021): 439-457.

Zhang et al., "Integrating semantic NLP and logic reasoning into a unified system for fully-automated code checking," Automation in Construction, 2017, vol. 73, 2017, pp. 45-57.

* cited by examiner

Figure 3:
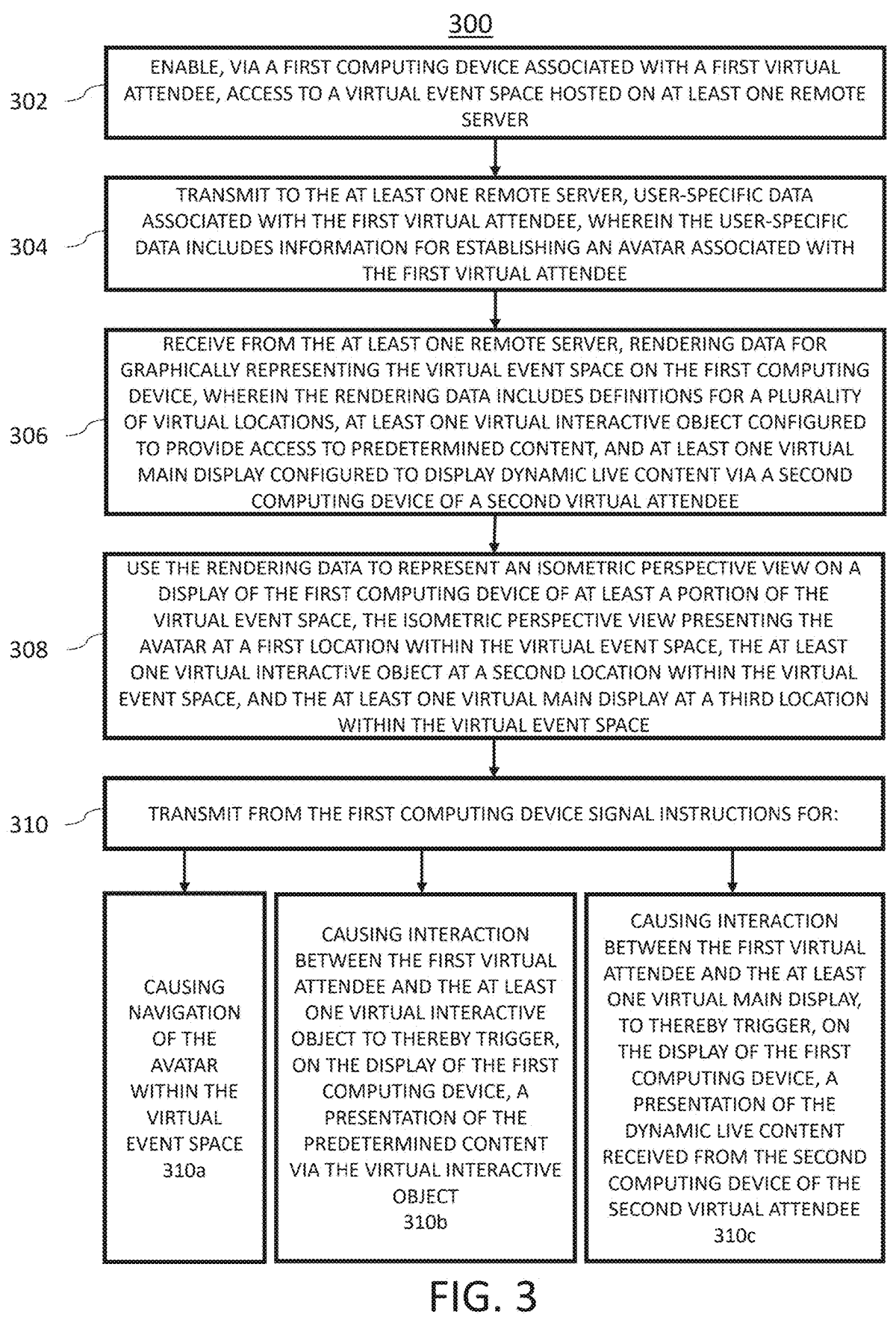

300

302 — ENABLE, VIA A FIRST COMPUTING DEVICE ASSOCIATED WITH A FIRST VIRTUAL ATTENDEE, ACCESS TO A VIRTUAL EVENT SPACE HOSTED ON AT LEAST ONE REMOTE SERVER

304 — TRANSMIT TO THE AT LEAST ONE REMOTE SERVER, USER-SPECIFIC DATA ASSOCIATED WITH THE FIRST VIRTUAL ATTENDEE, WHEREIN THE USER-SPECIFIC DATA INCLUDES INFORMATION FOR ESTABLISHING AN AVATAR ASSOCIATED WITH THE FIRST VIRTUAL ATTENDEE

306 — RECEIVE FROM THE AT LEAST ONE REMOTE SERVER, RENDERING DATA FOR GRAPHICALLY REPRESENTING THE VIRTUAL EVENT SPACE ON THE FIRST COMPUTING DEVICE, WHEREIN THE RENDERING DATA INCLUDES DEFINITIONS FOR A PLURALITY OF VIRTUAL LOCATIONS, AT LEAST ONE VIRTUAL INTERACTIVE OBJECT CONFIGURED TO PROVIDE ACCESS TO PREDETERMINED CONTENT, AND AT LEAST ONE VIRTUAL MAIN DISPLAY CONFIGURED TO DISPLAY DYNAMIC LIVE CONTENT VIA A SECOND COMPUTING DEVICE OF A SECOND VIRTUAL ATTENDEE

308 — USE THE RENDERING DATA TO REPRESENT AN ISOMETRIC PERSPECTIVE VIEW ON A DISPLAY OF THE FIRST COMPUTING DEVICE OF AT LEAST A PORTION OF THE VIRTUAL EVENT SPACE, THE ISOMETRIC PERSPECTIVE VIEW PRESENTING THE AVATAR AT A FIRST LOCATION WITHIN THE VIRTUAL EVENT SPACE, THE AT LEAST ONE VIRTUAL INTERACTIVE OBJECT AT A SECOND LOCATION WITHIN THE VIRTUAL EVENT SPACE, AND THE AT LEAST ONE VIRTUAL MAIN DISPLAY AT A THIRD LOCATION WITHIN THE VIRTUAL EVENT SPACE

310 — TRANSMIT FROM THE FIRST COMPUTING DEVICE SIGNAL INSTRUCTIONS FOR:

| CAUSING NAVIGATION OF THE AVATAR WITHIN THE VIRTUAL EVENT SPACE 310a | CAUSING INTERACTION BETWEEN THE FIRST VIRTUAL ATTENDEE AND THE AT LEAST ONE VIRTUAL INTERACTIVE OBJECT TO THEREBY TRIGGER, ON THE DISPLAY OF THE FIRST COMPUTING DEVICE, A PRESENTATION OF THE PREDETERMINED CONTENT VIA THE VIRTUAL INTERACTIVE OBJECT 310b | CAUSING INTERACTION BETWEEN THE FIRST VIRTUAL ATTENDEE AND THE AT LEAST ONE VIRTUAL MAIN DISPLAY, TO THEREBY TRIGGER, ON THE DISPLAY OF THE FIRST COMPUTING DEVICE, A PRESENTATION OF THE DYNAMIC LIVE CONTENT RECEIVED FROM THE SECOND COMPUTING DEVICE OF THE SECOND VIRTUAL ATTENDEE 310c |

Figure 6:
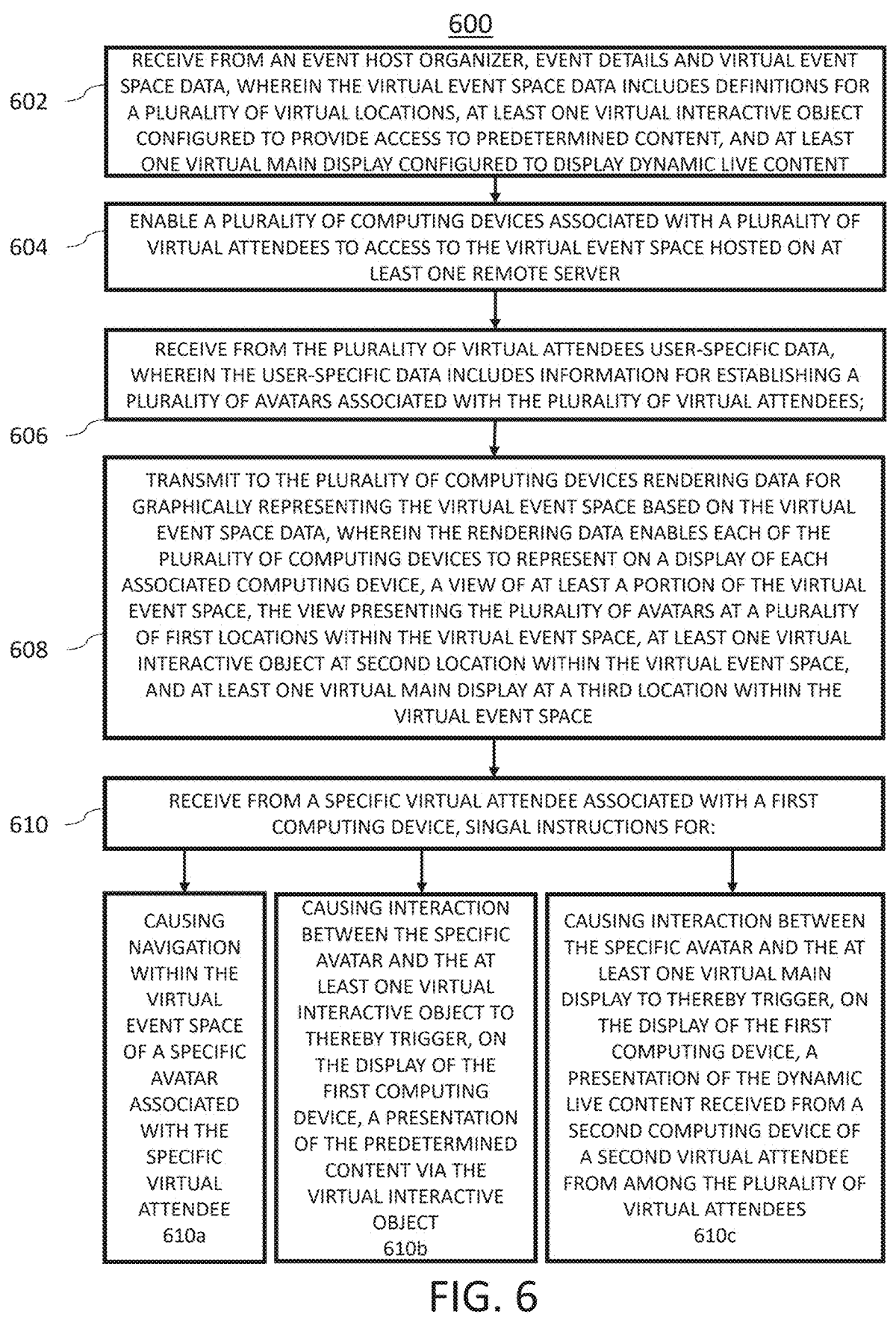

| 602 | RECEIVE FROM AN EVENT HOST ORGANIZER, EVENT DETAILS AND VIRTUAL EVENT SPACE DATA, WHEREIN THE VIRTUAL EVENT SPACE DATA INCLUDES DEFINITIONS FOR A PLURALITY OF VIRTUAL LOCATIONS, AT LEAST ONE VIRTUAL INTERACTIVE OBJECT CONFIGURED TO PROVIDE ACCESS TO PREDETERMINED CONTENT, AND AT LEAST ONE VIRTUAL MAIN DISPLAY CONFIGURED TO DISPLAY DYNAMIC LIVE CONTENT |

| 604 | ENABLE A PLURALITY OF COMPUTING DEVICES ASSOCIATED WITH A PLURALITY OF VIRTUAL ATTENDEES TO ACCESS TO THE VIRTUAL EVENT SPACE HOSTED ON AT LEAST ONE REMOTE SERVER |

| 606 | RECEIVE FROM THE PLURALITY OF VIRTUAL ATTENDEES USER-SPECIFIC DATA, WHEREIN THE USER-SPECIFIC DATA INCLUDES INFORMATION FOR ESTABLISHING A PLURALITY OF AVATARS ASSOCIATED WITH THE PLURALITY OF VIRTUAL ATTENDEES; |

| 608 | TRANSMIT TO THE PLURALITY OF COMPUTING DEVICES RENDERING DATA FOR GRAPHICALLY REPRESENTING THE VIRTUAL EVENT SPACE BASED ON THE VIRTUAL EVENT SPACE DATA, WHEREIN THE RENDERING DATA ENABLES EACH OF THE PLURALITY OF COMPUTING DEVICES TO REPRESENT ON A DISPLAY OF EACH ASSOCIATED COMPUTING DEVICE, A VIEW OF AT LEAST A PORTION OF THE VIRTUAL EVENT SPACE, THE VIEW PRESENTING THE PLURALITY OF AVATARS AT A PLURALITY OF FIRST LOCATIONS WITHIN THE VIRTUAL EVENT SPACE, AT LEAST ONE VIRTUAL INTERACTIVE OBJECT AT SECOND LOCATION WITHIN THE VIRTUAL EVENT SPACE, AND AT LEAST ONE VIRTUAL MAIN DISPLAY AT A THIRD LOCATION WITHIN THE VIRTUAL EVENT SPACE |

| 610 | RECEIVE FROM A SPECIFIC VIRTUAL ATTENDEE ASSOCIATED WITH A FIRST COMPUTING DEVICE, SINGAL INSTRUCTIONS FOR: |

| CAUSING NAVIGATION WITHIN THE VIRTUAL EVENT SPACE OF A SPECIFIC AVATAR ASSOCIATED WITH THE SPECIFIC VIRTUAL ATTENDEE 610a | CAUSING INTERACTION BETWEEN THE SPECIFIC AVATAR AND THE AT LEAST ONE VIRTUAL INTERACTIVE OBJECT TO THEREBY TRIGGER, ON THE DISPLAY OF THE FIRST COMPUTING DEVICE, A PRESENTATION OF THE PREDETERMINED CONTENT VIA THE VIRTUAL INTERACTIVE OBJECT 610b | CAUSING INTERACTION BETWEEN THE SPECIFIC AVATAR AND THE AT LEAST ONE VIRTUAL MAIN DISPLAY TO THEREBY TRIGGER, ON THE DISPLAY OF THE FIRST COMPUTING DEVICE, A PRESENTATION OF THE DYNAMIC LIVE CONTENT RECEIVED FROM A SECOND COMPUTING DEVICE OF A SECOND VIRTUAL ATTENDEE FROM AMONG THE PLURALITY OF VIRTUAL ATTENDEES 610c |

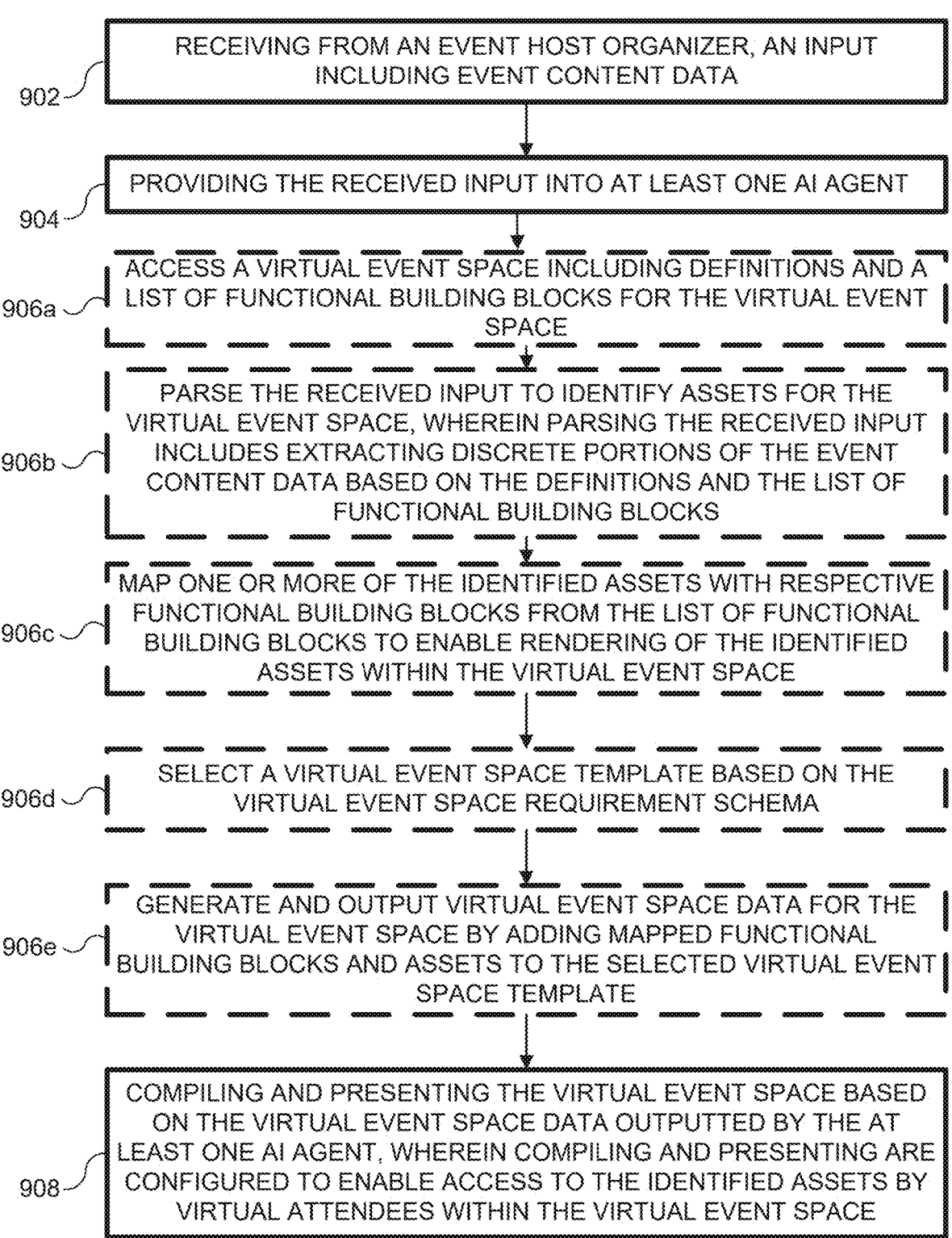

902 — RECEIVING FROM AN EVENT HOST ORGANIZER, AN INPUT INCLUDING EVENT CONTENT DATA

904 — PROVIDING THE RECEIVED INPUT INTO AT LEAST ONE AI AGENT

906a — ACCESS A VIRTUAL EVENT SPACE INCLUDING DEFINITIONS AND A LIST OF FUNCTIONAL BUILDING BLOCKS FOR THE VIRTUAL EVENT SPACE

906b — PARSE THE RECEIVED INPUT TO IDENTIFY ASSETS FOR THE VIRTUAL EVENT SPACE, WHEREIN PARSING THE RECEIVED INPUT INCLUDES EXTRACTING DISCRETE PORTIONS OF THE EVENT CONTENT DATA BASED ON THE DEFINITIONS AND THE LIST OF FUNCTIONAL BUILDING BLOCKS

906c — MAP ONE OR MORE OF THE IDENTIFIED ASSETS WITH RESPECTIVE FUNCTIONAL BUILDING BLOCKS FROM THE LIST OF FUNCTIONAL BUILDING BLOCKS TO ENABLE RENDERING OF THE IDENTIFIED ASSETS WITHIN THE VIRTUAL EVENT SPACE

906d — SELECT A VIRTUAL EVENT SPACE TEMPLATE BASED ON THE VIRTUAL EVENT SPACE REQUIREMENT SCHEMA

906e — GENERATE AND OUTPUT VIRTUAL EVENT SPACE DATA FOR THE VIRTUAL EVENT SPACE BY ADDING MAPPED FUNCTIONAL BUILDING BLOCKS AND ASSETS TO THE SELECTED VIRTUAL EVENT SPACE TEMPLATE

908 — COMPILING AND PRESENTING THE VIRTUAL EVENT SPACE BASED ON THE VIRTUAL EVENT SPACE DATA OUTPUTTED BY THE AT LEAST ONE AI AGENT, WHEREIN COMPILING AND PRESENTING ARE CONFIGURED TO ENABLE ACCESS TO THE IDENTIFIED ASSETS BY VIRTUAL ATTENDEES WITHIN THE VIRTUAL EVENT SPACE

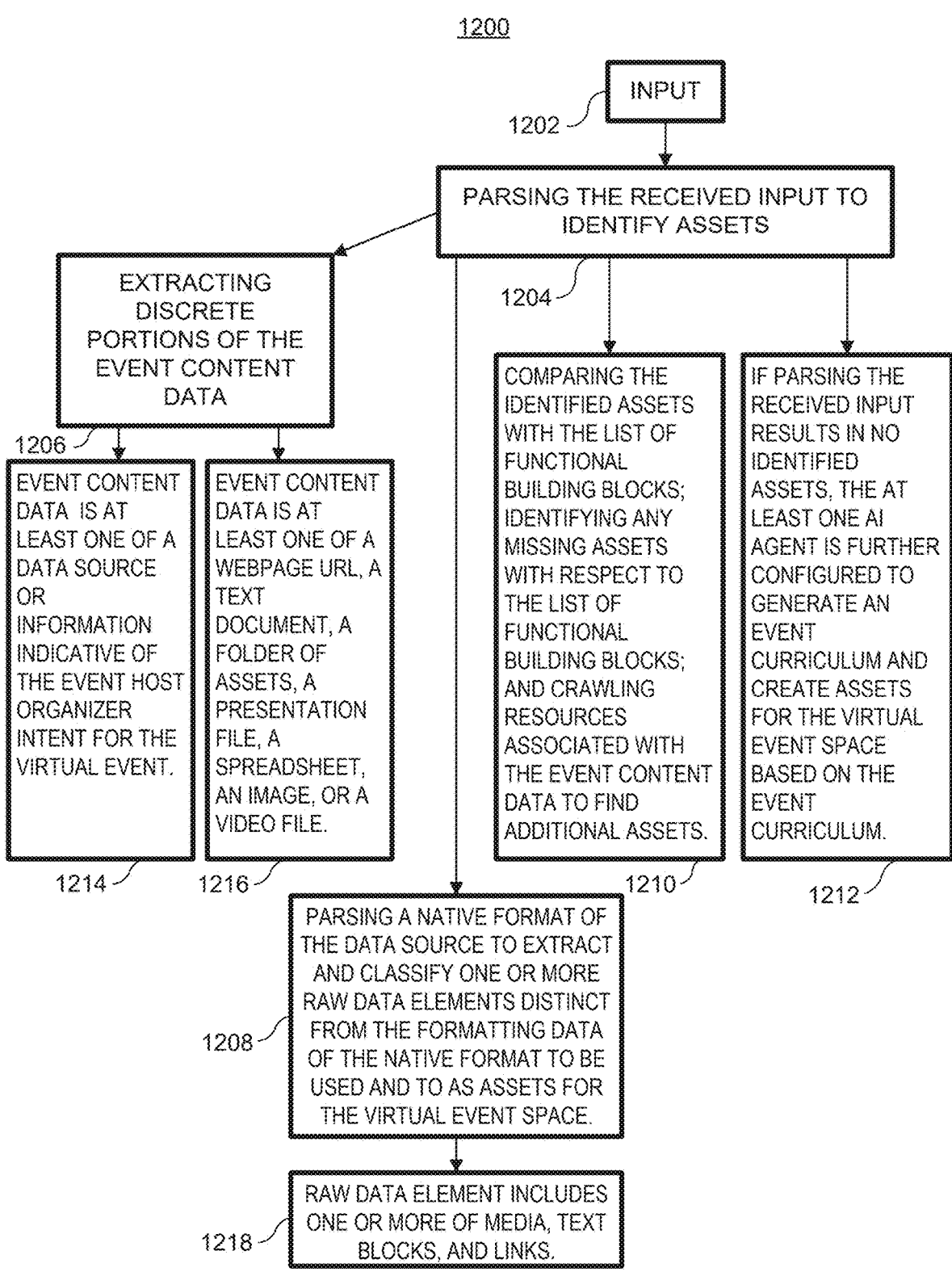

1200

INPUT
1202

PARSING THE RECEIVED INPUT TO IDENTIFY ASSETS
1204

EXTRACTING DISCRETE PORTIONS OF THE EVENT CONTENT DATA
1206

EVENT CONTENT DATA IS AT LEAST ONE OF A DATA SOURCE OR INFORMATION INDICATIVE OF THE EVENT HOST ORGANIZER INTENT FOR THE VIRTUAL EVENT.
1214

EVENT CONTENT DATA IS AT LEAST ONE OF A WEBPAGE URL, A TEXT DOCUMENT, A FOLDER OF ASSETS, A PRESENTATION FILE, A SPREADSHEET, AN IMAGE, OR A VIDEO FILE.
1216

COMPARING THE IDENTIFIED ASSETS WITH THE LIST OF FUNCTIONAL BUILDING BLOCKS; IDENTIFYING ANY MISSING ASSETS WITH RESPECT TO THE LIST OF FUNCTIONAL BUILDING BLOCKS; AND CRAWLING RESOURCES ASSOCIATED WITH THE EVENT CONTENT DATA TO FIND ADDITIONAL ASSETS.
1210

IF PARSING THE RECEIVED INPUT RESULTS IN NO IDENTIFIED ASSETS, THE AT LEAST ONE AI AGENT IS FURTHER CONFIGURED TO GENERATE AN EVENT CURRICULUM AND CREATE ASSETS FOR THE VIRTUAL EVENT SPACE BASED ON THE EVENT CURRICULUM.
1212

PARSING A NATIVE FORMAT OF THE DATA SOURCE TO EXTRACT AND CLASSIFY ONE OR MORE RAW DATA ELEMENTS DISTINCT FROM THE FORMATTING DATA OF THE NATIVE FORMAT TO BE USED AND TO AS ASSETS FOR THE VIRTUAL EVENT SPACE.
1208

RAW DATA ELEMENT INCLUDES ONE OR MORE OF MEDIA, TEXT BLOCKS, AND LINKS.
1218

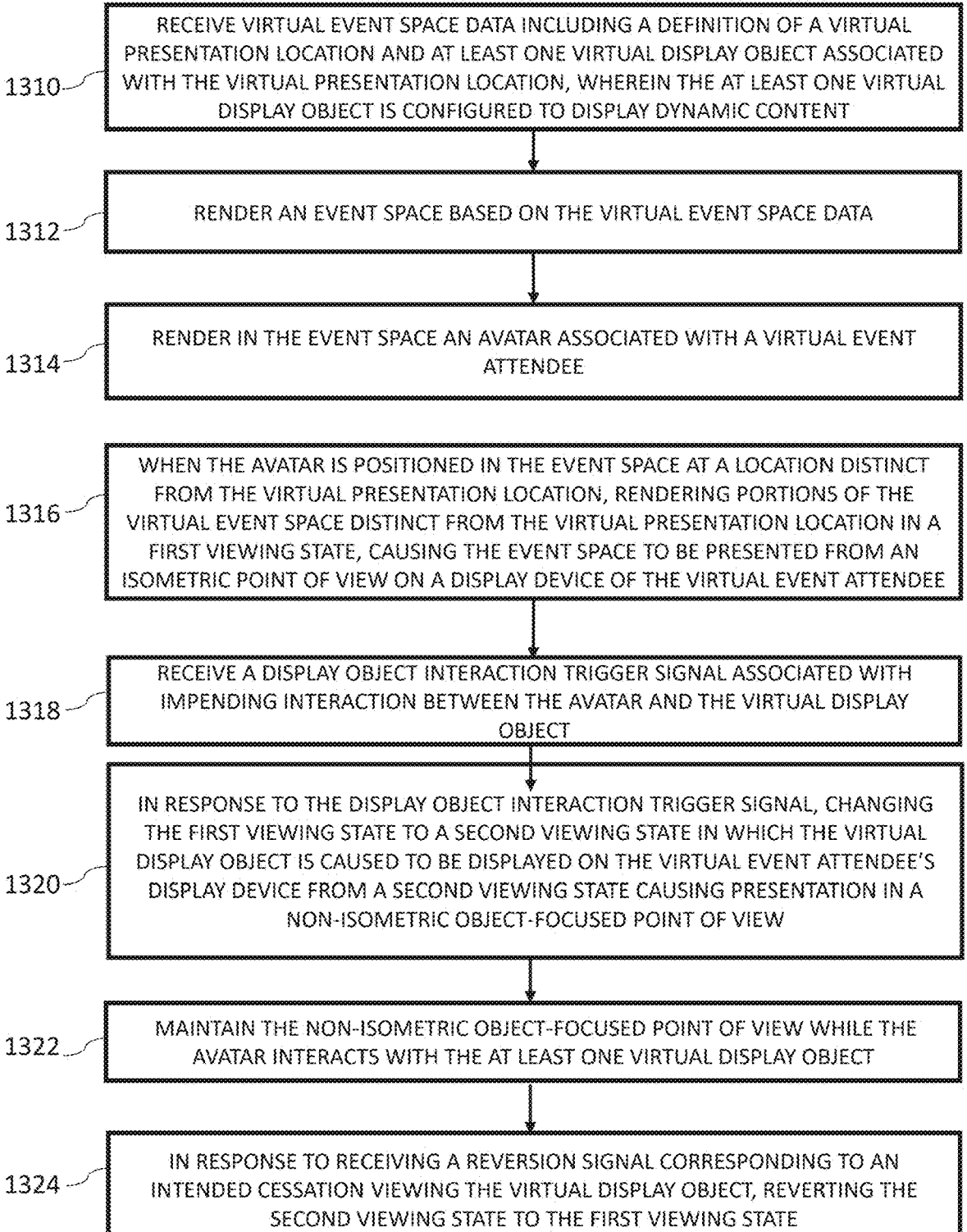

1310 — RECEIVE VIRTUAL EVENT SPACE DATA INCLUDING A DEFINITION OF A VIRTUAL PRESENTATION LOCATION AND AT LEAST ONE VIRTUAL DISPLAY OBJECT ASSOCIATED WITH THE VIRTUAL PRESENTATION LOCATION, WHEREIN THE AT LEAST ONE VIRTUAL DISPLAY OBJECT IS CONFIGURED TO DISPLAY DYNAMIC CONTENT

1312 — RENDER AN EVENT SPACE BASED ON THE VIRTUAL EVENT SPACE DATA

1314 — RENDER IN THE EVENT SPACE AN AVATAR ASSOCIATED WITH A VIRTUAL EVENT ATTENDEE

1316 — WHEN THE AVATAR IS POSITIONED IN THE EVENT SPACE AT A LOCATION DISTINCT FROM THE VIRTUAL PRESENTATION LOCATION, RENDERING PORTIONS OF THE VIRTUAL EVENT SPACE DISTINCT FROM THE VIRTUAL PRESENTATION LOCATION IN A FIRST VIEWING STATE, CAUSING THE EVENT SPACE TO BE PRESENTED FROM AN ISOMETRIC POINT OF VIEW ON A DISPLAY DEVICE OF THE VIRTUAL EVENT ATTENDEE

1318 — RECEIVE A DISPLAY OBJECT INTERACTION TRIGGER SIGNAL ASSOCIATED WITH IMPENDING INTERACTION BETWEEN THE AVATAR AND THE VIRTUAL DISPLAY OBJECT

1320 — IN RESPONSE TO THE DISPLAY OBJECT INTERACTION TRIGGER SIGNAL, CHANGING THE FIRST VIEWING STATE TO A SECOND VIEWING STATE IN WHICH THE VIRTUAL DISPLAY OBJECT IS CAUSED TO BE DISPLAYED ON THE VIRTUAL EVENT ATTENDEE'S DISPLAY DEVICE FROM A SECOND VIEWING STATE CAUSING PRESENTATION IN A NON-ISOMETRIC OBJECT-FOCUSED POINT OF VIEW

1322 — MAINTAIN THE NON-ISOMETRIC OBJECT-FOCUSED POINT OF VIEW WHILE THE AVATAR INTERACTS WITH THE AT LEAST ONE VIRTUAL DISPLAY OBJECT

1324 — IN RESPONSE TO RECEIVING A REVERSION SIGNAL CORRESPONDING TO AN INTENDED CESSATION VIEWING THE VIRTUAL DISPLAY OBJECT, REVERTING THE SECOND VIEWING STATE TO THE FIRST VIEWING STATE

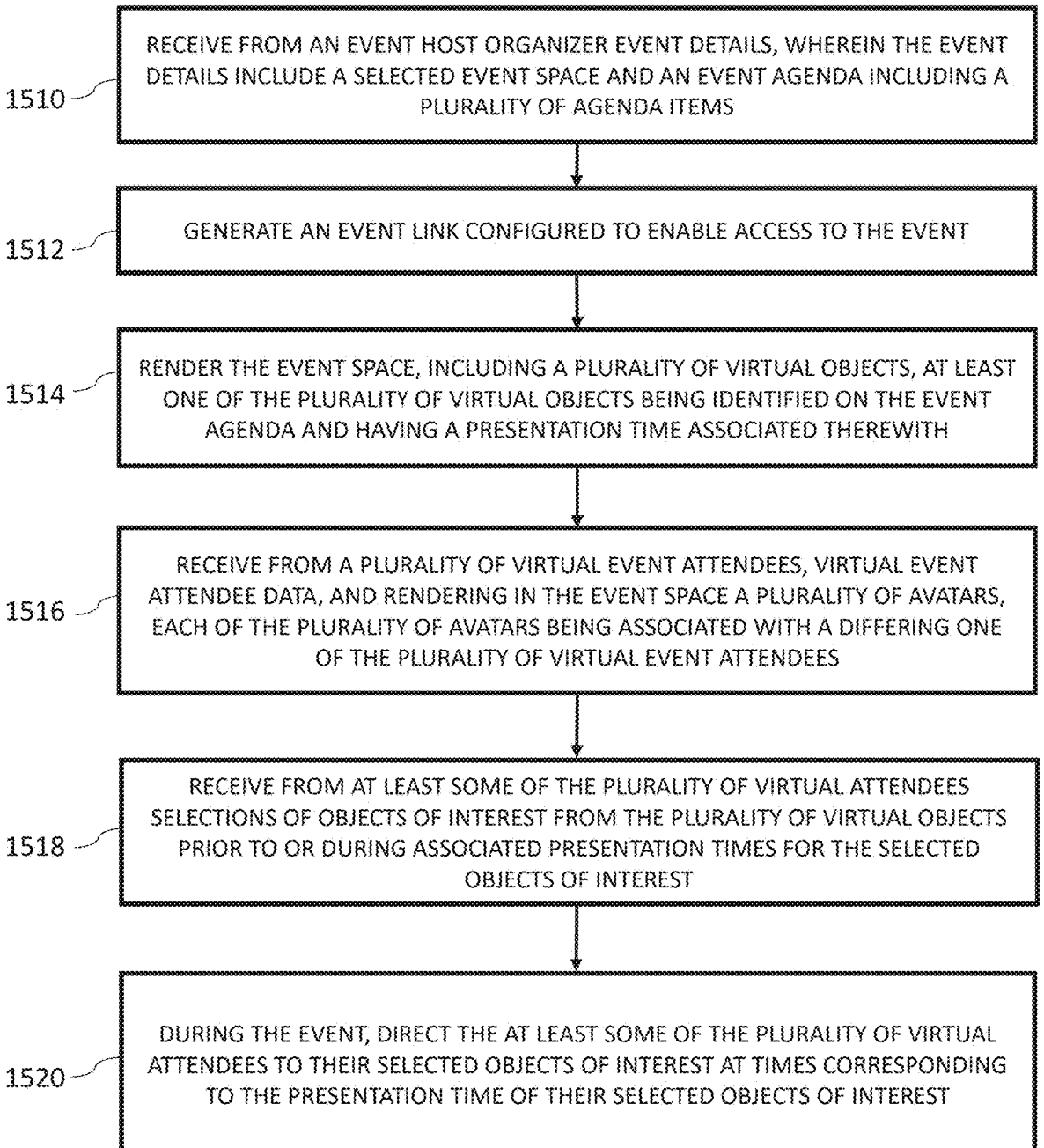

RECEIVE FROM AN EVENT HOST ORGANIZER EVENT DETAILS, WHEREIN THE EVENT DETAILS INCLUDE A SELECTED EVENT SPACE AND AN EVENT AGENDA INCLUDING A PLURALITY OF AGENDA ITEMS

1510

GENERATE AN EVENT LINK CONFIGURED TO ENABLE ACCESS TO THE EVENT

1512

RENDER THE EVENT SPACE, INCLUDING A PLURALITY OF VIRTUAL OBJECTS, AT LEAST ONE OF THE PLURALITY OF VIRTUAL OBJECTS BEING IDENTIFIED ON THE EVENT AGENDA AND HAVING A PRESENTATION TIME ASSOCIATED THEREWITH

1514

RECEIVE FROM A PLURALITY OF VIRTUAL EVENT ATTENDEES, VIRTUAL EVENT ATTENDEE DATA, AND RENDERING IN THE EVENT SPACE A PLURALITY OF AVATARS, EACH OF THE PLURALITY OF AVATARS BEING ASSOCIATED WITH A DIFFERING ONE OF THE PLURALITY OF VIRTUAL EVENT ATTENDEES

1516

RECEIVE FROM AT LEAST SOME OF THE PLURALITY OF VIRTUAL ATTENDEES SELECTIONS OF OBJECTS OF INTEREST FROM THE PLURALITY OF VIRTUAL OBJECTS PRIOR TO OR DURING ASSOCIATED PRESENTATION TIMES FOR THE SELECTED OBJECTS OF INTEREST

1518

DURING THE EVENT, DIRECT THE AT LEAST SOME OF THE PLURALITY OF VIRTUAL ATTENDEES TO THEIR SELECTED OBJECTS OF INTEREST AT TIMES CORRESPONDING TO THE PRESENTATION TIME OF THEIR SELECTED OBJECTS OF INTEREST

SYSTEMS AND METHODS FOR CONFIGURING AND/OR PARTICIPATING IN VIRTUAL EVENTS

CROSS-REFERENCE TO RELATED APPLICATION

This application is a divisional of U.S. patent application Ser. No. 19/419,782, filed Dec. 15, 2025, which claims the benefit of priority to U.S. Provisional Patent Application No. 63/733,578, filed Dec. 13, 2024, which is The contents of each application are incorporated herein by reference in their entireties its entirety.

TECHNICAL FIELD

The present disclosure relates generally to systems, methods, and computer-readable media, for configuring and/or participating in virtual events. More specifically, the disclosed embodiments enable users, via associated computing devices, to participate in virtual events as virtual attendees within designated virtual event spaces. Orchestration of the virtual events, virtual event spaces, and virtual attendees is handled by one or more remote servers. Various disclosed embodiments employ structures and non-transitory computer-readable storage media that store program instructions executable by at least one processing device to perform any of the steps and/or methods described herein.

BACKGROUND

Events and conferences have traditionally been held at physical venues such as conference halls or meeting centers, where participants can network, attend lectures, and engage in presentations. These gatherings offer business and professional value by fostering collaboration, knowledge sharing, and relationship building. However, they also come with inherent drawbacks, including the time and cost associated with travel, as well as periods of downtime during the event. For many organizations, these factors can reduce overall productivity and limit accessibility for participants who are unable to attend in person.

The rise of virtual meetings and online platforms has addressed some of these challenges by eliminating travel requirements and minimizing idle time. Remote participation enables greater flexibility and inclusivity, allowing individuals to join from anywhere in the world. Yet, despite these advantages, virtual events introduce new obstacles. Interactions are often limited, networking opportunities are constrained, and the overall experience can feel less engaging compared to in-person events. These shortcomings make it difficult to replicate the dynamic, immersive atmosphere that physical gatherings naturally provide.

In recent years, the field of virtual events and remote participation has grown rapidly, driven by technological advancements and the increasing demand for accessible communication solutions. Video conferencing and collaboration tools have improved significantly, but many current systems still lack the interactive and immersive features that make live events compelling. As a result, participants may experience reduced engagement, fewer opportunities for meaningful connections, and challenges in maintaining attention and enthusiasm throughout the event.

The growing need for more sophisticated virtual event platforms reflects a broader shift toward hybrid and remote work environments. Organizations are seeking solutions that deliver seamless, interactive experiences capable of bridging the gap between remote attendees and live audiences. The present disclosure describes solutions to address or overcome one or more of the above-stated challenges, among other drawbacks in existing virtual events platforms.

SUMMARY

Some embodiments consistent with the present disclosure provide digital systems, methods, and computer-readable media for configuring and/or participating in virtual events. Some embodiments may be implemented using a combination of conventional hardware and software as well as specialized hardware and software such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

In one embodiment, systems, methods, and computer-readable media for electronically participating in a virtual event hosted on at least one remote server are disclosed. Systems, methods, devices, and non-transitory computer readable media may involve at least one processor configured to: enable, via a first computing device associated with a first virtual attendee, access to a virtual event space hosted on the at least one remote server; transmit to the at least one remote server, user-specific data associated with the first virtual attendee, wherein the user-specific data includes information for establishing an avatar associated with the first virtual attendee; receive from the at least one remote server, rendering data for graphically representing the virtual event space on the first computing device, wherein the rendering data includes definitions for a plurality of virtual locations, at least one virtual interactive object configured to provide access to predetermined content, and at least one virtual main display configured to display dynamic live content via a second computing device of a second virtual attendee; use the rendering data to represent an isometric perspective view on a display of the first computing device of at least a portion of the virtual event space, the isometric perspective view presenting the avatar at a first location within the virtual event space, the at least one virtual interactive object at a second location within the virtual event space, and the at least one virtual main display at a third location within the virtual event space; transmit from the first computing device signal instructions for: causing navigation of the avatar within the virtual event space; causing interaction between the first virtual attendee and the at least one virtual interactive object to thereby trigger, on the display of the first computing device, a presentation of the predetermined content via the virtual interactive object; and causing interaction between the first virtual attendee and the virtual main display, to thereby trigger, on the display of the first computing device, a presentation of the dynamic live content received from the second computing device of the second virtual attendee.

In another embodiment, systems, methods, and computer-readable media for configuring a virtual event hosted remotely from participants are disclosed. Systems, methods, devices, and non-transitory computer-readable media may involve at least one processor configured to: receive from an event host organizer, event details and virtual event space data, wherein the virtual event space data includes definitions for a plurality of virtual locations, at least one virtual interactive object configured to provide access to predetermined content, and at least one virtual main display configured to display dynamic live content; enable a plurality of computing devices associated with a plurality of virtual attendees to access to the virtual event space hosted on at least one remote server; receive from the plurality of virtual attendees user-specific data, wherein the user-specific data includes information for establishing a plurality of avatars associated with the plurality of virtual attendees; transmit to the plurality of computing devices rendering data for graphically representing the virtual event space based on the virtual event space data, wherein the rendering data enables each of the plurality of computing devices to represent on a display of each associated computing device, a view of at least a portion of the virtual event space, the view presenting the plurality of avatars at a plurality of first locations within the virtual event space, at least one virtual interactive object at second location within the virtual event space, and at least one virtual main display at a third location within the virtual event space; receive from a specific virtual attendee associated with a first computing device, instructions for: causing navigation within the virtual event space of a specific avatar associated with the specific virtual attendee; causing interaction between the specific avatar and the at least one virtual interactive object to thereby trigger, on the display of the first computing device, a presentation of the predetermined content via the virtual interactive object; and causing interaction between the specific avatar and the at least one virtual main display to thereby trigger, on the display of the first computing device, a presentation of the dynamic live content received from a second computing device of a second virtual attendee from among the plurality of virtual attendees.

In another embodiment, systems, methods, and computer-readable media for configuring a virtual event space using artificial intelligence (AI) are disclosed. Systems, methods, devices, and non-transitory computer-readable media may involve at least one processor configured to: receive from an event host organizer, an input including event content data; provide the received input into at least one AI agent configured to: access a virtual event space requirement schema including definitions and a list of functional building blocks for the virtual event space; parse the received input to identify assets for the virtual event space, wherein parsing the received input includes extracting discrete portions of the event content data based on the definitions and the list of functional building blocks; map one or more of the identified assets with respective functional building blocks from the list of functional building blocks to enable rendering of the identified assets within the virtual event space; select a virtual event space template based on the virtual event space requirement schema; and generate and output virtual event space data for the virtual event space by adding mapped functional building blocks and assets to the selected virtual event space template; and compile and present the virtual event space based on the virtual event space data outputted by the at least one AI agent, wherein compiling and presenting are configured to enable access to the identified assets by virtual attendees within the virtual event space.

In another embodiment, systems, methods, and computer-readable media for generating a virtual event space visualization for media consumption in a hybrid 2D/3D manner are disclosed. Systems, methods, devices, and non-transitory computer-readable media may involve at least one processor configured to: receive virtual event space data including a definition of a virtual presentation location and at least one virtual display object associated with the virtual presentation location, wherein the at least one virtual display object is configured to display dynamic content; render an event space based on the virtual event space data; render in the event space an avatar associated with a virtual event attendee; when the avatar is positioned in the event space at a location distinct from the virtual presentation location, render portions of the virtual event space distinct from the virtual presentation location in a first viewing state, causing the event space to be presented from an isometric point of view on a display device of the virtual event attendee; receive a display object interaction trigger signal associated with impending interaction between the avatar and the virtual display object; in response to the display object interaction trigger signal, change the first viewing state to a second viewing state in which the virtual display object is caused to be displayed on the virtual event attendee's display device from a second viewing state causing presentation in a non-isometric object-focused point of view; maintain the non-isometric object-focused point of view while the avatar interacts with the at least one virtual display object; and in response to receiving a reversion signal corresponding to an intended cessation viewing the virtual display object, revert the second viewing state to the first viewing state.

In another embodiment, systems, methods, and computer-readable media for guiding virtual attendees of a virtual event space toward events of interest are disclosed. Systems, methods, devices, and non-transitory computer-readable media may involve at least one processor configured to: receive from an event host organizer event details, wherein the event details include a selected event space and an event agenda including a plurality of agenda items; generate an event link configured to enable access to the event; render the event space, including a plurality of virtual objects, at least one of the plurality of virtual objects being identified on the event agenda and having a presentation time associated therewith; receive from a plurality of virtual event attendees, virtual event attendee data, and rendering in the event space a plurality of avatars, each of the plurality of avatars being associated with a differing one of the plurality of virtual event attendees; receive from at least some of the plurality of virtual attendees selections of objects of interest from the plurality of virtual objects prior to or during associated presentation times for the selected objects of interest; and during the event, direct the at least some of the plurality of virtual attendees to their selected objects of interest at times corresponding to the presentation time of their selected objects of interest.

BRIEF DESCRIPTION OF DRAWINGS

The accompanying drawings, which are incorporated in and constitute a part of this disclosure, illustrate various disclosed embodiments. In the drawings:

FIG. 3 is a flowchart of an exemplary process for electronically participating in a virtual event hosted on at least one remote server, consistent with some embodiments of the present disclosure.

FIGS. 4A-4K illustrates different exemplary isometric perspective views of at least a portion of a virtual event space, consistent with some embodiments of the present disclosure.

FIG. 6 is a flowchart of an exemplary process for configuring a virtual event hosted remotely from participants, consistent with some embodiments of the present disclosure.

FIG. 9 is a flowchart of an example process for compiling and presenting a virtual event space, consistent with some embodiments of the present disclosure.

FIG. 12 is a flow chart of an example process for parallel processing of inputs, consistent with some embodiments of the present disclosure.

FIG. 13 is a flowchart of an exemplary process for generating a virtual event space visualization in a hybrid 2D/3D manner, consistent with some embodiments of the present disclosure.

FIG. 15 is a flowchart of an exemplary process for guiding virtual attendees of a virtual event space toward events of interest, consistent with some embodiments of the present disclosure.

DETAILED DESCRIPTION

Figure 1A:
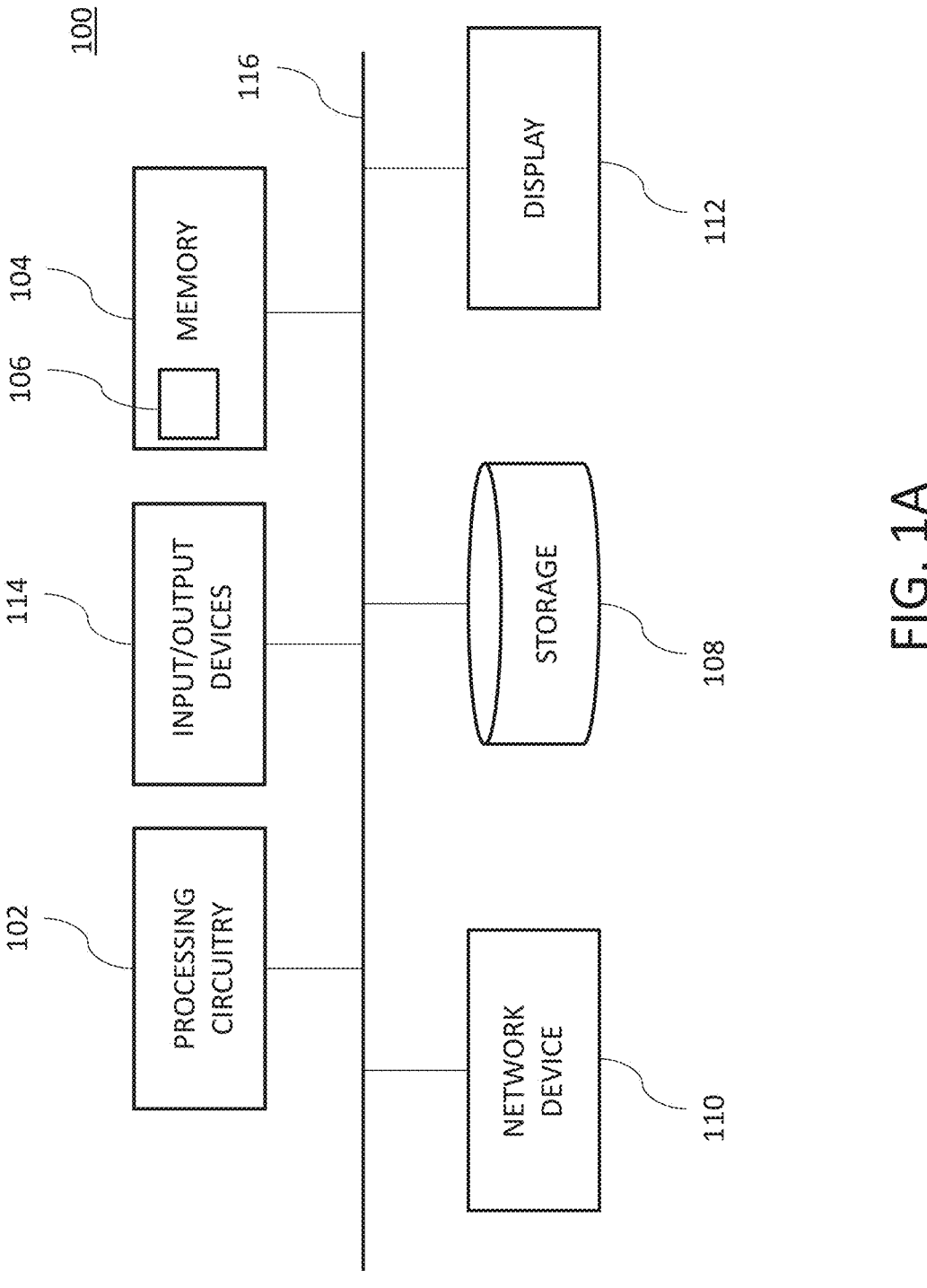
FIG. 1A is a block diagram of an exemplary computing device or system which may be employed in connection with some embodiments of the present disclosure.

Disclosed embodiments provide new and improved techniques for configuring and/or participating in virtual events.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for virtual event configuration and participation systems. Such systems may involve software that enables multiple users to collaboratively organize and participate in virtual events. For example, event management software may allow various stakeholders, such as organizers, presenters, and attendees, to engage seamlessly via a shared online platform. It is intended that one or more aspects of any mechanism may be combined with one or more aspects of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for virtual event configuration and participation. To avoid repetition, the functionality of some embodiments is described herein solely in connection with a processor or at least one processor. It is to be understood that such exemplary descriptions of functionality apply equally to methods and computer-readable media and constitute a written description of systems, methods, and computer-readable media. Various embodiments are described herein with reference to a system, method, device, or computer-readable medium. It is intended that the disclosure of one is a disclosure of all. For example, it is to be understood that disclosure of a computer-readable medium described herein also constitutes a disclosure of methods implemented by the computer-readable medium, and systems and devices for implementing those methods, via, for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer-readable medium containing instructions that, when executed by at least one processor, cause the at least one processor to perform a method. A non-transitory computer-readable medium may be any medium capable of storing data in any memory in a way that may be read by any computing device with a processor to carry out methods or any other instructions stored in the memory. The non-transitory computer-readable medium may be implemented as hardware, firmware, software, or any combination thereof. Moreover, the software may preferably be implemented as an application program tangibly embodied on a program storage unit or computer-readable medium consisting of parts, or of certain devices, and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer-readable medium may be any computer-readable medium except for a transitory propagating signal.

Examples of memory include Random Access Memory (RAM), Read-Only Memory (ROM), volatile memory, non-volatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage media located within an input unit or at a remote location. Additionally, one or more computer-readable storage media can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as temporary storage. Accordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuits (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated into a single circuit. When more than one processor is used, the processors may be configured to operate independently or collaboratively and may be co-located or located remotely from each other. The processors may be coupled electrically, magnetically, optically, acoustically, mechanically, or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the foregoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or an unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near-field communications (NFC), or other suitable communication methods that provide a medium for exchanging data and/or information between separate entities.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example, in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyperparameters, where the hyperparameters are set manually by a person or automatically by a process external to the machine learning algorithm (such as a hyperparameter search algorithm), and the parameters of the machine learning algorithm are set by the machine learning algorithm according to the training examples. In some implementations, the hyperparameters are set according to the training examples and the validation examples, and the parameters are set according to the training examples and the selected hyperparameters.

In some examples, a trained machine learning algorithm may be used as an inference model that, when provided with an input, generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyperparameters for the artificial neural network and/or the machine learning algorithm, and the machine learning algorithm may use the hyperparameters and training examples to determine the parameters of the artificial neural network, for example, using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Additionally some of the embodiments may be directed to improving the technical field of virtual event spaces. The field has experienced significant growth in recent years, particularly in response to the increasing demand for remote collaboration and digital engagement. Despite advancements in virtual meeting platforms, current solutions often lack the immersive and interactive qualities necessary for truly engaging virtual events. Many existing systems provide limited customization options, resulting in generic and uninspiring virtual environments that fail to capture the essence of in-person gatherings. The need for more sophisticated and tailored virtual event spaces is driven by the growing recognition that effective digital experiences require more than just video conferencing capabilities. By addressing these limitations, the suggested system aims to revolutionize the way organizations create and host virtual events, offering a more dynamic, personalized, and content-focused approach to digital gatherings. The present disclosure seeks to enhance the virtual event experience by leveraging artificial intelligence to streamline the creation process and deliver more engaging, interactive, and customizable virtual spaces.

FIG. 1A is a block diagram of an exemplary computing device 100 consistent with some embodiments. In some embodiments, computing device 100 may be similar in type and function to user device 154, discussed with respect to FIG. 1B. As shown in FIG. 1A, computing device 100 may include processing circuitry 102, such as, for example, a central processing unit (CPU). In some embodiments, the processing circuitry 102 may include, or may be a component of, a larger processing unit implemented with one or more processors. The one or more processors may be implemented with any combination of any of the hardware components described earlier or any other suitable entities that may perform calculations or other manipulations of information. The processing circuitry, such as processing circuitry 102, may be coupled via a bus 116 to a memory 104.

The memory 104 may further include a memory portion 106 that may contain instructions that, when executed by the processing circuitry 102, may perform the methods described in more detail herein. Further details on memory are provided in the above sections. The processing circuitry 102 may be further connected to a network device 110, such as a network interface card, for providing connectivity between the computing device 100 and a network, such as a network 152, discussed in more detail with respect to FIG. 1B below. The processing circuitry 102 may be further coupled with a storage device 108. The storage device 108 may be used for the purpose of storing single data type column-oriented data structures, data elements associated with the data structures, or any other data structures. While illustrated in FIG. 1A, as a single device, it is to be understood that storage device 108 may include multiple devices, either collocated or distributed.

The processing circuitry 102 and/or the memory 104 may also include machine-readable media 106 for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

In some embodiments, computing device 100 may include one or more input and output devices 114. Input and output devices 114 may include one or more input interfaces, such as a keyboard device, an electronic mouse, an electronic stylus, a touch-sensitive screen, a camera (e.g., for capturing an input gesture), a microphone (e.g., for capturing audio input), and/or any other type of input interface. Input and output devices 114 may include one or more output interfaces, such as an electronic screen, a speaker, a haptic output device, and/or any other type of output interface. Computing device 100 may also include a display 112, such as a touchscreen display or other display types discussed herein.

Figure 1B:
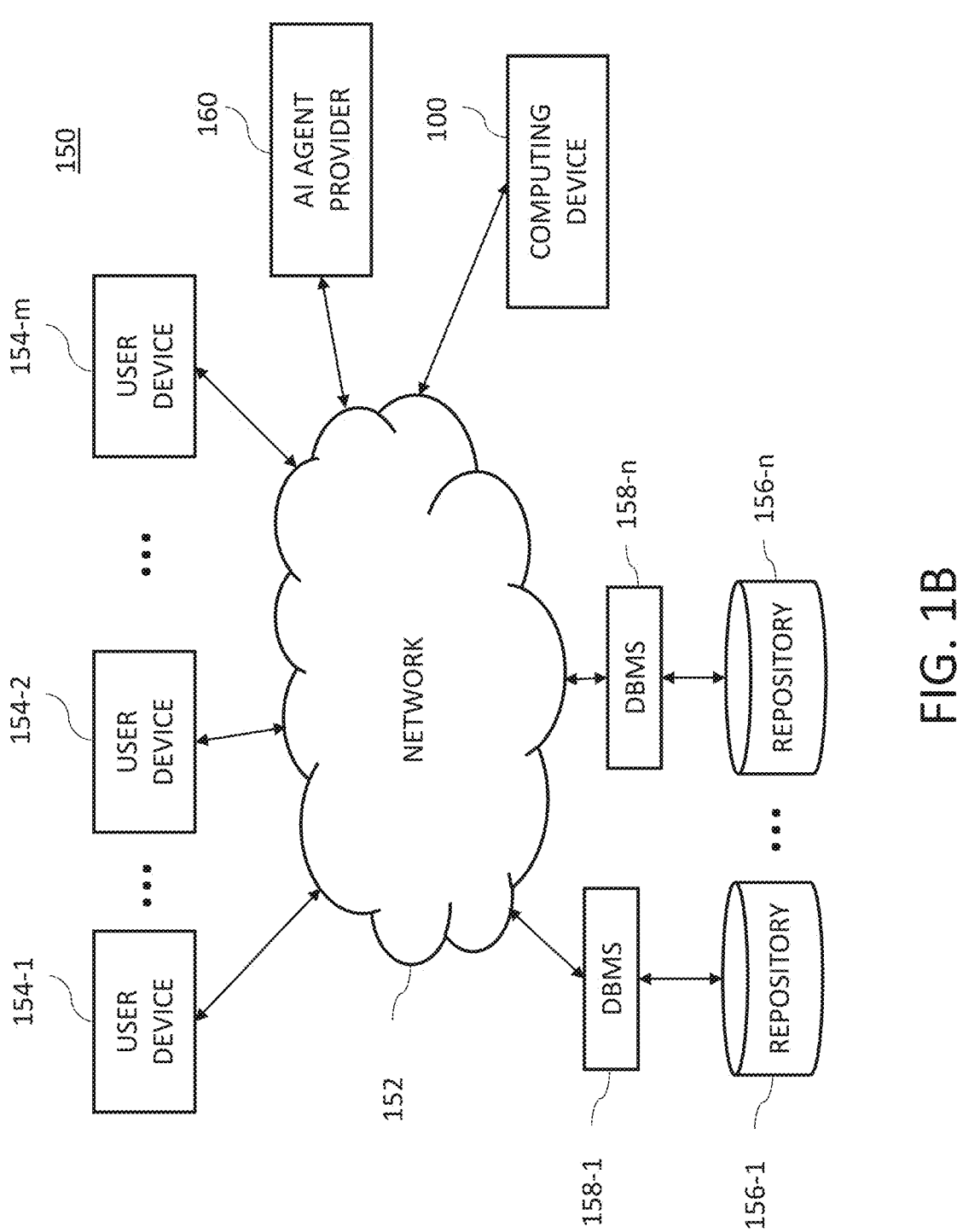
FIG. 1B is a block diagram of an exemplary computing architecture for collaborative work systems, consistent with some embodiments of the present disclosure.

FIG. 1B is a block diagram of a computing architecture 150 that may be used in connection with various disclosed embodiments. The computing device 100, as described in connection with FIG. 1A may be coupled to network 152. The network 152 may enable communication between different elements that may be communicatively coupled with the computing device 100, as further described below. The network 152 may include the Internet, the World Wide Web (WWW), a local area network (LAN), a wide area network (WAN), a metro area network (MAN), and other networks capable of enabling communication between the elements of the computing architecture 150. In some disclosed embodiments, the computing device 100 may be a server deployed in a cloud computing environment.

One or more user devices 154-1 through user device 154-m, where 'm' is an integer equal to or greater than 1, referred to individually as user device 154 and collectively as user devices 154, may be communicatively coupled with the computing device 100 via the network 152. A user device 154 may be, for example, a smartphone, a mobile phone, a laptop, a tablet computer, a wearable computing device, a personal computer (PC), a smart television, and/or any other device capable of performing computations. A user device 154 may be configured to send to and receive from the computing device 100 data and/or metadata associated with a variety of elements associated with single data type column-oriented data structures, such as columns, rows, cells, schemas, and the like. Furthermore, external third-party application providers, such as an AI agent provider 160, may be communicatively coupled with the computing device 100 via the network 152.

One or more data repositories 156-1 through data repository 156-n, where 'n' is an integer equal to or greater than 1, referred to individually as data repository 156 and collectively as data repository 156, may be communicatively coupled with the computing device 100 via the network 152, or embedded within the computing device 100. Each data repository 156 may be communicatively connected to the network 152 through one or more database management services (DBMS) 158-1 through DBMS 158-n. The data repository 156 may be, for example, a storage device containing a database, a data warehouse, and/or any other data structure that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Some disclosed embodiments involve a virtual event SaaS/software platform, hereinafter also referred to as "the platform," designed for organizing, hosting, and enabling participation of users in online events, tailored to meeting professional needs. Event host organizers may create and customize virtual 3D environments (hereinafter: virtual event space or virtual space) to host events, enabling the real-time sharing of content as well as on-demand access. In a similar manner to a video game, participants/virtual attendees may immerse themselves in these 3D environments and interact within them by controlling a virtual character, i.e., an avatar, located within the virtual event space, which serves as a digital representation of each user in the virtual world. This avatar may be customizable in appearance, behavior, and interactions, reflecting user preferences or professional roles. Within the virtual event space, users may utilize their avatars to navigate through various 3D environments, attend presentations, engage in chat discussions, interact with virtual objects or other avatars, among other things. Avatars may perform actions such as approaching a virtual podium to present content, entering chat-enabled zones for conversations, or signaling emotions through animated gestures. These capabilities are designed to mimic real-world interactions and enhance user engagement in the virtual event space. The platform may be designed to facilitate seamless connection and content sharing for organizations, with potential applications including large-scale conferences, webinars, educational classrooms, employee onboarding, retail demonstrations, and office meetings, among others.

The platform may differentiate itself from other virtual spaces through its emphasis on content delivery. While many platforms prioritize social interaction while having the virtual space as a background, the platform of the present disclosure may focus on empowering different types of users to present their own content in the virtual space itself, using the virtual space assets for other users to experience. Such content may include, for example, stored media such as images and videos or live feed directed from a user's device, such as websites and live streams. In some embodiments, to maintain user immersion within the virtual event, at least some features available to users are associated with virtual objects that simulate their real-life counterparts. For example, to present content, a user may be required to approach a virtual podium and "connect" their computing device to the podium by entering a password. Similarly, virtual doors may enable users to navigate between distinct event spaces, while elevators may allow users to transition between different instances of the same event space, if such instances exist. Additionally, certain objects within the virtual environment may be configured to exhibit altered graphical representations based on their state, such as active or inactive. For example, virtual curtains may be displayed as closed over an empty screen and configured to open only when a presentation is about to begin, such as when a presenter approaches a podium to connect their computing device. Similarly, virtual doors may display locks, bars, or a closed configuration to indicate that the virtual space they lead to is inactive. These doors may transition to an open configuration when the corresponding virtual space becomes active, visually signaling its availability to users.

By prioritizing immersive content sharing and user engagement, the platform aims to deliver a dynamic and personalized virtual event experience that sets it apart from traditional solutions.

The disclosed embodiments address a specific technological problem in existing virtual event platforms, namely the lack of immersive and interactive experiences that effectively replicate the engagement and networking opportunities of physical events. Conventional virtual event systems often rely on simple video conferencing or static web pages, which fail to capture the dynamic nature of in-person gatherings and limit attendee interaction. As further explained below, the disclosed systems and methods work at a technical level by implementing a rendering engine that creates an isometric perspective view of a virtual event space on a user's computing device. This rendering engine may process complex data structures defining virtual locations, interactive objects, and dynamic displays within the event space. The disclosed systems and methods may employ advanced real-time data transmission and processing techniques to enable seamless navigation of avatars, interaction with virtual objects, and display of live content from other attendees.

The disclosed embodiments modify and improve computer operation by optimizing the way virtual event data is processed and presented. Unlike conventional systems that may simply stream video or display static content, the disclosed systems and methods may dynamically render a 3D environment in real-time, adjusting the view based on user interactions and event progression. The disclosed systems and methods may reconfigure the computing device's display to present an immersive isometric view that maintains consistent scale and orientation across the virtual space, enhancing spatial awareness and navigation. Unlike perspective projections, where distal objects appear smaller and thus become difficult to select via a cursor or touch input, the isometric perspective maintains a constant pixel-to-unit ratio for all interactive objects. This ensures that a virtual interactive object (e.g., a kiosk) remains equally accessible and 'clickable' regardless of its coordinate position within the virtual event space, thereby reducing input errors and improving interface accessibility for users who may be unfamiliar with gaming navigation controls. Furthermore, the isometric perspective eliminates the need for camera manipulation (e.g., panning or tilting) by the user.

This reduction in control complexity allows the first computing device to dedicate display resources to the dynamic live content and avatar interactions, rather than rendering skyboxes or occluded geometry typical of first-person views. It effectively combines the strategic overview of a 2D map with the immersive agency of a 3D environment.

As a result, the disclosed systems and methods may achieve measurable improvements in user engagement and interaction within virtual events. For example, the disclosed systems and methods may reduce latency in avatar movements and interactions by employing predictive rendering techniques, potentially decreasing response times compared to traditional video-based virtual event platforms (e.g., response times decreased by 30-50%). The use of isometric perspective rendering may also improve spatial comprehension, potentially increasing attendee navigation speed within the virtual space by up to 40% compared to 2D layouts. In one example scenario, a virtual trade show implemented using the disclosed embodiments may support 10,000 concurrent attendees, each with a customized avatar, navigating a complex virtual exhibition hall with 500 interactive booth objects and 50 dynamic live content displays. The system may process and render this environment in real-time, maintaining a frame rate of 60 fps on standard consumer hardware, while simultaneously managing thousands of peer-to-peer interactions between attendees. The disclosed embodiments go beyond merely processing information or displaying results, as they fundamentally transform the way virtual events are experienced by creating a dynamic, interactive 3D environment that responds in real-time to user inputs and event progression. This technical implementation enables new forms of engagement and interaction that were not possible with conventional virtual event platforms, thereby providing a novel technical solution to the challenge of replicating physical event experiences in a digital format.

Figure 2A:
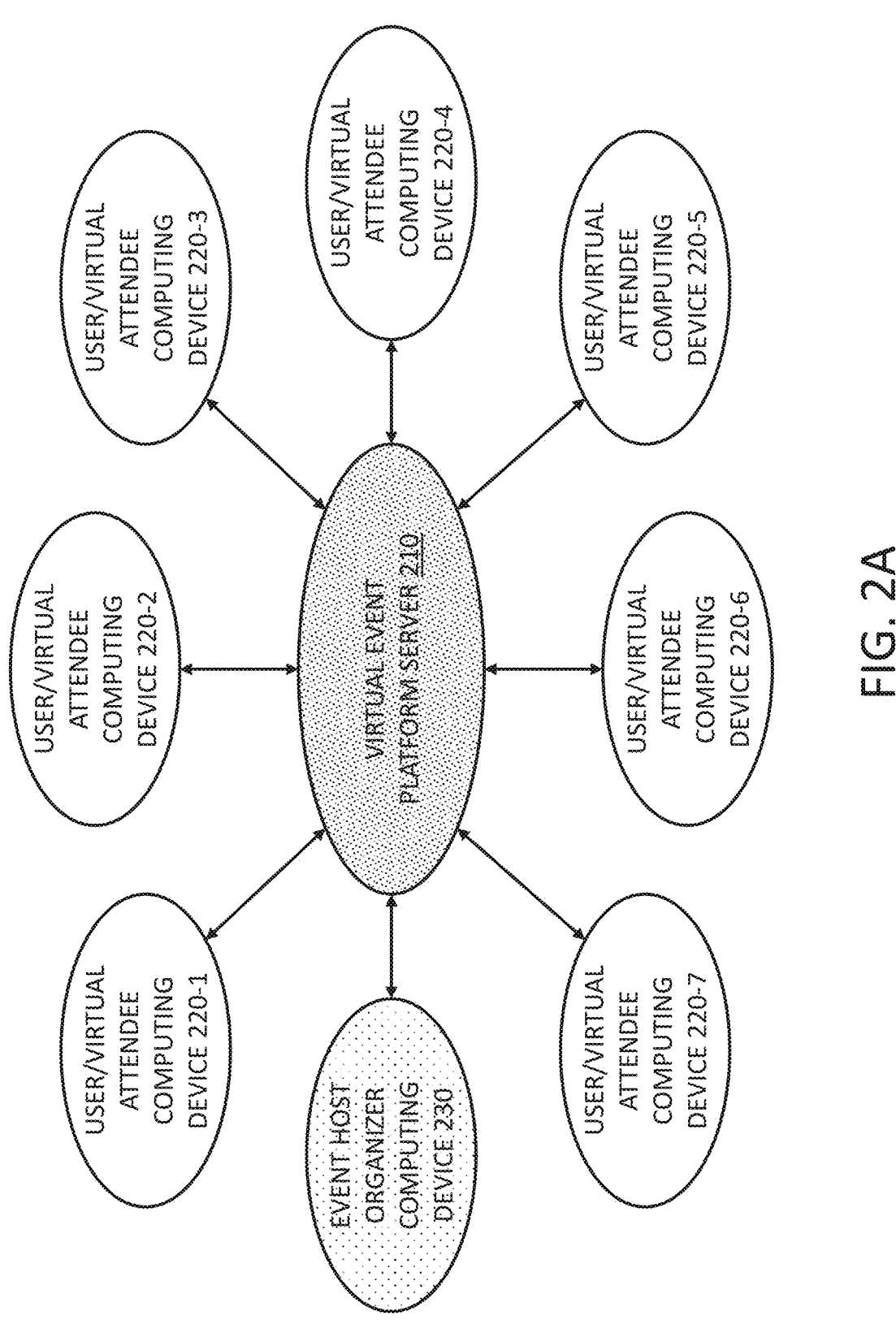
FIG. 2A is a schematic representation of various entities involved in a virtual event, consistent with some embodiments of the present disclosure.

FIG. 2A illustrates a schematic representation of the various entities involved in a virtual event, consistent with the disclosed embodiments. As shown, virtual events are orchestrated by a virtual event platform server 210, while users or virtual attendees participate through their respective computing devices 220-1 through 220-7, which communicate with virtual event platform server 210. Although FIG. 2A depicts only seven virtual attendee computing devices; this number is not limiting; any number of virtual attendees, whether fewer or significantly more, may, upon invitation, join and actively participate in an event managed by the platform server. Similarly, while only one virtual event platform server 210 is illustrated, in some embodiments, multiple servers may operate in coordination, communicating with one another to orchestrate the same event or to manage distinct events concurrently.

A virtual event may be initiated by an event host organizer using an associated event host organizer computing device 230. As further explained, the event host organizer may be responsible for controlling the overall design and experience of the virtual event and configuring and managing the event, including, but not limited to, defining its structure, setting the schedule, determining the number of attendees, and/or customizing the virtual event space's appearance and interactive features. It is to be appreciated that an event host organizer may also participate in the virtual event as a virtual attendee. However, the host organizer may hold higher-level credentials, granting access to advanced functionalities with respect to regular virtual attendees. These enhanced permissions may include the ability to modify certain aspects of the event during its execution, such as adjusting the virtual environment, managing attendee interactions, or updating event content in real time, among other things. An event host organizer may thus both engage with participants and maintain control over the event's structure and experience.

User or virtual attendee computing devices 220-1 through 220-7 and/or the event host organizer computing device 230 may be similar in type and functionality to computing device 100, as described with respect to FIG. 1A, and/or user device 154, as discussed with respect to FIG. 1B. Similarly, virtual event platform server 210 may also comprise computing components analogous to those of computing device 100, including, among other things, processing circuitry 102, memory 104, and storage device 108. Communication between the virtual event platform server 210, the event host organizer computing device 230, and the virtual attendee computing devices 220-1 through 220-7 may occur over a network, such as network 152 illustrated in FIG. 1B. This network may include wired or wireless connections and may leverage various protocols (e.g., TCP/IP, WebRTC) to support real-time data exchange. As further described below, such communication may enable the transmission of event configuration data, media streams, rendering updates, and interaction signals, among others, for delivering an immersive and dynamic virtual event experience.

Figure 2B:
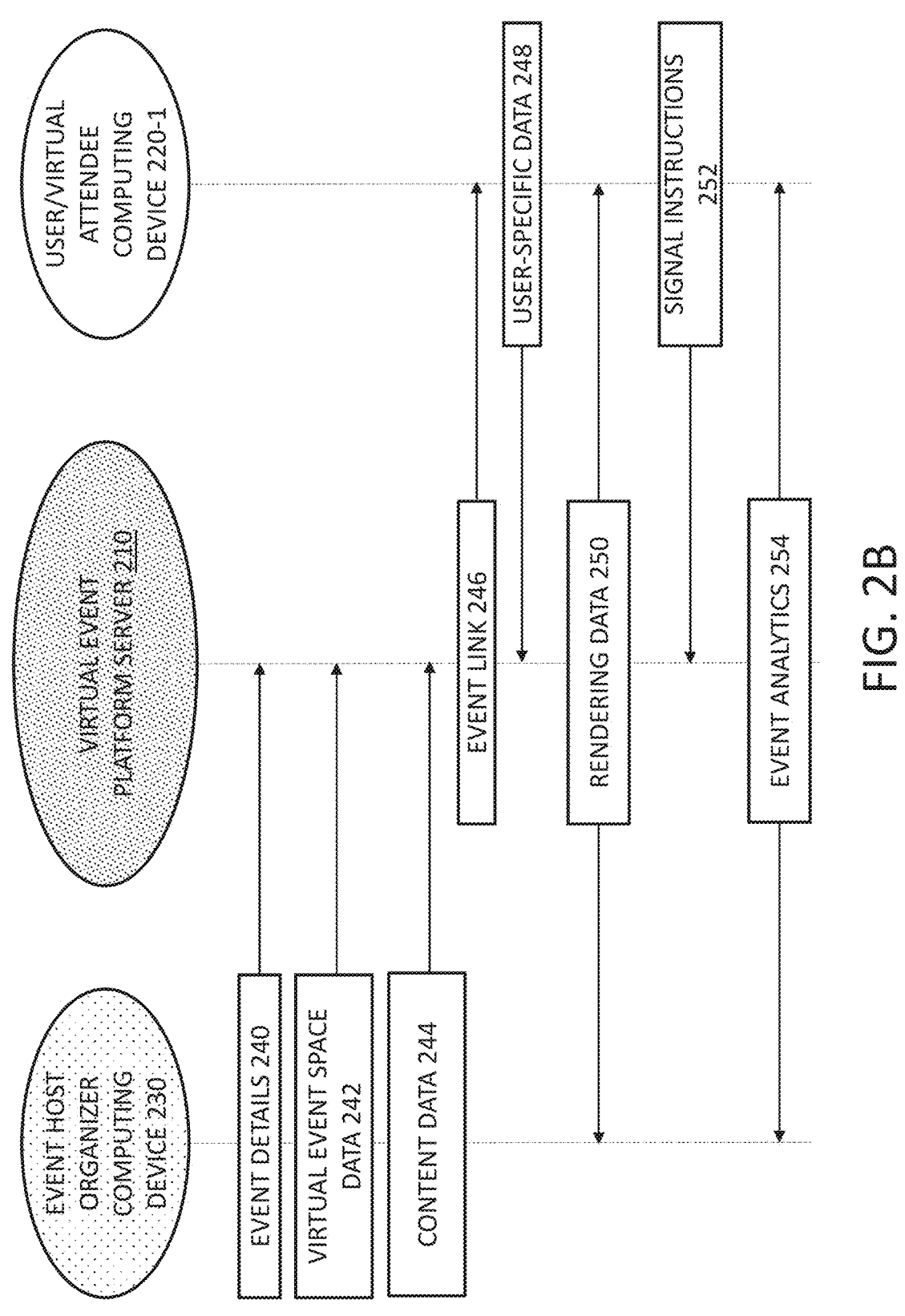
FIG. 2B is a diagram illustrating the various data exchanges that occur between the entities involved in a virtual event, consistent with some embodiments of the present disclosure.

FIG. 2B is a diagram illustrating the various data exchanges that may occur between the entities involved in a virtual event, consistent with the disclosed embodiments. Specifically, FIG. 2B depicts the interactions between the event host organizer computing device 230, the virtual event platform server 210, and a virtual attendee computing device 220-1. Although only one virtual attendee device 220-1 is shown for simplicity, it should be understood that similar exchanges may occur between the platform server 210 and other virtual attendee devices, such as 220-2 through 220-7. The nature of these data exchanges will be described in greater detail below, particularly in connection with process 300 illustrated in FIG. 3 and process X00 illustrated in FIG. XX. It should be noted that the exchanges shown in FIG. 2B are not intended to be exhaustive; additional exchanges may occur, and certain exchanges may persist for the entire duration of a virtual attendee's participation in the event. For example, rendering data 250, used to, among other things, generate the presentation of the virtual event space on user computing devices, may be continuously updated and transmitted from virtual event platform server 210 to user computing device 220-1 and/or event host organizer computing device 230, in real time, to reflect the live nature of the event. Furthermore, the sequence of data exchanges illustrated in FIG. 2B is not intended to be limiting. Rather, FIG. 2B represents an example flow beginning with the initial configuration of the virtual event, such as exchanges between the event host organizer and the virtual event platform server, followed by interactions as virtual attendees join the event, and continuing through to the conclusion of the event or the termination of an attendee's participation.

The following sections delve into the detailed operations, processes, and data exchanges that occur within the context of a virtual event. These descriptions will address the workflow from two complementary perspectives: the user or virtual attendee perspective, focusing on how participants interact with the platform and experience the event, and the virtual event platform server perspective, highlighting the underlying mechanisms, orchestration logic, and real-time data handling that enable an immersive virtual event environment.

Monday Mansion First Concept—Core Concept Host & Live Attendee Content Available at Virtual Events—User/ User Device Perspective [Header to be Deleted when Filing]

Some disclosed embodiments involve electronically participating in a virtual event hosted on at least one remote server. As used herein, "electronically participating" refers to engaging in an event or activity through digital means, such as using a computing device connected to a network. This may involve interacting with digital content, communicating with other participants, or performing actions within a virtual environment. For example, electronically participating may include accessing a virtual space, controlling an avatar, or viewing live-streamed content, among others. The term "virtual event" refers to an organized gathering or occurrence that takes place in a digital environment (herein, virtual event space) rather than a physical location. Virtual events may include conferences, exhibitions, meetings, or social gatherings conducted through online platforms. For example, a virtual event may be a digital trade show, an online concert, or a web-based educational seminar. In some cases, virtual events can be time-limited. The term "hosted" refers to the provision and management of resources, services, or content by a party or system for use by others. In the context of virtual events, hosting may involve maintaining the digital infrastructure, managing user access, and delivering event content. A "remote server" refers to a computer or system that provides services, resources, or data to other devices (clients/users) over a network, from a location physically separate from the user devices. Remote servers may handle tasks such as data storage, processing, or application hosting.

In the context of the present disclosure, "electronically participating in a virtual event hosted on at least one remote server" refers to the process of engaging in a digital gathering or event using a computing device, where the event's infrastructure and content are managed by one or more remote computer systems. This may involve accessing a virtual environment, interacting with digital objects and other participants, or experiencing content delivered from the hosting servers, among others.

By way of a non-limiting example, as described in detail below, a user may access a virtual event space using a computing device (e.g., user computing device 220-1), navigate an avatar within a virtual event space, interact with virtual objects, and view content presented on virtual displays, all facilitated by one or more remote servers (e.g., virtual event platform server 210) managing the event infrastructure. The remote servers may handle tasks such as rendering the virtual environment, processing user interactions, and coordinating communication between participants.

FIG. 3 is a flowchart of an exemplary process 300 for electronically participating in a virtual event hosted on at least one remote server, consistent with some of the disclosed embodiments. Process 300 is discussed herein for explanatory purposes and is not intended to be limiting. In some embodiments, steps of process 300 may be changed, modified, substituted, or rearranged, consistent with the present disclosure. Process 300 may be implemented using one or more components of user/virtual computing device 220-1 through 220-7 (discussed in FIG. 2A), computing device 100 (discussed in FIG. 1A), or user device 154 of computing architecture 150 (discussed in FIG. 1B). Some disclosed embodiments may include at least one processor that may be configured to execute stored instructions to perform operations for electronically participating in a virtual event hosted on at least one remote server. As shown in FIG. 3, process 300 may include steps 302, 304, 306, 308, and 310 (310a, 310b, 310c), discussed in further detail below.

Some disclosed embodiments involve enabling, via a first computing device associated with a first virtual attendee, access to a virtual event space hosted on the at least one remote server. As used herein, "enabling" refers to the act of making something possible, facilitating, or providing the means for an action or process to occur. In the context of computer systems, enabling may involve activating features, granting permissions, or establishing connections that allow certain functionalities to be accessed or utilized. A computing device may be any electronic device capable of processing data, executing instructions, and performing computational tasks. A computing device may include, but is not limited to, personal computers, laptops, smartphones, tablets, wearable devices, or any other electronic device with processing capabilities. A "virtual attendee" refers to a participant who engages remotely in a virtual event through a computing device and network connection. A user, when electronically participating in a virtual event, becomes a virtual attendee and may be represented by an avatar, profile, or other digital representation within the virtual space. The association between the first computing device and the first virtual attendee may be established through a login process, user profile, or other authentication mechanism that links the physical user to their digital representation within the virtual event space.

Access to the virtual event space refers to the ability to enter and interact with the virtual event space. This may include logging in and connecting to the platform. The process of enabling access may begin with the first computing device, which serves as the user's interface to the virtual event. The virtual event space itself refers to a digital environment or platform designed to host and facilitate online gatherings, meetings, conferences, or other events. A virtual event space may include various interactive elements, such as chat rooms, presentation areas, or networking zones, all rendered and accessed through digital means. Enabling access may involve establishing a connection between the first computing device and the remote server. As further explained below, once the connection is established, the remote server may begin streaming the necessary data to render the virtual event space on the first computing device. This data may include visual assets, audio streams, and real-time updates about other attendees and event activities.

The remote server or servers hosting the virtual event space may handle various aspects of the event, including user authentication, data storage, real-time communication, and rendering of the virtual environment. When a virtual attendee attempts to access the event space, the remote server may verify the attendee's credentials, allocate necessary resources, and initiate the data transfer required to render the virtual environment on the attendee's device.

In this context, enabling, via a first computing device associated with a first virtual attendee, access to a virtual event space hosted on the at least one remote server refers to the process of allowing a user, through their personal computing device, to enter and participate in a virtual event space that is managed and delivered by one or more remote computer systems. For example, referring to FIG. 2A, a first user via user computing devices 220-1 may be enabled to access a virtual event space hosted on virtual event platform server 210. Process 300 includes a step 302 of enabling, via a first computing device associated with a first virtual attendee, access to a virtual event space hosted on at least one remote server, as illustrated in FIG. 3.

In some embodiments, accessing the virtual event space may include receiving an event link configured to enable access to a virtual event space. An event link refers to a unique identifier that provides a direct pathway to access a specific virtual event or space. For example, an event link may be a clickable URL, a QR code, or an alphanumeric string that, when entered into a designated system, grants entry to the virtual event space. A first user via the first computing device may receive the event link via email, text message, or through a dedicated application from the remote server or the event host organizer. As further detailed below, the event link is generated by the remote server upon configuring the event and/or the virtual event space. Upon activating this link, the first user device may initiate a connection to the remote server hosting the virtual event space. The remote server may then verify the link's validity and, if authenticated, grant the user access to the virtual event space. This approach may allow for secure and controlled access to virtual events, ensuring that only invited or registered participants can enter the space. For example, referring to FIG. 2B, a first user via user computing device 220-1 may receive an event link 246 to enable access to a virtual event space hosted on virtual event platform server 210.

Some disclosed embodiments involve transmitting to the at least one remote server, user-specific data associated with the first virtual attendee, wherein the user-specific data includes information for establishing an avatar associated with the first virtual attendee. "Transmitting" refers to the act of sending data, signals, or information from one point to another, over a network or a given communication channel. In the context of computer systems, transmitting may involve sending digital data packets, streams, or files from one device or system to another (e.g., from the first computing device to the remote server). As used herein, "user-specific data" refers to information that is unique or particular to an individual user or account. User-specific data may include, but is not limited to, personal information (name, age, job, etc.), preferences, settings, or any other data that helps identify or customize the experience for a specific user. An "avatar" refers to a digital representation or character that represents a user in a virtual environment, i.e., the embodiment of a virtual attendee. An avatar may be a graphical image, 3D model, or any other visual representation. As further explained below, an avatar may be customized to reflect the user's preferences or characteristics.

In this context, transmitting to the at least one remote server, user-specific data associated with the first virtual attendee, refers to the process of sending information related to a particular user from a client device to one or more remote servers hosting the virtual event. This transmission may occur over a network connection, such as the internet, using appropriate communication protocols. The user-specific data may include various types of information that help identify and personalize the experience for the first virtual attendee. For example, user-specific data may encompass user profile information, preferences for the virtual environment, or historical data from previous virtual event participation. The transmission of this data may allow the remote server to recognize the user, apply appropriate settings, and tailor the virtual event experience to the individual attendee. For example, referring to FIG. 2B, a first user via user computing device 220-1 may be enabled to access a virtual event space hosted on virtual event platform server 210 and transmit user-specific data 248 in order to establish an avatar associated with the first user/virtual attendee. Process 300 includes a step 304 of transmitting to the at least one remote server, user-specific data associated with the first virtual attendee, wherein the user-specific data includes information for establishing an avatar associated with the first virtual attendee, as illustrated in FIG. 3.

Some disclosed embodiments involve receiving from the at least one remote server, rendering data for graphically representing the virtual event space on the first computing device. The rendering data includes definitions for a plurality of virtual locations, at least one virtual interactive object configured to provide access to predetermined content, and at least one virtual main display configured to display dynamic live content via a second computing device of a second virtual attendee. "Receiving" refers to the act of obtaining or acquiring data, information, or signals from an external source. In the context of computer systems, receiving may involve accepting incoming data transmissions, downloading files, or capturing input from various sources. "Rendering data" refers to information used to generate or create a visual representation of a scene, object, or environment. Rendering data may include geometric information, colors, textures, lighting parameters, and other details necessary for producing a graphical output. Rendering data is used to graphically represent the virtual event space, i.e., to create a visual simulation of the virtual event space that users can perceive and interact with through a display device (e.g., a display device associated with user computing devices). Rendering data may include "definitions", i.e., specifications, parameters, or descriptions that define the characteristics, properties, layout, appearance, functionality, or behavior of various elements within the virtual event space.

In this context, receiving from the at least one remote server, rendering data for graphically representing the virtual event space on the first computing device, refers to the process by which the first computing device obtains the necessary information from the remote server(s) to visually recreate the virtual event space on an associated display. This rendering data may be transmitted over a network connection and may include various types of information needed to construct the visual representation of the virtual event space. For example, referring to FIG. 2B, a first user via user computing device 220-1 may receive rendering data 250 to create, on a display device included in or associated with user computing device 220-1, a representation of the virtual event space hosted on virtual event platform server 210. Process 300 includes a step 306 of receiving from the at least one remote server, rendering data for graphically representing the virtual event space on the first computing device, as illustrated in FIG. 3.

Consistent with the disclosed embodiments, rendering data received from the remote server includes definitions for a plurality of virtual locations, i.e., distinct areas or positions within the virtual event space that users can navigate to or interact with. Virtual locations may represent different functional spaces, themed areas, or points of interest within a virtual event space.

The rendering data may also include information about at least one virtual interactive object configured to provide access to predetermined content. A virtual interactive object refers to a digital element or entity within the virtual event space that users/virtual attendees can engage with or manipulate to access predetermined content. Virtual interactive objects may respond to user inputs and provide specific functionalities or experiences within the virtual space. For example, a virtual interactive object may be a digital kiosk that, when engaged by an attendee's avatar, displays predetermined content for viewing. The kiosk may immediately present predetermined content, such as a video, document, image gallery, or interactive widget, on the attendee's device. For example, if the kiosk is configured to display product information, clicking or approaching it could open a pop-up window or panel showing detailed product specs, promotional videos, or downloadable brochures. Other examples of virtual interactive objects configured to provide access to predetermined content are provided in the sections below. The term "predetermined content" refers to information, media, or data that is prepared or defined in advance of its presentation or use. In the context of virtual events, predetermined content may include pre-recorded videos, documents, images, or other materials that are made available to attendees.

Additionally, the rendering data may include definitions for at least one virtual main display configured to display dynamic live content via a second computing device of a second virtual attendee. The term "virtual main display" refers to a prominent visual element within the virtual event space designed to showcase or present information to users. A virtual main display may function similarly to a large screen or projection system in a physical event space. This virtual main display may be a central feature in the virtual event space, capable of showing "dynamic live content," i.e., information or media that is generated, updated, or streamed in real-time during an event. "Dynamic" refers to information or media that is capable of changing, updating, or responding to user interactions or event progression, while "Live" refers to information or media that is generated, transmitted, or streamed in real time during the event. For example, the virtual main display may represent a large screen where live video feeds, real-time presentations, or interactive elements that change based on current inputs or conditions can be viewed. Such real-time content may be streamed from another participant's device, such as from other virtual attendees or from the event host organizer. For example, referring to FIG. 2A, a virtual main display may be configured to display dynamic live content originating from the event host organizer via computing device 230 or from a second virtual attendee via any of computing devices 220-2 through 220-7.

Technically, the virtual event platform may utilize and a user computing device may receive data through distinct transmission protocols for the different content types to optimize performance. For predetermined content, accessed via interactive objects (e.g., high-resolution brochures or pre-recorded 4K video), the virtual event platform may be configured to utilize reliable transport protocols via a Content Delivery Network (CDN), as an example, to ensure data integrity. Conversely, for 'dynamic live content' displayed on the virtual main display, the virtual event platform may be configured to prioritize low-latency streaming protocols (e.g., Web Real-Time Communication-WebRTC, User Datagram Protocol-UDP, or Real-Time Messaging Protocol-RTMP) routed through a media server or peer-to-peer connection. Furthermore, while predetermined content is often rendered in a 2D overlay independent of the 3D scene geometry, dynamic live content may be texture-mapped in real-time onto the specific polygonal surface of the virtual main display object, ensuring correct perspective rendering consistent with the isometric view.

The process of receiving and utilizing rendering data allows the first computing device to create a rich, interactive virtual environment that can be explored and engaged with by the first virtual attendee. By including definitions for various virtual locations, interactive objects, and displays capable of showing live content, the virtual event platform may enable a diverse and dynamic virtual event experience that mimics many aspects of physical events while leveraging the unique capabilities of digital platforms.

Some disclosed embodiments involve using the rendering data to represent an isometric perspective view on a display of the first computing device of at least a portion of the virtual event space. The isometric perspective view presents the avatar at a first location within the virtual event space, the at least one virtual interactive object at a second location within the virtual event space, and the at least one virtual main display at a third location within the virtual event space. In other words, the first computing device processes the received rendering data to generate and display a visual representation of the virtual event space on a display included in or associated with the first computing device. This representation may employ an isometric perspective, i.e., a method of visual representation of three-dimensional objects in two dimensions where the three coordinate axes appear equally foreshortened, and the angle between any two of them is 120 degrees. This type of view may provide a sense of depth and dimensionality while maintaining a consistent scale across the image, regardless of distance from the viewer. The isometric perspective view may allow the first virtual attendee to observe and interact with various elements within the virtual event space from a fixed angle, providing a clear understanding of spatial relationships and relative positions of objects and avatars. This view may be particularly useful for navigating complex virtual environments, as it may maintain a consistent scale and orientation across the displayed portion of the virtual event space. As a result, users may view and interact with a manageable area of the virtual environment, navigating as needed to explore other regions. Although the present disclosure provides examples of virtual event spaces rendered with an isometric perspective view, other types of views may also be used when rendering the virtual event space. For instance, a top-down orthographic view, a perspective (vanishing point) view, or a first-person view may be employed depending on the desired user experience and application requirements. These alternative views can offer different ways to visualize and interact with the virtual environment, such as providing a more immersive experience or enabling easier navigation and object selection. The representation may encompass at least a portion of the virtual event space, i.e., a part, section, or segment of the whole virtual event space. A portion may represent a specific area, region, or subset of the entire virtual space that is currently visible or accessible to a user. This is because the dimensions of the display associated with the first computing device may be too small to accommodate the entire virtual event space at a given zoom setting (e.g., default zoom setting), or conversely, the zoom level may be set such that only a subset of the space is visible at any given time.

Consistent with the disclosed embodiments, the isometric perspective view may present the avatar associated with the first virtual attendee at a specific position (first location) within the rendered portion of the virtual event space. This may allow the first virtual attendee to easily identify and control their avatar within the environment. The view may also display one or more virtual interactive objects at different positions (second locations) within the virtual event space. These objects may be visually distinct from the avatar and may be positioned in a way that allows the first virtual attendee to recognize and interact with them. Additionally, the isometric perspective view may include the at least one virtual main display at another distinct position (third location) within the virtual event space. This at least one main display may be prominently positioned to ensure visibility and accessibility for viewing dynamic live content. By presenting these elements at distinct locations within the isometric perspective view, a clear and intuitive representation of the virtual event space may be provided. This arrangement may allow the first virtual attendee to easily navigate the environment, interact with objects, and engage with content displayed on the virtual main display, all while maintaining a consistent and easily understandable visual perspective of the virtual event space. Referring to FIG. 2B, a first user via user computing device 220-1 may process received rendering data 250 to create, on a display device included in or associated with user computing device 220-1, a representation of at least a portion of the virtual event space hosted on virtual event platform server 210. The rendered portion may include an isometric perspective view featuring the avatar associated with the first user, one or more virtual interactive objects, and at least one virtual main display. Process 300 includes a step 308 of using the rendering data to represent an isometric perspective view on a display of the first computing device of at least a portion of the virtual event space, as illustrated in FIG. 3.

Because the isometric perspective view renders only a portion of the virtual event space, this visible area may not in all use cases be large enough to encompass the avatar of the first users, the one or more virtual interactive objects, the at least one main display, and optionally avatars associated with other users, simultaneously. In other words, while the virtual event space as a whole includes the avatar at a first location, the at least one virtual interactive object at a second location, and the main display at a third location, the portion of the space rendered on the display at any given time may not always show all these elements together. This limitation arises because the display dimensions of the first computing device, or the current zoom setting, may restrict the visible area to a subset of the entire virtual event space. In some cases, the virtual event space may be so large that the at least one main display cannot be rendered in the same view as the at least one virtual interactive object, making it necessary for the user to navigate or pan the view to access different elements. Nevertheless, in some embodiments, the rendered portion may, by default, include the avatar associated with the first virtual attendee.

Figure 4A:
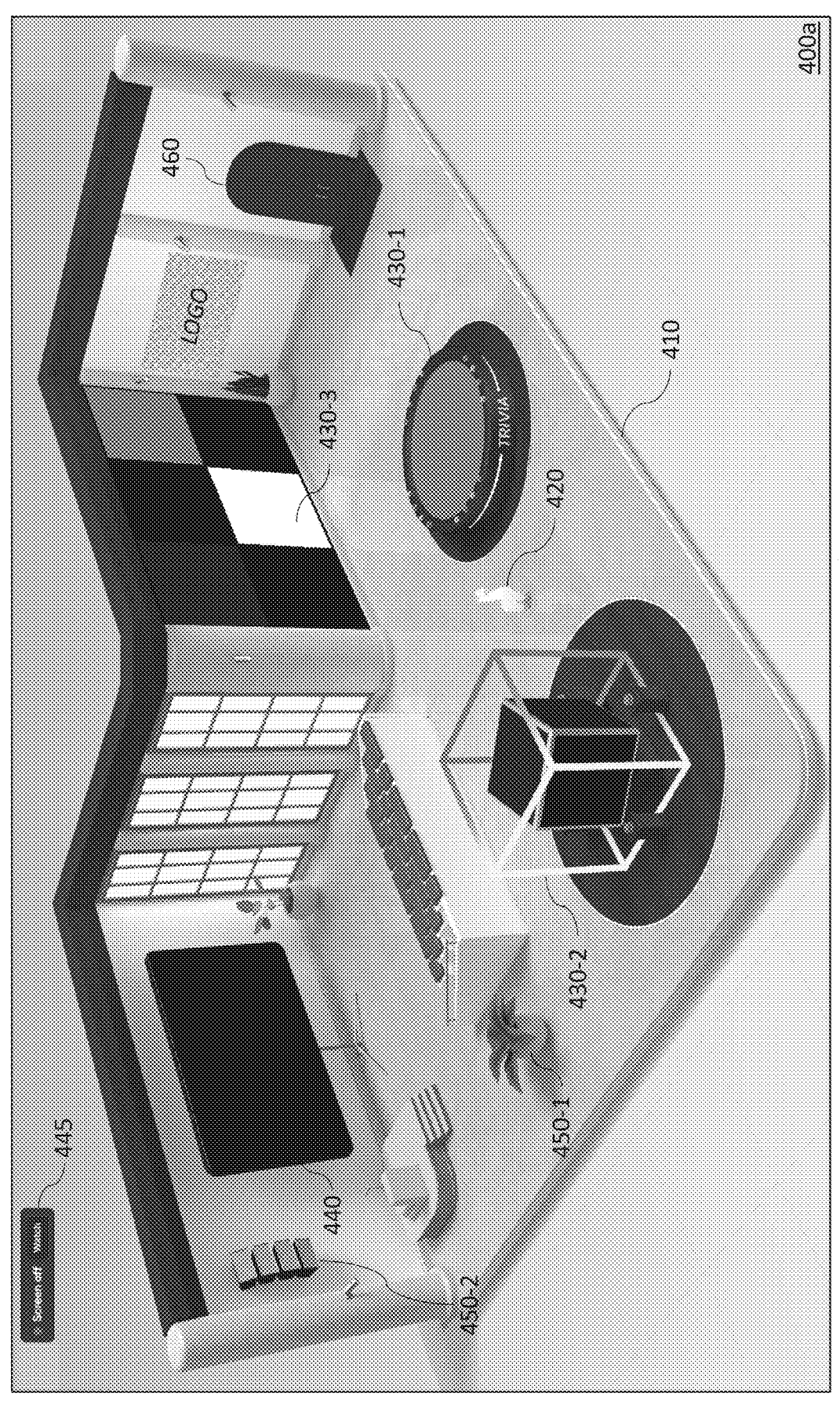

FIG. 4A illustrates an exemplary isometric perspective view 400a of at least a portion of a virtual event space 410, consistent with the disclosed embodiments. In accordance with these embodiments, such an isometric perspective view may be rendered on a display device associated with a first user's computing device, which has received rendering data corresponding to the virtual event space 410. As depicted, view 400a includes a representation of at least a portion, and in this particular example, the entirety, of virtual event space 410. Here, the virtual event space is configured as a medium-sized room that features an auditorium as well as additional areas designed for attendee interaction.

Several elements of virtual event space 410 are presented in view 400a. These include an avatar 420 associated with a first virtual attendee, three distinct virtual interactive objects 430-1, 430-2, and 430-3, and at least one virtual main display 440. Consistent with the disclosed embodiments, avatar 420, virtual interactive objects 430-1 through 430-3, and virtual main display 440 are each located at different locations within the virtual event space. Specifically, the avatar at a first location, the interactive objects at a set of second locations, and the main display at a third location. In the present example, the virtual interactive objects comprise a trivia table 430-1, which, upon interaction, may prompt the virtual attendee to answer one or more questions; a kiosk 430-2, which, upon interaction, may provide the attendee with predetermined content; and an image gallery 430-3, which is configured to display predetermined content. Additionally, virtual event space 410 includes, as shown in view 400*a*, a plurality of additional objects that are part of the decor of the virtual event space. These objects, such as plant 450-1 or speakers 450-2, are decorative and not intended to be interactive. Their purpose is to reinforce the illusion of a real event space, further immersing virtual attendees and helping to put them in the mindset of attending an actual event. This arrangement demonstrates how the isometric perspective view can effectively present both interactive and non-interactive elements within a virtual event space, allowing users to navigate, observe, and interact with various features while also experiencing a visually rich and realistic environment. The inclusion of both functional and aesthetic elements supports a more engaging and authentic virtual event experience. Virtual event space 410 includes, as shown in view 400*a*, a virtual door 460, the functionality of which will be described in detail later.

Virtual event space 410 is purely exemplary, and that a wide variety of designs may exist for a virtual event space. These designs may differ in size, the number of interactive objects, the number of virtual main displays, the types and quantity of decor objects, among other features. Similarly, view 400*a* is merely an exemplary initial view upon rendering and is not intended to be limiting. In other scenarios, the initial view upon rendering may feature the first virtual attendee's avatar in proximity to virtual door 460, and such a view may not include a representation of virtual main display 440. This flexibility allows for a range of user experiences and configurations, depending on the specific requirements and design choices of the virtual event platform.

In some embodiments, one or more virtual event space properties are modifiable in accordance with a predetermined schedule. Event space properties refer to the observable and/or perceivable characteristics or attributes of a digital environment that contribute to its appearance, atmosphere, and overall user experience. For example, the one or more virtual event space properties include at least one lighting, volume levels, playable audio, or color theme, among others. A "predetermined schedule" in this context refers to a pre-planned sequence of events or changes that are set to occur at specific times or intervals during the virtual event. For instance, such a schedule may dictate when certain visual or audio elements should change throughout the duration of the event, enabling the environment to dynamically adapt as the event progresses. The virtual event platform may thus have the capability to dynamically alter the appearance and ambiance of the virtual event space based on a preset timeline or in response to specific triggers. For example, the lighting conditions within the virtual event space may change to simulate different times of day, such as daylight with no virtual lighting systems illuminated during morning sessions, or nighttime with a virtual lighting system activated for evening events. Similarly, audio properties may be adjusted, such as when, during scheduled breaks, background audio may be played at an enhanced volume level to mimic the ambient noise that typically arises when several attendees gather and converse in a physical room. Conversely, when a presentation is in progress, such background audio may be reduced or muted entirely to ensure clarity and minimize distractions. All of these properties, when dynamically modified according to a predetermined schedule, can contribute to a more immersive and engaging experience for virtual attendees. By closely mirroring the evolving atmosphere of a real-world event, these dynamic changes may help increase attendee interaction and foster a sense of presence within the digital environment.

Some disclosed embodiments involve transmitting from the first computing device signal instructions. Once a virtual event space has been rendered, e.g., including an avatar associated with a first virtual attendee, one or more virtual interactive objects, and at least one virtual main display, the first virtual attendee may begin exploring and interacting within the virtual event space. In response to these user-initiated actions, the first computing device generates and transmits signal instructions to the remote server that are reflective of the current interaction state and intended operation, thereby enabling coordinated updates, server-side processing, content retrieval, and/or synchronized presentation across the virtual event platform. As used herein, the term "signal instructions" refers to data or commands sent from a user computing device to the remote server to initiate, control, or acknowledge specific actions or processes. Signal instructions may include, but are not limited to: control signals that encode user intents (e.g., "move," "interact," "play/pause," "open/close"); structured data packets carrying parameters and metadata (e.g., avatar location coordinates, object identifiers, content selection keys, timestamps, and session identifiers); and other forms of digital information used to communicate directives between the user computing device and the remote server. Different examples of signal instructions are provided below. The remote server may interpret the received signal instructions and return information and rendering data to the first computing device. This latter may then apply the returned information to adjust the rendered portion of the virtual event space accordingly. For example, referring to FIG. 2B, a first user via user computing device 220-1 may transmit signal instructions 252 to cause interaction or explore the virtual event space hosted on virtual event platform server 210. Process 300 includes a step 310 of transmitting from the first computing device signal instructions, as illustrated in FIG. 3.

While keyboard and mouse inputs are described, signal instructions may be derived from a variety of input modalities. These include, but are not limited to, volumetric inputs (e.g., 6-Degree-Of-Freedom controller tracking, hand tracking in Virtual Reality/Augmented Reality), biometric signals (e.g., gaze tracking, eye movement vectors), natural language voice commands processed via local or remote NLP engines (e.g., 'walk to the booth'), and indirect control signals generated by automated AI agents acting on behalf of the user. A user computing device can be configured to normalize these disparate input types into a standardized signal instruction packet for processing by the remote server. Furthermore, the signal instructions may utilize predictive synchronization techniques (e.g., dead reckoning or client-side prediction) to mitigate network latency. The structured data packets may include 'client-side timestamps' and 'sequence numbers' that allow the remote server to reconcile conflicting movement instructions from multiple attendees, ensuring that the rendered isometric view remains consistent across all participating devices despite varying network conditions.

By transmitting these various signal instructions, the first computing device may enable a rich, interactive experience within the virtual event space. The first virtual attendee may, as described below, navigate freely, engage with informative objects, and participate in live content sharing, all facilitated by the continuous exchange of data and instructions between the first computing device, the remote server hosting the virtual event, and other attendees' devices.

Some disclosed embodiments involve transmitting from the first computing device signal instructions for causing navigation of the avatar within the virtual event space. In other words, the first computing device may generate and send signal instructions to control the movement and positioning of the avatar within the virtual event space. These instructions may be based on user inputs, such as keyboard commands, mouse movements, touchscreen gestures, or other input methods. The signal instructions for navigation may include data specifying the desired direction, speed, or destination of the avatar within the virtual environment. Process 300 includes a step 310a of transmitting from the first computing device signal instructions for causing navigation of the avatar within the virtual event space, as illustrated in FIG. 3.

Figure 4B:
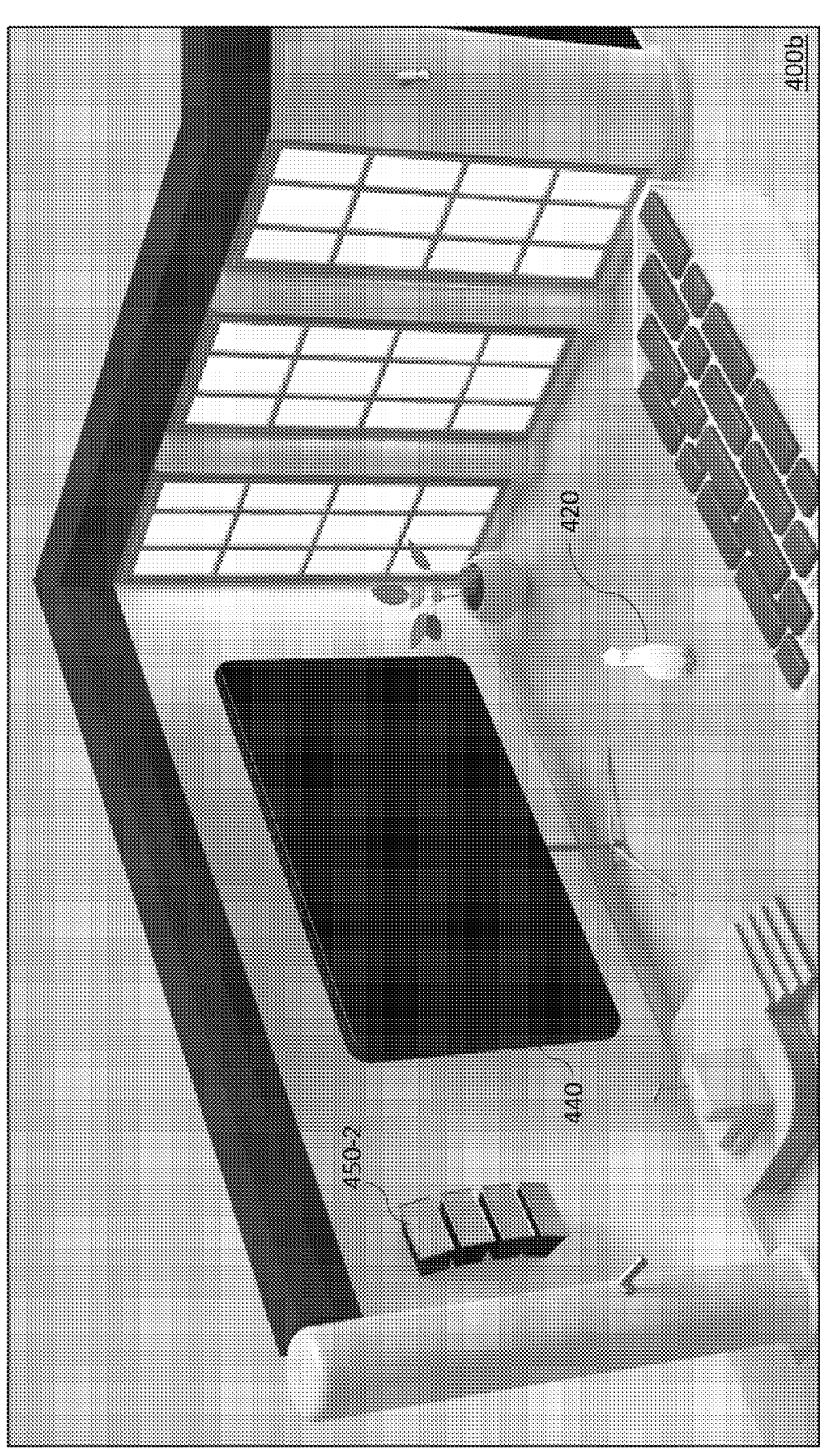

FIG. 4B illustrates another exemplary isometric perspective view 400b of at least a portion of virtual event space 410, consistent with the disclosed embodiments. In this example, the position of avatar 420 has changed compared to its location in view 400a; avatar 420 is now situated closer to virtual main display 440. This change in position may result from the first user interacting with the rendered view 400a of virtual event space 410, for example, by clicking or selecting a new destination within the environment, thereby prompting the avatar to navigate from its previous first location to a new first location within the space. As depicted in FIG. 4B, not only has the position of avatar 420 changed, but the zoom setting of the isometric perspective view has also been modified. In some embodiments, the zoom setting may be dynamically adjusted in response to the avatar's position within the virtual event space. For instance, referring back to FIG. 4A, when avatar 420 is located near the outer edge of the virtual event space (close to the so-called "fourth wall," which is not virtually embodied but conceptually represents the boundary between the virtual environment and the viewer), the zoom setting may be configured so that the entire virtual event space 410 fits within view 400a. This allows the first user to see all available features and elements within the environment at a glance. In contrast, in view 400b, when avatar 420 is positioned closer to an inner edge, such as near an existing virtual wall or a specific area of interest, the zoom setting may be increased (i.e., the view is zoomed in) to provide a more detailed and immersive perspective of the avatar's immediate surroundings. This dynamic adjustment of the zoom level may enhance the user experience by ensuring that relevant details are visible and accessible based on the avatar's current location, while still allowing the user to navigate and explore the broader virtual event space as needed.

Figure 4C:
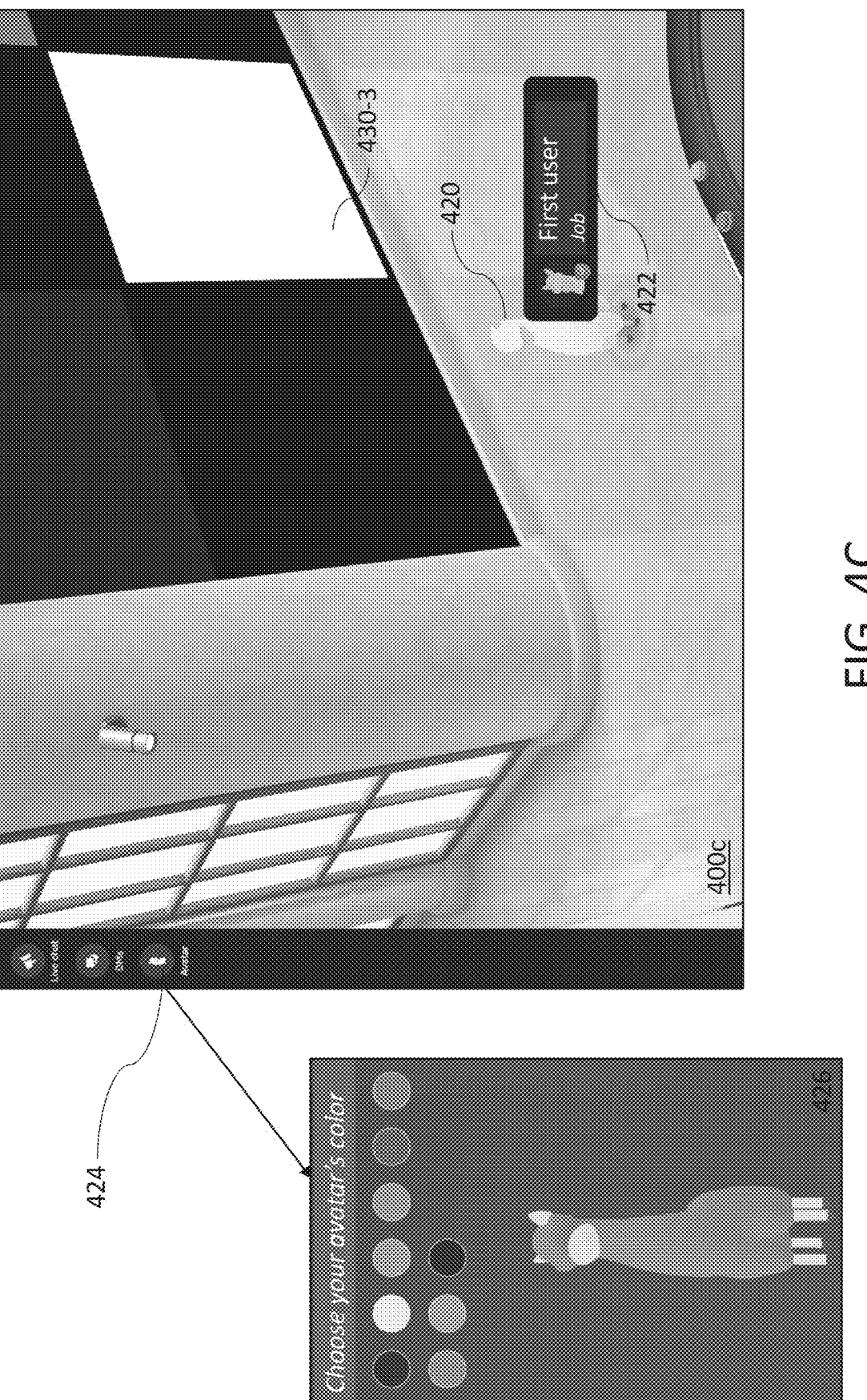

FIG. 4C illustrates another exemplary isometric perspective view 400c of at least a portion of virtual event space 410, consistent with the disclosed embodiments. In this example, the position of avatar 420 has changed compared to its location in view 400a and 400b, being closer to image gallery 430-3. View 400c corresponds to a close-up rendering of avatar 420, providing a more detailed and focused perspective on the virtual attendee's representation within the event space. As mentioned above, this close-up view may be used, for instance, to highlight the avatar's interactions with nearby virtual objects or to emphasize the attendee's presence within a specific area of the virtual environment. Although throughout the present disclosure, avatars are depicted as three-dimensional animated llamas for illustrative purposes, this choice is purely exemplary. Any other form of representation may be used for a virtual attendee avatar, including but not limited to human figures, other animals, abstract shapes, or customized characters designed by the user or event organizer. The selection of avatar style and appearance can be tailored to suit the theme of the virtual event, the preferences of the attendees, or the branding requirements of the hosting organization. This flexibility may ensure that the virtual event platform can accommodate a wide variety of visual identities and user experiences, further enhancing engagement and personalization within the virtual event space.

In some embodiments, the avatar associated with the first virtual attendee is customizable. The term "customizable" refers to the ability to modify or adjust the appearance, characteristics, or behavior of something according to individual preferences or specifications. In the context of avatars, this means that users can alter various aspects of their digital representation. In such cases, the first virtual attendee, via the first computing device, transmits a selection of avatar customization options to at least one remote server for the avatar associated with the first virtual attendee. This customization process may take place either prior to the commencement of the virtual event or at any time during the event itself. Users may be provided with an intuitive menu or graphical interface that enables them to select and modify a wide range of avatar attributes. These attributes may include, but are not limited to, clothing style, hair color, skin tone, facial features, accessories, and other visual characteristics. In addition to purely cosmetic options, the customization interface may also allow users to select functional elements, such as badges or icons that indicate the user's role (e.g., speaker, organizer, attendee) or achievements (e.g., completed sessions, earned awards) within the event. Once the user has made their selections, the chosen customization options are transmitted to the remote server, which processes the data and updates the appearance of the user's avatar in real time within the virtual event space. This ensures that participants see the most current representation of each attendee. The ability to customize avatars in this manner may enhance user engagement by fostering self-expression and individuality. It may also help attendees visually distinguish between different participants, making it easier to identify colleagues, speakers, or team members within the virtual environment. Furthermore, avatar customization may contribute to a more inclusive and welcoming atmosphere, as users are empowered to create representations that reflect their personal identity or preferences. For example, as depicted in view 400c (FIG. 4C), the first virtual attendee may interact with graphical user interface element 424. This interaction may trigger the rendering of an additional pop-up window or contextual menu 426, which provides options for selecting or modifying the color of avatar 420. Through this interface, the user can conveniently personalize the appearance of their avatar by choosing from a range of available color options, further enhancing the customization experience within the virtual event space.

In some embodiments, at least some of the customization options are available for selection after the first virtual attendee has performed one or more actions within the virtual event space. This progressive customization system may serve as an incentive for participation and exploration within the virtual space. For example, attending a certain number of presentations may unlock a special badge or accessory for the user's avatar. Engaging in networking activities might make new clothing options available. Completing a scavenger hunt within the virtual space could reveal unique avatar animations or effects. These action-based customization options may encourage users to actively participate in the event and provide a visual representation of their engagement level. The system may track user actions and automatically update the available customization options in real-time, providing immediate feedback and rewards for user participation.

In some embodiments, interacting with an avatar may cause information related to the virtual attendee associated with that avatar to be displayed. Such interaction may include actions like clicking on the avatar or hovering a cursor over the avatar within the virtual event space. When this occurs, relevant information, such as the attendee's name, job title, or other identifying details, may be shown on a tag or label positioned in the vicinity of the corresponding avatar. For example, referring to FIG. 4C, name tag 422 may be presented near avatar 420, displaying the name and job title of the first virtual attendee.

Some disclosed embodiments involve transmitting from the first computing device signal instructions for causing interaction between the first virtual attendee and the at least one virtual interactive object to thereby trigger, on the display of the first computing device, a presentation of the predetermined content via the virtual interactive object. In this context, "causing interaction" refers to enabling or initiating engagement between the first virtual attendee and/or its avatar and one or more interactive elements within the virtual event space. Such interaction may be effected through proximity-based activation (e.g., when the avatar enters a predefined interaction radius), direct user input (e.g., click, tap, keyboard, controller), gesture or voice input, or other mechanisms configured to allow the virtual attendee to engage with and elicit responses from the virtual interactive objects. For interactions with virtual interactive objects, the signal instructions may include data identifying the specific object being interacted with (e.g., object identifier, object type), the type of interaction (e.g., click, touch, proximity, hover, long-press), and any additional parameters required to trigger the appropriate response (e.g., content selection keys, playback mode, language or accessibility preferences, timestamps, session identifiers). When an interaction with a virtual interactive object occurs, the first computing device may receive data associated with the predetermined content linked to that object (e.g., streaming media assets, text panels, slide decks, 3D models, or interactive widgets). Process 300 includes a step 310b of transmitting from the first computing device signal instructions for causing interaction between the first virtual attendee and the at least one virtual interactive object to thereby trigger, on the display of the first computing device, a presentation of the predetermined content via the virtual interactive object, as illustrated in FIG. 3.

In some embodiments, the predetermined content is based on data received from an event host organizer as part of the virtual event space. As further explained below, the event host organizer, when configuring the event and/or the virtual event space, may upload various types of content to the remote server prior to the event. This content may include presentation slides, product information, promotional videos, interactive elements specific to the event's theme or purpose, or any other digital materials or information that are prepared and provided to be displayed or made available within the virtual event space. The remote server may then integrate this content into the virtual event space, making it accessible to attendees through virtual interactive objects. This approach may allow for a customized and curated experience that aligns with the event host's objectives and enhances attendee engagement. For example, referring to FIG. 2B, event host organizer via computing device 230 may transmit content data 244 to virtual event platform server 210. At least some of such content data 244 may be used to be displayed or made available within the virtual event space via one or more virtual interactive objects.

In some embodiments, access permissions to the predetermined content are enabled in accordance with a time limit provided as part of the virtual event space. Access permissions refers to the rules or settings that determine who can view, interact with, or modify specific content or areas within a digital environment. For example, access permissions may include read-only access, full editing rights, or time-limited viewing privileges. In other words, the ability of a virtual attendee to view, interact with, or otherwise access specific content, such as documents, media files, interactive modules, or other resources, may be restricted to a designated time window. The time limit may be set to correspond with particular sessions, activities, or phases of the virtual event, ensuring that content is only available during relevant periods. For example, certain presentation materials or interactive experiences might only be accessible during a scheduled session, after which access is automatically revoked or disabled. This approach may not only help manage the flow of information and engagement within the virtual event space, but also supports event organizers in controlling content distribution, protecting sensitive materials, and enhancing the overall structure and pacing of the event. In some cases, notifications or visual cues may be provided to attendees to indicate when access to specific content will become available or expire, further supporting a seamless and well-coordinated virtual event experience.

In some embodiments, the predetermined content is customized based on real-time data. "Real-time data" refers to information that is delivered immediately after collection, with no delay in the timeliness of the information provided. No delay refers to a latency so minimal that data may be delivered within less than 1 second, 1 millisecond, 1 microsecond, 1 nanosecond, or even lower. For example, real-time data may include live user interactions, current market conditions, or instantaneous sensor readings. In this context, predetermined content may be dynamically modified or adapted within the virtual event space in response to current information or conditions. For example, the content displayed via a virtual interactive object may change based on the number of attendees in a particular area, their interaction patterns, questions being asked, or live polling results. For example, if the number of attendees from diverse backgrounds or regions increases, a delivered content/message may be amended to address a broader audience such as by including multilingual greetings, culturally relevant information, or content tailored to the interests of participants from different parts of the world. This real-time customization may enhance engagement by providing more relevant and responsive content to attendees. The virtual event platform may employ algorithms that analyze incoming data streams from one or more virtual attendees and adjust the predetermined content accordingly, ensuring that the virtual event remains dynamic and responsive to the current needs and interests of the participants.

In some embodiments, the predetermined content is adapted to each attendee based on virtual attendee data. "Virtual attendee data" refers to information collected about a user participating in a virtual event, which may include their profile information, interaction history, preferences, or behavior within the virtual space. For example, virtual attendee data may encompass a user's job title, areas of interest, or the types of content they have engaged with in past events. In this context, predetermined content may be personalized within the virtual event space to align with the specific characteristics, interests, or behavior of individual participants. For example, the virtual event platform may analyze an attendee's job role and previous content interactions to prioritize and highlight relevant presentations or exhibits within their view of the virtual space. This personalization may enhance the attendees' experiences by presenting them with content that is more likely to be relevant and engaging to their specific interests or needs. In some embodiments, the virtual event platform may employ machine learning algorithms to continuously refine and improve the content adaptation based on ongoing attendee interactions and feedback.

In some embodiments, the predetermined content includes multiple content options, each provided with a timeframe, and the first virtual attendee is directed to one of them as a function of a current time. "Timeframe" refers to a specified period during which a particular action, event, or availability is scheduled to occur. For example, a timeframe may be a specific hour during an event, a day within a conference schedule, or a defined duration for accessing certain content. In this context, as the event progresses, various pieces of predetermined content may be made available or highlighted at different times throughout the virtual event, with the virtual event platform guiding users to the currently relevant content based on the ongoing schedule. For example, once a presentation ends, at least one virtual interactive object may be configured to display the slides associated with the presentation and answer in a Q&A session, such that attendees may access them. In another example, during a scheduled break, the virtual event platform may make available pre-recorded networking videos, sponsor booths, and interactive games, directing attendees to these options.

Figure 4D:
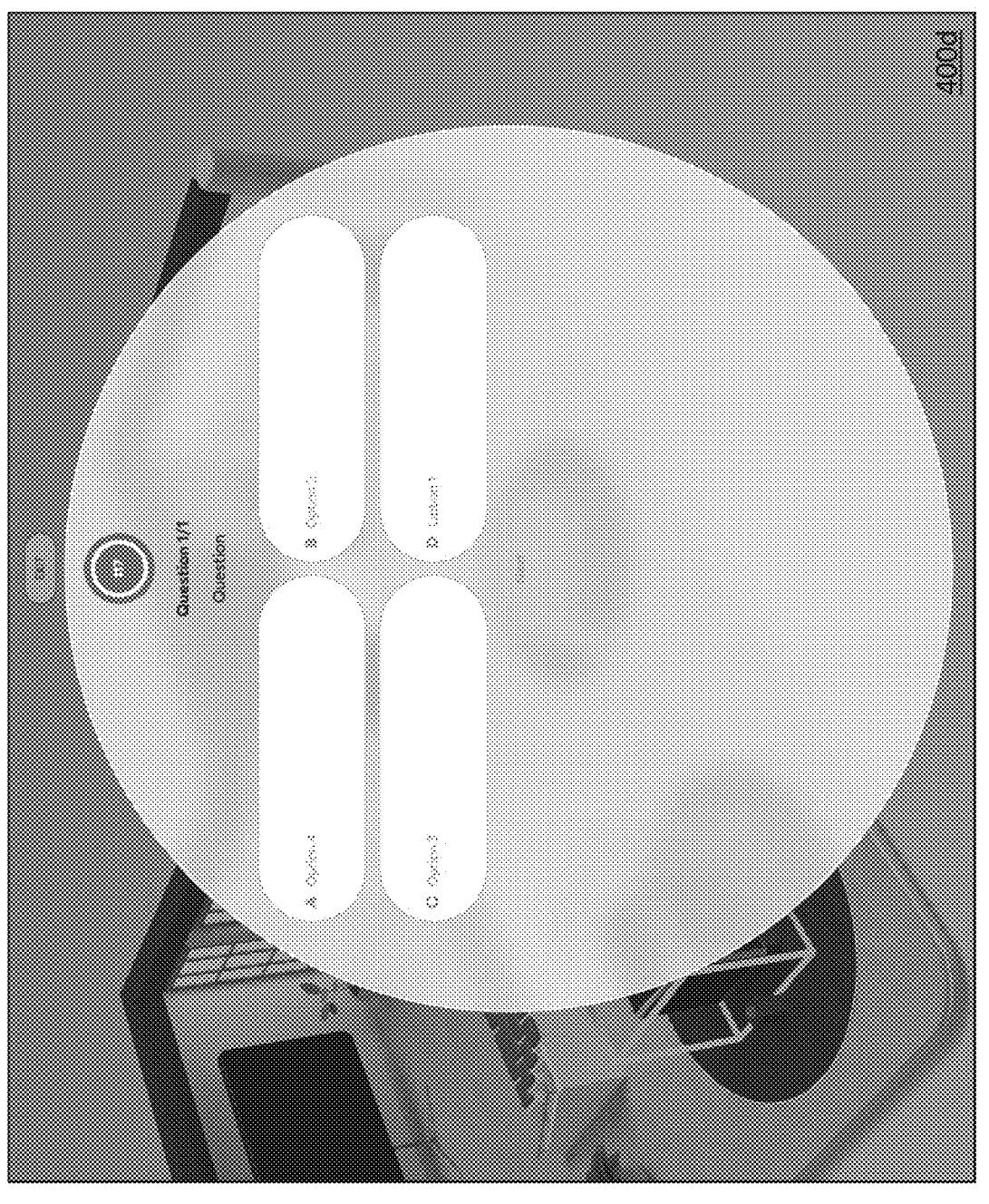

FIG. 4D illustrates an exemplary isometric perspective view 400*d* of at least a portion of virtual event space 410, consistent with the disclosed embodiments. In this example, view 400*c* is rendered following an interaction with trivia table 430-1, such as when the first user/virtual attendee associated with avatar 420 clicks on trivia table 430-1 as presented in view 400*a*. Consistent with the disclosed embodiments, such an interaction triggers the presentation of predetermined content, here, a trivia question, on the display of the first computing device, delivered via virtual interactive object 430-1. This process demonstrates how user engagement with interactive elements within the virtual event space can dynamically present relevant content, thereby enhancing the interactivity and immersive experience of the virtual event.

In some embodiments, triggering a presentation of predetermined content via a virtual interactive object may include updating a current presentation of predetermined content through that virtual interactive object. For example, upon initial rendering of the virtual event space, certain virtual interactive objects may already be presenting predetermined content to the user. In such cases, interaction with these objects does not necessarily initiate a new presentation, but may instead update or modify the existing display. In some embodiments, the at least one virtual interactive object includes at least one gallery interactive object configured to display predetermined content. A gallery interactive object refers to a digital element within a virtual environment that is designed to showcase or present a collection of related content items (e.g., images, media files). For example, a gallery interactive object may be a virtual wall displaying multiple images, a rotating carousel of product information, or a series of interconnected screens showing video clips. A gallery interactive object may display predetermined content (i.e., causing a visual presentation of predetermined content) by rendering images or text on a virtual surface, projecting video content onto a virtual screen, or organizing information in a visually coherent manner within the virtual space. If the gallery is already presenting a set of images by default when the virtual event space is first rendered, user interaction, such as clicking or selecting the gallery, may cause the display to update. This update could involve switching to a different image, expanding the view to show a larger or more detailed version, launching a slideshow, or revealing additional information or interactive controls related to the content. Other examples of updates could include changing the layout of displayed items, filtering content based on user preferences, or transitioning to a different content category within the same interactive object.

Figure 5B:
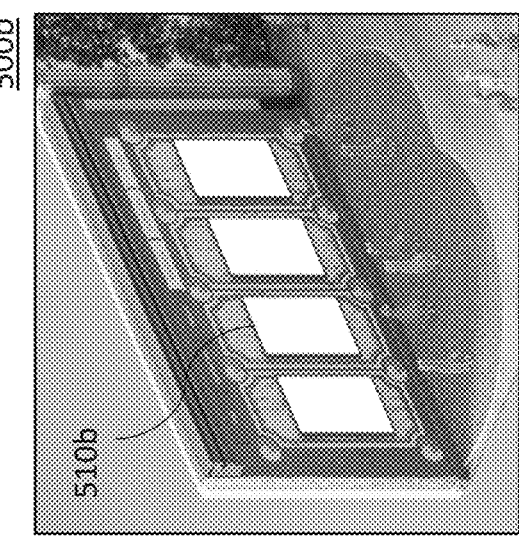
FIGS. 5A and 5B illustrate exemplary isometric perspective views of alternative virtual event spaces, each including gallery interactive objects, consistent with some embodiments of the present disclosure.
Figure 5A:
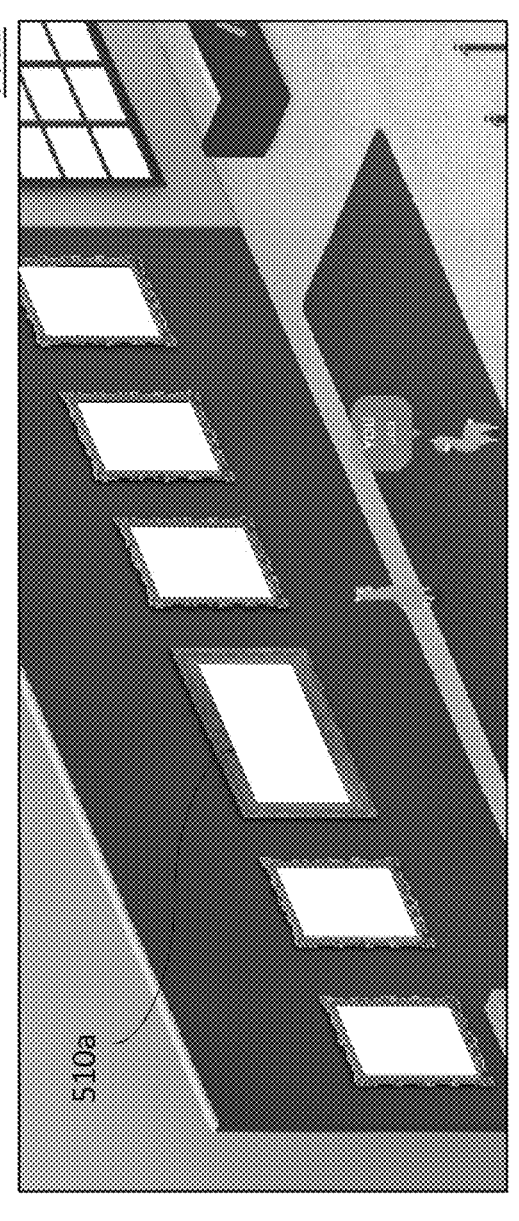

For example, referring to FIG. 4A and view 400*a*, upon interaction with image gallery 430-3, the multiple images displayed by default may be replaced by a single enhanced image, and further interactions may allow the user to switch between different images or views. FIGS. 5A and 5B illustrate exemplary isometric perspective views 500*a* and 500*b* of alternative virtual event spaces, each including gallery interactive objects 510*a* and 510*b*, which are configured to display predetermined content with alternative designs compared to image gallery 430-3. These alternative designs may feature different arrangements, navigation mechanisms, or content types, further demonstrating the flexibility in the design of virtual interactive objects and/or virtual event spaces.

Figures 5C, 5D:
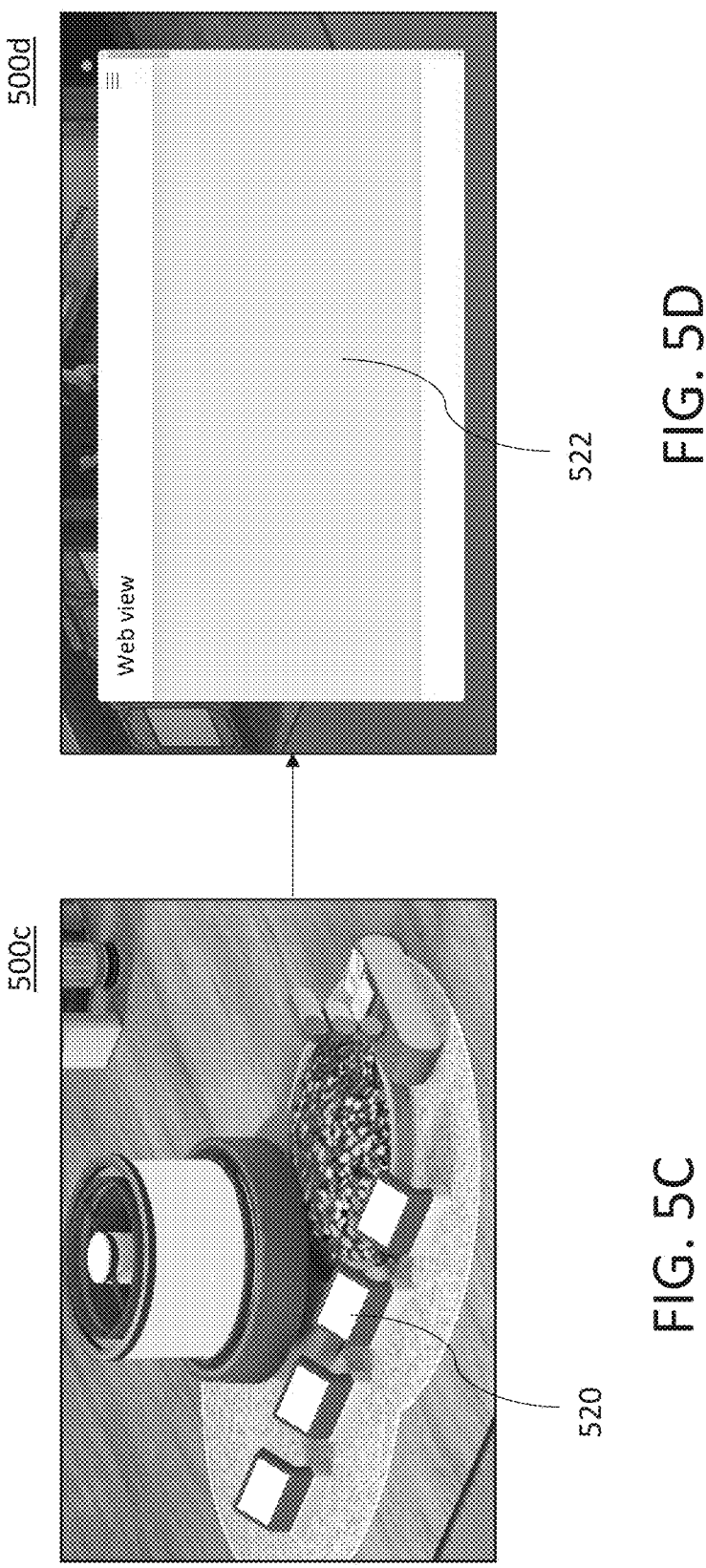
FIGS. 5C and 5D illustrate exemplary isometric perspective views of another alternative virtual event space including a virtual web-view object, consistent with some embodiments of the present disclosure.

In some embodiments, the at least one virtual interactive object includes at least one virtual web-view object. As used herein, the term "virtual web-view object" refers to an interactive element within the virtual event space that enables the display of web content or web-based interfaces directly within the virtual environment. This may include, but is not limited to, websites, web applications, online forms, streaming media, or other internet-based resources that can be accessed and viewed by the user without leaving the virtual event space. When the avatar or the first virtual attendee interacts with the virtual web-view object, such as by clicking, tapping, or approaching the object, the first computing device receives, from at least one remote server, augmentation data for enhancing the current view. In this context, "augmentation data" refers to additional information, visual elements, or interactive features that are added to the existing view of the virtual event space to enrich or supplement the user's experience. Examples of augmentation data may include overlays, pop-up windows, interactive controls, or contextual graphics that are not part of the virtual event space. Specifically, the augmentation data may be used to generate a pop-up window configured to display the predetermined content in a web-view setting (i.e., an interface where content appears and can be interacted with as a webpage directly within the virtual event space.). The term "pop-up window" in this context refers to a secondary display area that appears on top of or alongside the main view of the virtual event space. This pop-up window is used to present additional information, web content, or interactive features, allowing the user to engage with online resources while remaining immersed in the virtual environment. The pop-up window may be movable, resizable, or dismissible, and may support a range of web-based interactions, such as browsing, form submission, or multimedia playback, thereby providing a seamless and integrated user experience within the virtual event space. FIG. 5C illustrates an exemplary isometric perspective view 500c of an alternative virtual event space, consistent with the disclosed embodiments. In this example, the virtual event space includes a virtual web-view object 520, which is implemented in the form of an interactive information board. Upon interaction with virtual web-view object 520, such as when the avatar or user selects or approaches the information board, a pop-up window 522 may be rendered, as shown in FIG. 5D with view 500d. This pop-up window is configured to display predetermined content in a web-view setting, allowing the user to access web-based resources, applications, or information directly within the virtual event space.

Some disclosed embodiments involve transmitting from the first computing device signal instructions for causing interaction between the first virtual attendee and the at least one virtual main display, to thereby trigger, on the display of the first computing device, a presentation of the dynamic live content received from the second computing device of the second virtual attendee. Similar to interactions with the at least one virtual interactive object, interactions with the virtual main display involve the first computing device sending signal instructions that indicate the first virtual attendee's engagement with this feature of the virtual event space. These signal instructions may trigger (i.e., initiate or activate) a sequence of operations that enable the reception and display of dynamic live content originating from the second computing device. The process may include transmitting a request for the current dynamic live content, receiving streaming data from the second computing device (which may be routed through one or more remote servers), and rendering this content on the display of the first computing device via the virtual main display. In some embodiments, the dynamic live content may include live video, real-time presentations, shared documents, or other interactive media. The presentation of dynamic live content on the virtual main display may involve multiple signal instructions and data exchanges to maintain synchronization and responsiveness. For example, the first computing device may send commands to start or stop streaming, adjust resolution or layout, and handle user interactions such as pausing or expanding the view. This mechanism allows for real-time updates and live interactions between virtual attendees, effectively simulating the experience of watching a live presentation or demonstration in a physical event space while preserving the immersive qualities of the virtual environment. Process 300 includes a step 310c of transmitting from the first computing device signal instructions for causing interaction between the first virtual attendee and the at least one virtual main display, to thereby trigger, on the display of the first computing device, a presentation of the dynamic live content received from the second computing device of the second virtual attendee, as illustrated in FIG. 3.

In some embodiments, the first virtual attendee may join the virtual event while another, second virtual attendee is already presenting live content. Accordingly, dynamic live content may already be displayed via the virtual main display at the time of entry. In this use case, or in scenarios where the first virtual attendee is engaged in interactions other than with the virtual main display, the ongoing presentation or dynamic live content remains accessible and visible within the virtual event space. In other words, users are not forced to join the presentation; they may choose to follow it from a distance or join after it has begun, similar to the experience in a physical event setting. This design provides flexibility and mirrors real-world event dynamics, allowing attendees to navigate freely while maintaining awareness of live content being presented.

Further details regarding the interaction between a virtual attendee and the at least one virtual main display are provided below. In particular, as further explained, interaction with the virtual main display may cause a change in the viewing perspective from an isometric perspective view to a first-person view. In some embodiments, this first-person view may correspond to a predetermined location relative to the virtual main display, allowing the user to experience the content as if positioned directly in front of the display. This transition enhances immersion by simulating a real-world scenario where an attendee moves closer to a presentation screen for better visibility and engagement. The virtual event platform may implement this perspective change dynamically upon detecting specific user actions, such as clicking on the virtual main display, selecting a "focus" option, or navigating the avatar into a designated interaction zone.

In some embodiments, the at least one virtual main display is viewable immediately via selection of a graphical user interface element presented in the rendered isometric view. "Viewable immediately" in this context means that the content of the main display may become almost instantly (e.g., within less than 1 second, and often within 1 millisecond, 1 microsecond, 1 nanosecond, or even lower latency) accessible or visible upon interaction with the graphical user interface element, without requiring additional navigation or steps. This GUI element may thus serve as a shortcut or quick-access control, enabling the user to focus on the main display without requiring navigation through the virtual environment. This feature provides a quick and efficient way for attendees to access the main content, regardless of their current position or activity within the virtual space. For example, referring to FIG. 4A and view 400a GUI element 445 may be persistently displayed in a corner of the user's view, and clicking on this icon may immediately bring the main display into a rendered isometric perspective view, ensuring that attendees can quickly (e.g., within less than 1 second, and often within 1 millisecond, 1 microsecond, 1 nanosecond, or even lower latency) return to the primary content at any time. In some embodiments, selection of the graphical user interface element further causes a change of perspective to a first-person perspective view from a predetermined location with respect to the at least one main display. A first-person perspective view refers to a visual representation of the virtual environment as if seen through the eyes of the avatar, providing a more immersive and direct view of the content. Such a feature may allow attendees to seamlessly switch between an overview of the entire event space and a focused, presentation-centric view, thereby enhancing usability and replicating the experience of moving closer to a screen in a physical event setting. Further details regarding this perspective switch are provided below.

In some embodiments, the virtual event space is configured with a single virtual main display. The single virtual main display is viewable in the rendered isometric perspective view of the virtual event space, regardless of a position of the avatar within the virtual event space. In other words, even as the first virtual attendee navigates to different areas of the environment, the main display may be persistently visible within the user's field of view in the isometric rendering. This design may ensure that dynamic live content presented on the main display, such as live presentations or shared media, remains accessible and noticeable at all times, thereby replicating the experience of a central stage or screen in a physical event setting. Such persistent visibility may enhance usability by allowing attendees to follow ongoing content without interrupting their exploration or interactions elsewhere in the virtual space. As mentioned earlier, such a feature may not be available in the case of a large venue whose dimensions are so extensive that the virtual main display might fall outside the visible portion of the isometric perspective view when the avatar is positioned at a distant location.

Some disclosed embodiments involve, upon initiation of the interaction with the at least one virtual interactive object or the virtual main display, if a distance in the virtual event space between the avatar and the at least one virtual interactive object or the virtual main display is above a predetermined threshold, causing the avatar to move from the first location towards a location in proximity of the second location or the third location. As used herein, the term "predetermined threshold" refers to a specific distance or proximity measure between the avatar and an interactive object. This threshold may be defined in terms of virtual units, coordinates, or any other metric suitable for the digital space. When a user initiates interaction with a virtual interactive object or the virtual main display, the virtual event platform checks the distance between the user's avatar and the target object or virtual main display. If this distance exceeds a predetermined threshold the virtual event platform automatically causes the avatar to move from its current location to a position near the object or display By implementing such a mechanism, the virtual event platform may ensure that users do not need to manually navigate their avatars across large distances before engaging with interactive features. Instead, the virtual event platform may proactively manage avatar movement, streamlining the user experience and maintaining the immersive quality of the virtual event.

Figure 4E:
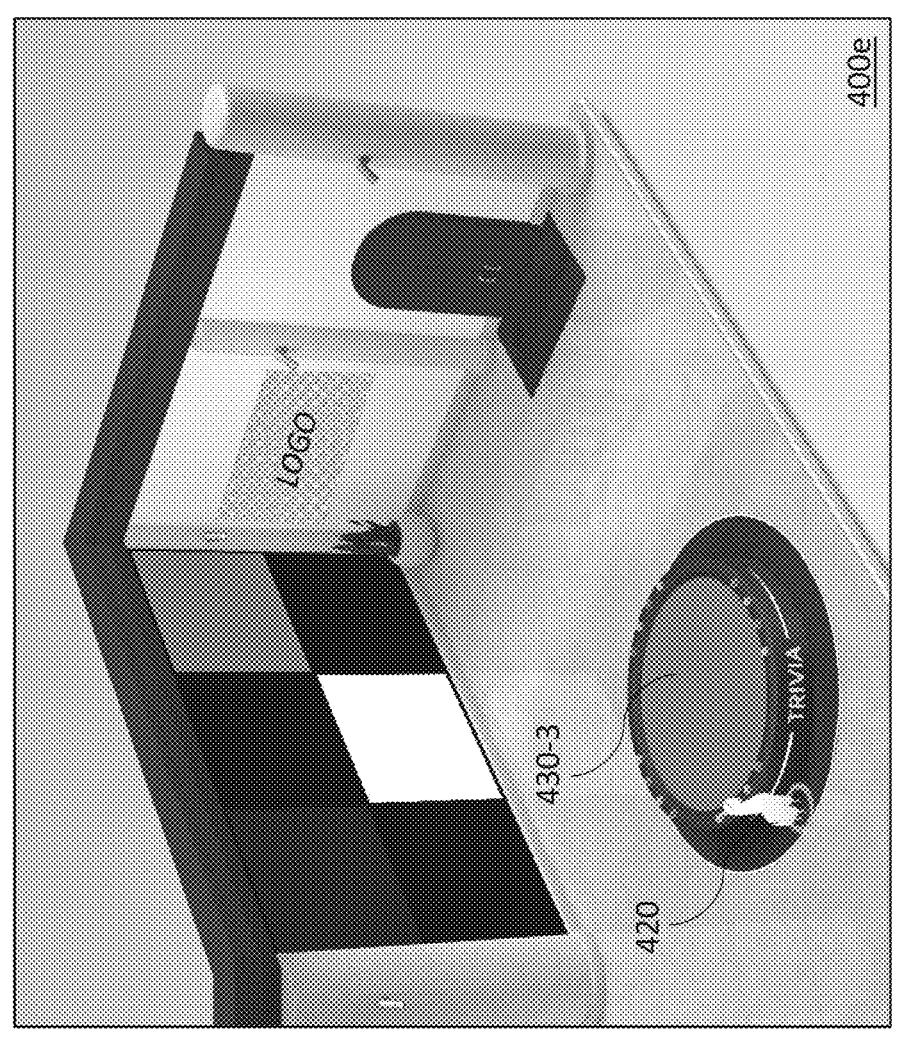

In some embodiments, motion of the avatar occurs behind a pop-up window. In other words, the presentation of the predetermined content or live content may be prioritized over the visual depiction of avatar movement within the virtual event space. When a user initiates an interaction, such as clicking on a virtual interactive object or the virtual main display, the relevant content may be immediately presented. During this period, the user's avatar may be programmed to move toward the location of the interactive object or virtual main display in the background, but the whole journey of the avatar is not necessarily visible to the user. Instead, the user's attention is directed toward the content being presented, which becomes the focal point of the interface. Upon initiation of an interaction by the user, at least a portion of the avatar may be presented as the avatar begins its movement toward the target location; subsequently, the avatar and/or the depiction of the avatar's movement may become obscured or hidden by the pop-up window, or, alternatively, the avatar and/or its movement may be hidden immediately upon initiation of the interaction due to the display of the pop-up window. For instance, as illustrated in FIG. 4D, the first virtual attendee represented by avatar 420 may interact with trivia table 430-1, even if their avatar is initially positioned far from it. Upon interaction, the trivia question may be promptly displayed, as depicted in view 400d, without requiring the user to observe the avatar's journey across the virtual space. While the question is being presented, the avatar's movement toward the trivia table occurs unobtrusively in the background. Once the interaction concludes, such as after the first user answers the question or closes the pop-up, the avatar is automatically relocated to a position near trivia table 430-1, as shown in FIG. 4E, which provides an alternative perspective of the virtual event space in view 400e.

In some embodiments, the virtual event space rendering data further includes definitions for at least one mobility-facilitating object. In such case, the first computing device transmits signal instructions for causing interaction between the avatar and the at least one mobility-facilitating object, and in response: causing the first virtual attendee to leave the virtual event; causing the first virtual attendee to join a different instance of the virtual event space; causing the first virtual attendee to join a different portion of the virtual event space; or causing the first virtual attendee to join a different virtual event space. The term "mobility-facilitating object" refers to any virtual element specifically designed to enable or assist avatars in moving between distinct areas, instances, or events within the digital environment. Examples of such objects include virtual doors, portals, teleportation pads, and other interactive features that are intentionally crafted to support navigation. These elements are not merely decorative; they function as gateways or conduits, allowing avatars to traverse the virtual landscape with ease and efficiency. For example, referring to FIG. 4A, virtual door 460 may act as a mobility-facilitating object. As used herein, an instance of the virtual event space refers to a copy a version of the virtual event space. Accordingly, a different instance of the virtual event space refers to another occurrence or copy of the same virtual environment, potentially with different attendees or content. This is distinct from a "different virtual event space," which refers to a separate and unique virtual environment, possibly with a different layout, theme, or purpose. The existence of different instances of the same virtual event space allows for parallel sessions, breakout groups, or load balancing, where multiple groups of participants can interact independently within identical environments, each instance potentially featuring unique content, configurations, or participant lists. For example, an organizer may create several instances of a conference hall to accommodate different teams or to run simultaneous workshops, each with its own set of participants and tailored content, while maintaining the same underlying virtual architecture. In addition, different instances may be created to accommodate a larger number of avatars. For example, if an event is joined by a large group of attendees, rendering a view that includes all avatars simultaneously could hinder visibility and create a sensation of a crowded space. To address this, the virtual event platform may generate multiple instances of the same virtual event space, which are identical in all respects except for the composition of attendees within each instance. When a speaker is presenting in an event that is distributed across multiple instances, the speaker and the presentation may be made visible across all instances, ensuring that all attendees, regardless of the instance they occupy, can participate in and view the presentation simultaneously.

To maintain a unified event experience despite the segmented architecture, the virtual event platform can be configured to employ a global state synchronization layer. This layer may ensure that global events (e.g., a keynote speaker's audio/video stream or a specific 'emotional reaction' animation) are propagated simultaneously to all instances with synchronized timing. Furthermore, a cross-instance directory service may allow attendees to search for and communicate with users in different instances, potentially offering a 'jump to instance' mobility option to facilitate networking.

Leaving the virtual event refers to the process by which an avatar, and thus the associated virtual attendee, exits the current virtual event space. Upon leaving, the attendee may be disconnected from the event platform, returned to a lobby or home screen, or transitioned to another event or activity as determined by the system. This operation may results in the termination of the attendee's session within the current event space. Leaving the event may also entail the cessation of all ongoing interactions, communications, and access to event-specific content, thereby marking the end of the attendee's participation in that particular virtual event.

The integration of mobility-facilitating objects may enhance the navigability and interconnectedness of the virtual event platform. By interacting with these objects, attendees may effortlessly move between different areas or events, making the experience more dynamic and adaptable to their needs. For example, an avatar might approach and interact with a virtual door to transition from a main conference hall to a breakout session room, or utilize a teleportation pad to join a different instance of the event populated by another group of participants. This system not only streamlines movement but also fosters a sense of exploration and agency, allowing users to tailor their journey through the virtual event according to their interests and objectives.

In some embodiments, the virtual event space rendering data further includes definitions for at least one virtual meeting area and an ad hoc group of avatars, including the avatar associated with the first virtual attendee and avatars associated with other virtual attendees, is enabled to enter the at least one meeting area. A "virtual meeting area" refers to a designated space within the virtual event environment where an ad hoc group of avatars, i.e., a spontaneously formed collection of avatars that come together for a specific purpose or interaction, can gather for more focused interactions or discussions. Avatars may be enabled to enter the at least one meeting area by interacting with a delineated element of the virtual event space. In some embodiments, the at least one meeting area is associated with a specific asset in the virtual event space. A "specific asset" in this context refers to a particular object, feature, or location within the virtual event space that serves as a focal point or identifier for a meeting area. This feature may allow for intuitive organization and navigation within the virtual event space. For example, a virtual coffee shop within the event space might serve as a meeting area where avatars may spontaneously gather around virtual tables for small group discussions. In this example, the specific asset associated with the meeting area is the depiction of the coffee shop or the virtual tables within it. Similarly, a virtual whiteboard or presentation screen could be designated as a meeting area, facilitating collaborative work or focused presentations for smaller groups. In these cases, the specific asset is the virtual whiteboard or the presentation screen itself, which serves as the focal point for group interaction.

In such cases, in response to receiving a signal indicative of a desired interaction between the avatar associated with the first virtual attendee and another avatar of the ad hoc group of avatars, the first computing device receives from the at least one remote server augmentation data for augmenting the view with a private virtual screen to be displayed for viewing by the first virtual attendee and another virtual attendee associated with the other avatar. As mentioned earlier, augmentation data refers to additional information, visual elements, or interactive features that are added to the existing view of the virtual event space to enrich or supplement the user's experience. In the present context, augmentation data may enable the creation of a private virtual screen within the shared view of the meeting area. The private virtual screen may be rendered in such a way that only the initiating virtual attendee and the selected counterpart can view its contents, ensuring confidentiality and exclusivity for their interaction. Furthermore, the at least one remote server may enable at least one of the first attendee and the other attendee to control content displayed on the private virtual screen. This means that participants can collaboratively manage presentations, documents, or other shared resources in real time, tailoring the experience to their specific needs and preferences.

Some disclosed embodiments involve receiving from the at least one remote server a summary of interactions that occur between avatars of the ad hoc group of avatars. As will be further detailed below, the remote server may be designed to monitor the interactions between the various avatars and/or their engagements with virtual interactive objects distributed throughout the virtual event space. The collected data may then be processed to generate event analytics, which can provide valuable insights into attendee behavior, engagement levels, and the overall effectiveness of the virtual event. One aspect of this analytics process is the handling of private interactions. Even when avatars engage in confidential or exclusive exchanges, such as collaborative sessions on a private virtual screen, the virtual event platform may be capable of summarizing these interactions without compromising privacy. These summaries may then be transmitted back to the ad hoc group of avatars, allowing participants to review a concise overview of their collaborative activities.

By integrating these features, the virtual event platform may not only support large-scale public interactions but also provide mechanisms for secure, private collaboration. Attendees may seamlessly transition from group activities to one-on-one or small group sessions, leveraging the flexibility of virtual meeting areas and private virtual screens to enhance productivity and engagement. This approach may mirror the dynamics of physical conferences, where breakout rooms and private discussions are used for effective networking and decision-making, but it does so with the added benefits of digital augmentation and remote control capabilities.

Figure 4F:
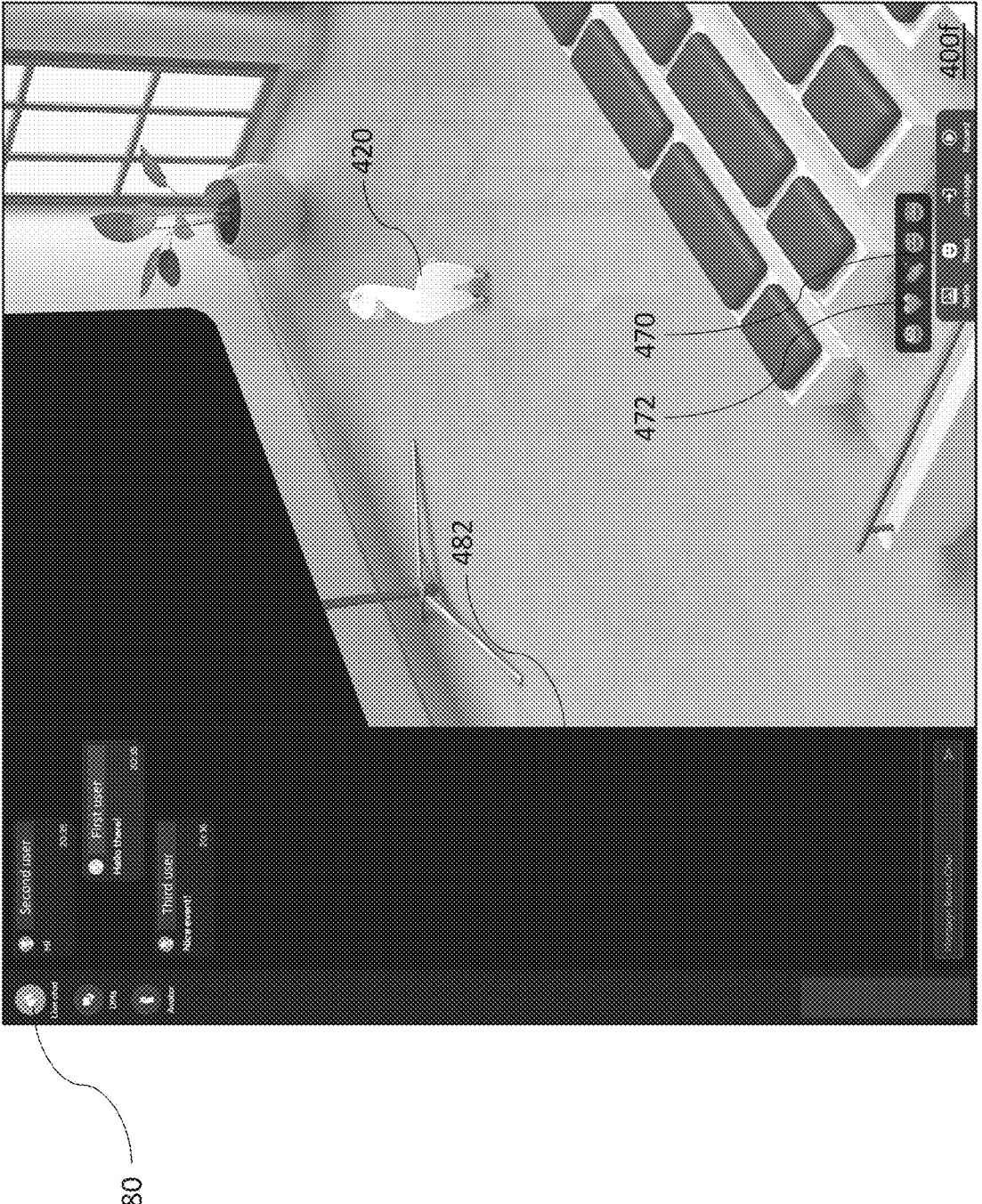

Some disclosed embodiments involve transmitting from the first computing device signal instructions for a selection of an icon reflective of an emotion. A "icon reflective of an emotion" refers to a visual symbol or representation that expresses a particular feeling, mood, or reaction. These may include, but are not limited to, emojis, animated reactions, or custom-designed emotional indicators specific to the virtual event platform. This feature allows virtual attendees to express emotions or reactions in a visual and immediate way within the virtual event space. For example, during a presentation or interactive session, attendees might select icons to express agreement, excitement, confusion, or other emotions, providing real-time feedback to presenters and other attendees. This can enhance engagement and create a more dynamic and responsive virtual environment. An icon reflective of an emotion may be accessible via one or more GUI elements integrated into the rendered perspective view of the at least one virtual event space. FIG. 4F illustrates another isometric perspective view 400f of virtual event space 410. In this view, the first virtual attendee is shown interacting with the environment by selecting an icon that is reflective of a particular emotion. This icon may serve as a visual representation of the first attendee's current feeling or reaction, such as agreement, excitement, or curiosity. The process of selecting this icon may be facilitated through a GUI element 470. By engaging with this interface, the first virtual attendee may easily access a range of emotion-reflective icons 472 and choose the one that best expresses their response in real time. Once selected, the chosen icon may be displayed within the virtual event space, making the attendee's emotional feedback visible to other attendees.

Some disclosed embodiments involve transmitting from the first computing device signal instructions for communicating with other virtual attendees via a chatroom. A "chatroom" refers to a virtual space or interface within the event platform where multiple attendees can engage in text-based communication in real-time. This feature enhances the interactive and social aspects of the virtual event platform. Attendees can engage in discussions, ask questions, or network with other participants through text-based communication, complementing the visual and spatial interactions within the virtual environment. For example, during a presentation in the main virtual space, attendees might use a chatroom to discuss the content, share insights, or ask questions without interrupting the main event. Transmissions of signal instructions for accessing to the chatroom may be facilitated through one or more GUI elements integrated into the rendered virtual event space view. Referring to FIG. 4F, upon selection of GUI element 480, the rendered isometric perspective view may be augmented to display chatroom 482. This allows the first virtual attendee to initiate or join text-based conversations with other attendees directly from within the virtual event space, making communication seamless and intuitive.

Some disclosed embodiments involve transmitting from the first computing device signal instructions for causing interactions between the first virtual attendee and other avatars located within the virtual event space, wherein the other avatars are associated with other virtual attendees. In this context, the term "interactions" encompasses any form of communication, engagement, or exchange between two or more virtual attendees within the virtual event space. For example, interactions may include text chat via a private chatroom, voice communication, gestures, or collaborative activities within the virtual space, among others. The virtual event platform may be designed to make these interactions intuitive and accessible; for example, an attendee may initiate communication and cause transmission of signal instructions for causing interactions, by approaching another avatar, clicking on their representation, or hovering a cursor over them. Upon such actions, the platform may present controls or commands that allow users to easily engage with nearby avatars, facilitating seamless and meaningful exchanges within the virtual event space.

Figure 4G:
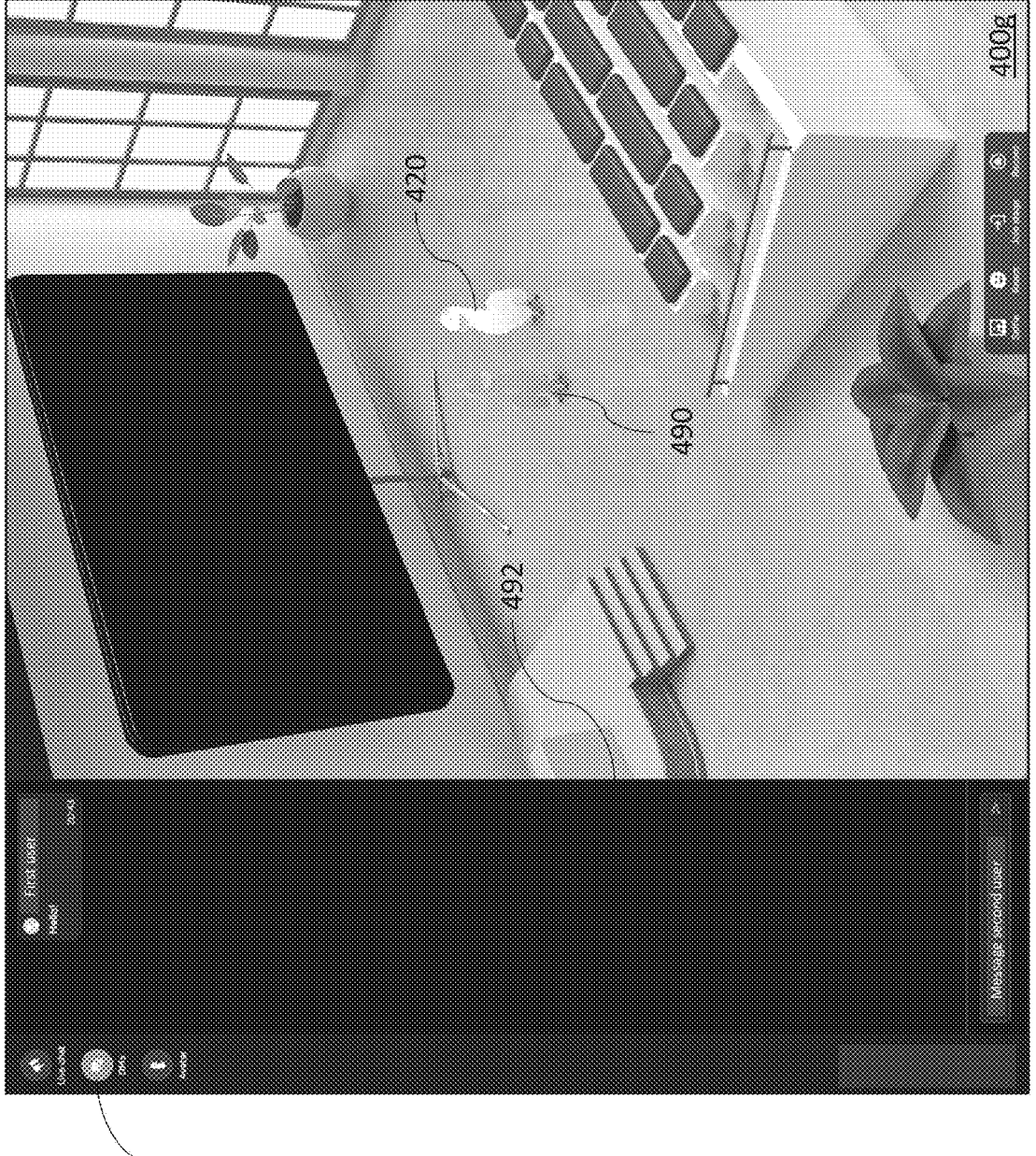

FIG. 4G presents another isometric perspective view 400g of virtual event space 410. In this illustration, the first virtual attendee, represented by avatar 420, is shown engaging with a second virtual attendee, represented by avatar 490. When the first attendee interacts with avatar 490, such as by clicking on or approaching the avatar, the virtual event platforms responds by augmenting the rendered view to display a private chatroom 492. This private chatroom is specifically configured to enable confidential, real-time communication between the first and second virtual attendees, allowing them to exchange messages without interruption from the broader event. Once private conversations have been initiated with one or more virtual attendees, the platform provides convenient access to these ongoing discussions. This is achieved through interaction with GUI element 494, which represents direct messages (DMs). By selecting this GUI element, the first virtual attendee can easily view and manage their private conversations, ensuring seamless and organized communication within the virtual event space. This feature may enhance the overall user experience by supporting both spontaneous and ongoing private interactions, fostering deeper connections and collaboration among participants.

Monday Mansion Second Concept—Core Concept Host & Live Attendee Content Available at Virtual Events—Server Perspective [Header to be Deleted when Filing]

Some disclosed embodiments involve configuring a virtual event hosted remotely from participants. As used herein, "configuring" refers to arranging, setting up, or customizing elements, parameters, or features of a system or environment to achieve a desired functionality or appearance. For example, configuring may involve selecting options, adjusting settings, or defining rules that determine how a system operates or how users interact with it. As described elsewhere in this disclosure, a "virtual event" refers to an organized gathering or occurrence that takes place in a digital environment (herein, virtual event space) rather than a physical location. Virtual events may include conferences, exhibitions, meetings, or social gatherings conducted through online platforms. For example, a virtual event may be a digital trade show, an online concert, or a web-based educational seminar. The term "hosted remotely" refers to the provision and management of a service, platform, or event from a location separate from where the users or participants are physically located. Remote hosting involves the use of servers, cloud infrastructure, or other networked systems to deliver content and functionality to geographically dispersed users. The term "participants" refers to individuals, users, or entities who engage in, attend, or interact with an event, system, or platform. Participants may include attendees, presenters, organizers, or any other individuals involved in the virtual event.

In the context of the present disclosure, the phrase "configuring a virtual event hosted remotely from participants" refers to the process of setting up, customizing, and managing a digital gathering or interaction that takes place over a network, where the event infrastructure and management systems are located separately from the physical locations of the attendees and organizers. This may involve defining virtual spaces, setting up interactive elements, managing content delivery, and establishing communication channels to create an engaging and functional online event environment.

By way of a non-limiting example, as described in detail below, configuring a virtual event hosted remotely from participants may involve creating customizable 3D environments, setting up virtual interactive objects for content delivery, establishing avatar-based representation for attendees, and implementing real-time communication features to facilitate interaction among participants in a shared digital space.

FIG. 6 is a flowchart of an exemplary process 600 for configuring a virtual event hosted remotely from participants, consistent with some of the disclosed embodiments. Process 600 is discussed herein for explanatory purposes and is not intended to be limiting. In some embodiments, steps of process 600 may be changed, modified, substituted, or rearranged, consistent with the present disclosure. Process 600 may be implemented using one or more components of virtual event platform server 210 (discussed in FIG. 2A) or computing device 100 (discussed in FIG. 1A). Some disclosed embodiments may include at least one processor that may be configured to execute stored instructions to perform operations for electronically participating in a virtual event hosted on at least one remote server. As shown in FIG. 6, process 600 may include steps 602, 604, 606, 608, and 610 (610*a*, 610*b*, 610*c*), discussed in further detail below.

Some disclosed embodiments involve receiving from an event host organizer, event details and virtual event space data, wherein the virtual event space data includes definitions for a plurality of virtual locations, at least one virtual interactive object configured to provide access to predetermined content, and at least one virtual main display configured to display dynamic live content. As used herein, "receiving" refers to the act of obtaining, acquiring, or accepting information, data, or signals from an external source. For example, receiving may involve obtaining data through a network connection, accepting user input through a user interface, or acquiring information from a database or storage device. An "event host organizer" refers to an individual, entity, or system responsible for planning, coordinating, and managing a virtual event. An event host organizer may be a person, a company, an organization, or an automated system that oversees the creation and execution of a virtual event. "Event details" refer to specific information related to a virtual event, such as the event name, date, time, duration, agenda, or participant/attendee information. Event details may include any relevant data that describes or defines the characteristics of the virtual event. "Virtual event space data" refers to information that defines and describes the virtual event space in which a virtual event takes place. Virtual event space data may include definitions, i.e., specifications for the layout, appearance, and functionality of the virtual event space where participants interact during the event.

Receiving from an event host organizer, event details, and virtual event space data refers to the process by which a remote server on which the event will be hosted obtains information from the event host organizer to set up and configure a virtual event. This may involve receiving input through a user interface, accepting data uploads, or retrieving information from a database associated with the event host organizer. For example, referring to FIG. 2B, virtual event platform server 210 may receive event details 240 and virtual event space data 242 from event host organizer computing device 230. Process 600 includes a step 602 of receiving from an event host organizer, event details, and virtual event space data, as illustrated in FIG. 6.

Consistent with the disclosed embodiments, virtual event space data received by the remote server (e.g., virtual event platform server 210) from the event host organizer (e.g., via event host organizer computing device 230) server includes definitions for a plurality of virtual locations, i.e., distinct areas or positions within the virtual event space that users can navigate to or interact with. Virtual locations may represent different functional spaces, themed areas, or points of interest within a virtual event space.

The virtual event space data may also include information about at least one virtual interactive object configured to provide access to predetermined content. As described elsewhere in this disclosure, a virtual interactive object refers to a digital element or entity within the virtual event space that users/virtual attendees can engage with or manipulate to access predetermined content. Virtual interactive objects may respond to user inputs and provide specific functionalities or experiences within the virtual space. The term "predetermined content" refers to information, media, or data that is prepared or defined in advance of its presentation or use. In the context of virtual events, predetermined content may include pre-recorded videos, documents, images, or other materials that are made available to attendees. Examples of virtual interactive objects are provided elsewhere in this disclosure, including trivia table 430-1, kiosk 430-2, and image gallery 430-3 shown in FIG. 4A.

In some embodiments, the predetermined content is based on data received from the event host organizer. The event host organizer, when configuring the event and/or the virtual event space, may upload various types of content to the remote server prior to the event. This content may include presentation slides, product information, promotional videos, interactive elements specific to the event's theme or purpose, or any other digital materials or information that are prepared and provided to be displayed or made available within the virtual event space. The remote server may then integrate this content into the virtual event space, making it accessible to attendees through virtual interactive objects. This approach may allow for a customized and curated experience that aligns with the event host's objectives and enhances attendee engagement. For example, referring to FIG. 2B, event host organizer via computing device 230 may transmit content data 244 to virtual event platform server 210. At least some of such content data 244 may be used to be displayed or made available within the virtual event space via one or more virtual interactive objects.

Additionally, the virtual event space data includes definitions for at least one virtual main display configured to display dynamic live content via a second computing device of a second virtual attendee. As described elsewhere in this disclosure, the term "virtual main display" refers to a prominent visual element within the virtual event space designed to showcase or present information to users. A virtual main display may function similarly to a large screen or projection system in a physical event space. This virtual main display may be a central feature in the virtual event space, capable of showing "dynamic live content," i.e., information or media that is generated, updated, or streamed in real-time during an event. "Dynamic" refers to information or media that is capable of changing, updating, or responding to user interactions or event progression, while "Live" refers to information or media that is generated, transmitted, or streamed in real time during the event. For example, the virtual main display may represent a large screen where live video feeds, real-time presentations, or interactive elements that change based on current inputs or conditions can be viewed. Such real-time content may be streamed from a participant's device (associated with virtual attendees) or from the event host organizer. For example, referring to FIGS. 2A and 4A, a virtual main display 440 may be configured to display dynamic live content originating from the event host organizer via computing device 230 or from a virtual attendee via any of computing devices 220-1 through 220-7.

Figure 7A:
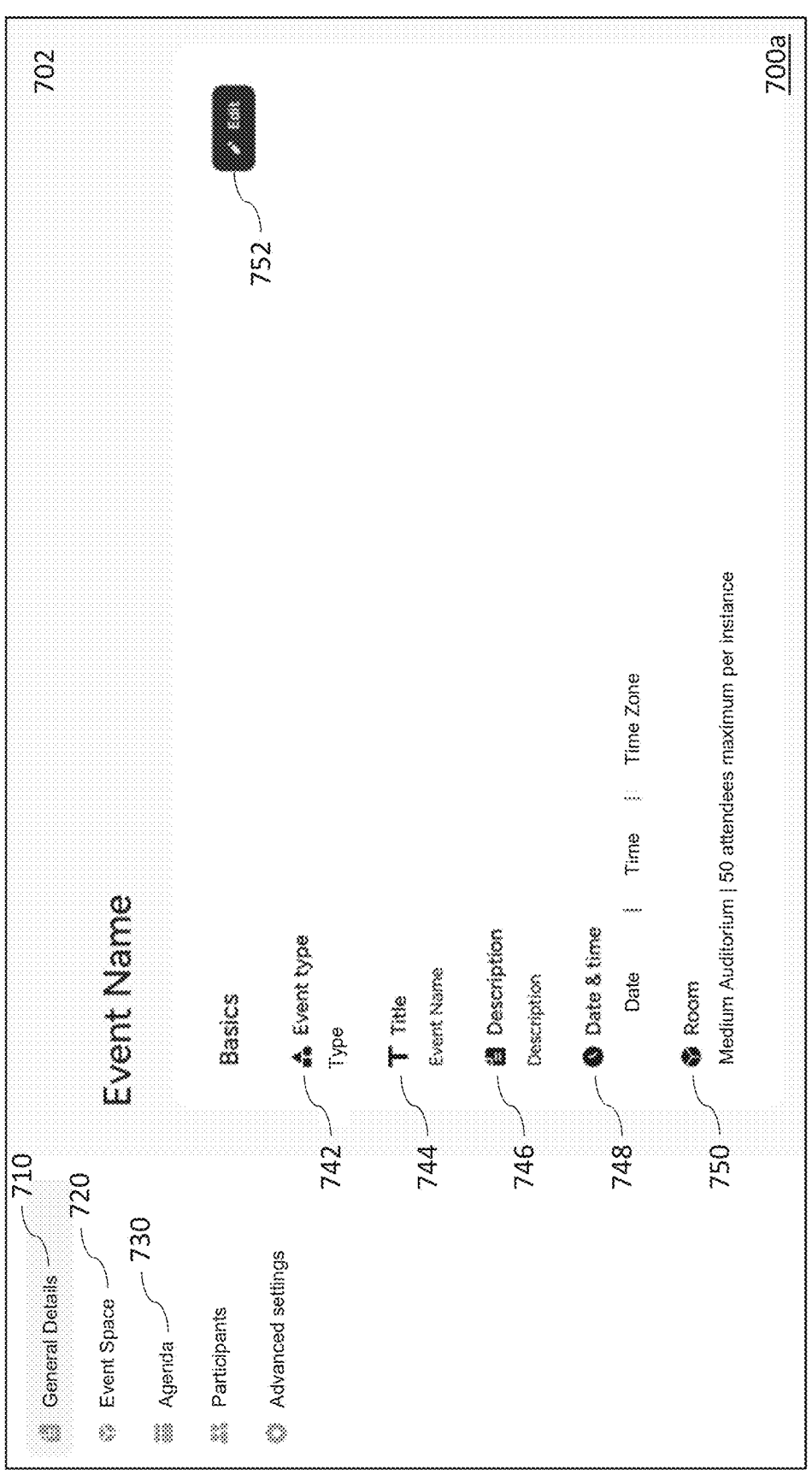
FIGS. 7A-7C illustrate two views of a user interface designed for use by an event host organizer when configuring a virtual event, consistent with some embodiments of the present disclosure.
Figure 7B:
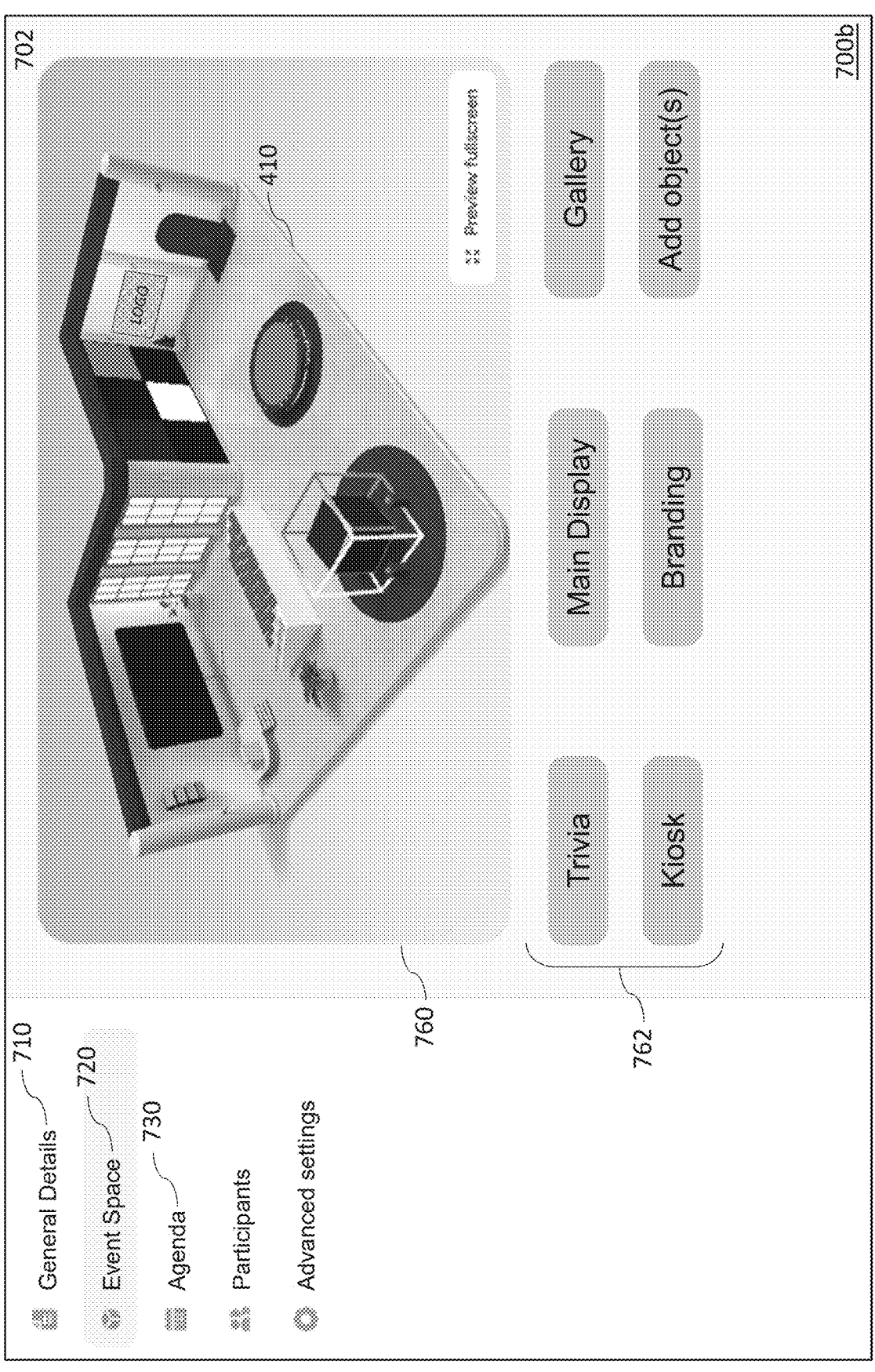

FIGS. 7A and 7B illustrate two views 700*a* and 700*b* of a user interface 702 designed for use by an event host organizer when configuring a virtual event, in accordance with the disclosed embodiments. As referenced in FIGS. 2A and 2B, user interface 702 may be provided by virtual event platform server 210 to event host organizer's computing device 230 when the event host organizer logs into the virtual event platform with the intention of setting up a new virtual event. Through this interface, the event host organizer may enter event details 240, specify virtual event space data 242, and upload content data 244 for at least one virtual interactive object or virtual main display.

As shown in FIG. 7A user interface 702 may provide a comprehensive set of graphical elements and contextual menus to assist event host organizers in configuring virtual events. Among such features are several tabs, such as general details 710, event space 720, and agenda 730, each designed to streamline different aspects of event setup. Within the general details tab 710, organizers can enter and modify event information. By interacting with the "Edit" button 752, the event host organizer is able to specify the event type 742, assign an event title 744, and compose an event description 746 that communicates the purpose and focus of the virtual event to participants. This section also allows the organizer to set the event date, time, and time zone 748, ensuring that all logistical details are clearly defined. Additionally, there is a field for designating the room 750 where the virtual event will take place, which helps tailor the environment to the specific needs of the event. Beyond these foundational details, the agenda tab 730 enables the host to add, edit, and organize the schedule and content of the event. This functionality ensures that the event's structure is well-planned and that participants have a clear understanding of the sessions, presentations, or activities that will occur. By integrating these interactive elements, the platform offers a user-friendly and unified interface, empowering event host organizers to manage every aspect of their virtual events within a single, cohesive environment.

Some disclosed embodiments involve providing the event host organizer with a library of template event spaces, wherein the template event spaces include a plurality of predetermined slots for virtual object placement and a plurality of customization options; receiving from the event host organizer a selection of a template event space from the library of event space templates; and receiving from the event host organizer the selection of event space customization options in relation to the selected event space template. A "library of template event spaces" refers to a collection of pre-designed virtual event spaces that can serve as starting points for creating customized event spaces. These templates may cater to different types of events or aesthetic preferences. Such a library may be provided to the event host organizer via a user interface accessible when logging into the virtual event platform as an event host organizer. For example, referring to FIG. 7A, when editing room 750, an event host organizer may be provided with a library of template event spaces (e.g., a library of virtual rooms). Each template within this library may be accompanied by a description that explains the intended purpose of the room (conferences, trade shows, or networking events), outlines the virtual assets or objects included, specifies the maximum capacity, and/or highlights other relevant features. Additionally, event host organizers may be provided with a preview of each room, allowing them to visualize the space before making a selection.

The term "predetermined slots" refers to designated areas or positions within a template event space where virtual objects can be placed. These slots may have specific properties or constraints to ensure proper object placement and interaction within the virtual environment. "Virtual object placement" refers to the act of positioning digital assets, such as virtual interactive objects, decorations, or functional items, within the virtual event space. This placement may affect how attendees interact with the space and access content during the event.

Customization options refer to the various settings and features that allow an event host organizer to personalize a selected template event space according to their preferences and the specific requirements of their event. Once a template is chosen by the event host organizer, and a selection of a template event space from the library of event space templates is provided to the virtual event platform, this latter presents a user interface, a plurality of customization options specific to that template, such as color schemes, textures, or themed elements. The organizer can then select and apply these customizations, as well as place virtual objects in the predetermined slots. The virtual event platform, upon receiving such a selection of customization options in relation to the selected event space template, processes these selections and updates the virtual space template templates to reflect the organizer's choices. This approach streamlines the event space creation process while still offering significant flexibility for customization.

For example, as illustrated in FIG. 7B, when an event host organizer selects a room from the provided library of template rooms, such as a medium auditorium, they can proceed to edit the chosen template and present the virtual event platform with a selection of customization options through menu options 762. These options may include, but are not limited to, placing virtual interactive objects and a virtual main display, and/or customizing the branding of the room (e.g., adjusting the color scheme, providing a logo for display on the virtual walls, etc.). In the scenario depicted in FIGS. 7A and 7B, the event host organizer is setting up virtual event space 410 as shown in FIG. 4A. As part of the medium auditorium template, a selection of virtual interactive objects may already be present by default. For instance, trivia table 430-1, kiosk 430-2, and image gallery 430-3 may be included in the template from the outset. The event host organizer may then provide instructions to further customize these objects by interacting with menu option 762, and further supply the predetermined content that the virtual interactive objects 430-1 through 430-3 are configured to provide access to as part of the customization of the virtual interactive object set.

Some disclosed embodiments involve enabling a plurality of computing devices associated with a plurality of virtual attendees to access to the virtual event space hosted on at least one remote server. As used herein, "enabling" refers to the act of making something possible, facilitating, or providing the means for an action or process to occur. In the context of computer systems, it involves granting access rights, configuring network settings, or providing authentication credentials to allow a system or user to perform certain actions or access specific resources. As described elsewhere in this disclosure, a computing device may be any electronic device capable of processing data, executing instructions, and performing computational tasks. A computing device may include, but is not limited to, personal computers, laptops, smartphones, tablets, wearable devices, or any other electronic device with processing capabilities. As described elsewhere in this disclosure, a "virtual attendee" refers to a participant who engages remotely in a virtual event through a computing device and network connection. A user, when electronically participating in a virtual event, becomes a virtual attendee and may be represented by an avatar, profile, or other digital representation within the virtual space. The association between computing devices and virtual attendees may be established through a login process, user profile, or other authentication mechanism that links the physical user to their digital representation within the virtual event space.

As described elsewhere in this disclosure, access to the virtual event space refers to the ability to enter and interact with the virtual event space. As further explained below, once the connection is established, the remote server may begin streaming the necessary data to render the virtual event space on computing devices associated with virtual attendees. This data may include visual assets, audio streams, and real-time updates about other attendees and event activities. The remote server or servers hosting the virtual event space may handle various aspects of the event, including user authentication, data storage, real-time communication, and rendering of the virtual environment. When a virtual attendee attempts to access the event space, the remote server may verify the attendee's credentials, allocate necessary resources, and initiate the data transfer required to render the virtual environment on the attendee's device.

In this context, enabling a plurality of computing devices associated with a plurality of virtual attendees to access to the virtual event space hosted on at least one remote server refers to the process of allowing multiple users, each using their own computing device, to enter and participate in a virtual event space that is managed and delivered by one or more remote computer systems. For example, referring to FIG. 2A, user/virtual attendees' computing devices 220-1 through 220-7 may be enabled to access a virtual event space hosted on virtual event platform server 210. Process 600 includes a step 604 of a plurality of computing devices associated with a plurality of virtual attendees to access to the virtual event space hosted on at least one remote server, as illustrated in FIG. 6.

In some embodiments, enabling access to the virtual event space includes generating an event link configured to enable access to the virtual event space. An event link refers to a unique identifier that provides a direct pathway to access a specific virtual event or space. For example, an event link may be a clickable URL, a QR code, or an alphanumeric string that, when entered into a designated system, grants entry to the virtual event space. Users via their associated computing devices may receive the event link via email, text message, or through a dedicated application from the remote server or the event host organizer. The event link is generated by the remote server upon configuring the event and/or the virtual event space. Upon activating this link, user devices may initiate a connection to the remote server hosting the virtual event space. The remote server may then verify the link's validity and, if authenticated, grant the user access to the virtual event space. This approach may allow for secure and controlled access to virtual events, ensuring that only invited or registered participants can enter the space. For example, referring to FIG. 2B, a first user via user computing device 220-1 may receive an event link 246 to enable access to a virtual event space hosted on virtual event platform server 210. A similar operation may occur for users associated with computing devices 220-2 through 220-7.

Figure 8:
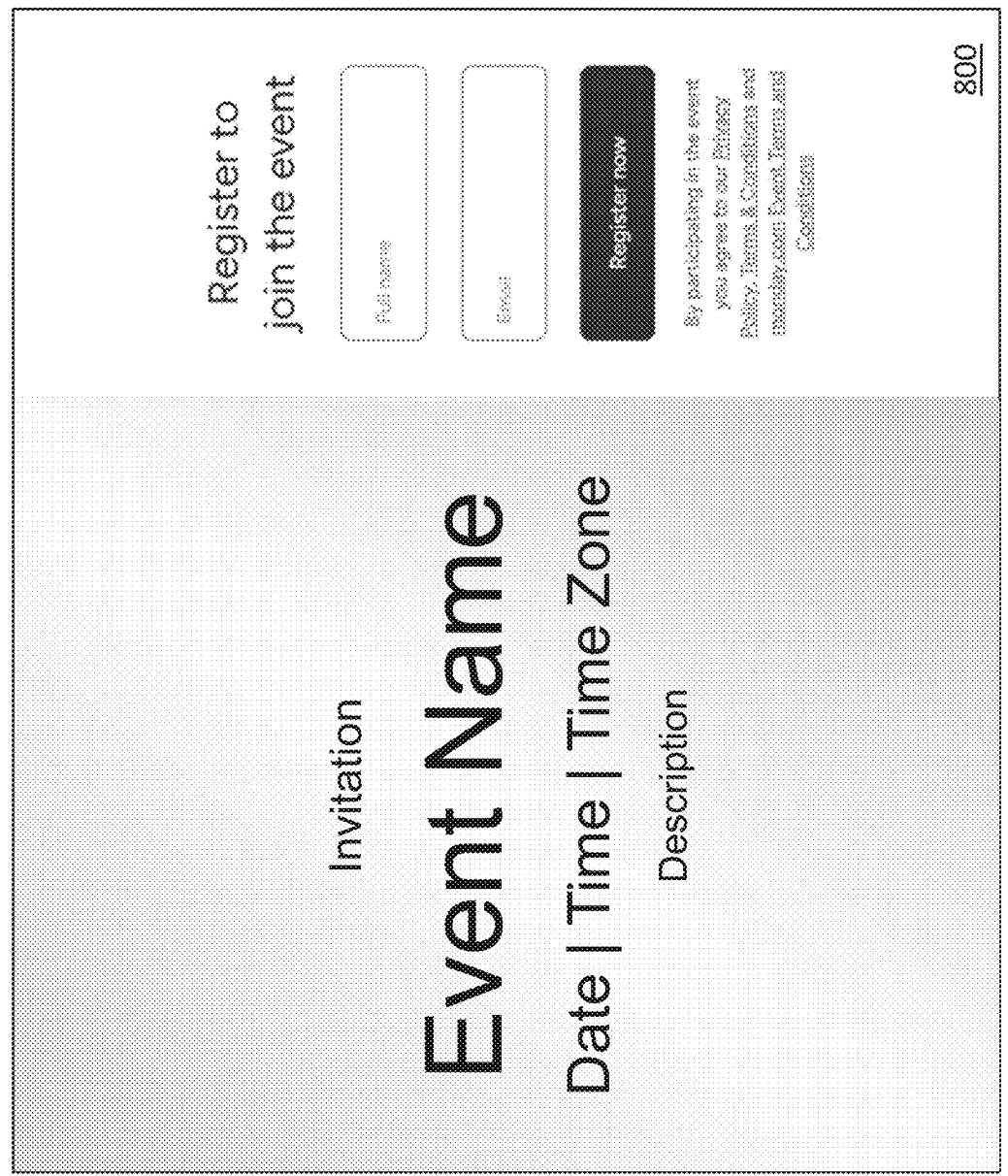
FIG. 8 is an illustration of an exemplary digital event invitation, consistent with some embodiments of the present disclosure.

In some embodiments, generating the event link includes generating a digital event invitation including the event link. A digital event invitation refers to an electronic message or document that provides information about an upcoming virtual event and invites the recipient to attend. Digital event invitations may take various forms, such as emails, calendar events, or specialized invitation platforms. In this context, generating a digital event invitation refers to the process of creating an electronic message or document that contains event details, formatting it appropriately, and preparing it for distribution to potential attendees. The virtual event platform may implement this feature by integrating the event link generation process with a digital invitation creation module. When an event host organizer initiates the invitation process, the virtual event platform may first generate the unique event link as described earlier and then populate a pre-designed invitation template with event details such as the title, date, time, and description. The generated event link is embedded within the invitation (e.g., as a clickable button or hyperlinked text). The virtual event platform may also include additional features such as RSVP tracking, calendar integration, and personalization options for the invitation design. FIG. 8 is an illustration of an exemplary digital event invitation 800, which is generated for an event organized by the event host organizer as described in FIGS. 7A and 7B. When recipients receive a digital event invitation 800, they may register for the event. Upon completing their registration, they are provided with an event link, enabling them to access and participate in the event.

Some disclosed embodiments involve receiving from the plurality of virtual attendees user-specific data, wherein the user-specific data includes information for establishing a plurality of avatars associated with the plurality of virtual attendees. As described elsewhere in this disclosure, "user-specific data" refers to information that is unique or particular to an individual user or account. User-specific data may include, but is not limited to, personal information (name, age, job, etc.), preferences, settings, or any other data that helps identify or customize the experience for a specific user. As described elsewhere in this disclosure, an "avatar" refers to a digital representation or character that represents a user in a virtual environment, i.e., the embodiment of a virtual attendee. An avatar may be a graphical image, 3D model, or any other visual representation. As further explained below, an avatar may be customized to reflect the user's preferences or characteristics.

In this context, receiving from the plurality of virtual attendees user-specific data, wherein the user-specific data includes information for establishing a plurality of avatars associated with the plurality of virtual attendees, refers to the process of collecting and processing individualized information from each participant in a virtual event to create their digital representations within the virtual event space. The virtual event platform may implement this functionality by providing a user interface or registration process (e.g., through a digital event invitation as shown in FIG. 8) where virtual attendees can input or upload their user-specific data. This data collection process may occur prior to or during the virtual event. The virtual event platform may request various types of information from the attendees, such as personal details and, optionally, customization options for their digital representation/avatar. Once the user-specific data is received, the virtual event platform may process this information to generate or configure avatars for each virtual attendee. For example, referring to FIG. 2B, a first user via user computing device 220-1 may be enabled to access a virtual event space hosted on virtual event platform server 210 and transmit user-specific data 248 in order to establish an avatar associated with the first user/virtual attendee. A similar operation may occur for users associated with computing devices 220-2 through 220-7. Process 600 includes a step 606 of receiving from the plurality of virtual attendees user-specific data, wherein the user-specific data includes information for establishing a plurality of avatars associated with the plurality of virtual attendees, as illustrated in FIG. 6.

Some disclosed embodiments involve transmitting to the plurality of computing devices rendering data for graphically representing the virtual event space based on the virtual event space data. The rendering data enables each of the plurality of computing devices to represent on a display of each associated computing device, a view of at least a portion of the virtual event space. The view presents the plurality of avatars at a plurality of first locations within the virtual event space, at least one virtual interactive object at a second location within the virtual event space, and at least one virtual main display at a third location within the virtual event space. As used herein, "transmitting" refers to sending, conveying, or transferring data, signals, or information from one point to another, over a network or communication channel. For example, transmitting may involve sending data packets over the internet, broadcasting signals wirelessly, or transferring information between components within a system. As described elsewhere in this disclosure "rendering data" refers to information used to generate or create a visual representation of a scene, object, or environment. Rendering data may include geometric information, colors, textures, lighting parameters, and other details necessary for producing a graphical output. Rendering data is used to graphically represent the virtual event space, i.e., to create a visual simulation of the virtual event space that users can perceive and interact with through a display device (e.g., a display device associated with user computing devices). Rendering data may include definitions, specifications, parameters, or descriptions that define the characteristics, properties, layout, appearance, functionality, or behavior of various elements within the virtual event space.

Transmitting to the plurality of computing devices rendering data for graphically representing the virtual event space based on the virtual event space data refers to the process by which the virtual event platform transfers to the plurality of user computing devices the necessary information to visually recreate the virtual event space on its associated display. Rendering data may be transmitted over a network connection and may include various types of information needed to construct the visual representation of the virtual event space. For example, referring to FIG. 2B, virtual event platform server 210 may transmit to a first user via user computing device 220-1 rendering data 250 to enable first user computing device 220-1 to create, on a display device included in or associated with user computing device 220-1, a representation of the virtual event space hosted on virtual event platform server 210. A similar operation may occur for users associated with computing devices 220-2 through 220-7. Process 600 includes a step 608 of transmitting to the plurality of computing devices rendering data for graphically representing the virtual event space based on the virtual event space data, as illustrated in FIG. 6.

The rendering data is structured to enable each receiving computing device to create a view (i.e., a visual representation) of at least a portion of the virtual event space on its associated display. A portion may represent a specific area, region, or subset of the entire virtual space that is currently visible or accessible to a user. This is because the dimensions of displays associated with user computing devices may be too small to accommodate the entire virtual event space at a given zoom setting (e.g., default zoom setting), or conversely, the zoom level may be set such that only a subset of the space is visible at any given time.

Consistent with the disclosed embodiments, the view may present the plurality of avatars at a plurality of first locations within the virtual event space a specific position within the rendered portion of the virtual event space. This may allow virtual attendees to easily identify and control their avatar within the environment. The view may also display one or more virtual interactive objects at different positions (second locations) within the virtual event space. These objects may be visually distinct from the avatars and may be positioned in a way that allows the virtual attendees to recognize and interact with them. Additionally, the view may include the at least one virtual main display at another distinct position (third location) within the virtual event space. This at least one main display may be prominently positioned to ensure visibility and accessibility for viewing dynamic live content.

By presenting these elements at distinct locations within the view, a clear and intuitive representation of the virtual event space may be provided. This arrangement may enable virtual attendees to easily navigate the environment, interact with objects, and engage with content displayed on the virtual main display, all while maintaining a consistent and easily understandable visual perspective of the virtual event space. Referring to FIG. 2B, a first user via user computing device 220-1 may process transmitted and received rendering data 250 to create, on a display device included in or associated with user computing device 220-1, a representation of at least a portion of the virtual event space hosted on virtual event platform server 210. The rendered portion may include a view featuring the avatar associated with the first user, avatars associated with other users, one or more virtual interactive objects, and at least one virtual main display. A similar operation may occur for users associated with computing devices 220-2 through 220-7.

Because the view renders only a portion of the virtual event space, this visible area may not, in all use cases, be large enough to encompass the plurality of avatars, the one or more virtual interactive objects, and the at least one main display simultaneously. In other words, while the virtual event space as a whole includes the plurality of avatars at a plurality of first locations, the at least one virtual interactive object at a second location, and the main display at a third location, the portion of the space rendered on the display at any given time may not always show all these elements together. This limitation arises because the display dimensions of user computing devices, or the current zoom setting, may restrict the visible area to a subset of the entire virtual event space. In some cases, the virtual event space may be so large that the at least one main display cannot be rendered in the same view as the at least one virtual interactive object, making it necessary for users to navigate or pan the view to access different elements. Nevertheless, in some embodiments, the rendered portion may, by default, include the avatar associated with a given virtual attendee.

In some embodiments, the rendered view of the at least a portion of the virtual event space on each of the plurality of computing devices includes an isometric perspective view of the at least a portion of the virtual event space. Isometric perspective refers to a method of visual representation of three-dimensional objects in two dimensions where the three coordinate axes appear equally foreshortened, and the angle between any two of them is 120 degrees. This type of view may provide a sense of depth and dimensionality while maintaining a consistent scale across the image, regardless of distance from the viewer. The isometric perspective view may allow the virtual attendees to observe and interact with various elements within the virtual event space from a fixed angle, providing a clear understanding of spatial relationships and relative positions of objects and avatars. This view may be particularly useful for navigating complex virtual environments, as it may maintain a consistent scale and orientation across the displayed portion of the virtual event space. As a result, users may view and interact with a manageable area of the virtual environment, navigating as needed to explore other regions. Exemplary illustrations of rendered isometric perspective views 400a through 400g of at least a portion of virtual event space 410 are shown in FIGS. 4A-4G. Other types of views may also be used when rendering the virtual event space. For instance, a top-down orthographic view, a perspective (vanishing point) view, or a first-person view may be employed depending on the desired user experience and application requirements. These alternative views can offer different ways to visualize and interact with the virtual environment, such as providing a more immersive experience or enabling easier navigation and object selection.

In some embodiments, receiving virtual event space data includes receiving a selection of event space customization options for the virtual event space. In such a scenario, transmitting rendering data includes transmitting rendering data for graphically representing the virtual event space in a customized manner in accordance with the received selection of event space customization options. Event space customization options refer to the range of choices available for modifying the appearance, layout, or features of the virtual environment where the event takes place. These options may include themes, color schemes, architectural styles, or interactive elements that can be adjusted to suit the event's purpose or brand. FIG. 7B represents a user interface 702 intended for an event host organizer, offering various categories of customization for the virtual event space. Customization can be implemented prior to the commencement of the event as well as during its progression. As the organizer makes selections, the virtual event platform generates a set of parameters that define the customized virtual environment. These parameters are then used to create rendering data, i.e., detailed instructions for user computing devices on how to display the virtual event space in a customized manner, i.e., in a way that reflects up-to-date specific choices and preferences selected by the event host organizer. This rendering data is transmitted to all participating devices, ensuring that all virtual attendees experience the event in the customized environment as designed by the event host organizer. The virtual event platform may also implement optimization techniques to ensure efficient transmission and rendering of the customized space across various device types and network conditions.

Some embodiments involve transmitting rendering data for graphically representing a preview of the customized virtual event space to the event host organizer before transmitting rendering data for graphically representing the customized virtual event space. A "preview" refers to a preliminary or advance view of something before it is finalized or made available to a wider audience. In this context, it allows the event host organizer to see and evaluate the customized virtual event space before it goes live to attendees. The virtual event platform may implement this preview feature by generating a separate set of rendering data specifically for the event host organizer's review. This preview rendering may be optimized for real-time interaction and may include additional tools for the event host organizer to navigate, inspect, and potentially make adjustments to the virtual space. The preview could be presented through a web interface (e.g., preview 760 shown in FIG. 7B) or a dedicated view of the customized virtual event space, allowing the event host organizer to experience the space from an attendee's perspective. Additional options may be provided for viewing the space from different vantage points or to simulate various attendee interactions. Once the event host organizer approves the preview, the virtual event platform finalizes the rendering data for the customized virtual event space and prepares it for transmission to the plurality of virtual attendee computing devices.

In some embodiments, the virtual event space is configured to hold a threshold number of avatars. A threshold number refers to a predetermined maximum capacity of avatars that can be accommodated within a single instance of the virtual event space while maintaining optimal performance and user experience. For example, referring to FIG. 7A, the medium auditorium being set up by the event host organizer is configured to hold up to 50 virtual attendees (i.e., threshold number=50 avatars). In such cases, transmitting rendering data for graphically representing the virtual event space includes if the plurality of avatars includes more avatars than the threshold number, creating a plurality of instances of the virtual event space, distributing the plurality of avatars over the plurality of instances of the virtual event space, and transmitting rendering data for graphically representing the plurality of instances of the virtual event space, That way, a number of avatars in each of the plurality of instances of the virtual event space is lower than the threshold number. Each of the plurality of instances is viewable on displays of virtual attendees associated with avatars distributed in that instance.

The term "instances" in this context refers to separate, concurrent versions or copies of the virtual event space, each capable of hosting a subset of the total number of attendees. Accordingly, distributing the plurality of avatars refers to the process of assigning or allocating virtual attendees to different instances of the event space in a balanced manner. The virtual event platform may implement this feature to ensure scalability and maintain performance for large-scale virtual events. When the number of attendees exceeds the predefined threshold for a single instance, the virtual event platform initiates a process to create multiple instances of the virtual event space. This may involve duplicating the environmental data, interactive objects, and other elements of the original space for each new instance. Each instance maintains its own state and interactions, while still being part of the larger event. For example, in a virtual conference with 1,000 attendees and a threshold of 50 avatars per instance, the virtual event platform might create 20 instances of the main conference hall. Attendees might be initially distributed randomly or based on predefined criteria. The virtual event platform would then manage the rendering data for each instance separately, ensuring that each virtual attendee sees and interacts with others in their specific instance. The virtual event platform may also implement features to allow for cross-instance communication or movement, such as global chat channels or special mobility-facilitating objects that allow attendees to switch between instances, as explained below. This approach may allow for the hosting of large-scale events while maintaining a sense of intimacy and manageable interactions within each instance.

The distribution of avatars across the plurality of instances may be handled through various algorithms, potentially considering factors such as attendee preferences, networking goals, or load balancing requirements. In some embodiments, distributing the plurality of avatars over the plurality of instances of the virtual event space includes grouping the avatars by shared interests of the associated virtual attendees. Shared interests refer to common topics, preferences, or areas of focus that multiple virtual attendees have in common. Shared interests may include professional fields, hobbies, expertise areas, or event-specific themes. Shared interest may also include attendees' goals for the event (e.g., "meeting people in my area", "connecting with people whose background is different from mine", "networking with people my age", etc.). "Grouping" refers to the process of organizing or categorizing items, in this case avatars, based on certain criteria or characteristics. Grouping may involve creating subsets, clusters, or collections of related elements. A combination of user profiling and clustering algorithms may be used to perform the grouping process. When virtual attendees register for an event or create their profiles, they may provide information about their interests, professional background, or event-specific preferences. The virtual event platform may analyze this data to identify commonalities among attendees. When creating multiple instances of the virtual event space, the platform may use these shared interests as a basis for grouping avatars. For example, in a virtual conference, attendees interested in artificial intelligence might be grouped together in one instance, while those focused on blockchain technology are placed in another. This approach may enhance networking opportunities and create more relevant and engaging experiences for attendees. Machine learning algorithms may be used to continuously refine these groupings based on attendee interactions and feedback during the event, as attendees join or leave the event or move between instances.

In some embodiments, a distribution logic used to distribute the plurality of avatars over the plurality of instances of the virtual event space may include a session persistence or 'sticky routing' mechanism. To maintain conversation continuity in the event of a network interruption or temporary exit, the remote server may associate a unique instance identifier with the specific virtual attendee's session data for a predetermined duration (e.g., 5-10 minutes). Upon receiving a reconnection request from the specific virtual attendee within this duration, the remote server identifies the stored instance identifier and prioritizes routing the specific virtual attendee back to the same specific instance of the virtual event space, rather than assigning a new instance via the standard distribution algorithms.

Some disclosed embodiments involve receiving from a specific virtual attendee associated with a first computing device, signal instructions. Once a virtual event space has been rendered, e.g., including a plurality of avatars associated with a plurality of virtual attendees, one or more virtual interactive objects, and at least one virtual main display, virtual attendees may begin exploring and interacting within the virtual event space. In response to these user-initiated actions, user computing devices may generate and transmit signal instructions to the remote server that are reflective of the current interaction state and intended operation, thereby enabling coordinated updates, server-side processing, content retrieval, and/or synchronized presentation across the virtual event platform. As used herein, the term "signal instructions" refers to data or commands sent from a user computing device to the remote server to initiate, control, or acknowledge specific actions or processes. Signal instructions may include, but are not limited to: control signals that encode user intent (e.g., "move," "interact," "play/pause," "open/close"); structured data packets carrying parameters and metadata (e.g., avatar location coordinates, object identifiers, content selection keys, timestamps, and session identifiers); and other forms of digital information used to communicate directives between the user computing device and the remote server. Different examples of signal instructions are provided below. The remote server may interpret the received signal instructions and return information to the first computing device. This latter may then apply the returned information to adjust the rendered portion of the virtual event space accordingly. For example, referring to FIG. 2B, a first user via user computing device 220-1 may transmit signal instructions 252 to virtual event platform server 210, to cause interaction or explore the virtual event space hosted on virtual event platform server 210. A similar operation may occur for users associated with computing devices 220-2 through 220-7. Process 600 includes a step 610 of receiving from a specific virtual attendee associated with a first computing device, signal instructions, as illustrated in FIG. 6.

Some disclosed embodiments involve receiving from the specific virtual attendee associated with a first computing device, signal instructions for causing navigation within the virtual event space of the specific avatar associated with the specific virtual attendee. In other words, the first computing device may generate and send signal instructions to control the movement and positioning of the avatar within the virtual event space. These instructions received by the remote server may be based on user inputs, such as keyboard commands, mouse movements, touchscreen gestures, or other input methods. The signal instructions for navigation may include data specifying the desired direction, speed, or destination of the avatar within the virtual environment. Process 600 includes a step 610a of receiving signal instructions for causing navigation within the virtual event space of a specific avatar associated with the specific virtual attendee, as illustrated in FIG. 6.

In some embodiments, receiving signal instructions for causing navigation of the specific avatar includes receiving from the specific virtual attendee a displacement trigger signal. In response to receiving from the specific virtual attendee a displacement trigger signal, the remote server transmits to the first computing device information and rendering data for causing the specific avatar to move from a specific location of the plurality of first locations to another location among the plurality of virtual locations selected by the specific virtual attendee. A displacement trigger signal refers to an input or command received from a virtual attendee that indicates their intention to move their avatar within the virtual event space. In this context, specific location refers to the current position of the specific avatar within the virtual event space, defined by coordinates or other spatial identifiers within the virtual environment. The virtual event platform may implement avatar navigation through a combination of user interface elements and back-end processing. When the specific virtual attendee initiates a movement command, such as clicking on a destination point or using directional controls, the virtual event platform may interpret this as a displacement trigger signal. This signal may include information about the desired destination or direction of movement. Upon receiving the displacement trigger signal, the platform calculates a path from the avatar's current location to the selected destination. This path-finding process may take into account obstacles, restricted areas, and the layout of the virtual space. The platform may then update the avatar's position incrementally along this path, potentially applying animations to create a smooth movement effect. For example, in a virtual trade show environment, an attendee might click on a position next to a booth across a virtual exhibition hall to initiate movement. The platform would receive this as a displacement trigger signal, calculate a path avoiding other attendees and exhibits, and move the avatar to the selected booth.

In some embodiments, the specific avatar is caused to move from the specific location to the selected location at a first pace. In addition, in response to receiving repeated displacement trigger signals, the remote server transmits to the first computing device information and rendering data for causing the specific avatar to move from the specific location to the selected location at a second pace, wherein the second pace is faster than the first pace. A pace refers to the speed or rate at which an avatar moves within the virtual event space. The first pace refers to an initial speed in response to a single displacement trigger signal and the second pace refers to an increased speed that is activated in response to receiving repeated displacement trigger signals, i.e., multiple, successive movement commands received from the specific virtual attendee within a short time frame (e.g., within less than 1 second, 1 millisecond, or lower). The virtual event platform may implement variable movement speeds to enhance user experience and provide more intuitive navigation within the virtual event space. By default, avatars may move at a moderate first pace that allows for comfortable exploration and interaction with the environment. This pace may be designed to mimic natural walking speed within the context of the virtual space. When the platform detects repeated displacement trigger signals, such as multiple clicks in quick succession or a held-down directional key, it interprets this as the virtual attendee's desire to move more quickly. In response, the platform increases the avatar's movement speed to a second, faster pace. This functionality may be useful in larger virtual spaces where attendees might want to quickly traverse long distances. For example, in a virtual conference center, an attendee might initially navigate at the first pace while exploring nearby booths. If they then decide to quickly move to a presentation hall on the other side of the venue, they would trigger the faster second pace by repeatedly clicking towards their destination or holding down a movement key. The platform would respond by increasing the avatar's speed, allowing for more efficient navigation of the space. The implementation of variable movement speeds may also include smooth acceleration and deceleration effects to create a more natural feeling of movement. Additionally, the system may include visual cues, such as motion blur or a "running" avatar animation, to indicate when the faster second pace is active.

In some embodiments, each of the plurality of avatars is customizable. The term "customizable" refers to the ability to modify or adjust the appearance, characteristics, or behavior of something according to individual preferences or specifications. In the context of avatars, this means that users can alter various aspects of their digital representation. In such cases, the remote server receives from a specific virtual attendee, via an associated first computing device, a selection of avatar customization options for the specific. The remote server transmits to the first computing device associated with the specific virtual attendee, rendering data for graphically representing the specific avatar in accordance with the received selection of avatar customization options. This customization process may take place either prior to the commencement of the virtual event or at any time during the event itself. Users may be provided with an intuitive menu or graphical interface that enables them to select and modify a wide range of avatar attributes. These attributes may include, but are not limited to, clothing style, hair color, skin tone, facial features, accessories, and other visual characteristics. In addition to purely cosmetic options, the customization interface may also allow users to select functional elements, such as badges or icons that indicate the user's role (e.g., speaker, organizer, attendee) or achievements (e.g., completed sessions, earned awards) within the event. Once the user has made their selections, the chosen customization options are transmitted to and received by the remote server, which processes the data and updates the appearance of the user's avatar in real time within the virtual event space. This ensures that participants see the most current representation of each attendee. The ability to customize avatars in this manner may enhance user engagement by fostering self-expression and individuality. It may also help attendees visually distinguish between different participants, making it easier to identify colleagues, speakers, or team members within the virtual environment. Furthermore, avatar customization may contribute to a more inclusive and welcoming atmosphere, as users are empowered to create representations that reflect their personal identity or preferences. FIG. 4C illustrates an exemplary user interface through which users can conveniently personalize the appearance of their avatar by choosing from a range of available color options, further enhancing the customization experience within the virtual event space.

In some embodiments, at least some of the customization options are available for selection after the specific virtual attendee has performed one or more actions within the virtual event space. This progressive customization system may serve as an incentive for participation and exploration within the virtual space. For example, attending a certain number of presentations may unlock a special badge or accessory for the user's avatar. Engaging in networking activities might make new clothing options available. Completing a scavenger hunt within the virtual space may reveal unique avatar animations or effects. These action-based customization options may encourage users to actively participate in the event and provide a visual representation of their engagement level. The system may track user actions and automatically update the available customization options in real-time, providing immediate feedback and rewards for user participation.

In some embodiments, each of the plurality of virtual attendees is associated with at least one role within the virtual event space. The term "role" refers to a designated function, position, or set of responsibilities assigned to a participant within the virtual event space. Roles may define an attendee's capabilities, access levels, and expected interactions within the event. Roles are specific to and operative within the confines of the digital environment created for the event, rather than external or real-world positions. The virtual event platform may implement this feature by incorporating a role-based access control (RBAC) model into the virtual event platform. When attendees register for an event, they may be assigned one or more predefined roles based on various factors such as their registration type, professional status, or specific event responsibilities. These roles may then be stored as part of the attendee's profile in the system's database.

In some embodiments, credentials associated with a specific virtual attendee depend on the at least one role associated with the specific virtual attendee. In this context, credentials refer to the digital access rights, permissions, or authentication tokens granted to a user that determine their level of access and capabilities within the virtual event system. Credentials are derived from or determined by the role assignment. The virtual event platform may implement this feature by creating a dynamic credential management system that integrates closely with the RBAC framework. When a virtual attendee is assigned a role or multiple roles, the platform automatically generates or assigns a set of credentials that correspond to the permissions and capabilities associated with those roles. The platform may maintain a database of role definitions, each specifying a set of allowed actions, accessible areas, and interaction capabilities within the virtual event space. When an attendee is assigned a role, the platform may query this database to determine the appropriate set of credentials. These credentials may take the form of digital tokens, access keys, or permission flags associated with the attendee's user account.

In some cases, the credential management system can be context-aware, granting permissions dynamically based on real or virtual conditions, such as the avatar's real-time location within the isometric coordinates. For example, a 'Guest' avatar navigating into a designated 'Speaker Zone' or 'Stage Area' may temporarily inherit 'Presenter' privileges (e.g., microphone unmuting, screen sharing), which are automatically revoked upon exiting the zone. This geo-fenced permission logic eliminates the need for manual administrative intervention during rapid transitions between speakers.

In some embodiments, the at least one role includes at least one of guest, employee, vendor, presenter, or moderator. A "guest" refers to a general attendee of the virtual event. A guest role may be configured with basic access rights, allowing attendees to view main presentations, participate in general chat rooms, and interact with public virtual objects. Guests might have limited ability to customize their avatar or initiate private communications. An "employee" refers to an individual who is part of the organization hosting or sponsoring the virtual event. Employees may have additional access rights or responsibilities within the event space. This role may be granted additional permissions, such as access to company-specific virtual rooms, the ability to host impromptu meetings, or special branding options for their avatar. The system might also provide employees with backend analytics or reporting tools, as further explained below. A "vendor" refers to a representative of a company or organization that is showcasing products, services, or information within the virtual event, often associated with virtual booths or exhibition spaces. This role may include rights for customizing and managing virtual booths or other virtual interactive objects and uploading product information. Vendors might also have access to lead generation data or visitor analytics for their booth. The presenter role is granted permissions to control the virtual main display during designated time slots, and upload and manage presentation materials. Moderators may be given broad permissions to manage chat rooms, control audience participation features, and intervene in discussions if needed. The system might provide moderators with tools to mute participants, remove inappropriate content, or manage speaker queues.

In some embodiments, guests are authorized to submit one or more questions to presenters while presenting content on the main display. The virtual event platform may implement this feature by integrating a question submission module into the virtual event. When a presentation begins on the virtual main display, the virtual event platform activates a question submission interface for all attendees with the "guest" role. This interface could appear as a dedicated panel or pop-up window within the guest's view of the virtual event space. Guests can type their questions into a text field within the submission interface. The virtual event platform may implement character limits or content filters to manage question length and appropriateness. When a guest submits a question, it is added to a queue. This queue may be visible to presenters and moderators but hidden from other guests. If enabled, the virtual event platform may route submitted questions through a moderation interface. Moderators can review questions in real-time, approving, editing, or rejecting them before they reach the presenter. Approved questions may appear in a separate interface visible to the presenter. This interface may allow presenters to sort questions, mark them as answered, or flag them for later follow-up. Selected questions may be displayed on the virtual main screen, visible to all attendees, creating a more interactive Q&A experience. This feature enhances audience participation and interactivity during presentations, allowing guests to engage with content in real-time while maintaining an organized flow of information for presenters and moderators.

Figure 4H:
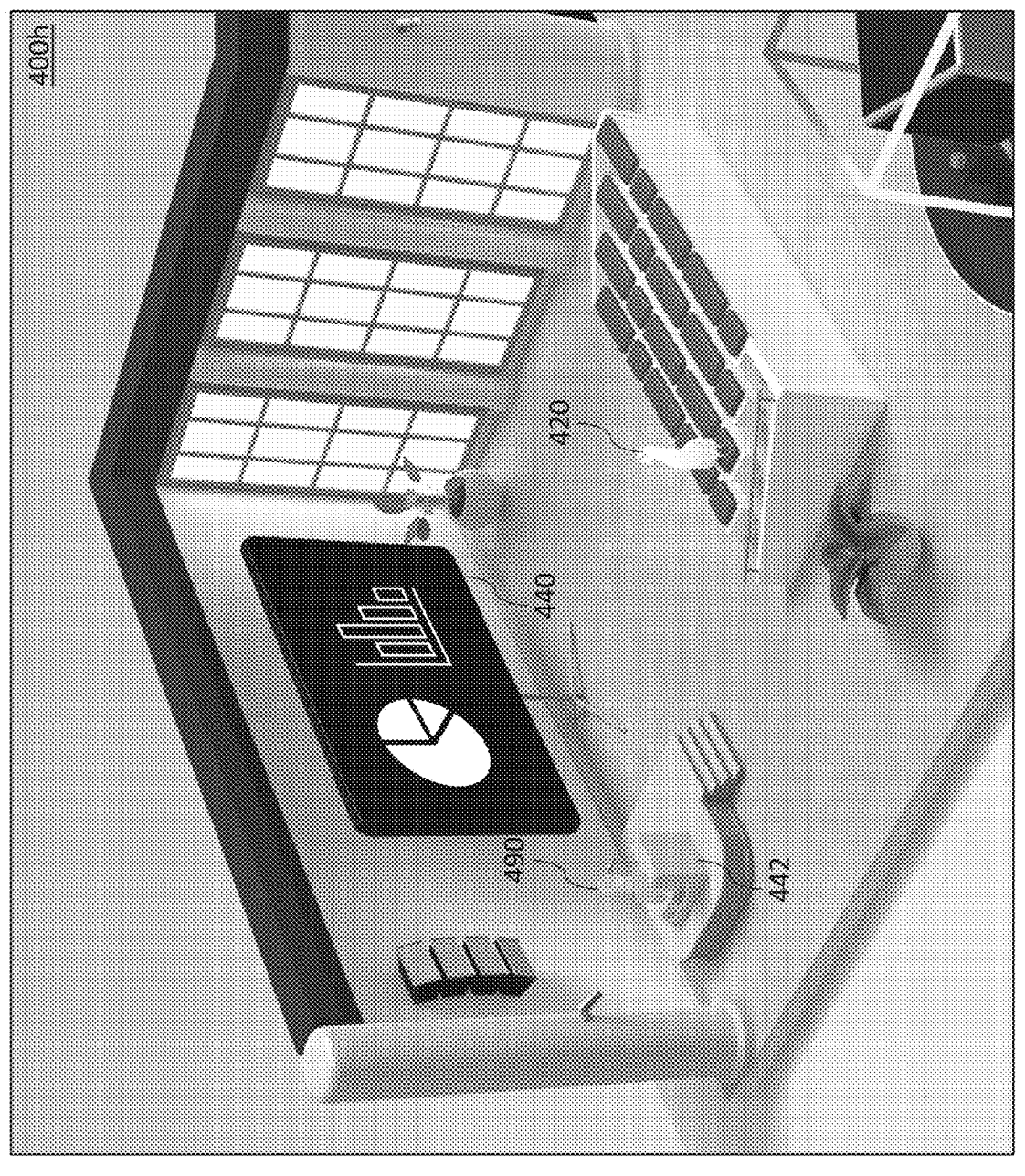
Figure 41:
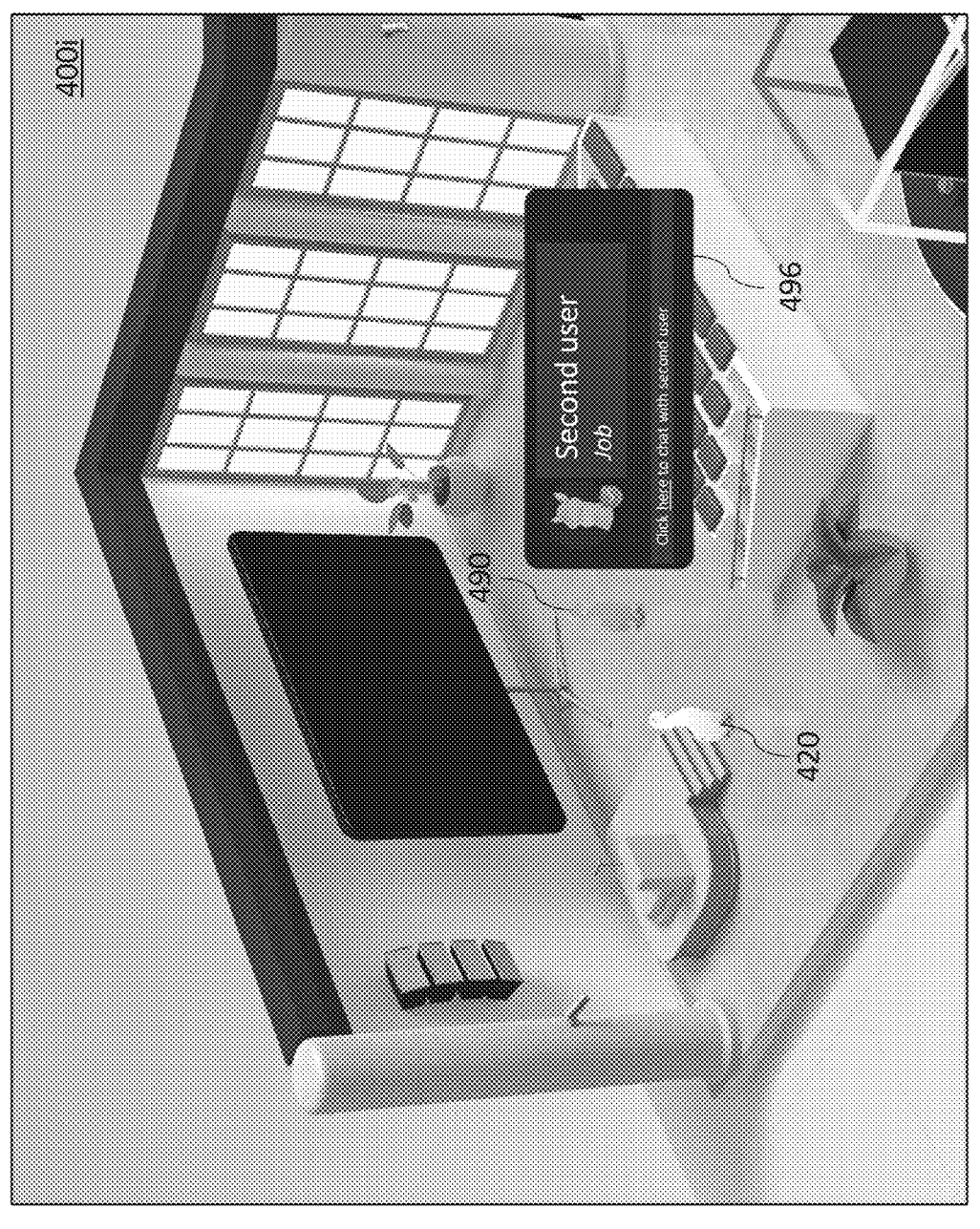

In some embodiments, avatars associated with presenters are configured to change their postures during presentations. A posture refers to the physical positions, stances, or arrangements of body parts that an avatar may assume within the virtual environment. Postures may include standing, sitting, gesturing, or other body language representations. A set of predefined posture animations may be associated with presenter avatars. These animations may be triggered based on various factors such as the content being presented, the presenter's input, or audience reactions. For example, when a presenter begins their presentation, their avatar may move toward a podium located near the virtual main display and place itself behind the podium. FIG. 4H illustrates another isometric perspective view 400h of virtual event space 410. In this illustration, a second virtual attendee, represented by avatar 490, serves as a presenter sharing dynamic live content on the virtual main display 440 while positioned behind podium 442. The first virtual attendee, represented by avatar 420, participates as a guest seated in the audience during the presentation. As the presentation progresses, the presenter's avatar may shift postures to emphasize key points, such as leaning forward during important explanations or gesturing towards visual aids. The changing postures of presenter avatars may enhance the visual engagement of the virtual event by providing non-verbal cues that complement the verbal presentation. This feature may help to maintain audience attention and create a more dynamic and lifelike presentation experience.

In some embodiments, avatars associated with presenters are configured to wave at a beginning of a presentation and bow at an end of a presentation. The term "wave" refers to a greeting gesture typically involving moving a hand or arm back and forth as a sign of acknowledgment or welcome. While the term "bow" refers to a gesture of respect or gratitude, usually involving bending the upper body forward. These specific animations for presenter avatars are automatically triggered at predetermined points in the presentation timeline. When a presenter is introduced or begins their session, the waving animation for the presenter's avatar may be activated, creating a welcoming gesture to the virtual audience. This may help establish a connection between the presenter and attendees, simulating the social cues of an in-person event. Similarly, at the conclusion of the presentation, a bowing animation may be triggered for the presenter's avatar. This gesture may serve as a visual cue that the presentation has ended and may also convey appreciation to the audience for their attention. These automated gestures may enhance the social dynamics of the virtual event by providing clear visual indicators of the presentation's structure.

Some disclosed embodiments involve, when multiple virtual attendees are associated with a presenter role, displaying a dedicated user interface to receive presenter credentials ahead of time, thereby enabling smooth transitions between presenters. The term "presenter credentials" refers to the authentication information, presentation materials, or other relevant data that presenters need to provide to prepare for their role in the virtual event. The virtual event platform may implement this feature by creating a separate section within the virtual event platform specifically for presenters. This dedicated interface may be accessible to users assigned the presenter role, allowing them to input their credentials and presentation details in advance of the event. The interface may include fields for uploading presentation slides, entering speaker bios, setting up any required audio/video equipment, and specifying the order of presentations if there are multiple speakers. By collecting this information ahead of time, the platform may automate the transition process between presenters. For example, when one presentation ends, the platform may use the pre-loaded credentials to quickly authenticate the next presenter, load their materials, and adjust any necessary settings for their avatar or presentation space. This may reduce delays and technical issues that could disrupt the flow of the event. The dedicated presenter interface may also include features to manage the timing of transitions. Presenters may be able to indicate when they are ready to begin, allowing the system to smoothly hand over control of the main display or presentation area. For instance, as one presenter concludes, a notification may appear in the interface for the next speaker, prompting them to prepare for their turn.

Some disclosed embodiments involve receiving from the specific virtual attendee associated with a first computing device, signal instructions for causing interaction between the specific avatar and the at least one virtual interactive object to thereby trigger, on the display of the first computing device, a presentation of the predetermined content via the virtual interactive object. In this context, "causing interaction" refers to enabling or initiating engagement between the specific virtual attendee and/or its avatar and one or more interactive elements within the virtual event space. Such interaction may be effected through proximity-based activation (e.g., when the avatar enters a predefined interaction radius), direct user input (e.g., click, tap, keyboard, controller), gesture or voice input, or other mechanisms configured to allow the virtual attendee to engage with and elicit responses from the virtual interactive objects. For interactions with virtual interactive objects, the signal instructions may include data identifying the specific object being interacted with (e.g., object identifier, object type), the type of interaction (e.g., click, touch, proximity, hover, long-press), and any additional parameters required to trigger the appropriate response (e.g., content selection keys, playback mode, language or accessibility preferences, timestamps, session identifiers). When an interaction with a virtual interactive object occurs, the first computing device may receive data associated with the predetermined content linked to that object (e.g., streaming media assets, text panels, slide decks, 3D models, or interactive widgets). Process 600 includes a step 610*b* of receiving signal instructions for causing interaction between the specific avatar and the at least one virtual interactive object to thereby trigger, on the display of the first computing device, a presentation of the predetermined content via the virtual interactive object, as illustrated in FIG. 6.

In some embodiments, the predetermined content is customized for at least one of the plurality of virtual attendees. When virtual attendees register for or join an event, the virtual event platform may collect or access virtual attendee data. Such data may include attendees' profile information, interaction history, preferences, or behavior within the virtual space. For example, virtual attendee data may encompass a user's job title, areas of interest, or the types of content they have engaged with in past events. In this context, predetermined content may be personalized/customized within the virtual event space to align with the specific characteristics, interests, or behavior of individual participants. For example, the virtual event platform may analyze an attendee's job role and previous content interactions to prioritize and highlight relevant presentations or exhibits within their view of the virtual space. This personalization may enhance the attendees' experiences by presenting them with content that is more likely to be relevant and engaging to their specific interests or needs. In some embodiments, the virtual event platform may employ machine learning algorithms to continuously refine and improve the content adaptation based on ongoing attendee interactions and feedback.

In some embodiments, the virtual event space data includes definitions for a plurality of virtual interactive objects, configured to display predetermined content set by the event host organizer, and at least some of the plurality of virtual interactive objects are configured to enable one or more virtual attendees to display additional content. "Additional content" refers to supplementary digital materials, information, or media that can be added or displayed within the virtual event space via virtual interactive objects beyond what was initially set up by the event organizer (i.e., predetermined content). This may include user-generated content, real-time updates, or dynamically loaded information. The virtual event platform may implement this feature by creating a flexible virtual object framework. This framework may allow for two types of virtual interactive objects: those that provide access to predetermined organizer-set content, and those that permit attendee contributions. Virtual interactive objects of the first type may be configured to display this content when attendees interact with them, such as clicking on a virtual booth or information kiosk. For the second type of objects, the virtual event platform may incorporate user-contribution capabilities. These objects could be designed with interfaces that allow authorized attendees to add, modify, or display their own content. For example, a virtual whiteboard object might allow attendees to add notes or sketches during a brainstorming session.

In some embodiments, the one or more virtual attendees that are enabled to display additional content possess credentials to display additional content via the at least some of the plurality of virtual interactive objects. The virtual event platform manages access controls, ensuring that only authorized attendees can modify or add content to these objects. It may also implement real-time synchronization to ensure that any additional content displayed by one attendee is visible to all other relevant participants in the virtual space. Put it differently the one or more virtual attendees are assigned a role that comes with credentials enabling them to display additional content via at least some virtual interactive objects, such as a vendor role potentially including rights for customizing and managing virtual booths. When a virtual attendee attempts to interact with an object that allows for displaying additional content, the virtual event platform may perform a credential check. This process may involve querying the user's permissions against a predefined set of rules or access control lists associated with each interactive object. If the attendee's credentials match the required permissions, the system unlocks the functionality to display additional content.

In some embodiments, the at least one virtual interactive object includes at least one gallery interactive object configured to display predetermined content, such as a collection of images or media files. A gallery interactive object refers to a digital element within a virtual environment that is designed to showcase or present a collection of related content items (e.g., images, media files). For example, a gallery interactive object may be a virtual wall displaying multiple images, a rotating carousel of product information, or a series of interconnected screens showing video clips. A gallery interactive object may display predetermined content (i.e., causing a visual presentation of predetermined content) by rendering images or text on a virtual surface, projecting video content onto a virtual screen, or organizing information in a visually coherent manner within the virtual space. If the gallery is already presenting a set of images by default when the virtual event space is first rendered, user interaction, such as clicking or selecting the gallery, may cause the display to update. This update could involve switching to a different image, expanding the view to show a larger or more detailed version, launching a slideshow, or revealing additional information or interactive controls related to the content. Other examples of updates could include changing the layout of displayed items, filtering content based on user preferences, or transitioning to a different content category within the same interactive object. FIGS. 4A, 5A, and 5B illustrate exemplary isometric perspective views of different virtual event spaces, each including gallery interactive objects 430-3, 510*a*, and 510*b*, which are configured to display predetermined In some embodiments, the at least one virtual interactive object includes at least one virtual web-view object. As used herein, the term "virtual web-view object" refers to an interactive element within the virtual event space that enables the display of web content or web-based interfaces directly within the virtual environment. This may include, but is not limited to, websites, web applications, online forms, streaming media, or other internet-based resources that can be accessed and viewed by the user without leaving the virtual event space. When the avatar or a specific virtual attendee interacts with the virtual web-view object, such as by clicking, tapping, or approaching the object, the remote server receives signal instructions for causing interaction with the at least one virtual web-view object. In response to receiving from the specific virtual attendee signal instructions for causing interaction with the at least one virtual web-view object the remote server sends augmentation data for augmenting the display associated with the specific virtual attendee with a pop-up window configured to display predetermined content in a web-view setting while the specific avatar interacts with the at least one web-view object. In this context, "augmentation data" refers to additional information, visual elements, or interactive features that are added to the existing view of the virtual event space to enrich or supplement the user's experience. Examples of augmentation data may include overlays, pop-up windows, interactive controls, or contextual graphics that are not part of the base virtual event space. Specifically, the augmentation data may be used to generate a pop-up window configured to display the predetermined content in a web-view setting (i.e., an interface where content appears and can be interacted with as a webpage directly within the virtual event space). The term "pop-up window" in this context refers to a secondary display area that appears on top of or alongside the main view of the virtual event space. This pop-up window is used to present additional information, web content, or interactive features, allowing the user to engage with online resources while remaining immersed in the virtual environment. The pop-up window may be movable, resizable, or dismissible, and may support a range of web-based interactions, such as browsing, form submission, or multimedia playback, thereby providing a seamless and integrated user experience within the virtual event space. FIG. 5C illustrates an exemplary isometric perspective view 500*c* of an alternative virtual event space, including a virtual web-view object 520, which is implemented in the form of an interactive information board.

In some embodiments, the virtual event space rendering data further includes definitions for at least one mobility-facilitating object. In such a case, the remote server is further configured to transmit rendering data for graphically representing the virtual event space, including the at least one mobility-facilitating object at a fourth location within the virtual event space. The term "mobility-facilitating object" refers to any virtual element specifically designed to enable or assist avatars in moving between distinct areas, instances, or events within the digital environment. Examples of such objects include virtual doors, portals, teleportation pads, and other interactive features that are intentionally crafted to support navigation. These elements are not merely decorative; they function as gateways or conduits, allowing avatars to traverse the virtual landscape with ease and efficiency. For example, referring to FIG. 4A, virtual door 460 may act as a mobility-facilitating object.

When a specific virtual attendee interacts with a mobility-facilitating object, the first computing device transmits, and the remote server receives signal instructions for causing interaction with the at least one mobility-facilitating object. In response to receiving from the specific virtual attendee signal instructions for causing interaction with the mobility-facilitating object, the remote server causes the specific virtual attendee to leave the virtual event; causes the specific virtual attendee to join a different instance of the virtual event space; causes the specific virtual attendee to join a different portion of the virtual event space; or causes the specific virtual attendee to join a different virtual event space.

As used herein, an instance of the virtual event space refers to a copy a version of the virtual event space. Accordingly, a different instance of the virtual event space refers to another occurrence or copy of the same virtual environment, potentially with different attendees or content. This is distinct from a "different virtual event space," which refers to a separate and unique virtual environment, possibly with a different layout, theme, or purpose. Leaving the virtual event refers to the process by which an avatar, and thus the associated virtual attendee, exits the current virtual event space. Upon leaving, the attendee may be disconnected from the event platform, returned to a lobby or home screen, or transitioned to another event or activity as determined by the system. This operation may result in the termination of the attendee's session within the current event space. Leaving the event may also entail the cessation of all ongoing interactions, communications, and access to event-specific content, thereby marking the end of the attendee's participation in that particular virtual event. The integration of mobility-facilitating objects may enhance the navigability and interconnectedness of the virtual event platform. By interacting with these objects, attendees may effortlessly move between different areas or events, making the experience more dynamic and adaptable to their needs. For example, an avatar might approach and interact with a virtual door to transition from a main conference hall to a breakout session room, or utilize a teleportation pad to join a different instance of the event populated by another group of participants. This system not only streamlines movement but also fosters a sense of exploration and agency, allowing users to tailor their journey through the virtual event according to their interests and objectives.

Some disclosed embodiments involve receiving from the specific virtual attendee associated with a first computing device, signal instructions for causing interaction between the specific avatar and the at least one virtual main display to thereby trigger, on the display of the first computing device, a presentation of the dynamic live content received from a second computing device of a second virtual attendee from among the plurality of virtual attendees. Similar to interactions with the at least one virtual interactive object, interactions with the virtual main display involve the first computing device sending and the remote server receiving signal instructions that indicate the specific virtual attendee's engagement with this feature of the virtual event space. These signal instructions may trigger (i.e., initiate or activate) a sequence of operations that enable the reception and display of dynamic live content originating from the second computing device. The process may include transmitting a request for the current dynamic live content, receiving streaming data from the second computing device (which may be routed through one or more remote servers), and rendering this content on the display of the first computing device via the virtual main display. In some embodiments, the dynamic live content may include live video, real-time presentations, shared documents, or other interactive media. The presentation of dynamic live content on the virtual main display may involve multiple signal instructions and data exchanges to maintain synchronization and responsiveness. For example, the first computing device may send commands to start or stop streaming, adjust resolution or layout, and handle user interactions such as pausing or expanding the view. This mechanism allows for real-time updates and live interactions between virtual attendees, effectively simulating the experience of watching a live presentation or demonstration in a physical event space while preserving the immersive qualities of the virtual environment. Process 600 includes a step 610c of receiving signal instructions for causing interaction between the specific avatar and the virtual main display, to thereby trigger, on the display of the first computing device, a presentation of the dynamic live content received from a second computing device of a second virtual attendee from among the plurality of virtual attendees, as illustrated in FIG. 6.

In some embodiments, the specific virtual attendee may join the virtual event while another, second virtual attendee is already presenting live content. Accordingly, dynamic live content may already be displayed via the virtual main display at the time of entry. In this use case, or in scenarios where the first virtual attendee is engaged in interactions other than with the virtual main display, the ongoing presentation or dynamic live content remains accessible and visible within the virtual event space. In other words, users are not forced to join the presentation; they may choose to follow it from a distance or join after it has begun, similar to the experience in a physical event setting. This design provides flexibility and mirrors real-world event dynamics, allowing attendees to navigate freely while maintaining awareness of live content being presented.

Further details regarding the interaction between a virtual attendee and the at least one virtual main display are provided below. In particular, as further explained, interaction with the virtual main display may cause a change in the viewing perspective from an isometric perspective view to a first-person view. In some embodiments, this first-person view may correspond to a predetermined location relative to the virtual main display, allowing the user to experience the content as if positioned directly in front of the display. This transition enhances immersion by simulating a real-world scenario where an attendee moves closer to a presentation screen for better visibility and engagement. The virtual event platform may implement this perspective change dynamically upon detecting specific user actions, such as clicking on the virtual main display, selecting a "focus" option, or navigating the avatar into a designated interaction zone Some disclosed embodiments involve muting all audio signals when the main display is active. Muting refers to the act of silencing or suppressing audio output, typically to eliminate background noise or reduce distractions. When the virtual main display is currently in use, presenting content, or the focus of attention within the virtual event space, muting applies to all sources of sound within the virtual event space, which may include background ambient noise, other attendees' voices, or sound effects associated with interactions. This feature enhances focus and reduces distractions during key presentations or content displays within the virtual event. The virtual event platform may implement the muting process by integrating an audio management module with the main display activation system. When the virtual main display becomes active, such as when a presentation begins or when an attendee enters a focused viewing mode, the platform automatically triggers the muting function. This function may work by setting the volume levels of all other audio sources in the virtual environment to zero or by temporarily disabling audio processing for non-essential sounds. The muting may be applied globally across the entire virtual event space or specifically to the audio perceived by attendees viewing the main display content. For example, during a keynote speech presented on the main display, the system would automatically mute ambient sounds, background music, and audio from other interactions, ensuring that attendees can focus solely on the presenter's voice and any audio associated with the presentation itself. This feature may also include options for selective unmuting.

Some disclosed embodiments involve disabling all links configured to give access to different windows when the main display is active. Links refer to interactive elements within the virtual event space that, when activated, direct users to different areas, content, or interfaces. Links may include clickable text, buttons, icons, or other visual elements that serve as navigation tools within the virtual environment. The term "windows" in this context refers to separate viewing areas or interfaces within the virtual event platform that display different content or functionalities. Windows may include pop-up displays, secondary screens, or embedded frames that present information or interactive elements distinct from the main virtual space. When the main display becomes active, such as during a presentation, the virtual event platform temporarily disables all interactive links that would normally allow attendees to navigate to different areas of the virtual space or open additional windows. This disabling process may involve modifying the properties of link elements in the user interface, changing their status to non-interactive, intercepting and blocking click events on these elements, or visually altering the links to indicate their inactive state. This feature helps maintain attendee focus on the primary content being presented. For example, during a live product demonstration on the main display, links to networking lounges, resource libraries, or other interactive areas may be temporarily disabled. This prevents attendees from inadvertently navigating away from the main content and potentially missing information. The virtual event platform may also provide visual cues, such as dimming or graying out disabled links, to indicate their temporary unavailability.

Some disclosed embodiments involve receiving from the specific virtual attendee signal instructions for causing interactions with other avatars located within the virtual event space. In this context, the term "interactions" encompasses any form of communication, engagement, or exchange between two or more virtual attendees within the virtual event space. For example, interactions may include text chat via a private chatroom, voice communication, gestures, or collaborative activities within the virtual space, among others. The virtual event platform may be designed to make these interactions intuitive and accessible; for example, a specific virtual attendee may initiate communication and cause transmission of signal instructions for causing interactions by approaching another avatar, clicking on their representation, or hovering a cursor over them. Upon such actions, the platform may present controls or commands that allow users to easily engage with nearby avatars, facilitating seamless and meaningful exchanges within the virtual event space.

Some disclosed embodiments involve, in response to receiving from at least one virtual attendee an interaction trigger signal with respect to an avatar associated with another virtual attendee, augmenting the display of the at least one virtual attendee with a pop-up window configured to display information related to the other virtual attendee. The term "interaction trigger signal" refers to a user-initiated action or input that indicates a desire to engage with or obtain information about another element in the virtual environment. This signal may be generated by clicking, hovering over, or otherwise selecting an avatar. The term "pop-up window" refers to a secondary graphical user interface element that appears temporarily on top of or alongside the main display. Pop-up windows are used to present additional information or options without navigating away from the current view. In this case, the pop-up window may be configured to display information related to another virtual attendee, i.e., details, data, or context about the user represented by the selected avatar. In some embodiments, the displayed information includes at least one of a name, a job title, or a company name associated with the other virtual attendee.

The virtual event platform may implement this feature by maintaining a database of attendee profiles linked to their respective avatars. When a virtual attendee interacts with another avatar, such as by clicking on it, the platform interprets this as an interaction trigger signal. In response, the platform retrieves the relevant information for the selected avatar from the attendee database. The system then generates a pop-up window on the initiating attendee's display, populating it with the retrieved information. This pop-up may include the attendee's name, job title, company, areas of expertise, and potentially their event agenda or interests.

In some embodiments, the pop-up window includes a message user interface element. A message user interface element refers to a graphical component within the pop-up window that allows users to initiate a private communication. This element may take the form of a button, icon, or text link labeled with phrases like "Send Message" or "Chat Now." In response to the specific virtual attendee interacting with the message user interface element, the remote server transmits information and rendering data for augmenting the display of the specific virtual attendee with a private chatroom configured for communication between the specific virtual attendee and the other virtual attendees. A private chatroom refers to a dedicated communication channel that is accessible only to specific users, in this case, the two virtual attendees engaging in the conversation. Private chatrooms ensure that the exchange of messages is confidential and separate from public or group discussions. The virtual event platform may implement this feature by integrating a private/direct messaging functionality into the virtual event platform. When a virtual attendee interacts with the message user interface element in the pop-up window, the platform initiates the creation of a private chatroom instance. This chatroom is linked specifically to the two involved attendees and is inaccessible to others. The system then augments the display of the initiating attendee with a new interface element, such as a chat window or a separate messaging panel. The system may send a notification to the other attendee, alerting them to the incoming chat request and providing them with access to the same private chatroom interface. This feature may enhance the networking capabilities of the virtual event by allowing attendees to move from public interactions to more focused, private conversations seamlessly. The private chatroom may support text messaging, and/or at least one of file sharing, audio calls, or video calls.

FIG. 4I illustrates another isometric perspective view 400*i* of virtual event space 410, where a first virtual attendee, depicted by avatar 420, is shown interacting with a second virtual attendee, represented by avatar 490. When the first attendee engages with avatar 490, such as by hovering a cursor over, clicking on, or approaching the avatar, the virtual event platform responds by enhancing the rendered view with a pop-up window 496. Pop-up window 496 displays the second attendee's name and job title, providing immediate context for the interaction. In addition, pop-up window 496 features a message user interface element, specifically a clickable area that allows the first attendee to initiate a chat with the second user. Upon selecting this element, a private chatroom may be added to the view, as shown in FIG. 4G, enabling direct communication between the attendees within the virtual event space.

Chatrooms are not necessarily limited to private communication between two virtual attendees. Some disclosed embodiments involve augmenting the display of each of the plurality of virtual attendees with a chatroom user interface element, and in response to the specific virtual attendee interacting with the chatroom user interface element, augmenting the display of the specific virtual attendee with a chatroom configured for communication between the plurality of virtual attendees. A chatroom user interface element refers to a graphical component or control within the virtual event user interface that allows users to access or interact with a text-based communication feature, such as GUI element 480 shown in FIG. 4F. In this context, "augmenting the display" refers to adding or overlaying additional visual elements or interfaces on top of or alongside the main view of the virtual event space. In contrast to a private chatroom, such a chatroom may be configured for communication between the plurality of virtual attendees. In other words, such a chatroom is set up to facilitate text-based interactions among multiple participants (potentially some or all of them) within the virtual event. The system may implement this feature by integrating a chat functionality seamlessly into the virtual event experience. The chatroom user interface element may be presented as a persistent icon or button within the attendee's view, easily accessible without obstructing the main virtual environment. This element might be designed to blend with the overall aesthetic of the virtual space while remaining clearly identifiable. When a virtual attendee interacts with the chatroom user interface element (e.g., GUI element 480), such as by clicking or tapping on it, the virtual event platform responds by opening the chatroom interface. This interface may be implemented as an overlay or a side panel that appears within the attendee's view of the virtual event space (as shown in FIG. 4F).

Some disclosed embodiments involve augmenting the display of each virtual attendee associated with a specific instance with a chatroom user interface element, and in response to at least one virtual attendee associated with the specific instance interacting with the chatroom user interface element, augmenting the display of the at least one virtual attendee with a chatroom configured for communication between all virtual attendees associated with avatars distributed in the specific instance. Similar to the global chatroom functionality described above (which enables communication among all virtual attendees across the broader event space), a chatroom limited to the participants of a particular instance may also be provided. This instance-scoped chatroom may foster focused discussions relevant to the local context, reduce cross-traffic from unrelated sessions, and allow attendees in that instance to exchange messages, share links, and coordinate activities without leaving the current view.

Some embodiments involve, receiving, from the specific virtual attendee, via an interactive interface, a selection of an icon reflective of an emotion; and causing a plurality of representations of the selected icon to simultaneously move along a plurality of trajectories on the display of each of the plurality of virtual attendees and in a manner associated with the avatar associated with the at least one virtual attendee. An interactive interface refers to a user-facing component of the virtual event platform that allows attendees to input commands, make selections, or interact with various elements of the virtual environment. This interface may include buttons, menus, or gesture-based controls. In some embodiments, the interactive interface of the specific virtual attendee is a graphical user interface (GUI) element presented in the display of the specific virtual attendee. A GUI element refers to a visual component of a software application that allows users to interact with the system through graphical icons and visual indicators rather than text-based interfaces or command-line syntax.

The term "icon reflective of an emotion" refers to a visual symbol or representation that expresses a particular feeling, mood, or reaction. These may include, but are not limited to, emojis, animated reactions, or custom-designed emotional indicators specific to the virtual event platform. This feature allows virtual attendees to express emotions or reactions in a visual and immediate way within the virtual event space. For example, during a presentation or interactive session, attendees might select icons to express agreement, excitement, confusion, or other emotions, providing real-time feedback to presenters and other attendees. This can enhance engagement and create a more dynamic and responsive virtual environment. An icon reflective of an emotion may be accessible via an interactive interface, including or being a GUI element integrated into the rendered perspective view of the at least one virtual event space. Upon interaction with such an interface, a plurality of representations of the selected icon, i.e., multiple copies of the chosen emotional icon, are displayed simultaneously across the virtual event space. These copies are then animated to move across the displays of all attendees in the virtual event space. The movement may follow various trajectories, creating a dynamic and visually engaging effect. In some embodiments, the plurality of trajectories on the displays originates from the avatar associated with the specific virtual attendee. When an attendee selects an emotion to express, the virtual event platform calculates the avatar's location within the virtual space, and then generates the multiple representations of the selected icon at this point and animates them to move outward from this origin. The trajectories may be designed to create a visually appealing effect, such as a burst or ripple emanating from the avatar For example, referring to FIG. 4F if a first virtual attendee associated with avatar 420 selects a "heart" emoji during a presentation via GUI element 470, multiple instances of that emoji might appear to float up from avatar 420 and spread across the virtual space. This feature enhances the sense of shared experience and emotional connection in the virtual environment, allowing attendees to express reactions in a way that is visible to all participants. The system may also track and analyze the use of these emotional expressions to gauge audience engagement and sentiment throughout the event.

In some embodiments, the plurality of representations of the selected icon is configured to disappear from the display of each of the plurality of virtual attendees after a predetermined period. A predetermined period refers to a set duration of time that is established in advance. This period may be a fixed number of seconds or milliseconds, or it may be adjustable based on event settings or system parameters. The system may implement this feature by associating or programming a timer with each set of icon representations when they are generated. When a virtual attendee selects an emotion icon, and the platform creates the multiple representations that move across the displays, it also starts a countdown based on the predetermined period. This period may be set by event organizers or system administrators to balance expressiveness with visual clarity in the virtual space. For example, the system might be configured to display the emotional icons for 5 seconds before they start to fade out. At the end of the predetermined period, the system gradually reduces the opacity of the icon representations until they are no longer visible, or it may make them disappear instantly. This automatic removal helps maintain a clean and uncluttered virtual environment while still allowing for dynamic emotional expressions. The system may also implement variations, such as having different durations for different types of emotions or allowing event organizers to adjust the display duration based on the nature of the event or specific segments within it.

In some embodiments, the plurality of avatars is configured to automatically perform movements that reflect an action or convey meaning. "Automatically perform" refers to actions or behaviors that are executed by the system without direct input from the user. These actions are triggered based on predefined conditions or events within the virtual environment. A movement in this context refers to changes in position, gesture, or posture of the avatars within the virtual space. These may include walking, hand gestures, facial expressions, or other animated actions. Such movements are not random but are designed to communicate something specific, either mirroring real-world actions or expressing ideas, emotions, or intentions within the virtual event context. The virtual event platform may implement this feature by developing a library of meaningful avatar movements and associating them with specific triggers or contexts within the virtual event space. These movements may be designed to enhance non-verbal communication and increase the sense of presence and engagement in the virtual environment. For example, when an attendee enters a new area of the virtual space, their avatar may automatically perform a looking around motion, simulating the natural behavior of surveying a new environment. Similarly, when an attendee approaches an interactive object, their avatar may extend a hand as if reaching to interact with it. The automatic movements may also be used to convey the status or actions of attendees without requiring constant manual input. For instance, if an attendee is listening to a presentation, their avatar may occasionally nod or lean forward, indicating attentiveness. These automated movements may significantly enhance the visual dynamics of the virtual event, making it feel more lifelike and engaging. For example, during networking sessions, avatars may automatically turn to face each other when in conversation, or perform greeting gestures when approaching one another. The system may also use these movements to guide attendee attention, such as having avatars automatically face towards important announcements or newly revealed content within the virtual space.

In some embodiments, the avatars are configured to perform movement based on an analysis of trigger signals. Trigger signals refer to specific inputs, events, or data points that the virtual event platform uses to initiate or determine avatar movements. These signals may come from user actions, environmental changes in the virtual space, or scheduled event occurrences. A framework for detecting, analyzing, and responding to various trigger signals within the virtual event space may be established by the virtual event platform. This framework may involve a combination of event listeners, data processing algorithms, and a mapped set of corresponding avatar movements. For example, the platform may continuously monitor attendee interactions, chat messages, presentation progress, and other event elements for potential trigger signals. When a trigger signal is detected, the platform analyzes it to determine the most appropriate avatar movement response. This analysis may take into account factors such as the type of signal, the current context of the virtual event, and the specific characteristics of the avatar or attendee involved. For instance, if the trigger signal is a sudden increase in chat activity during a presentation, the system may analyze the sentiment of the messages and cause attendee avatars to perform movements that reflect excitement or engagement, such as leaning forward or raising hands.

In some embodiments, the analysis of the trigger signals is performed using AI techniques. "AI techniques" refers to methods and algorithms from the field of artificial intelligence that enable computer systems to perform tasks that typically require human intelligence. These may include machine learning, natural language processing, computer vision, and other advanced computational approaches. The virtual event platform may employ machine learning techniques to refine its analysis and response over time, learning from patterns of attendee behavior and feedback to improve the relevance and naturalness of avatar movements. For example, if certain types of presentations consistently trigger specific attendee reactions, the platform may learn to anticipate these reactions and prepare appropriate avatar movements in advance. The platform may implement this feature by integrating advanced AI models and algorithms into the virtual event platform's backend. These AI components may be designed to process and analyze various types of trigger signals in real-time, making decisions about how avatars should move or behave in response to event dynamics. For example, the system may employ natural language processing (NLP) techniques to analyze text chat conversations and speech during the event. This AI-powered analysis may detect sentiment, identify key topics of interest, and gauge overall engagement levels. Based on this analysis, the system may trigger appropriate avatar movements, such as nodding in agreement, raising hands to ask questions, or expressing excitement through animated gestures.

Some disclosed embodiments involve blocking access to one or more portions of the virtual event space to the plurality of avatars. "Blocking access" refers to the act of preventing entry, interaction, or visibility of certain areas or features within the virtual event space. Blocking may involve creating barriers, implementing permission checks, or simply not rendering specific portions for certain users. Different portions of the virtual event space can be blocked, such as distinct areas, rooms, or sections within the virtual environment. These portions may represent different functional spaces. In some embodiments, the one or more portions of the virtual event space include at least one virtual object (interactive or not). This feature allows for fine-grained control over the content and interactions available within the virtual event space. The virtual event platform may implement this by associating virtual objects with specific access permissions, similar to how it manages access to spatial areas. Each virtual object may have properties defining its visibility, interactivity, and availability based on the current access state of its containing area. When access to a portion of the virtual space is enabled, the system not only allows avatars to enter the area but also activates or reveals the virtual objects within it. For example, in a virtual trade show, certain product demonstration booths (represented as virtual objects) might be hidden or inactive until the official start of the exhibition. When access is granted, these objects become visible and interactive, allowing attendees to engage with product displays, video presentations, or chat with virtual representatives. In some embodiments, the one or more portions of the virtual event space include at least one virtual room within the virtual event space. A "virtual room" refers to a distinct, enclosed area within the larger virtual event space that may have its own theme, purpose, or set of interactions. Virtual rooms can simulate physical spaces like conference halls, networking lounges, or breakout session areas. This feature enables the creation of a multi-layered virtual event space with controlled access to specific areas, mimicking the structure of physical events. When managing access, the virtual event platform can treat these virtual rooms as individual units, allowing for granular control over different event activities.

When designing the virtual space, event organizers can designate certain areas as restricted. The virtual event platform then associates these areas with specific access permissions or credentials. As avatars move through the virtual space, the platform continuously checks their permissions against the access requirements of each area. If an avatar attempts to enter a blocked portion, the platform may respond in several ways, including but not limited to rendering a visual barrier, such as a closed door or a "restricted area" sign; redirecting the avatar to an open area; or displaying a message explaining why access is denied.

In some embodiments, access to the one or more portions of the virtual event space is blocked for a predetermined time period. As used herein, a predetermined time period refers to a specific duration that is set or decided in advance. This may include fixed intervals such as minutes, hours, or days, or may be defined by specific start and end times. Implementing time-based access restrictions allows for dynamic control over the event flow and content availability. The virtual event platform may use a scheduling mechanism to manage these time-based restrictions. For example, certain areas of the virtual event space, such as a keynote presentation hall, may be blocked until the scheduled start time of the keynote address. This ensures that attendees cannot enter or view the space prematurely, maintaining the element of anticipation and allowing for last-minute preparations. The virtual event platform may implement a countdown timer visible to attendees, indicating when access will be granted. Once the predetermined time period elapses, the platform may automatically lift the access restrictions, allowing avatars to enter the previously blocked portions of the virtual event space.

Some embodiments involve enabling access to at least one of the one or more portions of the virtual event space to the plurality of avatars. Enabling access refers to the act of granting permission, removing barriers, or providing the means for entry or interaction with a previously restricted area or feature, and thus represents the opposite process of blocking access. This feature allows for dynamic control over the virtual event space, enhancing the overall event experience and flow. The platform may implement this by maintaining a database of access permissions associated with different areas of the virtual space and the avatars present in the event. When the conditions for enabling access are met (such as reaching a specific time or triggering a particular event milestone), the platform updates these permissions in real-time. This update may involve changing the status of certain virtual barriers from "closed" to "open," updating the rendering instructions for client devices to display the newly accessible areas, and/or modifying the navigation permissions for avatars. For example, at the start of a networking session, the system may enable access to multiple themed networking lounges simultaneously, allowing attendees to choose which areas to explore based on their interests.

In some embodiments, enabling access to at least one of the one or more portions of the virtual event space includes enabling access in response to receiving an enabling access trigger signal from the event host organizer. An enabling access trigger signal refers to a specific input or command sent from the event host organizer to the virtual event platform to initiate the process of granting access to previously restricted areas. This feature provides event host organizers with real-time control over the virtual event space, allowing for adaptive management of the event flow. The virtual event platform may provide a dedicated interface for event host organizers, which includes controls for managing access to different portions of the virtual space. When the organizer decides to open a new area, they can use this interface to send the enabling access trigger signal.

In some embodiments, blocking access to one or more portions of the virtual event space to the plurality of avatars includes blocking access to one or more portions of the virtual event space to a subset of the plurality of avatars in accordance with a credential criterion. The term "subset" refers to a part or portion of the larger group of avatars, indicating that access restrictions may apply differently to various groups of attendees within the virtual event. Credential criterion refers to a set of requirements or qualifications that determine an avatar's eligibility to access certain areas of the virtual event space. Credentials may include factors such as attendee role, registration level, or specific permissions granted by event organizers. This feature allows for sophisticated, role-based access control within the virtual event space, enhancing security and enabling tiered event experiences. The virtual event platform may implement this by associating each avatar with a set of credentials or attributes stored in the user profile database. When an avatar attempts to access a restricted portion of the virtual space, the platform checks these credentials against the access requirements defined for that area. The credential criterion may be based on various factors such as attendee type (e.g., guest, presenter, moderator), registration level (e.g., full access, basic access), or specific permissions granted by event organizers.

Some disclosed embodiments involve, in response to receiving from the at least one virtual attendee an object interaction trigger signal, causing the specific avatar to navigate toward at least one virtual object associated with the object interaction trigger signal and augmenting the specific avatar with a directionality indicator indicative of a direction of the at least one virtual object. An "object interaction trigger signal" refers to a user-initiated command or input indicating the desire to engage with or move towards a specific virtual object (e.g., a virtual interactive object or virtual main display) within the event space. Navigate in this context refers to the automated movement or repositioning of the avatar within the virtual space, towards a designated target or location. A "directionality indicator" refers to a visual cue or marker associated with the avatar that provides information about the direction or orientation of a point of interest, in this case, the virtual object. A directionality indicator enhances user navigation and interaction within the virtual event space by providing automated assistance and visual guidance. The virtual event platform may implement this functionality through a combination of pathfinding algorithms and dynamic avatar augmentation. When a virtual attendee initiates an interaction with a virtual object (e.g., by clicking on it or selecting it from a menu), the platform generates an object interaction trigger signal. In response, the platform calculates the optimal path for the avatar to reach the selected object, considering obstacles and other avatars in the virtual space. The avatar is then automatically moved along this path, simulating natural navigation. Simultaneously, the platform augments the avatar with a visual indicator, such as an arrow or glowing trail, pointing towards the target object. This directionality indicator updates in real-time as the avatar moves, ensuring continuous guidance. For example, if an attendee in a virtual trade show wants to visit a specific product booth, they can trigger this interaction, and their avatar will automatically navigate through the virtual exhibition hall with a visible indicator guiding them to their destination.

Some disclosed embodiments involve, for each of the plurality of virtual attendees: augmenting the virtual event space presented on the display of each of the plurality of computing devices associated with the plurality of virtual attendees with a two-dimensional map of the virtual event space, wherein the two-dimensional map presented on each of the plurality of virtual attendees' display devices includes a marker of a position of the avatar associated with the virtual attendee. A "two-dimensional map" refers to a flat, graphical representation of the virtual event space layout, viewed from a top-down or isometric perspective, providing an overview of the entire event area. A "marker" refers to a visual indicator or symbol on the map that represents the current location or position of a specific element, in this case, the attendee's avatar.

This feature improves navigation and spatial awareness within complex virtual event spaces by providing attendees with a comprehensive overview. The virtual event platform may implement this by generating a simplified, 2D representation of the virtual event space layout, including key landmarks, rooms, and interactive areas. This map is then rendered as an overlay or in a dedicated section of the user interface for each attendee (e.g., a corner). The virtual event platform continuously tracks the position of each avatar within the 3D virtual space and translates this position to corresponding coordinates on the 2D map. A distinct marker, such as a colored dot or avatar icon, is then placed on each attendee's map to indicate their current location. This marker updates in real-time as the avatar moves through the virtual space. For example, in a large virtual conference center, attendees can use this map to quickly locate specific session rooms, exhibition areas, or networking spaces, with their own position clearly marked for reference. The map may also include additional features such as clickable areas for quick navigation or indicators for points of interest, further enhancing the attendee's ability to efficiently explore and interact within the virtual event space.

Some embodiments involve, in response to receiving from the specific virtual attendee an avatar interaction trigger signal, wherein the avatar interaction trigger signal designates an avatar associated with another virtual attendee: causing the specific avatar to navigate toward the avatar associated with the other virtual attendee; and augmenting the specific avatar with a directionality indicator indicative of a direction of the avatar associated with the other virtual attendee. An avatar interaction trigger signal refers to a user-initiated command or input expressing the desire to engage with or move towards another attendee's avatar within the virtual event space. Such interaction is specifically targeted at a particular participant's digital representation, as opposed to a general area or object in the virtual space. This feature facilitates social interaction and networking within the virtual event space by providing automated navigation assistance towards other attendees. The virtual event platform may implement this functionality through a combination of avatar tracking, pathfinding algorithms, and dynamic visual feedback. When a virtual attendee initiates an interaction with another avatar (e.g., by selecting them from a participant list or clicking on their avatar), the virtual event platform generates an avatar interaction trigger signal. The virtual event platform then calculates the optimal path for the initiating avatar to reach the target avatar, considering the current positions of both avatars and any obstacles in the virtual space. The initiating avatar is automatically moved along this calculated path. Simultaneously, the system augments the initiating avatar with a visual indicator, such as an arrow or directional marker, pointing towards the target avatar. This directionality indicator updates in real-time, adjusting for any movements of either avatar.

Some embodiments involve monitoring interactions between the plurality of avatars and the at least one virtual interactive object and interactions among the plurality of avatars and generating event analytics based on the monitored interactions. Monitoring refers to the continuous observation, tracking, or recording of activities, behaviors, or data within a system or environment. Monitoring may involve collecting, analyzing, and storing information about specific events or interactions as they occur. As used herein, the term "interactions" refers to any form of engagement, communication, or action between two or more entities within a system. Interactions may include direct communication, collaborative activities, or indirect influences between participants or objects in a shared environment. The term "event analytics" refers to the process of collecting, analyzing, and interpreting data related to a specific event or series of events (hereinafter also referred to as event data). Event analytics may involve various statistical methods, data visualization techniques, and machine learning algorithms to extract meaningful insights from raw event data.

The virtual event platform may implement this event analytics feature by incorporating a comprehensive data collection and analysis framework into the virtual event platform. As virtual attendees navigate the virtual event space and interact with objects and other avatars, the virtual event platform continuously logs these activities. This may include tracking avatar movements, recording object interactions (such as clicks or views), and monitoring communication patterns between attendees. The collected data is then processed and analyzed to generate meaningful event analytics.

For example, the system may use spatial tracking algorithms to create heat maps showing areas of high activity within the virtual space. These heat maps could reveal popular exhibits, networking hotspots, or underutilized areas, providing valuable insights for event organizers. The system may also analyze object interaction data to determine which virtual displays or interactive elements were most engaging, helping to refine content strategies for future events. By generating these event analytics, the system provides event organizers with a powerful tool for assessing event success, understanding attendee behavior, and making data-driven decisions for future event planning. For example, referring to FIG. 2G virtual event platform server 210 may send event analytics 254 to event host organizer computing device 230. However, the sharing of event analytics is not limited solely to the event host organizer. These analytics may also be made available to other attendees who possess the appropriate credentials or access rights. In some cases, event analytics can be provided directly to attendees themselves, either to promote transparency or to enhance their event experience. When shared with a broader audience, the analytics may be presented in a simplified or lighter version, and can optionally be anonymized to protect individual privacy.

In some embodiments, the generated event analytics includes at least one of: virtual object interaction frequencies; popular areas within the virtual event space; movement patterns; average time spent by the virtual attendees in the event space; content engagement; identified cluster of virtual attendees during the event; or influential virtual attendees.

"Virtual object interaction frequencies" refers to the number of times or the rate at which virtual attendees engage with specific digital elements within the virtual event space. This may include clicks, views, or other forms of interaction with virtual displays, booths, or interactive features.

"Popular areas within the virtual event space" refer to specific zones, rooms, or sections of the virtual event environment that attract a high volume of virtual attendee activity or interactions. These areas are identified based on metrics such as traffic, dwell time, or frequency of visits, and may indicate locations of heightened interest, engagement, or social interaction among participants.

"Movement patterns" refers to the typical or recurring paths, routes, or trajectories that avatars follow as they navigate through the virtual event space. Movement patterns may reveal common traffic flows, areas of congestion, or preferred navigation routes within the environment.

"Average time spent by virtual attendees" in the event space denotes the mean duration that attendees remain active within the virtual event environment during a given session or across the entire event. This metric provides insight into attendee engagement levels and may help organizers assess the overall appeal and effectiveness of the event space.

"Content engagement" describes the extent to which attendees interact with or consume digital materials presented within the virtual event space. This may include viewing presentations, participating in polls, downloading resources, or engaging with multimedia displays. High content engagement indicates that attendees are actively involved with the event's offerings and are finding value in the provided materials.

"Identified cluster of virtual attendees" refers to groups or gatherings of avatars that form within the virtual space, often indicating areas of shared interest or engagement. Clusters may be temporary or persistent throughout the event and may provide insights into attendee preferences and social dynamics.

"Influential virtual attendees" refers to individuals whose actions, presence, or interactions have a notable impact on the behavior or engagement of other participants within the virtual event space. These attendees may be identified through metrics such as the number of connections made, frequency of interactions, or their role in initiating discussions/chats and forming clusters. Recognizing influential attendees may help organizers understand social dynamics and leverage key participants to enhance event outcomes.

The system may implement these various types of event analytics through a combination of data collection, processing, and visualization techniques. For example, for virtual object interaction frequencies, the virtual event platform may maintain counters for each interactive element, incrementing them whenever an avatar engages with the object. This data may be aggregated and presented as bar charts or heat maps overlaid on a map of the virtual space. In another example, content engagement may be measured by tracking time spent viewing specific content, interaction rates with multimedia elements, or participation in interactive sessions. These analytics provide event organizers with a comprehensive view of attendee behavior and engagement, allowing for data-driven improvements in event design, content curation, and networking facilitation.

In some embodiments, generating event analytics based on the monitored interactions further comprises constructing a time-dependent interaction graph that represents interactions among the plurality of avatars and the at least one virtual interactive object over discrete time intervals during the virtual event.

A time-dependent interaction graph refers to a dynamic representation of relationships and interactions that evolves over time. In this context, such a graph visualizes how connections between avatars and objects change throughout the duration of the virtual event, illustrating the various engagements and connections occurring within the virtual event space. Discrete time intervals refer to specific, non-continuous periods or segments of time. In the context of event analytics, these intervals may represent regular time slots (e.g., every 5 minutes) or event-specific phases (e.g., opening session, breakout periods, networking time).

The virtual event platform may implement this feature by developing a sophisticated graph-based analytics engine. As the virtual event progresses, the virtual event platform continuously logs interaction data, including avatar-to-avatar communications, avatar movements, and engagements with virtual objects. At predefined time intervals, the virtual event platform processes this data to construct a graph representation. In this graph, nodes may represent avatars and virtual objects, while edges represent interactions or connections between them. The weight or properties of these edges may vary based on the type and intensity of interaction. For example, a brief conversation might be represented by a thin edge, while a lengthy engagement with an interactive display could be shown as a thicker edge.

The virtual event platform may use a sliding window approach to construct these graphs at regular intervals, allowing for the observation of how interaction patterns evolve over time. This could reveal, for instance, how networking dynamics change from the beginning to the end of an event, or how attention shifts between different virtual exhibits or presentations throughout the day. Visualization tools may be employed to render these time-dependent graphs in an intuitive format. For example, the virtual event platform may create an animated graph that shows the ebb and flow of connections as the event progresses. By constructing and analyzing these time-dependent interaction graphs, event organizers may gain deep insights into the dynamics of their virtual events. This may help in identifying peak engagement times, understanding how different event elements contribute to overall interaction, and recognizing patterns that could inform the structure and timing of future events.

In some embodiments, generating event analytics further comprises performing a semantic analysis of chatroom communications and monitored interactions to determine engagement levels with respect to one or more event subjects presented during the virtual event. Semantic analysis refers to the process of interpreting the meaning and context of text or other forms of communication. In natural language processing, semantic analysis involves understanding the relationships between words, phrases, and concepts to extract meaningful insights from textual data. "Chatroom communications" refers to any communication, and in particular text-based messages exchanged between participants in a virtual discussion space. These communications may include public group chats, private messages, or topic-specific discussion threads within the virtual event platform. "Engagement levels" refers to the degree of interest, participation, or interaction that attendees demonstrate towards specific aspects of the virtual event. Engagement levels may be quantified through various metrics such as time spent, interaction frequency, or sentiment expressed in communications.

The virtual event platform may implement this feature by integrating natural language processing (NLP) and machine learning algorithms into its analytics pipeline. As virtual attendees engage in chatroom discussions and interact with event content, the virtual event platform collects and processes this textual data in real-time. The semantic analysis may involve several steps, such as cleaning and normalizing messages, identifying key topics and frequently used terms, applying sentiment analysis to gauge the emotional tone of communications, identifying mentions of specific speakers, presentations, or products, and/or identifying frequently used terms or phrases, potentially revealing trending topics or areas of high interest. By combining this semantic analysis with data from monitored interactions (such as time spent viewing certain content or participation in polls), the virtual event platform may generate a comprehensive picture of engagement levels for different event subjects. For example, it might reveal that a particular presentation topic not only had high viewership but also sparked extensive positive discussion in the chatrooms. This analysis may be presented through interactive dashboards, allowing event organizers to explore engagement levels across different subjects, time periods, or attendee segments. Such insights may be invaluable for refining content strategies, identifying successful presentation formats, and understanding which topics resonate most with the virtual audience.

Some disclosed embodiments involve separately storing analytics related to private meetings occurring within the virtual event space, wherein the separately stored analytics include interaction patterns, attendance, and engagement metrics specific to the private meetings. "Private meetings" refers to exclusive or restricted gatherings within the virtual event space that are accessible only to a subset of attendees. Private meetings may include one-on-one conversations, small group discussions, or invitation-only sessions within the larger virtual event context. "Interaction patterns" in this context refer to the ways in which participants engage with each other and with content during private meetings. This may include communication frequency, types of interactions, or the flow of discussions. "Engagement metrics" refers to quantifiable measures that indicate the level of participant involvement and interest during private meetings. These metrics may include factors such as active participation time, response rates to questions or polls, or the extent of content sharing.

The virtual event platform may implement this feature by creating a separate, secure analytics module specifically designed for private meetings within the virtual event platform. When a private meeting is initiated, the virtual event platform generates a unique identifier for that meeting and establishes a dedicated data collection pipeline. The separately stored analytics may be presented through specialized reporting interfaces, allowing meeting organizers or authorized individuals to gain insights into the effectiveness of their private sessions. By providing these detailed, segregated analytics for private meetings, the virtual event platform offers valuable insights for improving targeted interactions, assessing the success of exclusive sessions, and refining strategies for future private engagements within virtual events. This feature is particularly useful for events that include elements such as VIP roundtables, one-on-one networking sessions, or confidential business meetings alongside more public components.

In some embodiments, generating event analytics further comprises generating personalized summaries of the virtual event personalized to specific attendees and transmitting the personalized summaries to the specific attendees after the virtual event ends. A personalized summary refers to a tailored report that highlights the aspects of the virtual event most relevant to a specific attendee. This summary is generated by analyzing the attendees' unique interactions and engagement throughout the event, such as sessions attended, time spent in various areas, participation in chatrooms, responses to polls, and engagement with digital content. By focusing on each attendee's experience, the virtual event platform ensures that the summary reflects the attendee's personal journey and interests during the event. Transmitting, in this context, means delivering the personalized summary to the attendee after the event concludes. Transmitting may be accomplished through various channels, such as email, in-app notifications, or direct access via the event platform's dashboard. For example, after a virtual conference, an attendee might receive a summary that lists the sessions they attended, the amount of time spent in different virtual spaces, their contributions to chat discussions, and any resources they downloaded. The summary could also highlight topics they engaged with most, the feedback they provided, and connections made with other participants. By providing these individualized reports, the virtual event platform helps attendees reflect on their experience, revisit key content, and identify areas of interest for future events. This approach not only enhances attendee engagement but also adds value by making it easier for participants to review their involvement and stay connected with the event's content.

In some embodiments, generating event analytics further comprises offering at least some of the plurality of virtual attendees who join the virtual event late at least one of a summary of missed portions at a beginning of the virtual event or a recording of the missed portion at the beginning of the virtual event. In this context, a summary refers to a concise overview of the key topics, activities, or discussions that took place during the portion of the event the attendee missed. A recording, on the other hand, is a digital capture of the actual event proceedings, allowing latecomers to view the missed segment in its entirety. By providing either a summary or a recording of the initial portion of the event, the virtual event platform ensures that late-joining attendees may quickly catch up and become fully engaged with the ongoing activities. For example, if an attendee logs in after the event has started, the platform may present them with a written summary highlighting the main presentations, announcements, and interactive sessions that occurred before their arrival. Alternatively, the attendee might be given access to a video or audio recording of the missed segment, enabling them to review the content at their own pace. This approach helps maintain continuity for all participants and supports a more inclusive event experience, regardless of when attendees join.

Monday Mansion AI Driven Asset to Mansion [Header to be Deleted when Filing]

Embodiments consistent with the present disclosure provide systems, methods, and devices for configuring a virtual event space using artificial intelligence. Consistent with other disclosed embodiments, non-transitory computer-readable storage media may store program instructions, which are executed by at least one processing device and perform any of the methods described herein.

Some disclosed embodiments may include a non-transitory computer-readable medium containing instructions that, when executed by at least one processor, cause the at least one processor to perform operations for configuring a virtual event space using artificial intelligence (AI). The operations include receiving from an event host organizer, an input including event content data. The operations further include providing the received input into at least one AI agent configured to access a virtual event space requirement schema including definitions and a list of functional building blocks for the virtual event space. The AI agent is also configured to parse the received input to identify assets for the virtual event space, wherein parsing the received input includes extracting discrete portions of the event content data based on the definitions and the list of functional building blocks. The AI agent is further configured to map one or more of the identified assets with respective functional building blocks from the list of functional building blocks to enable rendering of the identified assets within the virtual event space. Additionally, the AI agent is configured to select a virtual event space template based on the virtual event space requirement schema, and generate and output virtual event space data for the virtual event space by adding mapped functional building blocks and assets to the selected virtual event space template. The operations also include compiling and presenting the virtual event space based on the virtual event space data outputted by the at least one AI agent, wherein compiling and presenting are configured to enable access to the identified assets by virtual attendees within the virtual event space.

The field of virtual event spaces has experienced significant growth in recent years, particularly in response to the increasing demand for remote collaboration and digital engagement. Despite advancements in virtual meeting platforms, current solutions often lack the immersive and interactive qualities necessary for truly engaging virtual events. Many existing systems provide limited customization options, resulting in generic and uninspiring virtual environments that fail to capture the essence of in-person gatherings. The need for more sophisticated and tailored virtual event spaces is driven by the growing recognition that effective digital experiences require more than just video conferencing capabilities. By addressing these limitations, the suggested system aims to revolutionize the way organizations create and host virtual events, offering a more dynamic, personalized, and content-focused approach to digital gatherings. The present disclosure seeks to enhance the virtual event experience by leveraging artificial intelligence to streamline the creation process and deliver more engaging, interactive, and customizable virtual spaces.

Some disclosed embodiments involve configuring a virtual event space using artificial intelligence. As used herein "configuring" refers to the process of arranging, setting up, or customizing components, settings, or parameters of a system or environment to achieve a desired functionality or appearance. For example, configuring may involve selecting templates, adding interactive elements, or adjusting layout and design features. As mentioned elsewhere in this disclosure, a "virtual event space" refers to a digital environment designed to host and facilitate online gatherings, meetings, conferences, or other interactive experiences. A virtual event space may include features such as 3D rooms, avatars, content sharing capabilities, and communication tools to simulate aspects of in-person events in a digital format.

"Artificial intelligence" or "AI" refers to computer systems or algorithms capable of performing tasks that typically require human intelligence, such as visual perception, speech recognition, decision-making, and language translation. AI agent s may use machine learning, natural language processing, or other advanced computational techniques to analyze data, recognize patterns, and make intelligent decisions. In the context of the present disclosure, "configuring a virtual event space using artificial intelligence" refers to the process of automatically designing, customizing, and setting up a digital environment for hosting online events by leveraging AI technologies. This may involve using AI to analyze input data, select appropriate templates, arrange interactive elements, and optimize the layout based on event requirements and user preferences. By way of a non-limiting example, as described in detail below, an AI-driven system may receive event content data from an organizer, analyze the data to identify assets and requirements, select a suitable virtual space template, and automatically generate a fully functional 3D environment tailored to the specific needs of the event.

FIG. 9 is a flowchart of an exemplary process 900 for configuring a virtual event space using artificial intelligence, consistent with some of the disclosed embodiments. Process 900 is discussed herein for explanatory purposes and is not intended to be limiting. In some embodiments, steps of process 900 may be changed, modified, substituted, or rearranged, consistent with the present disclosure. Process 900 may be implemented using one or more components of virtual event platform server 210 (discussed in FIG. 2A) or computing device 100 (discussed in FIG. 1A) in conjunction with at least one AI agent which as further described below may be internal or external to the virtual event platform. Some disclosed embodiments may include at least one processor that may be configured to execute stored instructions to perform operations configuring a virtual event space using artificial intelligence. As shown in FIG. 3, process 300 may include steps 902, 904, 906a-e (performed by at least one AI agent), and 908 discussed in further detail below.

Some disclosed embodiments involve receiving from an event host organizer, an input including event content data. "Receiving" refers to the act of obtaining, acquiring, or accepting data, information, or signals from an external source. For example, receiving may involve capturing user input, accepting data transmissions, or collecting information through various interfaces or communication channels. As described elsewhere in this disclosure, an "event host organizer" refers to an individual, group, or entity responsible for planning, coordinating, and managing a virtual event. For example, an event host organizer may be a company representative, conference planner, or educational institution administrator tasked with creating and overseeing a digital gathering. An "input" refers to any form of data, information, or instructions provided to a system or process. For example, input may include text documents, media files, user selections, or structured data sets used to define or configure an event. The term "event content data" refers to information, assets, or materials related to the subject matter, structure, or presentation of a virtual event. For example, event content data may include presentation slides, speaker information, schedules, multimedia resources, or interactive elements intended for use during the event.

In the context of the present disclosure, "receiving from an event host organizer" refers to the system's action of accepting or obtaining information directly from the individual or entity responsible for creating and managing the virtual event. This may involve various methods of data transfer, such as file uploads, form submissions, or API integrations. For example, referring to FIG. 2B, virtual event platform server 210 may receive event content data from event host organizer computing device 230, i.e., specific information package provided by the event host organizer, which contains the necessary elements to populate and structure the virtual event space. This input serves as the foundation for the AI-driven process of configuring the virtual environment. Process 900 includes a step 902 of receiving from an event host organizer, an input including event content data, as illustrated in FIG. 9.

In the context of configuring a virtual event space using artificial intelligence, receiving input from an event host organizer is the first step in the automated process. This input serves as the raw material from which the AI agent will extract, analyze, and organize information to create a tailored virtual environment. The event content data may come in various forms, such as documents, media files, or structured data, each containing valuable information about the event's purpose, structure, and desired outcomes.

By way of a non-limiting example, as described in detail below, an event host organizer might upload a presentation file, a spreadsheet containing speaker information, and a folder of brand assets as input. The AI agent would then process this event content data to identify key elements, such as session topics, speaker profiles, and visual themes, which will be used to configure the virtual event space.

In some embodiments, the event content data includes at least one of a data source or information indicative of the event host organizer intent for the virtual event. A "data source" refers to any repository, file, document, or collection of information that contains content relevant to the virtual event. In some embodiments, the data source includes at least one of a webpage URL, a text document, a folder of assets, a presentation file, a spreadsheet, an image, or a video file. Further examples may include audio file (e.g. MP3, WAV), PDF document, archive file (e.g. ZIP, RAR), Database file (e.g. SQL, MDB), Code file (e.g. Python .py, Java .java), Executable file (e.g. ,exe, .app), Vector graphic (e.g. SVG), 3D model file (e.g. .obj, .stl), E-book (e.g. EPUB, MOBI), Script file (e.g. shell .sh, PowerShell .ps1), Configuration file (e.g. .json, .yaml), Font file (e.g. .ttf, .otf), Compressed image format (e.g. WebP), Presentation template (e.g. .potx), Spreadsheet template (e.g. .xltx).

As used herein, "information indicative of the event host organizer intent" refers to any data, instructions, or specifications provided by the event organizer that express the desired purpose, theme, or goals for the virtual event. For example, this information may include keywords, event categories, or specific requirements that help guide the AI in creating an appropriate virtual environment.

Event content data may therefore include a data source, information indicative of intent, or both, providing flexibility in how the virtual event space can be configured. As explained further below, this allows the AI agent to work with various input types, adapting its approach based on the available information. When the event content data includes a data source, the AI agent can analyze the provided content to infer the event's purpose and extract relevant assets. For example, if the data source is a product launch webpage, the AI agent might identify key product features, images, and presentation materials to incorporate into the virtual event space. On the other hand, when the event content data includes information indicative of the organizer's intent, such as specifying a "virtual job fair," the AI agent can use this guidance to select appropriate templates and functional building blocks, even if detailed content is not provided. In cases where both a data source and intent information are provided, the AI agent can leverage this combination to create a more tailored and comprehensive virtual event space. For instance, if the intent is specified as "interactive product demonstration" and a product catalog is provided as the data source, the AI agent can create a virtual space with demonstration booths featuring 3D models of the products, interactive displays showing product details, and areas for virtual attendees to engage with product experts.

Figure 10:
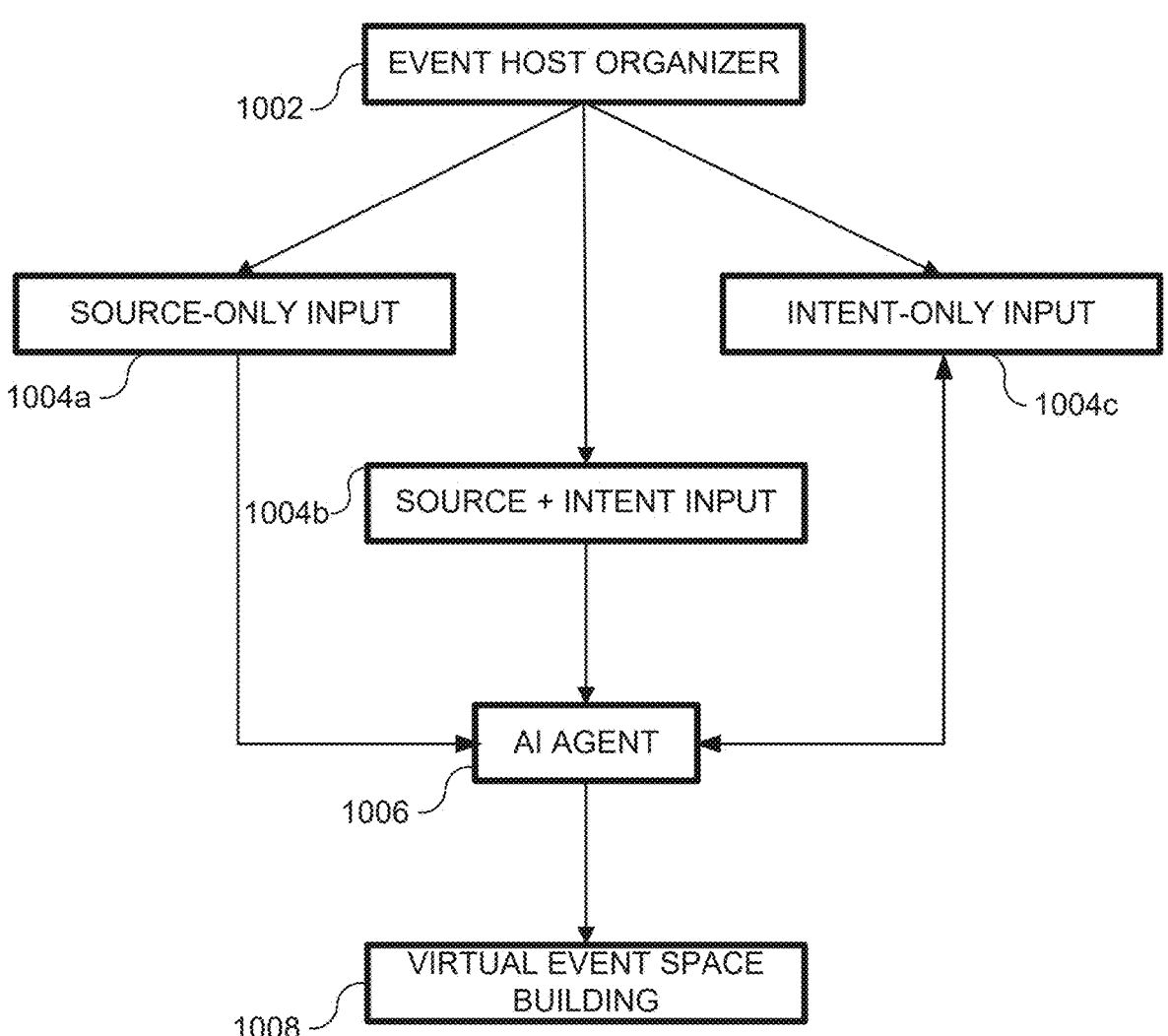
FIG. 10 is a flow chart of an example process for AI agent operation, consistent with some embodiments of the present disclosure.

Accordingly, different type/category of event content data may be received from an event host organizer. For example, as shown in FIG. 10, an event host organizer may provide different sort of inputs, including but not limited to:

(1) Source-Only 1004*a*: The user provides a data source (e.g., a webpage URL, a PDF document, or a folder of assets). The AI agent 1006 analyzes the source, infers the intent, and builds the virtual event space 1008;

(2) Source+Intent 1004*b*: The user provides both a data source and a specific user intent (e.g., "Product Launch," "Internal Training," "Recruiting Fair"). The intent acts as a technical constraint, guiding the AI agent generation and layout logic;

(3) Intent-Only 1004*c*: The user provides an intent and a text prompt, and the AI agent 1006 then uses generative models/web search to create fitting assets and the virtual event space from scratch 1008.

Some disclosed embodiments involve providing the received input into at least one AI agent. As used herein, "providing" refers to the act of supplying, furnishing, or making available data, information, or resources to a system, process, or entity. For example, providing may involve transferring data between components, feeding input into an algorithm, or presenting information to a user interface. The term "AI agent" refers to a software entity or system that utilizes artificial intelligence techniques to perform tasks, make decisions, or process information autonomously. An AI agent may employ various machine learning algorithms, natural language processing, computer vision, or other AI technologies to analyze data, recognize patterns, and generate outputs.

In this context, the phrase "providing the received input into at least one AI agent" refers to the process of transferring or making available the event content data received from the event host organizer to one or more AI-powered software components for further processing and analysis. This step serves as a link between the user input and the AI-driven configuration of the virtual event space. The provision of input to the AI agent initiates a series of automated processes designed to interpret, analyze, and transform the raw event content data into a structured format suitable for generating a virtual event space. By leveraging artificial intelligence, the virtual event platform can efficiently process complex and varied inputs, extracting relevant information and making intelligent decisions about how to configure the virtual environment. Process 900 includes a step 904 of providing the received input into at least one AI agent, as illustrated in FIG. 9.

In some embodiments, the AI agent (e.g., AI agent 1006) is local to the virtual event platform and operates within the platform's infrastructure. For example, the AI agent may be hosted on the virtual event platform server 210 as illustrated in FIG. 2A, enabling direct integration with platform services and reducing latency for real-time interactions. This local deployment can facilitate immediate access to event data and user context, thereby improving responsiveness and personalization. Alternatively, in some embodiments, the AI agent may be external to the virtual event platform and provided by a third-party service. For instance, an external AI agent provider, such as AI agent provider 160 shown in FIG. 1B, may deliver advanced capabilities through cloud-based services or application programming interfaces (APIs). This configuration allows the virtual event platform to leverage specialized AI models and external resources without requiring local installation, offering flexibility and scalability for diverse use cases. In some embodiments, hybrid arrangements may be employed, wherein both local and external AI agents collaborate to optimize performance, enhance feature richness, and ensure redundancy. Such hybrid designs can balance the benefits of on-premises integration with the adaptability of external AI services.

In some implementations, a single AI agent may handle all aspects of input processing and virtual space configuration. However, to prevent context window overload and optimize performance, the virtual event space may employ multiple specialized AI agents, each responsible for specific tasks. For example, referring to FIG. 11, when an input is received 1102 it may be fed to an orchestrator AI 1004 configure to coordinate the efforts of several agents, such as a "Scraper Agent" 1104*a* for deconstructing input data, a "Curriculum Agent" 1104*b* for generating event structures, a "Generative Media Agent" 1104*c* for creating assets, and/or a "Spatial Layout Agent" 1104*d* for 3D environment generation.

By way of a non-limiting example, as described in detail below, when an event host organizer uploads a presentation file, speaker information spreadsheet, and brand asset folder, the virtual event platform provides this diverse input to the AI agent(s). The agent(s) then process the data, identifying key elements such as session topics, speaker profiles, and visual themes, which form the foundation for configuring the virtual event space.

In some embodiments, the at least one AI agent is configured to access a virtual event space requirement schema including definitions and a list of functional building blocks for the virtual event space. "Accessing" refers to the act of retrieving, obtaining, or interacting with data, information, or resources stored in a system, database, or memory. For example, accessing may involve reading from a file, querying a database, or retrieving information from a data structure. A "virtual event space requirement schema" refers to a structured framework or blueprint that defines the components, rules, and specifications required for creating a virtual event space. For example, a virtual event space requirement schema may include data structures, asset definitions, layout guidelines, and interaction rules necessary for generating a cohesive and functional virtual environment. In some embodiments, a virtual event space requirement schema may be a core data structure or a technical artifact (e.g., a JSON, XML, or YAML file) that defines (1) required asset types (e.g., main_video_asset), (2) required functional blocks (e.g., main_stage_block), (3) layout rules (e.g., place: 'stage_front'), and (4) aesthetic parameters agent.

"Definitions" refers to formal descriptions or explanations of terms, concepts, or elements within a specific context. For example, definitions in a virtual event space requirement schema may include detailed specifications for various components, such as asset types, functional blocks, or user interaction models. "Functional building blocks" refers to modular components or units that serve specific purposes within a larger system or structure. For example, functional building blocks in a virtual event space may include interactive objects, content display areas, or communication tools that can be combined to create a complete virtual environment.

The term "list of functional building blocks" refers to a comprehensive inventory or catalog of the available modular components that can be used to construct a virtual event space. For example, a list of functional building blocks may include items such as virtual stages, presentation screens, chat interfaces, or avatar customization options.

In this context, accessing a virtual event space requirement schema including definitions and a list of functional building blocks for the virtual event space refers to the process of retrieving and utilizing a structured framework that contains essential information for creating a virtual event space. This schema serves as a blueprint, providing definitions for various components and a catalog of functional building blocks that can be used to construct the virtual environment. Process 900 includes a step 906a of providing the received input into at least one AI agent configured to access a virtual event space requirement schema including definitions and a list of functional building blocks for the virtual event space, as illustrated in FIG. 9.

By retrieving the virtual event space requirement schema, the AI agent(s) can ensure that all necessary components are considered and properly implemented when generating the virtual event space. The schema provides a standardized approach to virtual space creation, ensuring consistency and completeness across different events. The virtual event space requirement schema may be stored in various formats, such as JSON, XML, or YAML, allowing for easy parsing and manipulation by the AI agent. By accessing this schema, the AI agent(s) can make informed decisions about how to structure and populate the virtual event space based on the event content data provided by the organizer.

By way of a non-limiting example, as described in detail below, when configuring a virtual event space for a product launch, the AI agent may access a virtual event space requirement schema that includes definitions for various presentation areas, interactive product demonstration zones, and networking spaces. The schema would also provide a list of functional building blocks such as virtual stages, product showcase pedestals, and chat interfaces, along with rules for their placement and interaction within the virtual environment.

In some example embodiments, the AI agent accesses a virtual event space requirement schema comprising predefined definitions and a catalogue of functional building blocks. This schema establishes the structural and operational parameters for the virtual environment, ensuring that each identified asset is mapped to an appropriate component and that the resulting configuration adheres to consistent design and functional standards.

In some embodiments, the list of functional building blocks includes one or more of virtual interactive objects, required assets, layout rules, or aesthetic parameters.

As described elsewhere in this disclosure, "virtual interactive objects" refers to digital elements within the virtual event space that virtual attendees can engage with or manipulate. Examples of virtual interactive objects are provided elsewhere in this disclosure, including trivia table 430-1, kiosk 430-2, and image gallery 430-3 shown in FIG. 4A. The term "required assets" refers to essential components or content elements that are required to be present in the virtual event space to fulfill its intended purpose. For example, required assets for a product launch event might include product images, specification sheets, and promotional videos. "Layout rules" refers to guidelines or specifications that determine how different elements should be arranged or positioned within the virtual event space. For example, layout rules might dictate the placement of main stages, the organization of exhibition areas, or the flow of attendee movement through the space. "Aesthetic parameters" refers to design-related specifications that influence the visual appearance and atmosphere of the virtual event space. For example, aesthetic parameters might include color schemes, lighting effects, texture styles, or thematic elements that create a cohesive look and feel for the event.

The composition of the list of functional building blocks may provide a comprehensive framework for creating diverse and effective virtual event spaces. By including virtual interactive objects, required assets, layout rules, and aesthetic parameters, the virtual event platform via the at least on AI agent can generate environments that are not only functional but also engaging, well-organized, and visually appealing. The inclusion of these elements allows for a more nuanced and tailored approach to virtual event space creation, ensuring that each space is optimized for its specific purpose and audience.

Virtual interactive objects play role in creating an immersive and engaging experience within the virtual event space. For instance, in a virtual trade show, these objects might include interactive product displays that attendees can manipulate to view different features, virtual business card exchangers for networking, or interactive polls and quizzes to gather attendee feedback. By incorporating such objects, the virtual event space becomes more dynamic and participatory, encouraging attendees to actively explore and engage with the content.

The specification of required assets ensures that all essential content for the event is accounted for in the virtual space. This might involve defining that a virtual conference must include a main stage for keynote presentations, breakout rooms for smaller sessions, and a resource center for downloadable materials. By explicitly listing these required assets, the system can ensure that no critical elements are overlooked in the creation process, maintaining the integrity and completeness of the virtual event experience.

Layout rules provide structure and coherence to the virtual event space, guiding the overall organization and flow of the environment. These rules might dictate how different zones within the space are connected, how attendees navigate between areas, or how information is presented hierarchically. For example, layout rules for a virtual museum exhibition might specify that artwork should be displayed along virtual walls with appropriate spacing and lighting, with information panels positioned nearby for easy access. This structured approach helps create a logical and intuitive layout that enhances the user experience and facilitates efficient navigation through the virtual space.

Aesthetic parameters allow for the creation of visually cohesive and thematically appropriate virtual environments. These parameters might be used to ensure that the virtual space aligns with a company's branding guidelines, matches the tone of the event (e.g., professional, playful, futuristic), or creates a specific atmosphere that complements the event's purpose. For instance, a virtual job fair might use a clean, modern aesthetic with a professional color scheme, while a virtual music festival could employ vibrant colors, dynamic lighting effects, and thematic decorations to create an energetic atmosphere.

By incorporating these diverse functional building blocks, the AI-driven system can create virtual event spaces that are not only technically sound but also visually appealing and user-friendly. This comprehensive approach ensures that the resulting virtual environments are well-suited to host a wide range of events, from corporate conferences and product launches to educational seminars and entertainment experiences.

In some embodiments, accessing the virtual event space requirement schema includes selecting the virtual event space requirements schema from a library based on the event content data. As used herein a library refers to a collection or repository of pre-defined templates, schemas, or resources that can be accessed and utilized for various purposes. For example, a library in this context might contain multiple virtual event space requirement schemas tailored for different types of events or industries. "Selecting" refers to the process of choosing a specific item or option from a set of alternatives based on certain criteria or requirements. For example, selecting might involve evaluating multiple schemas and determining which one best fits the needs of the current virtual event. Such selection process is based on the event content data, meaning based on the information provided in the input as criteria for making decisions or choices in the virtual event space creation process. For example, keywords, themes, or specific content types in the event data might influence the selection of an appropriate schema from the library. By selecting a schema from a library based on the event content data, the at least one AI agent can tailor its approach to different types of events, industries, or specific requirements more effectively.

The use of a library of schemas allows for greater flexibility and specialization in creating virtual event spaces. For instance, the library might contain schemas optimized for product launches, academic conferences, job fairs, or music festivals. Each schema could define specific functional building blocks, layout rules, and interaction models that are particularly suited to that type of event. Selecting the appropriate schema based on the event content data involves analyzing the input to identify key characteristics of the event. For example, if the event content data includes terms like "keynote speaker," "breakout sessions," and "networking opportunities," the AI agent might select a schema designed for professional conferences. Alternatively, if the content data is rich in product specifications and demonstration videos, a schema optimized for product showcases might be chosen. This approach allows the AI agent to make informed decisions about the structure and features of the virtual event space from the outset. For instance, a schema for a virtual job fair might prioritize one-on-one meeting spaces and resume upload functionality, while a schema for a music festival might focus on virtual stages and interactive fan engagement areas.

By selecting an appropriate schema, the AI agent can streamline the process of configuring the virtual event space, ensuring that it includes all necessary elements for the specific type of event. This not only improves the efficiency of the creation process but also enhances the relevance and effectiveness of the resulting virtual environment for both event organizers and attendees. Furthermore, the use of a schema library allows for continuous improvement and specialization of virtual event spaces. As new types of events emerge or best practices evolve, new schemas can be added to the library, ensuring that the system remains adaptable and up-to-date in meeting diverse event needs.

In some embodiments, the at least one AI agent is configured to parse the received input to identify assets for the virtual event space, wherein parsing the received input includes extracting discrete portions of the event content data based on the definitions and the list of functional building blocks. "Parsing" refers to the process of analyzing and breaking down a set of data or information into its component parts to extract meaning, structure, or relevant elements. For example, parsing may involve identifying and categorizing different types of content within a document, separating text from images in a webpage, or recognizing patterns in a data stream. The term "identify assets" refers to the act of recognizing, locating, and cataloging specific elements, resources, or pieces of content that can be used or displayed within a virtual environment. For example, identifying assets may include finding images, videos, text blocks, or interactive elements within the provided event content data. "Discrete portions" refer to distinct, separable, or individual parts or segments of a larger whole. For example, discrete portions of event content data (i.e., information, materials, or resources provided by the event host organizer that form the basis for creating the virtual event space) may include individual paragraphs of text, separate image files, or standalone video clips.

In this context, "parsing the received input to identify assets for the virtual event space" refers to the process of analyzing and breaking down the event content data provided by the event host organizer to recognize and extract specific elements that can be used as assets within the virtual environment. This parsing process involves systematically examining the input data to locate, isolate and retrieve specific, individual elements or segments from the larger body of event content data. This parsing and extraction process allows the at least one AI agent to separate and organize different types of content for use within the virtual event space. Process 900 includes a step 906*b* of providing the received input into at least one AI agent configured to parse the received input to identify assets for the virtual event space, wherein parsing the received input includes extracting discrete portions of the event content data based on the definitions and the list of functional building blocks, as illustrated in FIG. 9.

Consistent with the disclosed embodiment the parsing and extraction process is guided by predetermined criteria and structures defined in the virtual event space requirement schema. The definitions provide context and parameters for identifying relevant content, while the list of functional building blocks serves as a template for organizing and categorizing the extracted assets. By parsing the received input and extracting discrete portions of the event content data, the AI agent can efficiently identify and organize the necessary assets for creating a comprehensive and well-structured virtual event space. This process ensures that all relevant content provided by the event host organizer is properly utilized and integrated into the virtual environment.

By way of a non-limiting example, as described in detail below, when parsing the received input for a product launch event, the AI agent may analyze a presentation file to extract individual slides as discrete assets, identify speaker information from a spreadsheet to create virtual presenter profiles, and locate product images and videos to be used in interactive demonstration areas within the virtual event space. The parsing process would be guided by the definitions and functional building blocks specified in the virtual event space requirement schema, ensuring that each extracted asset is appropriately categorized and prepared for integration into the virtual environment. In some embodiments, the AI agent parses the received input to identify assets for inclusion within the virtual event space. Parsing includes extracting discrete portions of the event content data in accordance with predefined definitions and the catalogue of functional building blocks, thereby enabling accurate classification and subsequent mapping of each asset to its corresponding component within the virtual environment.

In some embodiments, parsing the received input further includes parsing a native format of the data source to extract and classify one or more raw data elements distinct from the formatting data of the native format to be used as assets for the virtual event space. Native format refers to the original file format or structure in which the data source is provided. For example, the native format of a spreadsheet might be .xlsx for Microsoft Excel files, or .csv for comma-separated values files. Raw data elements refer to the core content or information contained within a file, separate from any formatting or structural elements. For example, raw data elements might include text content, numerical values, or embedded media files. Formatting data refers to the information within a file that determines how the content is presented or structured, rather than the content itself. For example, formatting data might include font styles, cell alignments in a spreadsheet, or slide layouts in a presentation.

By extracting raw data elements from the native format of the data source, the at least one AI agent can focus on the essential content while disregarding unnecessary formatting information. Parsing the native format allows the AI to handle a wide range of file types efficiently. For instance, when processing a PowerPoint presentation, the AI can extract text, images, and charts from individual slides without being constrained by the slide layout or transitions. This extracted content can then be repurposed and arranged within the virtual event space in ways that may differ from the original presentation structure. The classification of raw data elements is beneficial for organizing and utilizing the extracted information effectively. For example, when parsing a webpage, the AI might classify text blocks as headings, paragraphs, or list items, while also identifying and categorizing images, videos, and interactive elements. This classification helps the AI agent understand the relative importance and relationships between different pieces of content, informing decisions about how to represent them in the virtual event space.

By distinguishing raw data elements from formatting data, the at least one AI agent can create a more flexible and adaptable virtual environment. For instance, the color scheme or font choices from the original data source might be used as inspiration for the virtual space's aesthetic, but the AI agent has the freedom to arrange and present the content in ways that are optimized for the 3D environment and user interaction.

In some embodiments, the raw data element includes one or more of media, text blocks, and links. "Media" refers to various forms of digital content that convey information through visual, auditory, or interactive means. For example, media may include images, videos, audio files, animations, or 3D models. "Text blocks" refers to coherent segments of written content that form distinct units of information. For example, text blocks may include paragraphs, headings, bullet points, or captions. "Links" refers to hypertext references or connections that direct users to other digital resources or locations. For example, links may include URLs pointing to external websites, internal references to other parts of a document, or connections between different elements within the virtual event space.

The inclusion of media as a raw data element allows the AI agent to identify and extract visual and auditory content that can significantly enhance the immersive quality of the virtual event space. For instance, images extracted from a product brochure could be used to create virtual displays or 3D models within the environment. Videos could be incorporated as playable content on virtual screens or as part of interactive presentations.

Text blocks, as raw data elements, provide the core informational content for the virtual event. The AI agent can analyze these text blocks to determine their relevance and importance, then decide how best to present them within the virtual space. For example, key points from a text block might be displayed as floating text in a 3D environment, or used to generate interactive information panels that attendees can explore.

Links, when extracted as raw data elements, offer opportunities for creating interactive and interconnected experiences within the virtual event space. The AI agent might use these links to generate navigation systems, create virtual information kiosks, or establish connections between different areas of the virtual environment. For instance, a link to a speaker's biography in the original data source could be transformed into an interactive hologram of the speaker within the virtual space, providing attendees with an engaging way to access that information. By parsing and utilizing these diverse raw data elements, the AI agent can create a rich, informative, and interactive virtual event space that effectively represents the content provided in the original data source. This approach allows for a more dynamic and engaging presentation of information compared to traditional 2D formats, taking full advantage of the 3D virtual environment's capabilities.

In some embodiments, parsing the received input further includes: comparing the identified assets with the list of functional building blocks; identifying any missing assets with respect to the list of functional building blocks; and crawling resources associated with the event content data to find additional assets. "Comparing" refers to the process of examining two or more items to identify similarities, differences, or relationships between them. For example, comparing might involve matching identified assets against a predefined list of required elements for a virtual event space. "Identifying any missing assets" refers to the process of determining which required or desirable elements are not present in the initially extracted set of assets. For example, this might involve recognizing that a virtual event space template requires a logo asset, but none has been identified in the initial parsing of the input. "Crawling resources"

refers to the automated process of systematically browsing and analyzing linked or associated digital content to gather additional information. For example, crawling resources might involve following hyperlinks from a provided webpage to explore related pages or accessing linked documents mentioned in the initial data source. By comparing identified assets with the list of functional building blocks, the AI agent can determine if all necessary components for creating a comprehensive virtual environment are available.

The process of identifying missing assets is beneficial for maintaining the quality and functionality of the virtual event space. For instance, if the list of functional building blocks includes a "welcome video" element, but no video asset has been identified in the initial parsing, the at least one AI agent can flag this as a missing asset. This allows the AI agent to either prompt the event organizer for the missing content or take steps to generate or find a suitable alternative. Crawling resources associated with the event content data provides a method for autonomously filling gaps in the asset collection. This may be particularly useful when working with web-based content or interconnected documents. For example, if the initial data source is a webpage about a product launch event, the AI agent might crawl linked pages to find additional product images, technical specifications, or related video content that wasn't present on the main page. This crawling process can also help in enriching the virtual event space with relevant, up-to-date information. For instance, if the event is related to a company's annual conference, crawling the company's website or social media profiles might reveal recent news, speaker updates, or additional session information that can be incorporated into the virtual environment. By implementing this comprehensive parsing approach, the AI agent can create a more complete and engaging virtual event space. It ensures that all necessary functional elements are accounted for, while also potentially discovering additional valuable content that enhances the overall experience for virtual attendees. This method allows for a more robust and content-rich virtual environment, even when the initially provided input might be limited or incomplete.

In some embodiments, where parsing the received input results in no identified assets, the at least one AI agent is further configured to generate an event curriculum and create assets for the virtual event space based on the event curriculum. An event curriculum refers to a structured outline or plan that defines the content, schedule, and objectives of an event. For example, an event curriculum might include session topics, speaker information, timelines, and learning or engagement goals for participants. "Creating assets" refers to the process of generating, designing, or producing digital content, elements, or resources to be used within a virtual environment or presentation. For example, creating assets might involve generating 3D models, designing graphical elements, or composing text content to populate the virtual event space.

In this context, generating an event curriculum refers to the AI agent's capability to autonomously develop a comprehensive plan for the virtual event, including its structure, content, and objectives, when no specific assets are provided in the initial input.

This approach involve a scenario where the input provided by the event host organizer lacks identifiable assets that can be directly used in the virtual event space. In such cases, the AI agent demonstrates advanced capabilities by generating an event curriculum and creating corresponding assets, effectively filling in the gaps to produce a complete and functional virtual event environment.

The process of generating an event curriculum by the AI agent may involve analyzing the available information about the event's purpose, target audience, and any specified goals or themes. The AI might leverage its knowledge base of event planning best practices, industry trends, and successful event structures to create a comprehensive outline for the virtual event. This curriculum could include proposed session topics, suggested speaker roles, interactive elements, and a timeline for the event flow. For example, if the event host organizer provides only a brief description like "tech industry networking event," the AI agent might generate a curriculum that includes keynote presentation slots, breakout discussion topics on current tech trends, virtual networking lounges, and a schedule that balances formal presentations with interactive networking periods.

Once the event curriculum is generated, the AI agent proceeds to create assets based on this framework. This asset creation process demonstrates the AI agent's ability to not only organize information but also produce content to populate the virtual event space. The AI agent might generate placeholder presentations, create virtual speaker profiles, design informational panels about discussion topics, and develop interactive elements that align with the curriculum's objectives. By generating both an event curriculum and corresponding assets, the at least one AI agent, even with minimal input, can produce a comprehensive and engaging virtual event space. This feature offers flexibility to event organizers who may have a general idea for an event but lack specific content or assets, allowing them to leverage the AI's creative and organizational capabilities to bring their concept to life in a virtual environment.

In some embodiments, the at least one AI agent is configured to map one or more of the identified assets with respective functional building blocks from the list of functional building blocks to enable rendering of the identified assets within the virtual event space. "Mapping" refers to the process of associating, linking, or correlating one set of elements with another set of elements. For example, mapping may involve creating relationships between data points, establishing connections between different components, or aligning items from one category with corresponding items in another category. "Identified assets" refer to the specific elements, resources, or pieces of content that have been recognized and extracted from the event content data provided by the event host organizer. For example, identified assets may include presentation slides, speaker profiles, product images, or video clips that have been parsed and categorized for use in the virtual event space. "Respective functional building blocks" refers to the individual modular components or units from the list of functional building blocks that correspond to or are suitable for use with specific identified assets. For example, a presentation slide asset might be mapped to a virtual screen building block, while a speaker profile asset might be mapped to an avatar or information booth building block. The term "enable rendering" refers to the process of preparing or configuring data, assets, or objects in a way that allows them to be visually displayed or interactively presented within a digital environment. For example, enabling rendering may involve formatting data, assigning properties, or establishing relationships that allow a 3D engine to generate visual representations of assets within the virtual event space such as creating 2D or 3D graphics, applying textures and lighting effects, or producing interactive elements that can be displayed on a screen or within a virtual space.

In this context, mapping one or more of the identified assets with respective functional building blocks from the list of functional building blocks refers to the process of associating or linking specific content elements extracted from the event data with appropriate modular components that can represent or display those elements within the virtual environment. This mapping process ensures that each identified asset is paired with a suitable functional building block that can effectively present or utilize the asset within the context of the virtual event space. On the other hand enabling rendering of the identified assets within the virtual event space refers to the process of preparing and config- uring the mapped assets and functional building blocks in a way that allows them to be visually displayed and interac- tively accessed within the 3D virtual environment. This may involve setting up properties, defining relationships, or establishing parameters that allow the virtual event platform to generate and present the assets in a coherent and func- tional manner within the virtual space. Process 900 includes a step 906c of providing the received input into at least one AI agent configured to map one or more of the identified assets with respective functional building blocks from the list of functional building blocks to enable rendering of the identified assets within the virtual event space, as illustrated in FIG. 9.

By mapping identified assets to functional building blocks and enabling their rendering, the AI agent creates a struc- tured framework for presenting the event content within the virtual environment. This process ensures that each piece of content is appropriately represented and can be interacted with in a meaningful way by virtual attendees.

By way of a non-limiting example, as described in detail below, when mapping assets for a product launch event, the AI agent might associate a product image asset with a 3D model building block, allowing the image to be rendered as an interactive 3D object within the virtual space. Similarly, a presentation slide asset might be mapped to a virtual screen building block, enabling it to be rendered as a large display within a virtual auditorium. This mapping and rendering process allows the virtual event space to effectively show- case the event content in an immersive and interactive manner. In some example embodiments, the AI agent maps one or more identified assets to corresponding functional building blocks drawn from the predefined list. This map- ping process ensures that each asset is associated with an appropriate structural component, thereby enabling accurate rendering and integration of the asset within the configured virtual event space.

In some embodiments, mapping one or more of the identified assets with the list of functional building blocks for the virtual event space includes: comparing the identified assets with the list of functional building blocks; identifying any missing assets with respect to the list of functional building blocks; and creating new assets for the virtual event space to complete the list of building blocks.

As described elsewhere in this disclosure, "comparing" refers to the process of examining two or more items to identify similarities, differences, or relationships between them. For example, comparing might involve matching identified assets against a predefined list of required ele- ments for a virtual event space. The term "identifying" refers to the act of recognizing, locating, or distinguishing specific elements, features, or patterns within a set of data or information. For example, identifying missing assets might involve analyzing the list of functional building blocks and determining which required elements are not present in the initially extracted set of assets. The term "creating new assets" refers to the process of generating, designing, or producing additional digital content, elements, or resources to fulfill specific requirements or fill gaps in the existing asset collection. For example, creating new assets might involve generating 3D models, designing graphical ele- ments, or composing text content to complete the virtual event space.

By comparing the identified assets with the list of func- tional building blocks, the at least one AI agent can deter- mine if all required elements are available for creating a comprehensive virtual environment. This comparison pro- cess helps identify any gaps or missing components that need to be addressed to ensure the virtual event space meets all specified requirements. The step of identifying missing assets is beneficial for maintaining the quality and function- ality of the virtual event space. For instance, if the list of functional building blocks includes a "welcome video" element, but no video asset has been identified in the initial parsing of the event content data, the system can flag this as a missing asset. This identification process allows the AI to take proactive steps to address any deficiencies in the available assets, ensuring that all necessary components are included in the final virtual event space. Creating new assets to complete the list of building blocks demonstrates the AI agent's ability to autonomously fill gaps in the asset collec- tion. This capability is particularly valuable when working with limited or incomplete input from the event host orga- nizer. For example, if the system identifies that a product demonstration area is required but no 3D product models are available, it could potentially generate simplified 3D repre- sentations based on available product images or descrip- tions. Similarly, if a virtual event space template calls for informational panels but no specific content has been pro- vided, the system might create placeholder text or generate basic content based on the event theme and available infor- mation. This process of comparing, identifying, and creating assets ensures that the virtual event space is complete and fully functional, even when the initially provided input might be limited or lacking certain elements. It allows the AI-driven system to adapt to various scenarios and input qualities, providing a more robust and reliable solution for virtual event space creation.

In some embodiments, the at least one AI agent is further programmed to prompt the event host organizer for at least one of approval or further instructions, before creating new assets for the virtual event space. "Prompting" refers to the act of initiating a request, question, or suggestion to elicit a response or action from a user or system. For example, prompting may involve displaying a message, sending a notification, or presenting options for user input. Indicating, or otherwise providing "approval" refers to the act of giving formal or official agreement, consent, or permission for a proposed action or decision. For example, approval might involve the event host organizer confirming that the AI- generated assets are suitable for use in the virtual event space. "Further instructions" refer to additional guidance, specifications, or directives provided by the event host organizer to refine or modify the proposed actions or deci- sions of the AI agent. For example, further instructions might include specific design preferences, content require- ments, or functional adjustments for the new assets.

By programming the AI agent to prompt for approval or further instructions before creating new assets, the virtual event platform acknowledges the importance of human input and expertise in tailoring the virtual environment to specific needs and preferences. The prompting process serves mul- tiple purposes in the context of virtual event space creation. Firstly, it allows the event host organizer to review and validate the AI's assessment of missing assets, ensuring that the identified gaps align with the organizer's vision for the event. This step can prevent unnecessary asset creation and ensure that resources are allocated efficiently. Secondly, it provides an opportunity for the event host organizer to offer additional context, preferences, or requirements that may not have been evident from the initial input data. This additional information can guide the AI in creating more relevant and appropriate assets for the virtual event space. For example, if the AI agent identifies a need for a virtual stage backdrop and prompts the event host organizer, the organizer might approve the creation of a new asset but provide further instructions on specific branding elements, color schemes, or thematic imagery to be incorporated. This interaction ensures that the generated asset aligns closely with the event's overall aesthetic and messaging. In cases where the AI proposes creating placeholder content for missing informational panels, the prompt allows the event host organizer to either approve the generation of generic content or provide specific text or data to be used instead. This flexibility is particularly valuable when dealing with sensitive or specialized information that requires human oversight. By incorporating this prompting mechanism, the system strikes a balance between automation and customization, leveraging the efficiency of AI-driven asset creation while respecting the event host organizer's ultimate authority over the virtual event space design. This approach can lead to more satisfactory outcomes, as it combines the AI's ability to quickly identify and address gaps with the organizer's expertise and specific event requirements.

In some embodiments, the at least one AI agent is configured to involve selecting a virtual event space template based on the virtual event space requirement schema. As described elsewhere in this disclosure, "selecting" refers to the act of choosing, picking, or identifying a specific item or option from a set of alternatives. For example, selecting may involve evaluating multiple options based on certain criteria and determining the most suitable or appropriate choice for a given purpose. A "virtual event space template" refers to a pre-designed digital framework or layout that serves as a starting point for creating a virtual environment for hosting online events. For example, a virtual event space template may include predefined 3D rooms, stage areas, networking zones, or exhibition halls that can be customized and populated with specific content for a particular event.

The template selection process is based on the virtual event space requirement schema, i.e., a template can be selected by referencing and adhering to a structured set of rules, specifications, or guidelines defined in the virtual event space requirement schema. For example, basing selections on the schema may involve considering factors such as event type, attendee capacity, or required interactive features as specified in the schema.

In this context, selecting a virtual event space template based on the virtual event space requirement schema refers to the process by which the AI agent chooses an appropriate pre-designed virtual environment layout that aligns with the specifications and requirements outlined in the virtual event space requirement schema. This selection process ensures that the chosen template provides a suitable foundation for creating a virtual event space that meets the specific needs and goals of the event as defined by the event content data and the schema guidelines. Process 900 includes a step 906*d* of providing the received input into at least one AI agent configured to select a virtual event space template based on the virtual event space requirement schema, as illustrated in FIG. 9.

Selecting an appropriate virtual event space template provides a starting point that aligns with the event's requirements and can be efficiently customized to meet specific needs. The AI agent analyzes the virtual event space requirement schema, which may include information about the event type, expected number of attendees, required functional areas, and desired aesthetic elements. Based on this analysis, the AI selects a template that best matches these requirements, providing a foundation that can be further customized and populated with the identified assets and mapped functional building blocks.

By way of a non-limiting example, as described in detail below, when configuring a virtual event space for a product launch, the AI agent might analyze the virtual event space requirement schema to determine that the event requires a main presentation area, multiple product demonstration zones, and networking spaces. Based on these requirements, the AI could select a virtual event space template that includes a large central auditorium, surrounding exhibition halls, and social lounges. This selected template would then serve as the base structure for further customization and asset integration, ensuring that the final virtual event space effectively meets the specific needs of the product launch event.

In some embodiments, the input received from the event host organizer is indicative of a number of virtual attendees for the event and the at least one AI agent is configured to select a virtual event space template based on the virtual event space requirement schema and suitable for accommodating the number of virtual attendees. The term "indicative of" refers to providing information, evidence, or signs that suggest or point to a particular fact or conclusion. For example, data or input that is indicative of something may not explicitly state it but implies or suggests that information. The term "number of virtual attendees" refers to the quantity or count of individuals expected to participate in or access the virtual event space simultaneously. For example, this could range from a small group for a private meeting to thousands of participants for a large-scale conference or exhibition. The term "suitable for accommodating" refers to the capacity or ability to effectively handle, support, or provide for a specific number or range of users or participants. For example, a virtual space suitable for accommodating a large number of attendees might have more expansive areas, multiple concurrent session capabilities, or enhanced server resources to handle increased data traffic.

By taking the expected number of attendees into account, the AI agent can ensure that the selected template and resulting virtual environment are appropriately sized and structured to handle the anticipated crowd, enhancing the overall user experience and technical performance of the virtual event.

The process of selecting a template based on the number of virtual attendees involves considering various aspects such as the spatial requirements, technical capabilities, and interactive features needed to support different scales of events. For instance, a virtual event space for a small team meeting might prioritize intimate discussion areas and collaborative tools, while a large-scale conference template would need to accommodate multiple concurrent sessions, expansive exhibition halls, and robust networking features. By way of example, if the input from the event host organizer indicates an expected attendance of 5,000 virtual participants for a global tech summit, the AI agent might select a template with the following characteristics: A spacious main hall capable of hosting large-scale keynote presentations, multiple breakout areas for parallel sessions to prevent overcrowding, expansive virtual exhibition spaces to accommodate numerous vendor booths, and distributed networking zones to facilitate interactions among the large number of attendees. The selected template would also ensure that the underlying technical infrastructure can support simultaneous access and interactions for 5,000 users without compromising performance or user experience.

In some embodiments, if the number of virtual attendees is greater than a threshold number the at least one AI agent is further configured to duplicate one or more identified assets within the virtual event space. A "threshold number" refers to a predetermined or dynamically set value that serves as a point of reference for making decisions or triggering specific actions. For example, a threshold number in this context might be the maximum number of attendees that can comfortably interact with a single instance of an asset or feature within the virtual space. "Duplicating" refers to the act of creating an exact copy or replica of something, often to increase availability or capacity. For example, duplicating an asset in a virtual environment might involve creating multiple instances of the same content or interactive element.

This approach addresses the scalability of virtual event spaces, particularly for large-scale events with high attendance. By duplicating assets based on a threshold number of attendees, the virtual event space can maintain its functionality and user experience even as the number of participants grows. The process of duplicating identified assets when the number of virtual attendees exceeds a threshold involves creating multiple instances or copies of key elements within the virtual space. This approach allows for better distribution of attendees across the environment, reducing congestion and ensuring that all participants have access to important content or features. For example, if a virtual product launch event expects 10,000 attendees, and the threshold for comfortable interaction with a product demonstration booth is set at 500 users, the AI agent might duplicate the booth 20 times across the virtual space. Each duplicate would contain the same product information, 3D models, and interactive features as the original, but would be accessible to a different group of attendees. This duplication ensures that all participants have the opportunity to engage with the product demonstration without overcrowding or long wait times. Similarly, for a large-scale virtual conference, the AI agent might duplicate popular session rooms or keynote stages if the number of attendees exceeds the viewing capacity of a single instance. This could involve creating multiple identical presentation spaces, each streaming the same content but to different groups of attendees, effectively creating parallel "tracks" within the virtual event space.

In some embodiments, the at least one AI agent is further programmed to conduct a semantic analysis the event content data to identify a design theme for the virtual event and select the virtual event space template based on the virtual event space requirement schema and the identified design theme. As used herein, "semantic analysis" refers to the process of interpreting the meaning and context of text or data to extract relevant information and understand relationships between different elements. For example, semantic analysis might involve examining keywords, phrases, and contextual clues to determine the overall topic, tone, or purpose of a document or dataset. A "design theme" refers to a cohesive set of visual, conceptual, and stylistic elements that define the overall look, feel, and atmosphere of an event or environment. For example, a design theme might encompass s at least one of a color palette, a logo, a set of fonts, patterns, icons, or any other decorative elements that collectively create a unified aesthetic experience. A design theme for a virtual event may refer to the concept or style that shapes the event's visual design, atmosphere, and overall experience. A theme may reflect the organizer's intent, whether that's to educate, celebrate, inspire, or promote, and guides the selection of colors, graphics, layouts, and interactive elements to create a unified environment. For example, if the intent is to launch a new product, the theme might feature the product's branding, dynamic presentation screens, and interactive demo areas, all designed to engage attendees and highlight the product's unique features.

As described earlier, a virtual event space template refers to a pre-designed digital framework or layout that serves as a starting point for creating a virtual environment for hosting online events. For example, a virtual event space template may include predefined 3D rooms, stage areas, networking zones, or exhibition halls that can be customized and populated with specific content for a particular event. By conducting a semantic analysis of the event content data, the AI can gain deeper insights into the nature, purpose, and desired atmosphere of the virtual event. This analysis allows the system to identify a design theme that aligns with the event's objectives and content, ensuring that the selected virtual event space template and subsequent customizations are well-suited to the specific event requirements.

The semantic analysis process might involve examining various aspects of the event content data, such as keywords, phrases, tone, and subject matter. For instance, if the analysis reveals frequent mentions of "innovation," "future technology," and "interactive demonstrations," the AI might identify a futuristic or high-tech design theme. Similarly, if the content data includes terms like "networking," "industry leaders," and "professional development," the AI could infer a more formal, business-oriented theme. Once a design theme is identified, the AI agent can use this information in conjunction with the virtual event space requirement schema to select an appropriate template. For example, if the identified theme is "immersive product showcase" and the requirement schema specifies the need for multiple demonstration areas, the AI might choose a template that features a central hub with branching exhibition spaces, each designed to highlight different product categories or features.

The selection of a virtual event space template based on both the requirement schema and the identified design theme ensures a more holistic approach to virtual event space creation. This approach considers not only the functional requirements of the event but also its conceptual and aesthetic aspects, resulting in a more cohesive and engaging virtual environment. For instance, if the semantic analysis identifies a sustainability-focused theme for a corporate conference, the AI might select a template that incorporates natural elements, eco-friendly textures, and open, airy spaces. The selected template could feature virtual outdoor areas for networking, presentation stages designed to resemble sustainable architecture, and exhibition zones that emphasize green technologies. By leveraging semantic analysis to inform template selection, the AI agent can create virtual event spaces that more accurately reflect the event's purpose, content, and desired atmosphere. This approach helps ensure that the virtual environment not only meets the functional requirements of the event but also provides an immersive and thematically appropriate experience for attendees.

In some embodiments, the at least one AI agent is further configured to apply an aesthetic to the virtual event space template based on an identified design theme. "Applying"

refers to the act of implementing, utilizing, or putting into effect a particular set of rules, styles, or characteristics to modify or enhance an existing structure or design. For example, applying an aesthetic might involve adjusting colors, textures, lighting, or decorative elements within a virtual environment. The term "aesthetic" refers to a set of principles or characteristics that define the visual appearance, style, and overall sensory experience of an environment or design. For example, an aesthetic might encompass color schemes, texture patterns, architectural styles, or atmospheric effects that collectively create a specific look and feel. The term "identified design theme" (based on a conducted semantic analysis) refers to a recognized or determined conceptual framework that guides the overall visual and experiential aspects of an event or environment. For example, an identified design theme might be "futuristic technology expo" or "rustic outdoor conference," which would inform various design decisions throughout the virtual space.

Accordingly, the AI agent is not only configured to select a template based on the identified design theme but also to apply a corresponding aesthetic to that template. This process ensures that the virtual event space is not only functionally appropriate but also visually and atmospherically aligned with the event's theme and purpose. Applying an aesthetic to the virtual event space template involves modifying various visual and sensory elements to create a cohesive and immersive environment that reflects the identified design theme. This may include adjusting color palettes, implementing specific lighting effects, selecting appropriate textures for surfaces, and incorporating thematic decorative elements throughout the virtual space. For example, if the identified design theme is "underwater exploration conference," the AI agent might apply an aesthetic that includes blue and green color gradients to simulate water depth, add subtle animations to create the illusion of water movement, and incorporate marine-inspired textures and decorations throughout the virtual environment. The lighting might be adjusted to create a sense of being submerged, with softer, diffused illumination and occasional shimmering effects to mimic light filtering through water. In the case of a "retro gaming convention" theme, the aesthetic application might involve using pixel art textures, implementing a color palette reminiscent of classic video game consoles, and incorporating design elements that evoke nostalgia for early gaming eras. The virtual space could feature arcade-style structures, 8-bit inspired graphics for signage, and sound effects that callback to vintage gaming experiences.

By applying a theme-based aesthetic, the AI agent ensures that every aspect of the virtual event space contributes to a unified and immersive experience. This attention to visual and atmospheric details can significantly enhance attendee engagement and create a more memorable event. The applied aesthetic helps to reinforce the event's message, create the desired mood, and provide a consistent visual language throughout the virtual environment.

Furthermore, the ability to apply aesthetics based on identified themes allows for greater customization and branding opportunities. For corporate events, the AI could incorporate company colors, logos, and brand-specific design elements seamlessly into the virtual space, creating a branded environment that aligns with the organization's visual identity while still adhering to the overall event theme. This approach to aesthetic application demonstrates the AI agent's capability to go beyond mere functional arrangement of virtual spaces and into the realm of creating cohesive, thematically rich environments that enhance the overall event experience.

In some embodiments, the AI agent is further configured to identify the design theme from the event content data. In other words, the AI agent is able to analyze and interpret the provided event information to determine an appropriate visual and conceptual framework for the virtual event space. This process involves examining various aspects of the content, such as text, images, and formatting, to infer the intended style, tone, and atmosphere of the event.

The AI agent's capability to identify the design theme from the event content data enhances the automation and customization of virtual event space creation. By analyzing the provided information, the AI can make informed decisions about the visual and experiential aspects of the virtual environment without requiring explicit theme instructions from the event host organizer.

For example, if the event content data includes terms like "eco-friendly," "sustainability," and "green technology," along with images of natural landscapes and renewable energy sources, the AI agent might identify a nature-inspired, environmentally conscious design theme. This could lead to the selection of a virtual event space template with organic shapes, earth-tone color palettes, and virtual plant elements throughout the environment.

In some embodiments, the identified design theme includes at least one of a color palette, a logo, a set of fonts, patterns, or icons. A color palette refers to a selected set of colors used consistently throughout a design or visual presentation. For example, a color palette might include primary brand colors, complementary accent colors, and neutral tones that work together to create a cohesive visual identity. A set of fonts refers to a collection of typefaces or text styles chosen for use in various elements of a design or document. For example, a set of fonts might include a bold sans-serif font for headings, a readable serif font for body text, and a decorative font for special accents. Patterns refer to repeating visual elements or motifs used to create texture, interest, or consistency in a design. For example, patterns might include geometric shapes, organic forms, or stylized representations of objects or concepts related to the event theme.

Accordingly, the AI agent considers a wide range of visual elements when configuring the virtual environment. The inclusion of these specific design elements allows for greater customization and branding opportunities within the virtual event space. For instance, if the AI agent identifies a corporate branding theme from the event content data, it might extract the company's logo, official color palette, and preferred fonts to create a branded environment that aligns with the organization's visual identity. By way of example, for a technology conference virtual event, the AI agent might identify a futuristic design theme from the event content data. This theme could include a color palette of deep blues and bright neons, a set of sleek sans-serif fonts for headings and body text, patterns inspired by circuit board layouts, and icons representing various tech industry concepts. The event logo, perhaps featuring a stylized representation of innovation or connectivity, would be prominently incorporated throughout the virtual space.

In some embodiments, the at least one AI agent is configured to generate and output virtual event space data for the virtual event space by adding mapped functional building blocks and assets to the selected virtual event space template. "Generating" refers to the process of creating, producing, or bringing into existence something new. For example, generating may involve compiling information, synthesizing data, or constructing digital representations based on input parameters or predefined rules. "Outputting" refers to the act of producing, delivering, or making available the result of a process or operation. For example, outputting may involve displaying information on a screen, saving data to a file, or transmitting information to another system or device.

"Virtual event space data" refers to the digital information and specifications that define the structure, layout, and content of a virtual environment designed for hosting online events. For example, virtual event space data may include 3D models, textures, asset placements, interaction rules, and other parameters necessary to render and operate the virtual space.

Adding mapped functional building blocks refers to the process of incorporating pre-defined modular components into the selected virtual event space template, i.e., the pre-designed digital framework or layout chosen as the starting point for creating the specific virtual environment, where these components have been previously associated with specific assets or functionalities. For example, adding mapped functional building blocks may involve placing virtual stages, interactive displays, or networking areas within the digital environment based on their predefined purposes and relationships to event content.

In this context, generating and outputting virtual event space data for the virtual event space by adding mapped functional building blocks and assets to the selected virtual event space template refers to the process of creating a comprehensive digital representation of the virtual event environment by combining the chosen template with specific functional components and content elements. This process involves taking the selected template as a foundation, integrating the mapped functional building blocks to define interactive areas and features, and incorporating the identified assets to populate the space with event-specific content. The resulting virtual event space data provides a complete specification for rendering and operating the customized virtual environment. Process 900 includes a step 906e of providing the received input into at least one AI agent configured to generate and output virtual event space data for the virtual event space by adding mapped functional building blocks and assets to the selected virtual event space template, as illustrated in FIG. 9.

Generating and outputting virtual event space data transforms the abstract concepts and mapped elements into a concrete, implementable format. The AI agent combines the selected template, which provides the basic structure and layout, with the mapped functional building blocks, which define specific interactive areas and features. It then integrates the identified assets, such as presentation materials, product information, or branding elements, into appropriate locations within the virtual space.

The process of adding mapped functional building blocks involves placing pre-defined modular components, such as virtual stages, exhibition booths, or networking lounges, into specific locations within the template. These components are positioned based on their intended functions and relationships to the event content, ensuring a logical and intuitive layout for virtual attendees. The AI agent may consider factors such as traffic flow, visibility, and accessibility when determining the optimal placement of these building blocks.

Incorporating assets into the virtual event space involves more than simply placing content within the environment. The AI agent may need to consider factors such as file formats, resolution requirements, and compatibility with the virtual platform. It may also need to make decisions about how assets are displayed or interacted with, such as determining the size and positioning of images on virtual screens or setting up interactive 3D models of products for demonstration purposes.

The output of this process is a comprehensive set of virtual event space data that can be used to render and operate the customized virtual environment. This data may include detailed 3D models, texture maps, lighting information, interaction scripts, and asset placement coordinates. The format of this output is designed to be compatible with the virtual event platform or rendering engine that will ultimately host the event.

By way of a non-limiting example, as described in detail below, when generating virtual event space data for a product launch event, the AI agent might start with a selected template that includes a main presentation hall and several smaller exhibition areas. It would then add mapped functional building blocks such as a virtual stage in the main hall, interactive product demonstration booths in the exhibition areas, and networking lounges between the main spaces. The AI would incorporate assets such as presentation slides onto virtual screens, place 3D product models in the demonstration booths, and add branding elements throughout the space. The resulting virtual event space data would provide a complete specification for rendering a fully functional and visually cohesive virtual environment tailored to the product launch event's needs.

In some example embodiments, the AI agent generates and outputs virtual event space data by incorporating mapped functional building blocks and associated assets into the selected virtual event space template. This process produces a structured configuration that reflects the organiser's intent and ensures that all elements are integrated within the predefined spatial and functional parameters of the template.

In some embodiments, adding mapped functional building blocks includes spatially determining a location of each of the functional building blocks within an area defined by the virtual event space template. "Spatially determining" refers to the process of deciding or calculating the physical arrangement, positioning, or distribution of elements within a given space. For example, spatially determining might involve assessing the size, shape, and relationships between different components to create an optimal layout. The term "location" refers to the specific position or place where something is situated within a defined area or context. For example, a location within a virtual event space might be described by coordinates, relative positions to other elements, or designated zones within the environment. The term "area defined by the virtual event space template" refers to the boundaries, dimensions, and overall structure provided by the selected template for the virtual event environment. For example, this area might include the total available space, predefined rooms or zones, and any architectural or design constraints inherent in the template.

In other words, the AI agent not only adds functional building blocks but also determines their optimal spatial arrangement within the template. This spatial determination ensures that the virtual environment is not only functional but also logically organized and navigable for attendees. The process of spatially determining the location of functional building blocks involves considering various factors such as the purpose of each element, expected attendee flow, visibility, accessibility, and the overall user experience. For instance, when configuring a virtual conference space, the AI agent might place the main stage area in a central, easily accessible location, position breakout session rooms in surrounding areas, and distribute networking zones throughout the space to encourage interaction. By way of example, in a virtual product launch event, the AI agent might spatially determine the locations of functional building blocks as follows: A large presentation area could be placed at the forefront of the virtual space for keynote speeches and product demonstrations. Interactive product showcase booths might be arranged in a circular pattern around this central area, allowing attendees to easily move between displays. Networking lounges could be strategically placed at intersections or corners of the space to facilitate casual interactions. Information kiosks or help desks might be positioned near entry points for easy access. The AI would consider the size and importance of each element, ensuring that high-traffic areas have sufficient space and that there are clear pathways for navigation throughout the virtual environment.

Some disclosed embodiments involve compiling and presenting the virtual event space based on the virtual event space data outputted by the at least one AI agent, wherein compiling and presenting are configured to enable access to the identified assets by virtual attendees within the virtual event space. "Compiling" refers to the process of gathering, assembling, or combining various components, data, or resources into a cohesive whole. For example, compiling may involve integrating different elements of a virtual environment, such as 3D models, textures, and interactive objects, into a unified and functional digital space. "Presenting" refers to the act of displaying, showing, or making available information, content, or experiences to users or viewers. For example, presenting may involve rendering a virtual environment on a user's device, allowing them to view and interact with the digital space and its contents.

By compiling and presenting the virtual event space, the virtual vent platform provide or facilitate the ability to use, interact with, or retrieve information, resources, or functionality within the virtual event space. For example, enabling access may involve granting permissions, creating user interfaces, or establishing connections that allow virtual attendees to engage with specific features or content. As described elsewhere in this disclosure "virtual attendees" refers to individuals who participate in or attend an event, meeting, or gathering through a digital platform or virtual environment, rather than being physically present. For example, virtual attendees may use computers, mobile devices, or virtual reality headsets to access and interact with a virtual event space and other participants.

In this context compiling and presenting the virtual event space refers to the process of assembling the various components, assets, and functional elements of the virtual environment based on the generated data, and then rendering and displaying this environment in a format that can be accessed and experienced by users. This process involves integrating the mapped functional building blocks, incorporating the identified assets, and applying any specified design themes or layouts to create a cohesive and interactive virtual space. Process 900 includes a step 908 of compiling and presenting the virtual event space based on the virtual event space data outputted by the at least one AI agent, wherein compiling and presenting are configured to enable access to the identified assets by virtual attendees within the virtual event space in FIG. 9.

In the context of the present disclosure, the phrase "enable access to the identified assets by virtual attendees" refers to the implementation of features and functionalities within the virtual event space that allow participants to view, interact with, and utilize the various content elements and resources that have been incorporated into the environment. This may include providing intuitive navigation systems, interactive displays, or user interfaces that facilitate engagement with presentations, product demonstrations, or networking opportunities within the virtual space.

The process of compiling and presenting the virtual event space based on the virtual event space data outputted by the AI agent represents the final stage in transforming the conceptual design into a functional, interactive digital environment. This step involves taking the comprehensive set of specifications, layouts, and asset mappings generated by the AI and using them to construct the actual virtual space that attendees will experience.

The compilation process may involve several technical steps, such as rendering 3D models, applying textures and lighting effects, implementing interaction scripts, and integrating various media types (e.g., videos, images, audio) into their designated locations within the virtual space. This process ensures that all the elements specified in the virtual event space data are properly assembled and positioned to create a cohesive and visually appealing environment.

The presentation aspect focuses on how the compiled virtual event space is delivered to and experienced by the virtual attendees. This may involve considerations such as optimizing the rendering for different devices or platforms, implementing real-time networking capabilities to support multi-user interactions, and ensuring that the virtual space is responsive and performant even with a large number of concurrent users.

Enabling access to the identified assets by virtual attendees involve creating intuitive navigation systems, interactive elements, and user interfaces that allow attendees to easily locate, view, and engage with the various content and features within the virtual space. For example, this might include implementing clickable objects that open presentations or product information, creating virtual screens for video playback, or designing interactive zones for networking and discussions.

The configuration of the compilation and presentation processes to enable asset access may also involve implementing various technical features to enhance the user experience. This could include features such as dynamic loading of assets to reduce initial load times, implementing level-of-detail systems to optimize performance, or creating adaptive interfaces that adjust based on user interactions or device capabilities.

By way of a non-limiting example, as described in detail below, when compiling and presenting a virtual event space for a product launch, the system might integrate a 3D model of the main presentation stage, position virtual screens for displaying slides and videos, and create interactive product demonstration booths throughout the space. The presentation layer would then render this environment in real-time, allowing virtual attendees to move their avatars through the space, interact with product displays, watch presentations on the virtual screens, and engage in networking activities with other attendees. The system would be configured to ensure that all identified assets, such as product information, presentation materials, and interactive demonstrations, are easily accessible and functional for all virtual attendees, regardless of their device or platform.

In some example embodiment, the AI agent outputs virtual event space data, which is compiled and presented to form the complete virtual environment. This compilation integrates all mapped functional building blocks and associated assets, and the presentation is configured to enable virtual attendees to access and interact with the identified assets within the virtual event space. Aspects of this disclosure may involve step 914 of FIG. 9.

Some embodiments involve generating a preview of the virtual event space and presenting the preview to the event host organizer. A "preview" refers to an advance showing, demonstration, or representation of something before it is finalized or made fully available. For example, a preview of a virtual event space might include sample layouts, visual mockups, or a limited interactive tour of the proposed environment.

By providing the event host organizer with a preview of the AI-generated environment for feedback, adjustments, and approval before the virtual space is finalized may be received, ensuring that the resulting environment meets the organizer's expectations and requirements.

The process of generating a preview involves creating a representative sample or demonstration of the virtual event space based on the AI agent's configuration and design decisions. This preview might include visual renderings of key areas within the space, sample interactions with functional building blocks, or a simplified version of the navigation system.

Presenting the preview to the event host organizer allows for a collaborative refinement process. The organizer can review the proposed layout, assess the placement of assets and functional elements, and evaluate how well the virtual space aligns with their event goals and branding requirements.

For example, in the case of a virtual trade show, the AI agent might generate a preview that includes:

1. A bird's-eye view map of the entire virtual space, showing the layout of exhibition halls, presentation stages, and networking areas.
2. 3D renderings of key locations, such as the main entrance, a sample exhibitor booth, and the keynote presentation stage.
3. A brief interactive demo allowing the organizer to navigate through a portion of the space and test basic functionalities like accessing product information or joining a presentation.

This preview would be presented to the event host organizer through a secure online platform, potentially with a guided walkthrough by a customer support representative. The organizer could then provide feedback on aspects such as the overall design theme, the placement of sponsor logos, or the flow between different areas of the virtual space.

In some embodiments, the preview is a 2D image of the virtual event space or a 3D immersive view of the virtual event space.

The term "2D image" refers to a flat, two-dimensional visual representation of an object, scene, or space. For example, a 2D image of a virtual event space might include floor plans, elevation drawings, or rendered snapshots of different areas within the environment. The term "3D immersive view" refers to a three-dimensional, interactive representation of an environment that allows users to experience a sense of presence and depth within the space. For example, a 3D immersive view might enable users to navigate through the virtual event space, look around in all directions, and interact with objects as if they were physically present.

By providing options for both 2D and 3D previews, the system can cater to different preferences, technical capabilities, and levels of detail required by various organizers. A 2D image preview of the virtual event space might include a series of static images or a comprehensive floor plan that provides an overview of the entire environment. This format can be particularly useful for quickly conveying the layout, spatial relationships, and overall design of the virtual space. For example, a 2D preview for a virtual conference might include:

1. A color-coded floor plan showing different zones (e.g., exhibition hall, presentation stages, networking lounges).
2. Elevation views of key areas, such as the main stage or sponsor showcase.
3. Rendered snapshots of important locations, like the entrance lobby or a typical breakout room.

A 3D immersive view, on the other hand, offers a more dynamic and interactive preview experience. This format allows the event host organizer to virtually "walk through" the space, gaining a first-person perspective of how attendees will experience the environment. For instance, a 3D immersive preview of a virtual product launch event might enable the organizer to:

1. Navigate through the virtual space using controls similar to those that will be available to attendees.
2. Interact with sample product displays or information kiosks to test functionality.
3. Experience the visual impact of branding elements and design themes from various vantage points within the space.
4. Assess the flow and connectivity between different areas of the virtual environment.

By offering both 2D and 3D preview options, the system can accommodate different technical requirements and preferences. For example, a 2D preview might be more suitable for quick reviews or when working with organizers who have limited hardware capabilities, while a 3D immersive view could be offered for more detailed evaluations or when demonstrating complex interactive features.

Some embodiments involve receiving from the event host organizer, feedback on the virtual event space, providing the feedback to the at least one AI agent further configured to adjust the virtual event space based on the provided feedback. Feedback refers to information, comments, or suggestions provided in response to an experience, product, or service. For example, feedback may include critiques, recommendations for improvements, or expressions of satisfaction or dissatisfaction with various aspects of the virtual event space.

When receiving feedback the at least one AI gent may be configured to adjust, modify, alter or revise the virtual event space. In some embodiments, adjusting the virtual event space may involve changing layouts, updating design elements, or modifying interactive features based on user input. In this context of the present disclosure, adjusting the virtual event space based on the provided feedback refers to the process of modifying or refining the AI-generated virtual environment in response to the event host organizer's input and suggestions. This adjustment process ensures that the final virtual event space aligns closely with the organizer's vision and requirements.

By incorporating a feedback loop, the virtual event platform can address any discrepancies between the AI-generated environment and the organizer's expectations, leading to a more tailored and satisfactory final product. The process of receiving feedback from the event host organizer may involve various methods of communication, such as written comments, verbal discussions, or interactive markup tools within the preview interface. This feedback could encompass a wide range of aspects, including aesthetic preferences, functional requirements, branding considerations, or user experience observations. Providing the feedback to the AI agent enables the system to leverage its adaptive capabilities and make intelligent adjustments to the virtual event space. The AI agent may analyze the feedback to identify patterns, prioritize changes, and implement modifications that best address the organizer's concerns while maintaining the overall integrity and functionality of the virtual environment.

The adjustment process carried out by the AI agent based on the provided feedback may involve various actions, such as repositioning elements within the virtual space, modifying color schemes or textures, adding or removing interactive features, or refining the navigation system. For example, if the event host organizer provides feedback that the networking areas feel too isolated, the AI agent might adjust the layout to create more open sight lines or add virtual pathways to improve connectivity between different zones. By incorporating this feedback loop and adjustment capability, the system ensures that the final virtual event space is not only technically sound but also closely aligned with the event host organizer's vision and requirements. This collaborative approach combines the efficiency and innovation of AI-driven design with the specific knowledge and preferences of the event organizer, resulting in a more personalized and effective virtual event environment.

The overall purpose of the above described process is to automate and streamline the creation of customized virtual event spaces using AI technology. By analyzing input data, identifying relevant assets, and mapping them to functional building blocks within a selected template, the virtual event platform can efficiently generate complex and interactive virtual environments tailored to specific event requirements. This approach may be applied to various types of virtual events, such as conferences, product launches, or educational seminars, providing organizers with a powerful tool for creating engaging online experiences.

By way of non-limiting example, and referring to FIG. 10, configuring a virtual event space using artificial intelligence may be performed following the step of process 1000. It should be understood that the steps of the process 1000 may be performed in any suitable order and may be carried out by one or more processors or other suitable entities.

In one example embodiment, the event host organizer 1002 provides a data source. In step 1004, the received input is provided to at least one AI agent 1006 for processing. In some example embodiments, this may include source-only input, source+intent input or intent-only input. In step 1004*a*, source only input is supplied such as a webpage URL or a folder of assets, without specifying explicit intent. In some example embodiments, the AI agent 1006 is configured to analyze the source 1004*a*, infer the organizer's intent, and build the virtual event space 1008 by accessing the virtual event space requirement schema. In some example embodiments, event host organizer provides only information indicative of intent 1004*c* for the virtual event, such as "interactive product demonstration." The AI agent 1006 uses generative models to create fitting assets and the virtual event space 1008 from scratch. In some example embodiments, event host organizer provides information with both source and intent 1004*b* from which the AI agent 1006 builds the virtual event space 1008.

Figure 11:
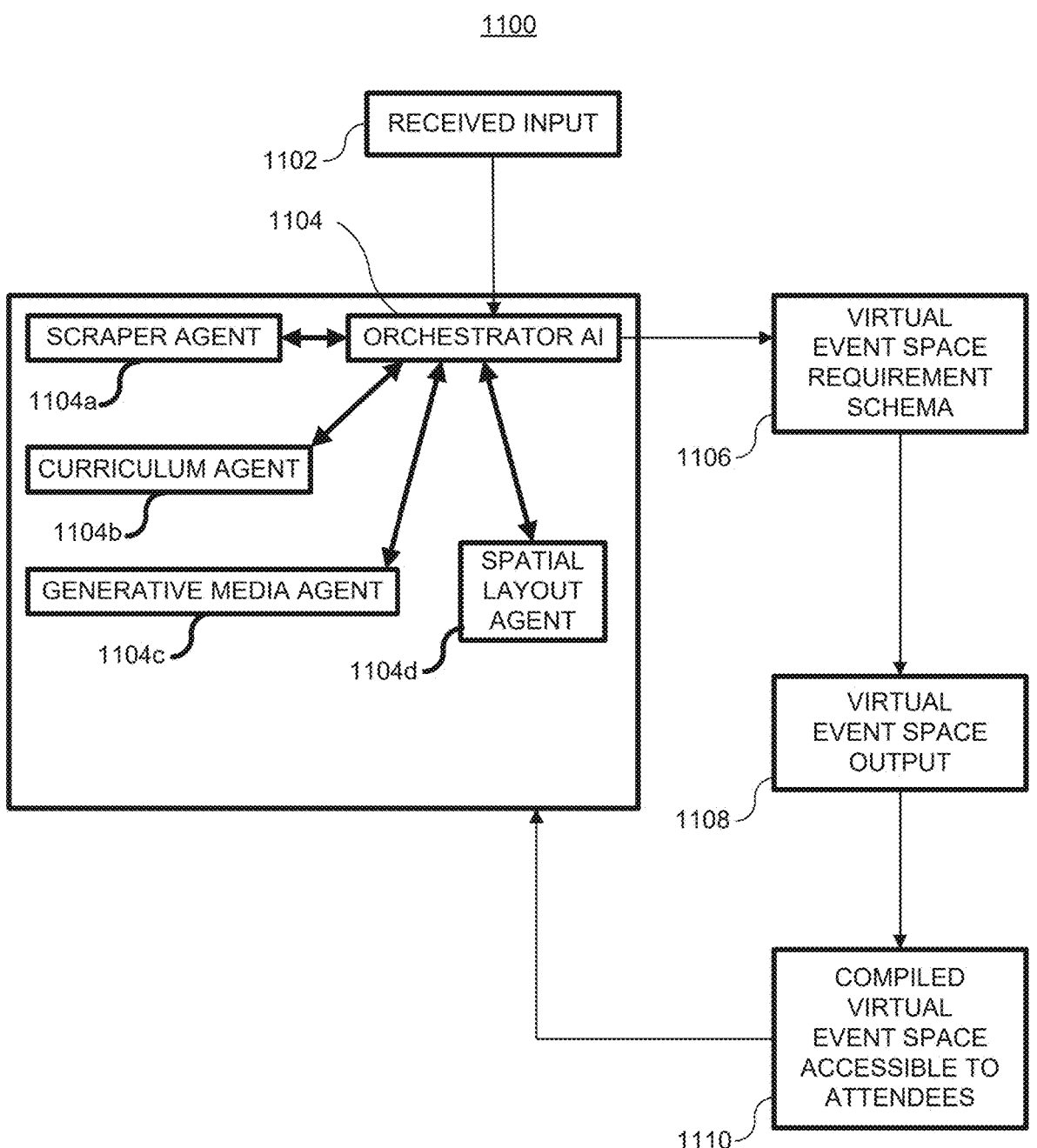
FIG. 11 is a flow chart of an example process employing an orchestrator AI, consistent with some embodiments of the present disclosure.

Referring to FIG. 11, a schematic representation 1100 of various AI entities involved in creation of a virtual event, consistent with some embodiments of the present disclosure. This figure demonstrates the layered architecture and functional interplay between agents responsible for parsing, generating, and spatially configuring the virtual environment.

In certain example embodiments, the agent accesses the virtual event space requirement schema from a library based on the event content data, conducts a semantic analysis of the event content data to identify a design theme for the virtual event, and applies an aesthetic to the virtual event space template based on the identified design theme. The agent may be a single agent, two agents, three agents or four agents. The agent may be termed as orchestrator AI and may comprise a single agent or a distributed system of multiple specialized agents. In some implementations, four distinct agents operate collaboratively. For example, in some embodiments, input is received 1102 which is fed into an orchestrator AI 1104. The Orchestrator AI may comprise at least one agent. In some embodiments, the orchestrator AI may comprise four AI agents: a "Scraper Agent" 1104*a* for the deconstruction, a "Curriculum Agent" 1104*b* for generative scaffolding, a "Generative Media Agent" 1104*c* for asset creation, and a "Spatial Layout Agent" 1104*d* for 3D generation. In some embodiments, the Scraper agent performs initial deconstruction of the input data, extracting raw elements and separating content from formatting metadata. This phase ensures that assets are isolated for subsequent mapping.

In some embodiments, the curriculum agent generates a structural scaffold for the event, creating a logical sequence of sessions, zones, and interaction points based on inferred organizer intent.

In some embodiments, the generative media agent produces visual and interactive assets, including branded panels, media objects, and thematic elements, leveraging generative models to fill gaps where source material is incomplete.

In some embodiments, the special layout agent determines the spatial arrangement of functional building blocks within the virtual event space template, ensuring optimal attendee flow and visual coherence.

In some example embodiments, the AI agent spatially determines a location of each of the functional building blocks within an area defined by the virtual event space template 1106, and compiles and presents the virtual event space data outputted by the AI agent 1108, enabling access to the identified assets by virtual attendees 1110.

Referring to FIG. 12, in some example embodiments, in some example embodiments, an input 1202 is received and then parsed 1204 to identify data assets. In some example embodiments, from this data source and the identified data assets is extracted discrete portions of the event content data 1206. In some example embodiments, the event content data is at least one of a data source or information indicative of the event host organizer intent for the virtual event 1214. In some example embodiments, the event content data is at least one of a webpage URL, a text document, a folder of assets, a presentation file, a spreadsheet, an image, or a video file 1216. In some example embodiments, from this data source and the identified data assets a native format of the data source is parsed to extract and classify one or more raw data elements distinct from the formatting data of the native format to be used as assets for the virtual event space 1208. In some example embodiments, the raw data element includes one or more of media, text blocks, and links 1218. In some example embodiments, the data source and the identified data assets are compared with the list of functional building blocks; identifying any missing assets with respect to the list of functional building blocks; and crawling resources associated with the event content data to find additional assets 1210. In some example embodiments, the parsed data source results in no identified data assets 1212.

While the disclosed and illustrated processes describe different aspects configuring and/or participating in virtual events, the steps within the disclosed processes may be combined with each other or integrated into a more comprehensive process. This global process may be implemented using one or more components of a computing device 900 (as discussed in FIG. 9) or a method or system for configuring a virtual event space using artificial intelligence.

The disclosed system for configuring a virtual event space using artificial intelligence (AI) involves several elements that work together to create a comprehensive and customizable virtual environment. The process begins with receiving input from an event host organizer, which may include event content data such as a data source or information indicative of the organizer's intent. This input is then provided to at least one AI agent, which performs a series of operations to generate the virtual event space.

The AI agent first accesses a virtual event space requirement schema, which includes definitions and a list of functional building blocks for the virtual event space. This schema serves as a blueprint for creating the virtual environment, ensuring that all necessary components are considered. The AI agent then parses the received input to identify assets for the virtual event space, extracting discrete portions of the event content data based on the definitions and functional building blocks specified in the schema.

Once assets are identified, the AI agent maps them to respective functional building blocks, enabling their rendering within the virtual event space. This mapping process ensures that each piece of content is appropriately represented and can be interacted with in the virtual environment. The AI agent then selects a virtual event space template based on the requirement schema, providing a foundation for the virtual space that aligns with the event's needs.

The AI agent generates and outputs virtual event space data by adding the mapped functional building blocks and assets to the selected template. This data is then used to compile and present the virtual event space, enabling virtual attendees to access the identified assets within the environment.

In one implementation according to disclosed embodiments, the system can handle various types of input data, including webpage URLs, text documents, folders of assets, presentation files, spreadsheets, images, or video files. The AI agent is capable of parsing native formats of these data sources to extract raw data elements, such as media, text blocks, and links, which are then used as assets for the virtual event space.

Another implementation allows the AI agent to conduct a semantic analysis of the event content data to identify a design theme for the virtual event. This theme is then used to select an appropriate virtual event space template and apply a cohesive aesthetic to the environment. The identified design theme may include elements such as color palettes, logos, fonts, patterns, or icons, ensuring a visually consistent and engaging virtual space.

The system also considers the number of virtual attendees when configuring the space. If the number exceeds a threshold, the AI agent can duplicate assets within the virtual event space to accommodate larger crowds while maintaining functionality and user experience.

To ensure the virtual event space meets the organizer's expectations, the system can generate a preview, either as a 2D image or a 3D immersive view, and present it to the event host organizer for feedback. The AI agent can then adjust the virtual event space based on this feedback, allowing for iterative refinement of the environment.

In cases where the input provides minimal information, the AI agent can generate an event curriculum and create corresponding assets, demonstrating its ability to produce a comprehensive virtual event space even with limited initial content.

By integrating these various elements and functionalities, the system provides a powerful and flexible solution for creating customized virtual event spaces, adapting to different types of events and content while leveraging AI to streamline the process and enhance the overall user experience.

Monday Mansion Third Concept—Mixed 2D/3D Perspective [Header to be Deleted when Filing]

Some disclosed embodiments involve generating a virtual event space visualization for media consumption in a hybrid 2D/3D manner. As used herein, "generating" refers to the process of creating, producing, or bringing into existence. In the context of computer systems, generating may involve using algorithms, software, or hardware to create digital content, data, or visual representations. The term "virtual event space visualization" refers to a digital representation of a simulated environment designed for hosting and displaying events, meetings, or gatherings in a computer-generated space. This visualization may include 3D models, avatars, interactive elements, and various forms of media content. The term "media consumption" refers to the act of viewing, interacting with, or experiencing various forms of digital content, such as videos, images, audio, or interactive presentations within a virtual environment. The phrase "hybrid 2D/3D manner" refers to an approach that combines both two-dimensional and three-dimensional elements in a single user interface or visualization system. This hybrid approach may involve seamlessly transitioning between 2D and 3D views or simultaneously presenting information in both formats.

In the context of the present disclosure, generating a virtual event space visualization for media consumption in a hybrid 2D/3D manner refers to the process of creating a digital environment that allows users to experience and interact with various forms of media content using a combination of two-dimensional and three-dimensional visual representations. This approach may involve a more immersive and flexible user experience, allowing for seamless transitions between different viewing modes and interaction styles within the virtual event space.

By way of a non-limiting example, as described in detail below, the system may render an event space based on virtual event space data, including avatars and virtual display objects. The system may dynamically switch between an isometric point of view (representing a more 2D-like perspective) and a non-isometric object-focused point of view (representing a more 3D-like perspective) based on user interactions and display object engagement, providing a hybrid 2D/3D experience for media consumption within the virtual event space.

FIG. 13 is a flowchart of an exemplary process 1300 for performing operations for generating a virtual event space visualization for media consumption in a hybrid 2D/3D manner, consistent with some of the disclosed embodiments. Process 1300 is discussed herein for explanatory purposes and is not intended to be limiting. In some embodiments, steps of process 1300 may be changed, modified, substituted, or rearranged, consistent with the present disclosure.

Process 1300 may be implemented using one or more components of user/virtual computing device 220-1 through 220-7 (discussed in FIG. 2A), computing device 100 (discussed in FIG. 1A), or user device 154 of computing architecture 150 (discussed in FIG. 1B). Some disclosed embodiments may include at least one processor that may be configured to execute stored instructions to perform operations to generate a virtual event space visualization for media consumption in a hybrid 2D/3D manner. As shown in FIG. 13, process 1300 may include steps 1310, 1312, 1314, 1316, 1318, 1320, 1322, and 1324, discussed in further detail below.

The process begins at step 1310, where virtual event space data is received. This data may include a definition of a virtual presentation location and at least one virtual display object associated with the virtual presentation location. The virtual display object may be configured to display dynamic content, allowing for real-time updates and interactions within the virtual environment. In step 1312, an event space is rendered based on the received virtual event space data. This step may involve creating a three-dimensional representation of the virtual environment, including various elements such as rooms, stages, or other relevant structures. Following this, in step 1314, an avatar associated with a virtual event attendee is rendered in the event space. This avatar may serve as the user's representation within the virtual environment, allowing for interaction and movement. Step 1316 involves rendering portions of the virtual event space distinct from the virtual presentation location in a first viewing state when the avatar is positioned at a location distinct from the virtual presentation location. This first viewing state may cause the event space to be presented from an isometric point of view on a display device of the virtual event attendee, providing a comprehensive overview of the environment.

In step 1318, a display object interaction trigger signal may be received. This trigger signal may be associated with an impending interaction between the avatar and the virtual display object, indicating that the user intends to engage with specific content or elements within the virtual space, and may be detected by the avatar's location in the event space in relation to the virtual display object. Responding to this trigger signal, step 1320 involves changing the first viewing state to a second viewing state. In this second viewing state, the virtual display object may be displayed on the virtual event attendee's display device from a non-isometric object-focused point of view. This transition may allow for a more detailed and immersive interaction with the virtual display object and its content. Step 1322 may maintain the non-isometric object-focused point of view while the avatar interacts with the virtual display object in the event space. This sustained focus enables the user to engage with the content without distraction from the broader virtual environment. Finally, in step 1324, upon receiving a reversion signal corresponding to an intended cessation of viewing the virtual display object the process may revert the second viewing state back to the first viewing state. This may allow the user to return to the broader isometric view of the virtual event space.

The overall purpose of this process is to provide a dynamic and engaging virtual event experience that balances comprehensive spatial awareness with focused content interaction. By seamlessly transitioning between isometric and non-isometric views, the system may allow users to navigate the virtual space efficiently while also engaging deeply with specific content or presentations. This approach may find applications in various contexts, such as virtual conferences, educational seminars, or interactive exhibitions, where the ability to switch between overview and detail is valuable for effective participation and information consumption.

Some disclosed embodiments involve receiving virtual event space data, including a definition of a virtual presentation location and at least one virtual display object associated with the virtual presentation location, wherein the at least one virtual display object is configured to display dynamic content. "Receiving" refers to the act of obtaining or acquiring data, information, or signals from an external source. In the context of computer systems, receiving may involve accepting incoming data transmissions, downloading files, or capturing input from various sources. The term "virtual event space data" refers to digital information that defines or describes a simulated environment designed for hosting and displaying events, meetings, or gatherings in a computer-generated space. This data may include specifications for 3D models, textures, lighting, interactive elements, and other components that make up the virtual environment. The phrase "virtual presentation location" refers to the specific parameters, coordinates, or attributes that define a designated area or space within the virtual event environment where content or information is intended to be presented or displayed. This may include spatial coordinates, dimensions, orientation, or other properties that determine the location and characteristics of the presentation area within the virtual space. The term "virtual display object" refers to a digital representation of a surface, screen, or interface within the virtual event space that is designed to present or showcase visual content. This may include simulated projector screens, digital billboards, interactive displays, or any other virtual element capable of showing images, videos, or other visual media within the virtual environment. The phrase "configured to display" refers to the setup, arrangement, or programming of a system or object to visually present or show information, images, or other content. This configuration may involve software settings, hardware specifications, or a combination of both that enable the object to render and exhibit visual elements. The term "dynamic content" refers to digital information or media that may change, update, or adapt in real-time or near real-time. Dynamic content may include live video streams, interactive presentations, real-time data visualizations, or any other form of content that may be modified or updated during the course of an event or user interaction.

In the context of generating a virtual event space visualization for media consumption in a hybrid 2D/3D manner, receiving virtual event space data including a definition of a virtual presentation location and at least one virtual display object associated with the virtual presentation location, wherein the at least one virtual display object is configured to display dynamic content, forms the foundation for creating an interactive and immersive virtual environment. This process involves obtaining the necessary information to construct the virtual space, including the specific area designated for content presentation and the digital objects that will serve as displays within that space.

For example in FIG. 13, process step 1300 may receive data defining a virtual conference hall, including specifications for a virtual presentation location, such as a stage hall, and one or virtual display objects, such as large screens, positioned on the stage. These virtual display objects are configured to show live video streams, interactive presentations, or other dynamic content that may be updated in real-time during the virtual event.

Some disclosed embodiments involve rendering an event space based on the virtual event space data. The term "rendering" refers to the process of generating a visual representation of data, typically in the form of an image or video. In computer graphics, rendering involves creating a two-dimensional or three-dimensional visual representation from a model or description of a scene, often using specialized software or hardware.

The term "event space" refers to a virtual environment or area designed to host and facilitate various types of gatherings, presentations, or interactions in a digital context. An event space may include virtual representations of physical elements such as rooms, stages, seating areas, or display screens, as well as interactive elements specific to digital environments.

By way of a non-limiting example, as described in detail below, the process step 1312 may use the received virtual event space data to create a visual representation of the virtual conference hall, including the stage area and large screens. This rendering process may involve generating 3D models, applying textures, setting up lighting, and positioning virtual objects according to the specifications provided in the virtual event space data. The resulting rendered event space may provide a visually coherent and interactive environment for virtual attendees to explore and engage with during the event.

In some embodiments, the virtual event space data further includes at least one virtual object and wherein the operations further comprise rendering the at least one virtual object in the event space using the isometric point of view; receiving from the virtual event attendee an object interaction trigger signal; and causing the avatar to perform a movement action corresponding to a movement action predefined for the at least one virtual object. The term "virtual object" refers to a digital representation of an item, element, or entity within a computer-generated environment. Virtual objects may range from simple decorative elements to complex interactive items that respond to user input or system events. The term "movement action" refers to a change in position, orientation, or state of an entity within a virtual environment. Movement actions may include translations, rotations, scaling, or other transformations that alter the spatial characteristics or appearance of an object or avatar. For example, a movement action may involve the avatar changing location. As seen in FIG. 4A, the avatar 420 could move to closer to an object, such as 430-1, 430-2, or 430-3. For example in FIG. 4G, the avatar 420 could interact with another avatar 490, or change appearance as seen in FIG. 4C.

The system may render virtual objects in the isometric view, providing a comprehensive overview of the event space and its contents. When a user interacts with one of these objects, the system receives a trigger signal and responds by animating the user's avatar to perform a predefined movement action associated with that specific object.

By way of a non-limiting example, as described in detail below, the virtual event space might include interactive objects such as virtual doors or teleportation points. These objects would be visible in the isometric view, allowing users to see their locations within the overall layout of the event space. For example, in FIG. 4A, a user may decide to interact with a virtual door 460, the user may click on the virtual door 460 or use a specific command. The system receives this interaction trigger signal and responds by animating the user's avatar to walk towards the door and perform an opening action. This movement action provides visual feedback of the interaction and maintains the sense of presence within the virtual environment, even when viewed from the isometric perspective.

Some disclosed embodiments involve rendering in the event space an avatar associated with a virtual event attendee. The term "avatar" refers to a digital representation or graphical embodiment of a user within a virtual environment. An avatar may take various forms, such as a 3D model, 2D icon, or animated character, and may be customized to reflect the user's preferences or characteristics. For example, avatars may include humanoid figures, animals, abstract shapes, or any other visual representation that allows users to interact within the virtual space. The term "virtual event attendee" refers to a user or participant who is present and engaged in a virtual event or gathering through a digital platform or interface. Virtual event attendees may interact with the event content, other attendees, and various elements of the virtual environment using their computer, mobile device, or other compatible hardware.

In the context of the present disclosure, the process step 1314 may render in the event space an avatar associated with a virtual event attendee refers to the process of creating and displaying a visual representation of a user within the virtual event environment. This process may involve generating and positioning the avatar within the rendered event space, allowing the virtual attendee to have a visible presence and means of interaction within the digital gathering.

By way of a non-limiting example, the system may create and display a customizable llama-shaped avatar for each virtual event attendee. These avatars may be rendered within the virtual conference hall, allowing attendees to move around the space, interact with virtual objects, and visually represent their presence to other participants. The rendering process ensures that the avatars are properly positioned and animated within the 3D environment, maintaining proper scaling, lighting, and perspective relative to other elements in the virtual event space. FIGS. 4A-4H show the avatar 420 positioned and interacting within the 3D environment. The avatar, objects, and screens all have the proper scale, lighting, and perspective.

Some embodiments involve rendering in the event space a plurality of avatars associated with a plurality of virtual event attendees, and wherein the non-isometric object-focused point of view of the virtual display object is common to each of the plurality of virtual event attendees. The term "plurality" refers to a group or collection consisting of two or more items, elements, or entities. In this context, it indicates multiple avatars representing multiple attendees within the virtual event space. The term "non-isometric object-focused point of view" refers to a more 3D-like perspective. In this context, based on user interactions and display object engagement, providing a hybrid 2D/3D experience for media consumption within the virtual event space, as seen in FIGS. 4A-4H.

In the context of generating a virtual event space visualization for media consumption in a hybrid 2D/3D manner, functionality for handling multiple attendees within the virtual event space and ensuring a consistent viewing experience when focusing on content may be included. The system renders multiple avatars representing different attendees, allowing for a sense of shared presence within the virtual environment. When transitioning to the non-isometric object-focused view of a virtual display object, all attendees are provided with the same perspective, regardless of their avatars' positions in the virtual space.

By way of a non-limiting example, during a virtual conference presentation, multiple attendee avatars might be scattered throughout a virtual auditorium. When the presenter activates a virtual display object to show a detailed diagram, the system transitions all attendees to the same non-isometric object-focused view. This shared perspective ensures that every attendee has an optimal view of the presented content, regardless of where their avatar is positioned in the virtual space, as seen in FIG. 4H with the virtual main display 440 location in relation to the avatar 420. This approach maintains a sense of shared experience and ensures equal access to information for all participants, while still allowing for individual exploration and interaction within the broader virtual event space when in the isometric view, as seen in FIG. 14A. 1400 shows the virtual main display 440 in isometric view where the user is exploring the presentation screen without seeing the other objects and avatars within the event space.

Some embodiments involve augmenting the event space with a chatroom user interface element, and in response to the at least one virtual event attendee interacting with the chatroom user interface element augmenting the event space with a chatroom configured for communication between a plurality of virtual attendees, wherein when the non-isometric object-focused point of view is used augmenting the event space with a chatroom includes triggering a camera associated with the non-isometric object focused point of view to zoom out so as to render the chatroom and the at least one virtual display object simultaneously visible.

The term "augmenting" refers to the act of adding to, enhancing, or supplementing an existing entity or system with additional features, information, or functionality. In the context of virtual environments, augmentation often involves adding new interactive elements or visual components to the existing space. The phrase "chatroom user interface element" refers to a graphical component or control within the virtual environment that allows users to access or interact with a text-based communication system. This element might be represented as a button, icon, or other interactive visual cue within the virtual space. The term "zoom out" refers to the action of adjusting a virtual camera or viewpoint to increase the field of view, typically resulting in a wider, more encompassing perspective of the scene. This action allows more elements to be visible within the frame, often at the cost of reducing the apparent size or detail of individual objects.

Figure 14A:
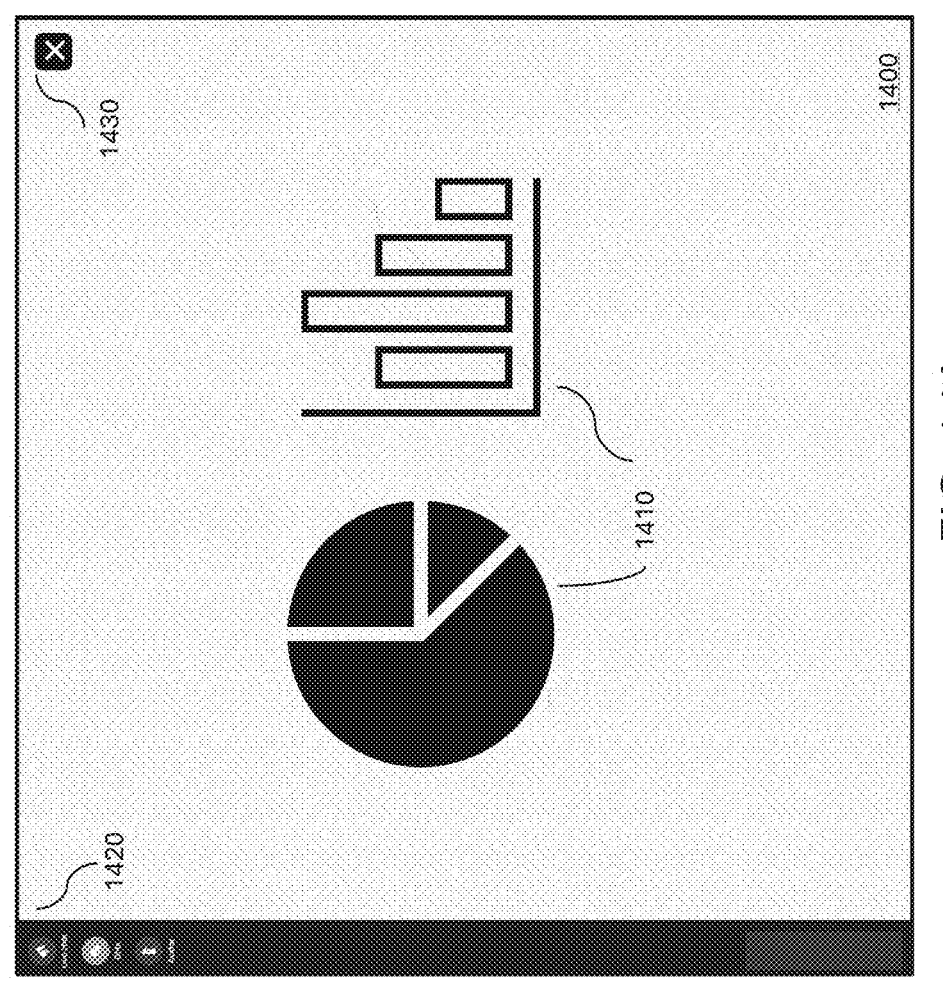
FIGS. 14A-14C illustrates the virtual presentation location in a first viewing state, causing the event space to be presented from an isometric point of view, consistent with some embodiments of the present disclosure.
Figure 14B:
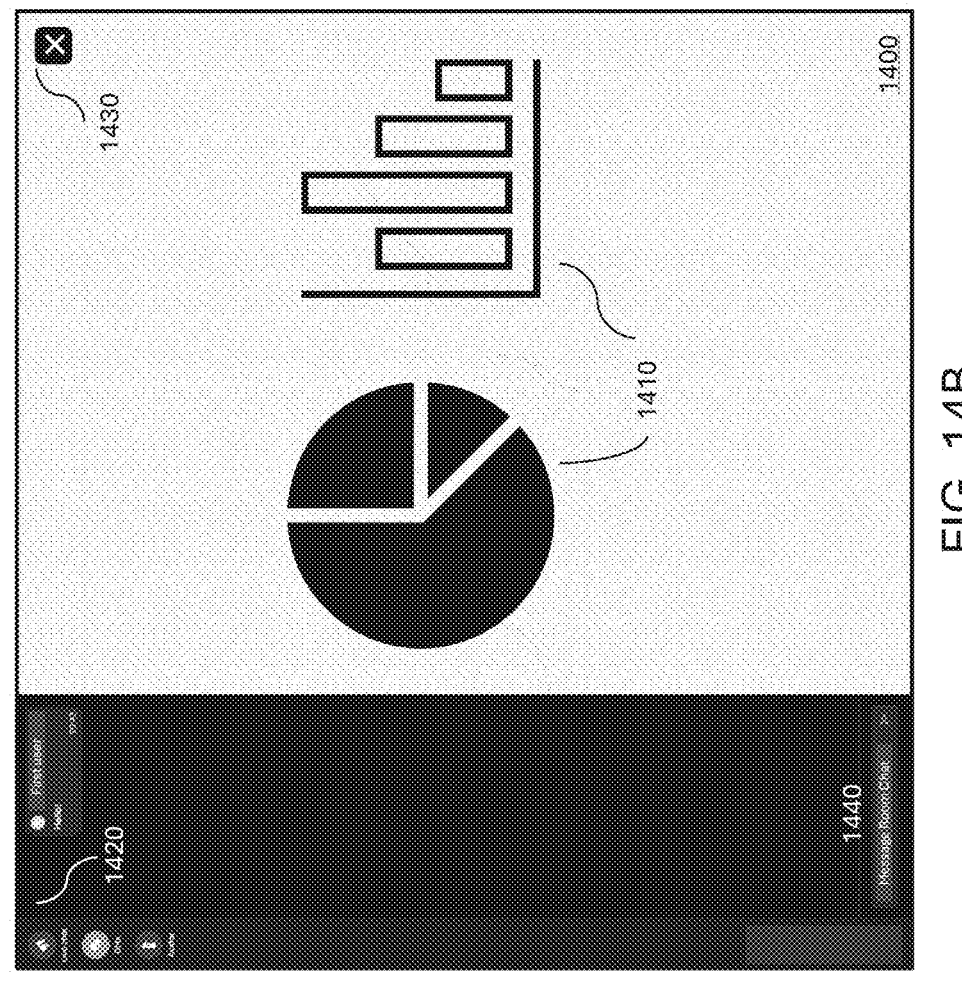

As seen in FIG. 14A, the system may integrate a chat system 1420 within the virtual event space and adapt the view to accommodate both content viewing and communication, as seen further in FIG. 14B. The system augments the event space with a chat interface 1440, allowing attendees to initiate text-based communication. When an attendee interacts with this interface, a full chatroom is added to the virtual space, as seen in FIG. 14B. Importantly, when in the non-isometric object-focused view, the system adjusts the camera to ensure that both the chatroom and the virtual display object remain visible, balancing content consumption with communication capabilities, as seen in 1400.

By way of a non-limiting example, as described in detail below, during a virtual presentation, an attendee might activate the chatroom interface to discuss the content with other participants. In response, the system adds a chatroom panel to the virtual space. If the attendee is currently in the non-isometric object-focused view, for example, closely examining a 3D model on a virtual display, the system automatically adjusts the virtual camera to zoom out. This adjustment ensures that the attendee may still see the 3D model on the virtual display while also viewing and interacting with the chatroom panel, as seen in FIG. 14B. This approach allows for simultaneous engagement with the presented content and communication with other attendees, enhancing the interactive and collaborative aspects of the virtual event experience.

Some disclosed embodiments involve when the avatar is positioned in the event space at a location distinct from the virtual presentation location, rendering portions of the virtual event space distinct from the virtual presentation location in a first viewing state, causing the event space to be presented from an isometric point of view on a display device of the virtual event attendee.

The term "positioned" refers to the placement, location, or orientation of an object or entity within a defined space or coordinate system. In the context of virtual environments, positioning may involve setting the coordinates, rotation, or other spatial parameters of a digital representation within the simulated space. The term "rendering portions" refers to the process of generating or creating visual representations of specific parts or sections of a larger whole, typically in the context of computer graphics or digital imaging. This may involve selectively processing and displaying certain elements of a scene while potentially omitting or de-emphasizing others. The phrase "first viewing state" refers to an initial or primary configuration of visual parameters that determine how a scene or environment is presented to a viewer. This may include aspects such as camera angle, field of view, lighting conditions, or level of detail rendered. The term "isometric point of view" refers to a method of visual representation where three-dimensional (3D) objects are depicted in a two-dimensional plane without using perspective. In an isometric view, the scale remains constant regardless of distance, and parallel lines remain parallel, creating a characteristic "flattened" 3D effect often used in technical drawings, maps, and certain types of video games. The term "display device" refers to any hardware component or system capable of visually presenting digital information to a user. This may include, but is not limited to, computer monitors, smartphone screens, virtual reality headsets, or any other technology that may render visual output from digital data.

For example, in FIG. 17-1, process step 1316 may provide a consistent, flattened 3D perspective that allows users to view the entire event space from a fixed angle, maintaining relative positions and sizes of objects regardless of their distance from the viewer. By way of a non-limiting example, when a user's avatar is located in an area of the virtual conference hall that is separate from the main presentation stage, the system renders the surrounding environment, such as seating areas, networking spaces, or exhibition booths, using an isometric perspective. This view is then displayed on the user's computer monitor, tablet, or VR headset, providing a comprehensive overview of the event space while maintaining a consistent scale and angle for all visible elements. This isometric representation allows attendees to easily navigate the virtual space and understand the relative positions of various features and other avatars within the environment.

Some embodiments involve receiving the dynamic content to be displayed by the at least one virtual display object, and rendering the at least one virtual display object displaying the received dynamic content using the isometric point of view or the non-isometric object-focused point of view. The term "dynamic content" refers to digital information or media that may change, update, or adapt in real-time or near real-time. Dynamic content may include live video streams, interactive presentations, real-time data visualizations, or any other form of content that may be modified or updated during the course of an event or user interaction.

The system may receive dynamic content, which may be continuously updated or changed, and then renders this content on the appropriate virtual display objects. This rendering may occur in either the isometric point of view, providing a broader context of the event space, or the non-isometric object-focused point of view, offering a more immersive experience focused on the content itself.

By way of a non-limiting example, when a live video stream is received as dynamic content for a virtual display screen within the conference hall, the system may render this content in real-time. In the isometric view, attendees might see the video playing on a small screen within the overall layout of the event space, as seen in FIG. 4H on the virtual display 440. When switching to the non-isometric object-focused view, the same video content would be rendered in greater detail, potentially filling more of the user's field of view for a more immersive experience, as seen in FIG. 14A. This flexibility allows for seamless transitions between overview and focused content consumption within the virtual event space.

In some embodiments, virtual event space data further includes at least one virtual non-interactive object and the operations further comprise rendering the event space, including the at least one virtual non-interactive object, using the isometric point of view. The term "virtual non-interactive object" refers to digital representations of items or elements within a virtual environment that do not respond to user input or actions. These objects serve as static components of the scene, providing visual context or ambiance without offering direct interaction capabilities. The phrase "rendering the event space" refers to the process of generating a visual representation of the entire virtual environment, including all its components, objects, and spatial relationships. This rendering creates the complete visual scene that users will perceive and navigate within the virtual event.

These non-interactive objects contribute to the overall atmosphere and design of the virtual environment without requiring direct user engagement. In addition, the capability to include and render non-interactive objects within the virtual event space, specifically when using the isometric point of view. For example, in FIG. 4A, when rendering the virtual conference hall in isometric view 400a, the system might include virtual non-interactive objects such as decorative plants, banners, or architectural elements like columns or staircases. These objects would be visible and contribute to the visual richness of the environment, helping to create a more realistic and immersive setting. However, unlike interactive elements like virtual display screens or avatars, these non-interactive objects would not respond to user actions or provide additional functionality. Their primary purpose is to enhance the visual experience and provide spatial context within the isometric overview of the event space. For example, the user is not able to interact with plant 450-1 in FIG. 4A, its purpose is to enhance the decorative aspect of the event space.

Some disclosed embodiments involve receiving a display object interaction trigger signal associated with impending interaction between the avatar and the virtual display object. The term "display object interaction trigger signal" refers to a digital input or notification that indicates an upcoming or potential interaction between a user's avatar and a virtual object within a simulated environment. This signal may be generated based on various factors such as proximity, user input, or predefined event conditions. For example, a display object interaction trigger signal may be initiated when an avatar moves within a certain distance of a virtual display object, when a user hovers their cursor over an interactive element, or when a timed event is about to occur. The term "impending interaction" refers to an action or engagement that is about to occur or is on the verge of happening within a virtual environment. An impending interaction may include actions such as an avatar approaching a virtual object, a user preparing to click on an interactive element, or a system-initiated event that is about to trigger a change in the virtual space.

The display object interaction trigger signal associated with impending interaction between the avatar and the virtual display object may refer to the process of detecting and processing an indication that a user's avatar is about to engage with a specific interactive element within the virtual event space, as seen in process step 1318 in FIG. 13. This signal serves as a prompt for the system to prepare for a transition from the isometric view to a more focused, non-isometric perspective centered on the virtual display object.

For example, when a user's avatar approaches a virtual display screen within the conference hall, the system may receive a trigger signal based on the avatar's proximity to the screen. This signal indicates that the user is likely to interact with the content displayed on the virtual screen, prompting the system to prepare for a transition from the isometric overview to a more immersive, object-focused view of the display screen and its content. Then, once a user has clicked on the virtual screen the view may go from FIG. 4H to FIG. 14A to be more immersive of the content on the screen 1400.

Some disclosed embodiments involve, in response to the display object interaction trigger signal, causing the avatar associated with the virtual attendee to move towards a viewing location in proximity of the virtual presentation location. The term "viewing location" refers to a predefined or dynamically determined position within the virtual environment that provides an optimal perspective of the presentation content. In this context, the avatar's movement toward the viewing location may ensure that the attendee is virtually repositioned to observe the presentation more effectively.

The virtual event platform may enhance spatial engagement and ensure that attendees maintain visual focus on presentation elements. By way of a non-limiting example, during a virtual meeting, when a user selects a shared document or activates a 3D model displayed at the presentation area, the virtual event platform may generate a trigger signal. In response, the avatar associated with the user is animated to glide or walk toward a position near the presentation zone, as illustrated in FIG. 4A, where the avatar 420 may glide or walk around the event space 400a. The avatar's movement may include smooth transitional effects, such as acceleration and deceleration, to create a natural and immersive experience. The repositioning of avatars based on interaction signals fosters a sense of presence and attentiveness within the virtual environment, thereby improving collaboration and engagement among participants.

Some embodiments involve receiving, from the virtual attendee, via an interactive interface a selection of an icon reflective of an emotion, and causing one or more representations of the selected icon to simultaneously move along one or more trajectories in a manner associated with the avatar associated with the at least one virtual attendee. The term "icon reflective of an emotion" refers to a small graphical symbol or image that represents a specific feeling, mood, or emotional state. These icons, often called emojis or emoticons, are used to convey non-verbal cues in digital communication. The term "simultaneously" refers to events or actions occurring or existing at the same time. In this context, it indicates that multiple representations of the selected icon move at the same time, potentially in different directions or along different paths.

Figure 14C:
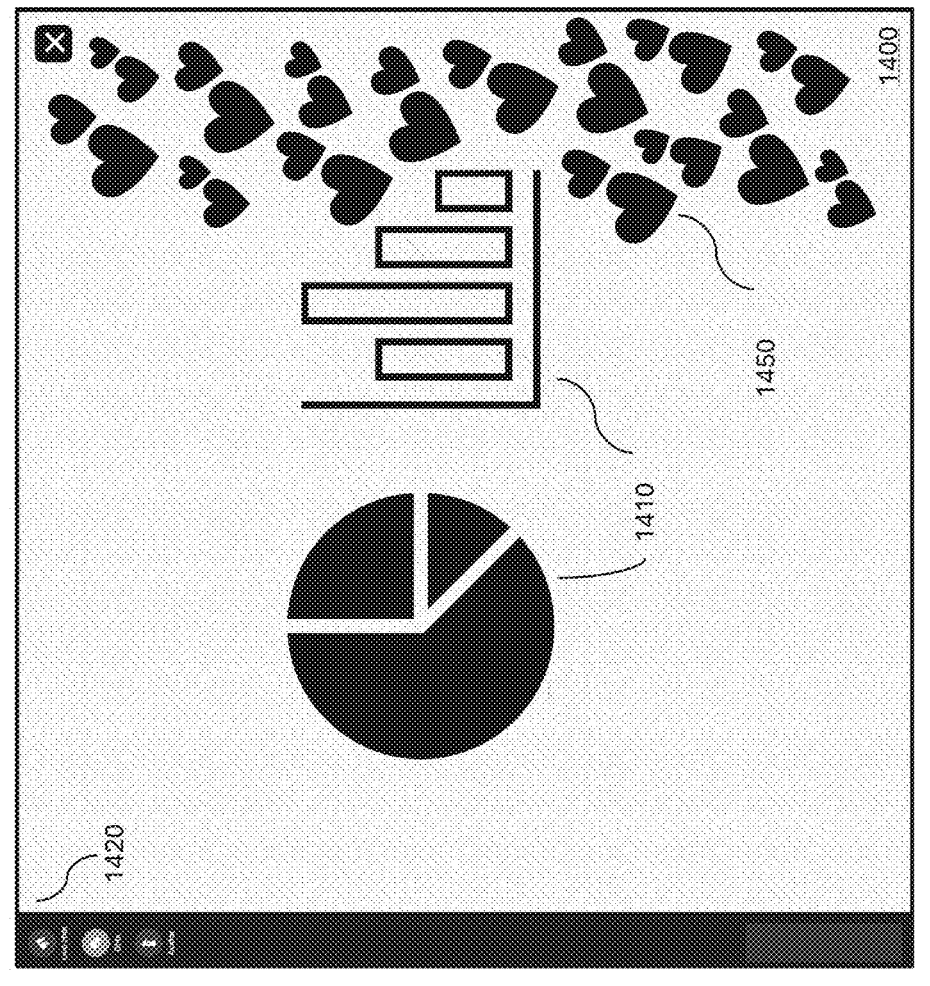

The system may provide an interactive interface for attendees to select emotion icons and then animates these icons in association with the attendee's avatar. This feature enhances non-verbal communication and emotional expression within the virtual environment. By way of a non-limiting example, as described in detail below, during a virtual presentation, an attendee might want to express excitement about the content being shared. The user could, for example, select clapping hands, a thumbs up, or a heart icon from an emotion menu. As seen in FIG. 14C, the user may choose a heart as the selected icon. The system would then generate multiple instances of the selected heart icon 1450 and animate them to move outward from the attendee's avatar in various directions as seen in FIG. 14C. These animated icons might float upwards and outwards, creating a visual burst of emotion associated with the avatar. This animation would be visible to other attendees, allowing for non-verbal feedback and emotional engagement within the virtual event space. The simultaneous movement of multiple icon representations creates a more dynamic and noticeable effect, enhancing the expressiveness of the feature.

In some embodiments, the one or more representations s of the selected icon in the first viewing state is different from the one or more representations s of the selected icon in the second viewing state. The term "representations" refers to visual depictions, symbols, or manifestations of an object, concept, or emotion within a digital environment. Representations may include 2D or 3D graphics, animations, or other visual elements that convey meaning or information to users. The term "first viewing state" refers to the initial or primary visual configuration of the virtual event space, typically characterized by an isometric point of view that provides a broader overview of the environment and its elements. The term "second viewing state" refers to an alternative visual configuration of the virtual event space, typically characterized by a non-isometric, object-focused point of view that provides a more detailed or immersive perspective on specific elements within the environment.

The system may adjust how selected icons are displayed depending on whether the user is in the first viewing state (isometric overview) or the second viewing state (non-isometric object-focused view). This adaptation ensures that emotional expressions remain visible and meaningful across different perspectives within the virtual environment.

Figure 4J:
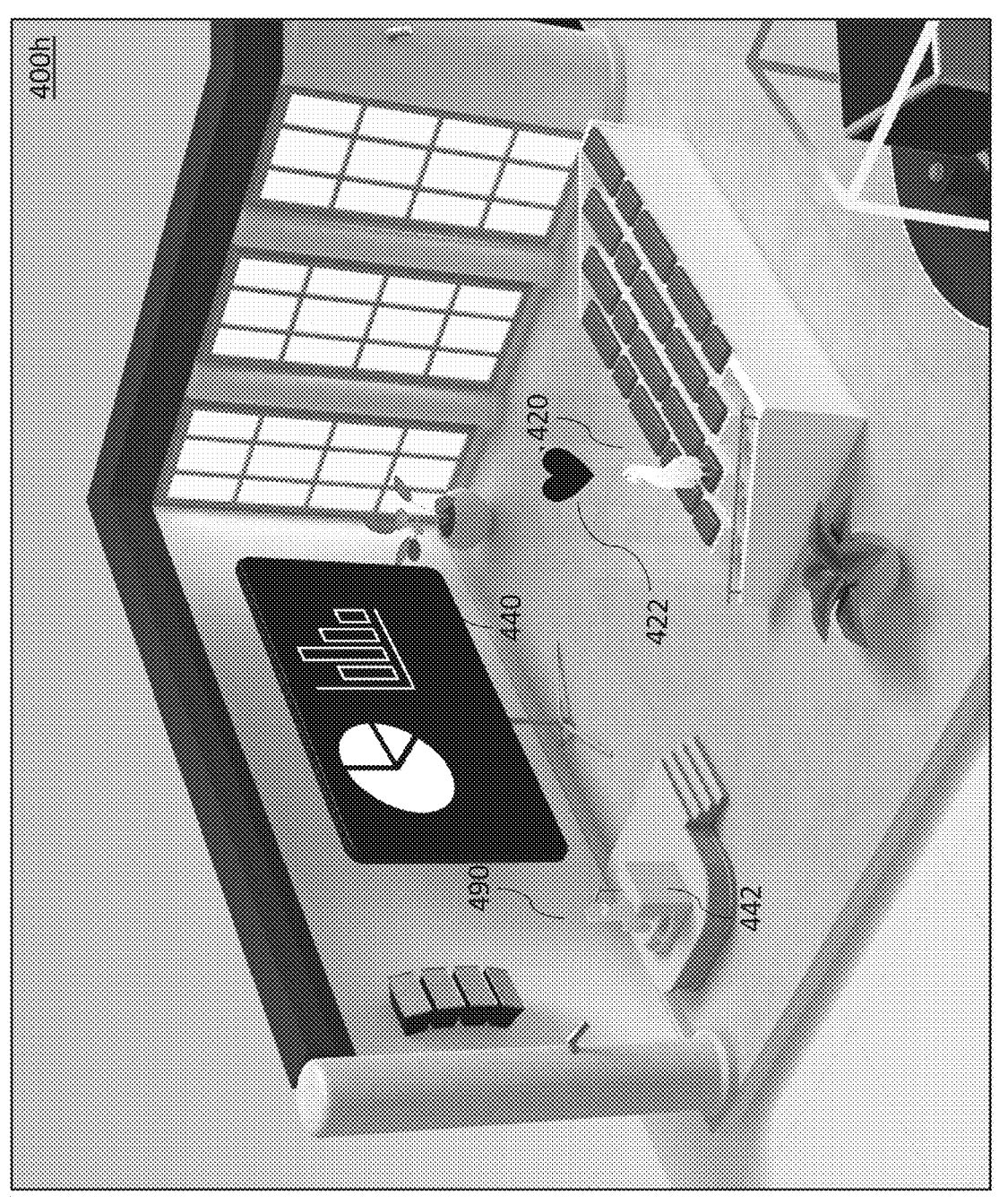
Figure 4K:
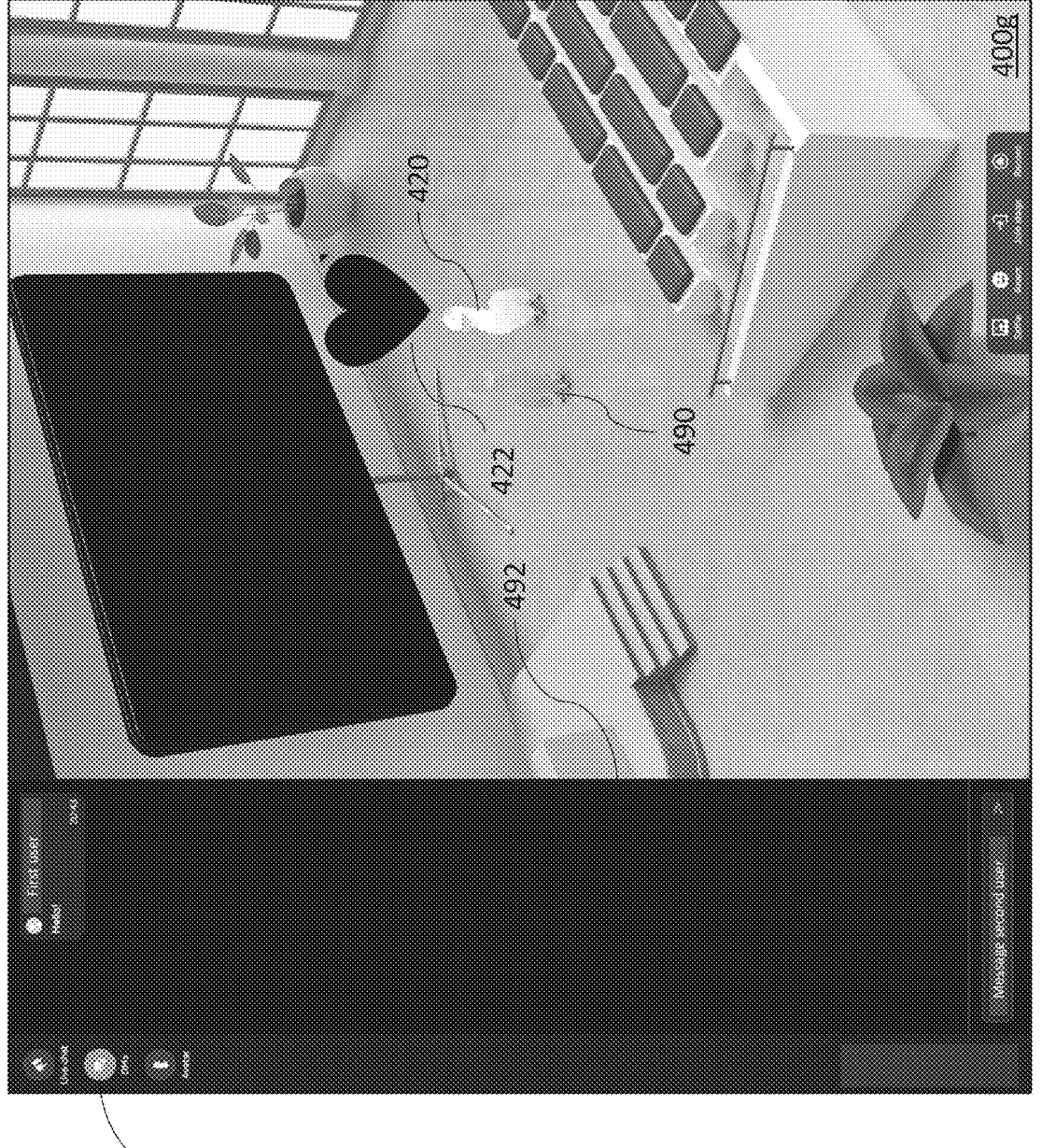

By way of a non-limiting example, as described in detail below, when a user selects a heart icon 422 to express approval, the system may render it as a small, floating symbol above the avatar in the first viewing state (isometric view), as seen in FIG. 4J. However, when transitioning to the second viewing state (non-isometric object-focused view) of a virtual display object, the same heart icon 422 might be rendered as a larger, more detailed 3D object that appears to emerge from the avatar's location, as seen in FIG. 4K. This differentiation in representation allows for appropriate visibility and impact of emotional expressions in both overview and focused interaction scenarios within the virtual event space.

In some embodiments, in the second viewing state, the one or more trajectories are configured such that the selected icons are partially and momentarily obstructing the virtual display device. The term "trajectories" refers to the paths or routes along which objects or visual elements move within a virtual environment. Trajectories may be defined by mathematical functions, animations, or predefined motion patterns. The term "partially" refers to the state of being incomplete or not fully covering or affecting something. In the context of visual obstruction, partial coverage implies that some, but not all, of the obstructed object remains visible. The term "momentarily" refers to a brief or short duration of time, typically lasting only for a moment or a few seconds. In the context of visual effects, momentary actions are fleeting and do not persist for extended periods.

The system configures the movement paths of selected emotional icons to briefly and partially obscure the virtual display object, creating a visually striking effect that emphasizes the user's emotional response without completely disrupting content visibility. By way of a non-limiting example, as described in detail below, when a user expresses excitement by selecting a "fireworks" icon during a presentation, the system may animate multiple instances of the icon to burst outward from the avatar's location. In the non-isometric object-focused view, these animated icons may briefly pass in front of the virtual display object, creating a momentary, partial obstruction of the presentation's content. This effect might involve colorful sparks or light trails that cross the screen for a second or two before fading away, drawing attention to the user's emotional reaction while quickly clearing to allow uninterrupted viewing of the presentation's content.

In some embodiments, virtual attendees in the first viewing state are enabled to see the one or more representations of the selected icons of virtual attendees in the second viewing state. The term "enabled" refers to the state of being given the ability, permission, or capacity to perform a specific action or access certain features within a system or environment. The term "virtual attendees" refers to digital representations of users or participants within a simulated event or gathering space. Virtual attendees may be represented by avatars, icons, or other visual indicators of their presence and actions within the virtual environment.

The system allows users in the first viewing state (isometric overview) to observe the emotional expressions of users who are engaged in the second viewing state (focused interactions). This feature enhances the sense of connection and shared presence within the virtual event space, even when participants are interacting with content in different ways.

For example, during a virtual conference presentation, some attendees may be viewing the overall event space in the isometric view, while others are closely engaged with a specific virtual display object in the non-isometric object-focused view. When an attendee in the focused view expresses excitement by triggering a heart icon 1450 animation, the system renders a scaled-down version of this animation visible to attendees in the isometric view, as seen in FIG. 14C. This might appear as small, animated hearts or sparkles emanating from the location of the focused attendee's avatar, allowing those in the overview to perceive and potentially respond to the emotional reactions of their peers, regardless of their current viewing state.

In some embodiments, the one or more representations of the selected icons presented on the display device of the virtual attendee when in the second viewing state are different from the one or more representations s of the selected icons presented on display devices of other virtual attendees when in the first viewing state. The virtual event platform may implement logic to dynamically alter the visual characteristics of the selected icons based on the viewing state of each attendee. By way of a non-limiting example, when a user selects a heart icon during a virtual event, the virtual event platform may render multiple animated hearts 1450 in vibrant colors and larger sizes on the initiating attendee's display device in the second viewing state, creating a more immersive and expressive effect as seen in FIG. 14C. Conversely, on other attendees' devices operating in the first viewing state, the same heart icon may appear as smaller, static symbols or with reduced animation complexity. The virtual event platform may implement logic to dynamically alter the visual characteristics and spatial anchoring of the selected icons based on the viewing state of each attendee. By way of a non-limiting example, when a user selects a heart icon, the virtual event platform may render multiple animated hearts overlaying the virtual display object or the general field of view on the initiating attendee's display device in the second viewing state. Conversely, on other attendees' devices operating in the first viewing state, the same heart icon may appear as smaller, static symbols anchored to and floating vertically above the specific avatar associated with the user generating the reaction. This differentiation enhances personalization while maintaining consistency across the shared environment. Such adaptive rendering ensures that emotional feedback remains visible to all participants while providing a richer experience for the user.

Some embodiments involve, in response to the virtual attendee engaging with a content displayed on the virtual display object, causing a visual indicator to be displayed in a manner associated with the avatar associated with the virtual attendee, the visual indicator conveying relevant information. The term "visual indicator" refers to any graphical element, symbol, or visual cue that provides information or feedback within a user interface or virtual environment. Visual indicators may include icons, badges, color changes, animations, or other graphical representations that convey status, progress, or other relevant data. The phrase "conveying relevant information" refers to the process of communicating or presenting data, status updates, or other pertinent details that are applicable or important to the current context or user action. Relevant information may include, but is not limited to, engagement metrics, content-specific details, or user-specific data related to the interaction.

For example, the system may display a visual indicator associated with the user's avatar to communicate information about their engagement with the content on the virtual display object. This feature enhances the interactive nature of the virtual event space and provides additional context for other attendees. When a virtual attendee views a presentation slide on a virtual display object, the system may cause a small icon to appear above their avatar, indicating that they are currently engaged with that specific content. This visual indicator might change color or animate based on the duration of engagement or the type of interaction, for example, viewing, commenting, or sharing. Other attendees in both the isometric and non-isometric views would be able to see these indicators, providing insights into which content is generating the most interest or engagement during the virtual event.

In some embodiments, the virtual display object is associated with at least one other virtual attendee acting as a presenter. The term "presenter" refers to an individual or entity responsible for delivering, explaining, or showcasing content, information, or ideas to an audience. In the context of virtual environments, a presenter may control the content displayed on virtual objects and guide the flow of information during an event or meeting.

For example, certain virtual display objects may be linked to specific virtual attendees who have presenter roles. This association allows for a more dynamic and interactive presentation experience within the virtual event space, mimicking real-world scenarios where speakers control and present content to an audience. During a virtual conference, a designated presenter's avatar might be visually linked to a large virtual display screen. When this presenter interacts with the display object, they may control the content shown, advance slides, or initiate interactive elements. Other attendees would see the presenter's avatar near the display object, providing a clear visual indication of who is currently leading the presentation or discussion. This feature enhances the sense of presence and authority for presenters within the virtual event space, creating a more engaging and structured experience for all attendees.

Some disclosed embodiments involve, in response to the display object interaction trigger signal, changing the first viewing state to a second viewing state in which the virtual display object is caused to be displayed on the virtual event attendee's display device from a second viewing state causing presentation in a non-isometric object-focused point of view.

The term "changing" refers to the act of altering, modifying, or transforming something from one state or condition to another. In the context of digital systems, changing may involve updating data, modifying visual representations, or transitioning between different modes of operation. The phrase "viewing state" refers to a particular configuration or mode of visual presentation within a digital environment. A viewing state may encompass various aspects of how information is displayed, including perspective, level of detail, focus, and other visual parameters that define the user's view of the virtual space. Changing the first viewing state to a second viewing state refers to the process of transitioning from one visual configuration to another within a digital environment. This change may involve altering the perspective, focus, or other visual parameters to provide a different view or interaction experience for the user. The phrase "object-focused point of view" refers to a visual perspective that emphasizes or centers on a specific object or element within a scene. This type of view may involve zooming in on the object, adjusting the camera angle to highlight its features, or otherwise directing the user's attention to the object of interest.

The embodiment may refer to the process of altering the visual representation to provide a more immersive and detailed view of a specific virtual object or element. This transition may involve changing from a broader, isometric overview to a more focused, three-dimensional perspective that highlights the object of interest and its surrounding context.

By way of a non-limiting example, as described in detail below, when the system 1300 receives the display object interaction trigger signal, for example, based on the avatar's proximity to a virtual display screen, it initiates a transition from the isometric overview to a more immersive, object-focused view as seen in step 1320. This may involve smoothly adjusting the camera angle, zooming in on the virtual display object, and potentially altering the rendering style to provide a more detailed and three-dimensional representation of the content. For instance, the system might transition from a top-down, isometric view of the entire conference hall to a first-person or slightly angled perspective that prominently features the virtual display screen and its content, while still maintaining some context of the surrounding virtual environment.

In some embodiments, when multiple instances of the event space are created, and content is presented on the virtual display object, by a presenter associated with a presenter avatar, the same presenter avatar is presented across all instances. The term "instances" refers to separate occurrences, copies, or iterations of a particular entity, object, or environment. In the context of virtual spaces, instances may represent duplicate or parallel versions of the same event space, potentially accommodating different groups of attendees. The phrase "presented across all instances" refers to the consistent display or representation of an element, such as an avatar, in multiple parallel or duplicate versions of a virtual environment. This consistency ensures that the same visual representation is maintained across different groups or sessions within the broader virtual event. In the context of generating a virtual event space visualization for media consumption in a hybrid 2D/3D manner, this approach addresses scenarios where a virtual event may need to be replicated to accommodate large numbers of attendees or different time zones. By ensuring that the presenter's avatar remains consistent across all instances, the system maintains a unified and professional presentation experience, regardless of which instance an attendee joins.

By way of a non-limiting example, as described in detail below, a popular virtual conference might create multiple instances of the event space to handle thousands of attendees without overcrowding. A keynote speaker presenting in this multi-instance setup would have their avatar and associated virtual display object replicated identically across all instances. This means that regardless of which instance an attendee joins, they would see the same presenter avatar, positioned in the same location controlling the same virtual display object. This location, for example, may be behind a podium or next to the display screen. The content presented on the display object would be synchronized across all instances, ensuring that every attendee receives the same information simultaneously. This approach allows for scalable virtual events that maintain a consistent and high-quality experience for all participants, regardless of the total number of attendees or their distribution across different instances of the virtual space.

Some disclosed embodiments involve maintaining the non-isometric object-focused point of view while the avatar interacts with the at least one virtual display object. The term "maintaining" refers to the act of keeping or preserving a particular state, condition, or configuration over a period of time. In the context of computer systems and user interfaces, maintaining may involve continuously updating or refreshing a visual representation to ensure it remains consistent with a desired perspective or mode of interaction. The phrase "while the avatar interacts" refers to a period of time during which a user's digital representation (avatar) is engaged in some form of action, manipulation, or communication within the virtual environment. This interaction may include activities such as moving the avatar, selecting objects, inputting commands, or participating in virtual events.

This approach ensures that the user remains focused on the presented media or information without being distracted by sudden shifts in perspective or unnecessary elements of the broader virtual environment. For example, once the system has transitioned to the non-isometric object-focused view of a virtual display screen, it continues to render this perspective as the user's avatar engages with the content. As seen in FIG. 14B, the display screen 1400 view stays the same even when the chat 1420 is enabled. The user may then send a chat message 1440 and look at the objects on the display screen 1410, at the same time. For instance, if the virtual display object is showing a video presentation, the system maintains the focused view throughout the duration of the video, allowing the user to watch the content without interruption. Even if the user's avatar moves slightly or performs actions like raising a virtual hand to ask a question, the system adjusts the view to keep the virtual display object as the central focus, ensuring a consistent and immersive media consumption experience within the virtual event space, as seen in step 1322 in FIG. 13.

In some embodiments, the non-isometric object-focused point of view corresponds to a first person point of view from a location different from that of the avatar relative to the virtual display object. The term "first person point of view" refers to a perspective in which the virtual environment is presented as if seen through the eyes of a character or entity within that environment. This view typically shows what would be visible from the viewpoint of the character, without showing the character's body or avatar. The phrase "location different from that of the avatar" refers to a spatial position within the virtual environment that is distinct from the position occupied by the user's digital representation (avatar). This different location may be closer to, farther from, or at a different angle relative to the virtual display object compared to the avatar's actual position.

The perspective shift to a first-person view that is not necessarily tied to the avatar's position allows for greater flexibility in presenting content and may provide a more immersive experience for the user. For example, when a user's avatar approaches a virtual display screen showing a presentation, the system might transition to a first-person view positioned directly in front of the screen, even if the avatar itself is off to the side or further back in the virtual space. This perspective shift allows for optimal viewing of the content without being constrained by the avatar's actual position, enhancing the user's ability to engage with the presented material while maintaining a sense of presence within the virtual environment.

In some embodiments, the non-isometric object-focused point of view corresponds to a view uncorrelated to the avatar location. The term "uncorrelated" refers to a lack of direct relationship, connection, or dependency between two or more variables, elements, or aspects within a system or context. In this case, it indicates that the viewing perspective is not directly tied to or determined by the position of the user's avatar. The non-isometric object-focused view might be completely independent of the avatar's position within the virtual space. This allows for greater flexibility in presenting content and may provide optimal viewing angles regardless of where the user's avatar is located.

For example, when a user engages with a virtual display object showing a detailed presentation, the system might transition to a non-isometric object-focused view that provides the best angle for viewing the content, regardless of the avatar's actual position in the virtual space. For instance, if the avatar is standing at the back of a virtual auditorium, the object-focused view could still present the content as if viewed from the front row, ensuring optimal visibility and engagement with the presented material. As seen in FIGS. 14A, 14B, and 14C, the size of the screen is the same regardless of the location of the avatar. This uncorrelated view enhances the user's ability to consume content effectively while maintaining the overall context of being present within the virtual event space.

In some embodiments, the presenter is identifiable as being located in vicinity of an object placed near the virtual display object. The term "identifiable" refers to the ability to recognize, distinguish, or determine the identity or characteristics of something or someone within a given context. In virtual environments, identifiability may involve visual cues, labels, or other indicators that help users recognize specific roles or individuals. The term "vicinity" refers to the area or space surrounding or near a particular location, object, or point of reference. In virtual spaces, vicinity may be defined by proximity, visual alignment, or programmatic association between elements.

By associating the presenter with an object near the virtual display, the system creates a clear and intuitive way for attendees to recognize who is in control of the presentation, enhancing the overall organization and clarity of the virtual event. By way of a non-limiting example, a podium 442 might be placed next to the virtual main display 440 in the virtual event space 400*h*. The presenter's avatar would be positioned behind or near this podium, making it easy for other attendees to identify who is currently presenting. This setup mimics real-world conference or lecture scenarios, providing familiar visual cues that help attendees understand the roles and focus of attention within the virtual environment. Whether viewed from the isometric overview or the non-isometric object-focused perspective, the combination of the presenter's avatar, the podium, and the virtual display object would create a clear presentation area, enhancing the structure and professionalism of the virtual event.

Some disclosed embodiments involve in response to receiving a reversion signal corresponding to an intended cessation viewing the virtual display object, reverting the second viewing state to the first viewing state. The term "reversion signal" refers to a digital input, command, or notification that indicates a desire or intention to return to a previous state or condition within a system or application. For example, a reversion signal may be triggered by a user action, such as pressing a specific button, performing a gesture, or issuing a voice command, or it may be automatically generated by the system based on predefined conditions or timeouts. The phrase "intended cessation viewing" refers to a user's deliberate decision or action to stop or pause their engagement with specific content or visual elements within a digital environment. This may be indicated through various user inputs or behaviors that signal a desire to disengage from the current focus of attention.

Reverting the second viewing state to the first viewing state refers to the process of transitioning from the non-isometric object-focused point of view back to the isometric point of view that provides a broader overview of the virtual event space, as seen in step 1324 of FIG. 13. This reversion process is triggered in response to detecting a user's intention to stop viewing or interacting with the virtual display object, allowing for a seamless transition between focused and overview perspectives within the virtual environment. For example, in FIG. 14B, when a user has finished watching a video presentation on a virtual display screen and indicates their desire to return to the broader event space, for example, by pressing an "exit" button or performing a specific gesture 1430, the system receives this reversion signal. In response, it smoothly transitions the view from the non-isometric object-focused perspective back to the isometric overview of the virtual conference hall. This transition may involve adjusting the camera angle, zooming out, and potentially altering the rendering style to provide a comprehensive view of the entire event space, allowing the user to easily navigate to other areas or engage with different aspects of the virtual environment.

In some embodiments, the object is a podium and the presenter is located behind the podium. The term "podium" refers to a raised platform or elevated structure typically used by speakers, presenters, or performers to deliver addresses, lectures, or performances to an audience. In virtual environments, a podium may be represented as a 3D model or graphical element that serves a similar symbolic and functional purpose. The phrase "located behind the podium" refers to the positioning of a virtual avatar or representation in a spatial arrangement where the podium is between the avatar and the primary viewing direction or audience. This arrangement mimics traditional speaking or presentation setups in physical environments.

As seen in FIG. 4H, by placing the avatar 490 behind a virtual podium 442, the system creates a highly recognizable and intuitive presentation setup that closely mirrors real-world conventions, enhancing the immersion and familiarity of the virtual event experience. For example, when a presentation is about to begin in the virtual event space, attendees would see a 3D model of a podium appear near the virtual display screen. The avatar of the designated presenter would then move into position behind this podium. This arrangement would be visible from both the isometric overview and the non-isometric object-focused views, providing a clear visual cue for all attendees. The podium serves as a focal point, helping to direct attention to the presenter and the associated virtual display object. This setup not only aids in identifying the current speaker but also adds a layer of professionalism and structure to the virtual event, making it feel more like a traditional conference or lecture environment.

In some embodiments, portions of the virtual event space are rendered in the first or the second viewing state on the display device of the presenter, while presenting. The term "portions" refers to parts, sections, or segments of a larger whole. In the context of virtual environments, portions may refer to specific areas, objects, or elements within the overall virtual space. The phrase "while presenting" refers to the duration or period during which a presenter is actively delivering content, information, or a performance to an audience. In virtual environments, this may involve controlling content on virtual display objects, speaking to attendees, or guiding interactions within the space.

The presenter's view of the virtual event space may dynamically switch between the first viewing state (isometric overview) and the second viewing state (non-isometric object-focused view) during their presentation. This flexibility allows presenters to maintain awareness of the broader event space while also focusing on specific content or interactions as needed. For example, a presenter delivering a virtual keynote speech might have their display device initially show the isometric view of the entire conference hall, allowing them to see the distribution and engagement of attendee avatars. When they begin discussing a specific slide or 3D model on the virtual display object, their view could automatically transition to the non-isometric object-focused state, providing a more detailed and immersive perspective of the content they're presenting. The presenter could then switch back to the isometric view to gauge audience reactions or to facilitate a Q&A session. This dynamic rendering approach enables presenters to effectively manage both their content and their audience interaction within the virtual event space, enhancing their ability to deliver engaging and responsive presentations.

The disclosed system for generating a virtual event space visualization for media consumption in a hybrid 2D/3D manner involves several elements that work together to create an immersive and interactive virtual environment. The system begins by receiving virtual event space data, which includes definitions for virtual presentation locations and associated virtual display objects. This data forms the foundation for rendering the event space and positioning avatars representing virtual event attendees.

One aspect of the system is its ability to dynamically switch between two distinct viewing states. Initially, when an avatar is positioned away from the virtual presentation location, the system renders the event space from an isometric point of view. This provides attendees with a comprehensive overview of the virtual environment. However, upon receiving a display object interaction trigger signal, the system smoothly transitions to a non-isometric object-focused point of view. This change in perspective allows for more detailed engagement with virtual display objects and their content.

The system maintains this object-focused view during avatar interactions with virtual display objects, enhancing the immersive experience of content consumption. When the interaction concludes, as indicated by a reversion signal, the system reverts to the initial isometric view, allowing attendees to easily navigate the broader event space once more.

In one implementation according to disclosed embodiments, the system may handle dynamic content, receiving and rendering it in real-time on virtual display objects. This capability ensures that virtual events may feature live or updated content, mirroring the experience of physical events. The system also accommodates multiple attendees, rendering numerous avatars and providing a shared, non-isometric object-focused view when interacting with display objects. This feature facilitates a collective viewing experience, beneficial for virtual conferences or presentations.

Another important aspect of the system is its ability to integrate communication features within the virtual environment. For example, the event space may be augmented with a chatroom user interface element. When activated, the system adjusts the camera view to simultaneously display both the chatroom and the virtual display object, enabling attendees to engage with content while participating in discussions.

The system also incorporates emotional expression capabilities, allowing attendees to select icons representing emotions. These icons are then animated in the virtual space, with their representation adapting based on the current viewing state. This feature adds a layer of non-verbal communication to the virtual event experience, enhancing attendee engagement and interaction.

For presentations, the system allows for the designation of presenter avatars associated with specific virtual display objects. Presenters may be identified by their proximity to objects like virtual podiums, mimicking real-world conference setups. The system also supports multiple instances of the event space while maintaining consistency in presenter avatar representation across all instances, enabling scalable events with a uniform experience for all attendees.

Overall, these elements and their interactions create a sophisticated virtual event platform that balances comprehensive spatial awareness with focused content engagement, while incorporating features that enhance communication, emotional expression, and presentation capabilities in a virtual setting.

The present disclosure addresses a significant technological problem in virtual event platforms, namely the challenge of providing an immersive and interactive experience that balances comprehensive spatial awareness with focused content engagement. Conventional virtual event systems often struggle to seamlessly transition between broad overviews and detailed interactions, leading to disjointed user experiences and reduced engagement.

The disclosed system introduces a novel approach to generating virtual event space visualizations for media consumption in a hybrid 2D/3D manner. This approach involves dynamically switching between an isometric point of view for broad spatial awareness and a non-isometric object-focused point of view for detailed content interaction. The system employs sophisticated rendering techniques to create these distinct viewing states and manages smooth transitions between them based on user interactions and display object engagement signals.

At a technical level, the invention works by receiving and processing virtual event space data, including definitions of virtual presentation locations and associated virtual display objects. The system renders the event space and avatars based on this data, utilizing different rendering techniques for the isometric and non-isometric views. When an avatar is positioned away from a virtual presentation location, the system renders the event space from an isometric point of view, providing a comprehensive overview. Upon receiving a display object interaction trigger signal, the system dynamically changes the rendering state to a non-isometric object-focused view, reconfiguring the virtual camera and adjusting rendering parameters to provide a more immersive perspective on the virtual display object and its content.

As a result, the system modifies and improves computer operation by optimizing rendering processes and resource allocation based on user interactions and content focus. This dynamic approach allows for more efficient use of computational resources, as detailed rendering is applied selectively to areas of current user interest rather than uniformly across the entire virtual space.

The invention also reconfigures device operation by implementing a hybrid 2D/3D visualization system that seamlessly integrates isometric and non-isometric views. This approach enhances the user's ability to navigate and interact within the virtual environment, improving spatial awareness and content engagement simultaneously. The system's ability to maintain consistent avatar representations and emotional expressions across different viewing states further enhances the sense of presence and continuity within the virtual event space.

Measurable improvements resulting from this invention include reduced cognitive load on users, as they may easily switch between overview and detailed perspectives without losing context. The system also enables more efficient data transmission, as it may selectively render high-detail content only when needed, potentially reducing bandwidth requirements for large-scale virtual events.

As an example scenario, consider a virtual conference with 10,000 attendees. Using conventional systems, rendering detailed 3D environments for all attendees simultaneously could require significant computational resources and bandwidth. With the disclosed system, the majority of attendees viewing the event space in isometric view may be rendered with lower detail, while only those actively engaging with specific content receive high-detail, non-isometric renders. This approach could potentially reduce overall rendering load by 60-70%, allowing for smoother performance and lower latency even on devices with limited processing power.

The disclosed system goes beyond merely processing information or displaying results. It fundamentally alters how virtual environments are rendered and experienced, creating a more immersive, efficient, and engaging platform for virtual events. This technical solution addresses the specific problem of balancing spatial awareness and focused interaction in virtual environments, providing a novel approach that enhances both user experience and system performance.

A number of implementations have been described. Nevertheless, it will be understood that various modifications may be made without departing from the spirit and scope of the disclosure. Accordingly, other implementations are within the scope of the following claims.

Monday Mansion Fourth Concept—Interactive Agenda Connected to 3D Environment [Header to be Deleted when Filing]

Some disclosed embodiments involve guiding virtual attendees of a virtual event space toward events of interest. The term "guiding" refers to directing, steering, or assisting in navigation. For example, guiding may involve providing instructions, visual cues, or automated movement to help users reach a desired location or objective within a virtual environment.

The term "virtual attendees" refers to users or participants who are present in a digital or online environment, typically represented by avatars or other digital representations. Virtual attendees may interact with the environment and other participants through computer interfaces, without being physically present in the same location. The term "virtual event space" refers to a digital environment designed to host gatherings, meetings, or conferences in a simulated three-dimensional space. For example, a virtual event space may include virtual rooms, auditoriums, exhibition halls, or other areas where attendees may interact, view content, and participate in activities. The term "events of interest" refers to specific activities, presentations, or interactions within a virtual event that are relevant or appealing to particular attendees. For example, events of interest may include keynote speeches, breakout sessions, networking opportunities, or interactive demonstrations.

Guiding virtual attendees of a virtual event space toward events of interest may refer to the process of directing or assisting users represented by digital avatars to navigate within a simulated three-dimensional environment to locate and participate in specific activities, presentations, or interactions that are relevant or appealing to them. This may involve providing navigation aids, personalized recommendations, or automated movement of avatars to ensure attendees can efficiently find and engage with content or experiences that align with their preferences or event agenda.

By way of a non-limiting example, the system may receive selections of objects of interest from virtual attendees prior to or during an event, and then direct these attendees to their selected objects at appropriate times during the event, ensuring they do not miss presentations or activities that are relevant to their interests. For example, FIG. 5A shows an avatar interacting with gallery interactive objects 510a and 510b, which are configured to display predetermined content with alternative designs compared to image gallery 430-3 in FIG. 4C.

FIG. 15 is a flowchart of an exemplary process 1500 for guiding virtual attendees of a virtual event space toward events of interest, consistent with some of the disclosed embodiments. Process 1500 is discussed herein for explanatory purposes and is not intended to be limiting. In some embodiments, steps of process 1500 may be changed, modified, substituted, or rearranged, consistent with the present disclosure. Process 1500 may be implemented using one or more components of user/virtual computing device 220-1 through 220-7 (discussed in FIG. 2A), computing device 100 (discussed in FIG. 1A), or user device 154 of computing architecture 150 (discussed in FIG. 1B). Some disclosed embodiments may include at least one processor that may be configured to execute stored instructions to perform operations to guide virtual attendees of a virtual event space toward events of interest. As shown in FIG. 15, process 1500 may include steps 1510, 1512, 1514, 1516, 1518, and 1520, discussed in further detail below.

The 1500 process begins with step 1510 of receiving event details from an event host organizer. These details may include a selected event space and an event agenda with multiple agenda items, forming the foundation for the virtual event structure. Following the receipt of event details, the process moves to step 1512, where an event link may be generated. This link is configured to enable access to the event for attendees, serving as a gateway to the virtual environment. In step 1514, the event space is rendered, including a plurality of virtual objects. Importantly, at least one of these virtual objects may be identified on the event agenda and has an associated presentation time, creating a dynamic and scheduled environment within the virtual space. The process then proceeds to step 1516, which involves receiving virtual event attendee data from a plurality of virtual event attendees. Based on this data, the system may render avatars in the event space, with each avatar being associated with a different virtual event attendee. This step provides a visual representation and presence for each participant within the virtual environment. In step 1518, the process receives selections of objects of interest from at least some of the virtual attendees. These selections are made from the plurality of virtual objects, either prior to or during the associated presentation times for the selected objects of interest. This step may allow attendees to indicate their preferences and areas of focus within the event. Finally, step 1520 may direct the virtual attendees to their selected objects of interest during the event. This guidance occurs at times corresponding to the presentation time of their selected objects of interest, ensuring that attendees can efficiently navigate the virtual space and engage with content that aligns with their interests.

One overall purpose of this process is to create a personalized and efficient virtual event experience. By guiding attendees to their points of interest at relevant times, the system may ensure that attendees may maximize their event experience, focusing on content and interactions that are most valuable to them. This approach may be particularly useful in large-scale virtual conferences, trade shows, or educational events where attendees need assistance in navigating complex virtual environments and managing their time effectively.

A number of implementations have been described. Nevertheless, it will be understood that various modifications may be made without departing from the spirit and scope of the disclosure. Accordingly, other implementations are within the scope of the following claims.

Some disclosed embodiments involve receiving from an event host organizer event details, wherein the event details include a selected event space and an event agenda including a plurality of agenda items. The term "receiving" refers to the act of obtaining, acquiring, or accepting information, data, or input from an external source. For example, receiving may involve obtaining data through a user interface, accepting input from a network connection, or acquiring information from a database or storage system. The term "event host organizer" refers to an individual, group, or entity responsible for planning, coordinating, and managing an event. For example, an event host organizer may be a company representative, a professional event planner, or a designated team member tasked with overseeing the event's logistics and execution. The term "event details" refers to specific information and parameters related to the planning, execution, and content of an event. For example, event details may include the date and time of the event, the venue or platform, the list of speakers or presenters, and the schedule of activities. The term "event space" refers to a chosen virtual environment or digital area designated for hosting an online event or gathering. For example, an event space may be a customized 3D virtual room, a digital conference hall, or a simulated exhibition area within a virtual platform. The term "event agenda" refers to a structured outline or schedule of planned activities, presentations, or sessions for an event. For example, an event agenda may include the order of speakers, timing of breaks, and sequence of topics to be covered during the event. The term "plurality of agenda items" refers to multiple distinct elements, activities, or topics scheduled as part of an event's program. For example, agenda items may include keynote speeches, panel discussions, networking sessions, product demonstrations, or interactive workshops.

The event details may include a selected event space and an event agenda including a plurality of agenda items which refers to the process of obtaining specific information about an upcoming virtual event from the person or entity organizing it, as seen in system 1500, step 1510. This information may include the chosen virtual environment where the event will take place and a structured schedule of the various activities and presentations planned for the event.

Figure 7C:
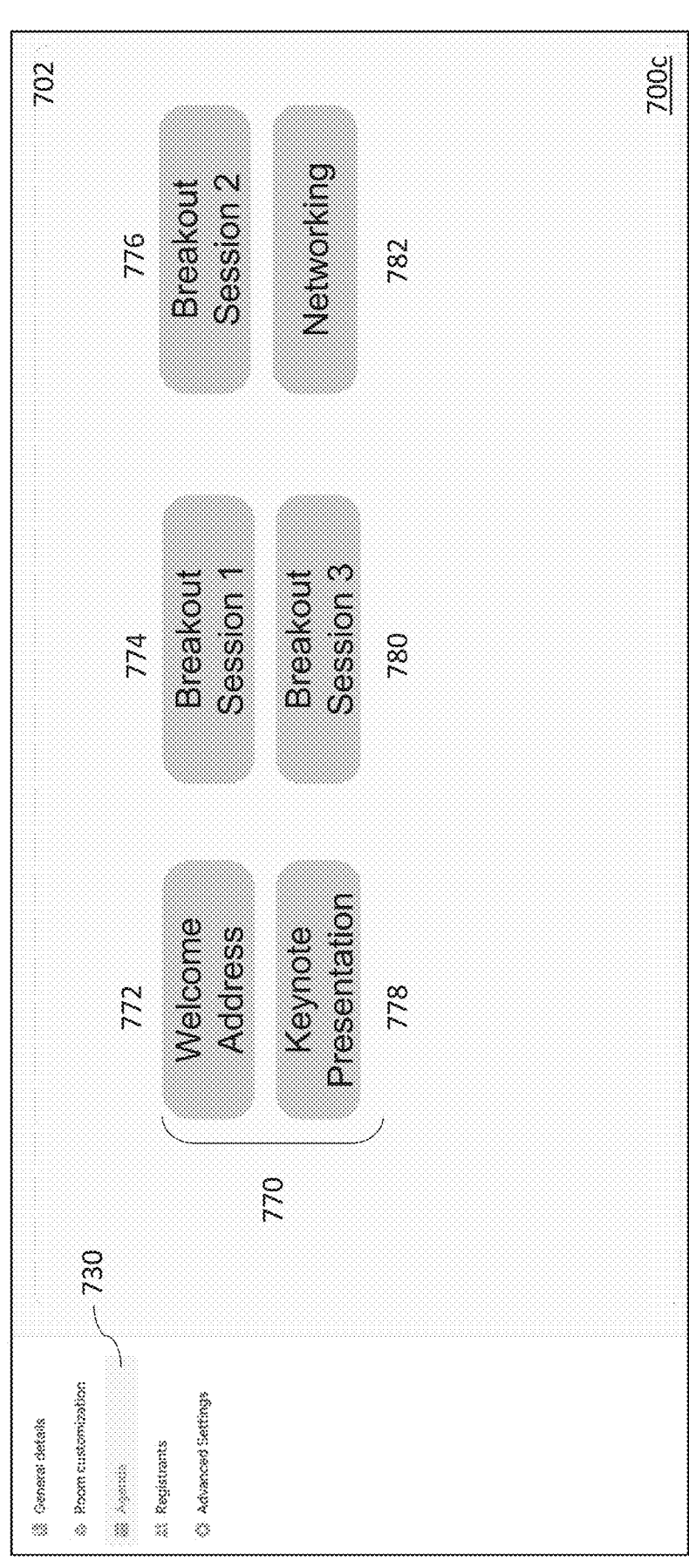

For example, as seen in FIG. 7C, the system may receive from an event organizer details such as the selection of a customizable 3D virtual conference hall as the event space 720, as seen in 700a and 700b of a user interface 702 designed for use by an event host organizer when configuring a virtual event, along with an agenda 730. The agenda 730 may specify agenda points 770, such as the welcome address 772, multiple breakout sessions 774, 776, 780, a keynote presentation 778, and a virtual networking 782. This information forms the foundation for setting up and managing the virtual event within the platform.

Some disclosed embodiments involve generating an event link configured to enable access to the event. The term "event link" refers to a unique digital identifier or address that provides a direct pathway to access a specific event or gathering in a virtual environment. For example, an event link may be a URL, a QR code, or a specialized token that, when activated, grants entry to a particular online event space. The term "enable access" refers to the act of granting or facilitating entry, admission, or the ability to participate in a particular activity or environment. For example, enabling access may involve providing necessary credentials, removing barriers to entry, or activating permissions that allow a user to engage with a specific digital resource.

In the context of FIG. 15, process step 1512, access to the event may refer to the ability of virtual attendees to enter, participate in, and interact within the specified virtual event space and its associated activities. This may include viewing presentations, engaging in discussions, exploring virtual environments, or interacting with other attendees and objects within the event space.

In some embodiments, the plurality of virtual event attendees accesses the event space via the generated link. The term "generated link" refers to a unique digital identifier or address that is created specifically for accessing a particular resource or environment. For example, the system may generate a unique URL or QR code that, when clicked or scanned by invited attendees, automatically directs them to the virtual event space, verifies their credentials, and allows them to join the event using their assigned avatar. This generated link may be time-sensitive, only granting access during the scheduled event period, and may also include embedded information about the attendee's role or access level within the event.

Utilizing a generated link as the primary means of access for virtual event attendees streamlines the entry process and enhances security. This approach allows for controlled access to the event space, ensuring that only authorized participants can join. The generated link may contain embedded information about the event and the attendee, enabling seamless authentication and personalized experiences upon entry. For instance, when an attendee clicks on or enters the generated link, they may be automatically directed to the virtual event space, bypassing complex login or password procedures. In some embodiments, a password or an additional login credential may be required to access the link. This method can also facilitate tracking of attendee engagement and provide valuable data on participation rates and access patterns.

In some embodiments, the event being a time-limited event, and the generated link being a temporary link, and wherein the operations further comprise sending an alert to the plurality of virtual event attendees indicative of a start of the event.

The term "time-limited event" refers to a virtual gathering or activity that has a predetermined duration or scheduled end time. For example, a time-limited event may include a conference with a set agenda, a webinar with a specific runtime, or a virtual product launch with a defined start and end time. The term "temporary link" refers to a digital access point or URL that is only valid for a limited period. For example, a temporary link may be active only for the duration of an event, expire after a set number of hours, or become invalid once the associated event concludes. The term "alert" refers to a notification, message, or signal designed to draw attention or provide important information. For example, an alert may be a pop-up notification, an email, a text message, or an in-app notification that informs users about a specific occurrence or upcoming action.

In the context of virtual events, implementing time-limited events with temporary links and start alerts may enhance security, manage access control, and improve attendee engagement. The time-limited nature of the event helps create a sense of urgency and exclusivity, encouraging attendees to participate actively during the specified timeframe. By generating a temporary link, the system may ensure that access to the virtual event space is restricted to the intended duration, preventing unauthorized entry after the event concludes. This feature may be particularly useful for maintaining the confidentiality of sensitive discussions or proprietary content shared during the event.

The addition of an alert system to notify attendees of the event's start serves multiple purposes. For example, it helps synchronize participant entry, ensuring that all attendees have the opportunity to join at the designated start time. This may be especially valuable for events with live components, such as keynote speeches or real-time demonstrations, where timing is controlled. For example, in a virtual product launch event, the system might send out an alert 15 minutes before the official start time, reminding attendees to join the virtual space and prepare for the presentation. This alert could include the temporary link, making it convenient for attendees to access the event with a single click.

In some embodiments, if at least one virtual event attendee attempts to access the event before the start of the event, sending a message to the at least one virtual event attendee indicating that the event has not yet started. The term "attempts to access" refers to the action of trying to enter, join, or gain entry to a digital space or resource. For example, attempting to access may involve clicking on an event link, entering login credentials, or navigating to a specific URL associated with the virtual event. The phrase "sending a message" refers to the act of transmitting or delivering information, typically in digital form, from one entity to another. For example, sending a message may involve dispatching an email, displaying a pop-up notification, or pushing an in-app alert to a user's device.

This feature may enhance the user experience by providing clear communication and managing attendee expectations when they attempt to join a virtual event before its official start time. Instead of encountering an error message or a blank screen, which may lead to confusion or frustration, attendees receive informative feedback about the event's status. This proactive communication helps maintain engagement and ensures that attendees remain informed about the correct timing of the event. Implementing this feature may also serve as a useful tool for event organizers to gauge attendee interest and preparedness. For instance, if a significant number of attendees attempt to access the event early, it may indicate high anticipation or confusion about the start time. Organizers may use this information to send out additional reminders or clarifications if needed.

The system may also be configured to provide varying levels of information based on how early the attendee attempts to access the event. For example, if an attendee tries to join a virtual conference several hours before the start time, the message might include a countdown timer and an option to set a reminder. If the attempt is made just a few minutes before the event, the message could indicate that the virtual space will open shortly and suggest that the attendee stand by. This graduated approach to pre-event communication may help maintain attendee interest and ensure a smooth start to the virtual event.

Some disclosed embodiments involve rendering the event space, including a plurality of virtual objects, at least one of the plurality of virtual objects being identified on the event agenda and having a presentation time associated therewith. The term "rendering" refers to the process of generating a visual representation of a digital environment or object. For example, rendering may involve creating a 2D or 3D image from a mathematical model, applying textures and lighting effects, or updating the visual state of a virtual scene in real-time. The term "plurality of virtual objects" refers to multiple digital representations of items, structures, or interactive elements within a virtual environment. For example, virtual objects may include 3D models of furniture, screens for displaying content, interactive booths, or avatars representing attendees. The phrase "identified on the event agenda" refers to the inclusion or listing of a specific item, activity, or object as part of the planned schedule or program for an event. For example, an object identified on the event agenda may be a virtual stage for a keynote presentation or a specific booth scheduled for a product demonstration. The term "presentation time" refers to a designated period during an event when a particular activity, session, or interaction is scheduled to occur. For example, a presentation time may be a specific timeslot allocated for a speaker's talk, a product launch, or a networking session.

The process of creating and displaying a virtual environment for an event, populating it with various digital elements, and ensuring that certain objects within the space are linked to specific agenda items and scheduled presentation times may allow for a structured and organized virtual event experience where attendees can navigate the space and engage with content at appropriate times. For example, the system may render a virtual conference hall with multiple rooms, each containing objects such as presentation screens, interactive booths, and networking areas. Some of these objects, like a main stage for a keynote speech, may be identified on the event agenda and have a specific presentation time associated with them. This allows the system to guide attendees to the right locations at the right times and manage the flow of the event in the virtual space.

In some embodiments, the event details including a list of a plurality of non-temporary interactable objects. The term "non-temporary interactable objects" refers to persistent digital elements within a virtual environment that users can engage with over an extended period. For example, non-temporary interactable objects may include virtual booths, information kiosks, or networking areas that remain accessible throughout an event's duration.

In the context of virtual event spaces, as seen in process step 1514 in FIG. 15, including a list of non-temporary interactable objects as part of the event details allows for more comprehensive event planning and attendee engagement. For example, FIG. 4A shows a non-temporary interactable objects such as a trivia table 430-1, a kiosk 430-2, and an image gallery 430-3. An avatar 420 can interact with these objects throughout the event, depending on how the organizer has set up the object and agenda. This feature enables event organizers to define and communicate the persistent interactive elements that will be available throughout the virtual event. By providing this information, attendees may better plan their event experience and prioritize their interactions within the virtual space. For instance, an event organizer might include a list of virtual exhibition booths, each representing a different company or product, that will be available for attendees to visit and interact with throughout the event's duration. This may allow attendees to schedule their time effectively and ensures they don't miss out on important networking or learning opportunities.

In some embodiments, at least one of the selected objects of interest includes a presentation. The term "presentation" refers to a formal delivery of information, ideas, or content to an audience. For example, a presentation may include a lecture, a product demonstration, a panel discussion, or a keynote speech delivered within the virtual event space. Incorporating presentations as selectable objects of interest may enhance the educational and informational value of the virtual event as seen in FIG. 4J and FIGS. 14A and 14B via the virtual main display 440. Another example may be seen in FIGS. 5A and 5B where the gallery interactive objects 510a and 510b display a presentation. This feature may allow attendees to prioritize and plan their participation around specific content delivery sessions that align with their interests or professional development goals. For instance, an attendee might select a keynote presentation on industry trends as an object of interest, ensuring they receive notifications or guidance to attend this session during the event. This capability not only helps attendees manage their time effectively but may also enable event organizers to gauge interest in different presentations, potentially informing future content planning or real-time adjustments to the event schedule.

In some embodiments, the presentation is associated with a virtual screen configured to display dynamic content. The term "virtual screen" refers to a digital display surface within a virtual environment that simulates a physical screen or projection surface. For example, a virtual screen may be a large display in a virtual auditorium, a floating panel in a 3D space, or a shared viewing area for multiple avatars. The phrase "dynamic content" refers to digital information or media that can change, update, or adapt in real-time or based on certain conditions. For example, dynamic content may include live video streams, interactive presentations, real-time data visualizations, or content that responds to audience input.

Associating presentations with virtual screens capable of displaying dynamic content significantly may enhance the interactive and engaging nature of virtual events. This feature may allow for rich, multimedia presentations that can adapt and respond to the audience in real-time. For instance, a virtual screen might display a live video feed of a speaker alongside interactive polls, allowing attendees to engage directly with the presentation content. The ability to showcase dynamic content on these virtual screens also enables more flexible and engaging presentations, such as real-time demonstrations, collaborative whiteboarding sessions, or seamless transitions between different media types during a single presentation. For example, in FIG. 4H the avatar 490 can be speaking from the virtual podium 442 while the virtual main display 440 is showing a dynamic presentation based on the avatar 420 and other attendees real-time feedback.

In some embodiments, at least one of the selected objects of interest includes a sub-space within the event space. The term "sub-space" refers to a distinct area, section, or environment within a larger virtual space. For example, a sub-space may be a breakout room, a themed exhibition area, or a specialized networking zone within the broader virtual event environment. Including sub-spaces as selectable objects of interest allows for a more diverse and tailored event experience. This feature enables attendees to identify and prioritize specific areas within the larger event space that align with their interests or objectives. For instance, an attendee might select a specialized networking sub-space focused on their industry sector as an object of interest. This selection could then guide them to relevant discussions or connections within that specific area of the virtual event. Sub-spaces can also facilitate more focused interactions, allowing for smaller group discussions, targeted content delivery, or themed experiences within the broader event context. By making these sub-spaces selectable as objects of interest, the system ensures that attendees can easily navigate to and engage with the most relevant parts of the event for their individual needs. For example, FIGS. 5A-5D show a virtual web-view object 520 and a pop-up window 522 which may show a sub-space.

In some embodiments, the at least one virtual object includes a virtual gallery object configured to display predetermined content. The phrase "configured to display" refers to the setup or programming of a virtual object to present visual information in a specific manner. For example, a virtual gallery object configured to display predetermined content may be designed with specific viewing angles, interactive elements, or sequencing to optimize the presentation of the chosen materials. The term "predetermined content" refers to digital materials, information, or media that are selected and prepared in advance of an event or interaction. For example, predetermined content may include pre-recorded videos, static images, text descriptions, or 3D models that are chosen to be displayed within a virtual gallery.

Incorporating virtual gallery objects configured to display predetermined content may enhance the informational and visual aspects of the virtual event, as seen in FIGS. 5A-5D, a virtual web-view object 520 and a pop-up window 522 which may show predetermined content. This feature allows for the creation of curated experiences within the event space, where attendees may explore and interact with carefully selected content at their own pace. For instance, a virtual gallery object might be used to showcase a company's product line, displaying 3D models of products along with detailed specifications and promotional videos. Attendees may navigate through this gallery, examining items of interest and accessing additional information as needed. The use of predetermined content ensures that the presentation is polished and consistent, while the virtual gallery format provides an engaging and intuitive way for attendees to consume information that might otherwise be presented in a less interactive format.

In some embodiments, at least one of the selected objects of interest includes a virtual web-view object configured to display content in a web-view setting. The term "web-view setting" refers to a display configuration that renders web content within an application or environment, typically maintaining the functionality and appearance of a standard web browser. For example, a web-view setting may allow users to interact with websites, web applications, or online resources as they would in a traditional browser, but within the context of the virtual event space. For example, a virtual web-view object configured to display content may be designed to load and render web pages, handle user interactions, and potentially integrate with other aspects of the virtual environment.

Including virtual web-view objects as selectable objects of interest significantly expands the range of content and interactions available within the virtual event space. This feature may allow for seamless integration of web-based resources, external platforms, or real-time information sources into the event experience. For instance, an attendee might select a virtual web-view object that provides access to a live social media feed related to the event, allowing them to stay connected with broader discussions or reactions. For example, an attendee may select a virtual web-view object 520 and then see a pop-up window 522 which shows a live feed. Alternatively, a web-view object may be used to incorporate interactive web-based tools or resources directly into the virtual environment, such as collaborative documents, online surveys, or external registration systems. This capability may enhance the versatility of the virtual event platform, enabling organizers to leverage existing web resources and provide attendees with familiar web-based interactions within the immersive 3D environment.

Some disclosed embodiments involve receiving from a plurality of virtual event attendees, virtual event attendee data, and rendering in the event space a plurality of avatars, each of the plurality of avatars being associated with a differing one of the plurality of virtual event attendees. The term "virtual event attendee data" refers to information associated with or provided by participants in a virtual event. For example, virtual event attendee data may include user profiles, login credentials, preferences, device information, or any other relevant details that help identify and manage attendees within the virtual environment. The term "plurality of avatars" refers to multiple digital representations or characters that represent individual users within a virtual environment. For example, avatars may take the form of customizable 3D models, 2D icons, or other visual representations that allow users to interact and be identified within the virtual space. The phrase "differing one of the plurality of virtual event attendees" refers to the unique identification and representation of each individual participant within the group of virtual event attendees. For example, each avatar in the virtual space corresponds to a distinct attendee, ensuring that every participant has their own unique presence and identity within the event.

In the context of the present disclosure, process step 1516 receives from a plurality of virtual event attendees, virtual event attendee data, and rendering in the event space a plurality of avatars, each of the plurality of avatars being associated with a differing one of the plurality of virtual event attendees may refer to the process of collecting information from multiple event participants, using that data to create digital representations of those participants, and displaying those representations within the virtual event environment. This may allow for a personalized and interactive experience where each attendee can be uniquely identified and can interact with others through their avatar. For example, an avatar can customize its appearance via the graphical user interface element 424 and name tag 422, as seen in FIG. 4C. Further, as seen in FIG. 4G, avatar 420 can interact with another avatar 490 in the event space.

By way of a non-limiting example, as described in detail below, the system may receive login information, profile details, and avatar customization preferences from users as they join a virtual conference. Using this data, the system generates and renders unique llama avatars for each attendee, placing them within the virtual conference hall. These avatars may be customized with different colors, accessories, or name tags, allowing attendees to recognize and interact with each other in a visually engaging manner. This process enables the creation of a dynamic and personalized virtual event space where each participant has a distinct presence and identity.

In some embodiments, access to one or more portions of the event space is limited to at least some of the plurality of virtual attendees based on a subscription fee of the at least some of the plurality of virtual attendee. The term "limited" refers to restricted, controlled, or reduced in scope, quantity, or availability. For example, limited access may involve placing constraints on who can enter certain areas or use particular features within a virtual event space. The phrase "subscription fee" refers to a recurring payment made by users to access a service, content, or platform for a specified period. For example, a subscription fee may be a monthly or annual charge that grants users ongoing access to premium features or exclusive content within a virtual event platform.

This tiered access model based on subscription fees may allow for the creation of premium or exclusive experiences within the virtual event space. By limiting access to certain portions of the event space based on subscription levels, organizers can offer differentiated experiences that cater to various attendee needs or preferences. This approach may incentivize higher-tier subscriptions while still providing value to all attendees. For example, a basic subscription might grant access to general sessions and networking areas, while a premium subscription could unlock exclusive workshops, one-on-one meetings with speakers, or VIP lounges within the virtual event space. This model not only provides a revenue stream for event organizers but may also allow for more tailored and valuable experiences for attendees willing to invest in higher-tier access.

In some embodiments, at least one virtual event attendee has credentials for sharing dynamic content on the virtual screen. The term "credentials" refers to authentication information or permissions that grant a user specific rights or access within a system. For example, credentials may include login information, security tokens, or role-based access controls that determine what actions a user can perform within the virtual event space. The term "sharing"

refers to the act of making content, information, or resources available to others within a system or platform. For example, sharing dynamic content may involve uploading files, streaming live video, or collaboratively editing documents in real-time.

This feature may enable a more interactive and participatory event experience by allowing certain attendees to contribute directly to the content displayed on virtual screens. By granting specific credentials for content sharing, the system can facilitate more dynamic and collaborative presentations. For example, a panelist in a discussion might have credentials to share slides, videos, or live annotations on the virtual screen, enhancing their ability to communicate ideas effectively. This capability can also support more engaging Q&A sessions, where attendees with appropriate credentials could share relevant data or examples on the screen in response to questions. The selective granting of these credentials ensures that content sharing remains controlled and relevant to the event's objectives while still allowing for rich, multi-directional communication.

Some disclosed embodiments involve receiving from at least some of the plurality of virtual attendees selections of objects of interest from the plurality of virtual objects prior to or during associated presentation times for the selected objects of interest. The phrase "prior to or during associated presentation times" refers to the period before or while a specific virtual object or event is actively being presented or made available for interaction within the virtual event space. For example, this may include the time leading up to a scheduled presentation, during the presentation itself, or any designated period when the object is highlighted or featured within the event.

For example, in FIG. 15, process step 1518 receives from at least some of the plurality of virtual attendees selections of objects of interest from the plurality of virtual objects prior to or during associated presentation times for the selected objects of interest may refer to the process of collecting and registering choices made by event participants regarding specific elements within the virtual event space that they wish to engage with, either before or during the time these elements are actively presented or featured. This allows the system to understand attendee preferences and potentially guide them to relevant content or experiences within the virtual event.

For example, the system may allow virtual attendees to browse through a list of upcoming presentations, interactive booths, or networking opportunities within the virtual conference hall. Attendees can select which elements they are most interested in, either before the event begins or as it unfolds. For instance, an attendee might mark a keynote speech scheduled for later in the day, select a product demonstration booth they want to visit, or choose to be notified when a specific networking session begins. The system collects these selections, enabling it to provide personalized guidance and notifications to each attendee, ensuring they don't miss the content or interactions that are most relevant to their interests.

In some embodiments, directing the at least some of the plurality of virtual attendees to their selected objects of interest at times corresponding to the presentation time of their selected objects of interest includes sending to the at least some of the plurality of virtual attendees at times corresponding to the presentation time of their selected objects of interest an indicator signaling a commencement of agenda items associated with their selected objects of interest. The term "indicator" refers to a sign, signal, or notification that provides information or draws attention to a specific event, status, or condition. For example, an indicator may be a visual cue, an auditory alert, or a tactile feedback mechanism designed to inform or guide users. The phrase "signaling a commencement" refers to the act of notifying or indicating that something is about to begin or has just started. For example, signaling a commencement may involve sending a notification, displaying a visual cue, or triggering an alert to mark the initiation of an activity or event. The term "agenda items" refers to specific topics, activities, or events scheduled as part of an organized program or plan. For example, agenda items may include presentations, workshops, networking sessions, or any other planned components of a virtual event.

This feature may enhance the attendee experience by providing timely and relevant notifications about the start of activities or presentations that align with their expressed interests. By sending indicators signaling the commencement of agenda items associated with selected objects of interest, the system ensures that attendees are promptly informed and can engage with their chosen content at the appropriate time. Implementing this approach may offer several benefits within the virtual event space. Firstly, it may help attendees manage their time effectively by providing real-time updates about the start of relevant activities. For instance, if an attendee has selected a panel discussion as an object of interest, they might receive an indicator five minutes before the discussion begins, allowing them to wrap up other activities and prepare to join the session.

Secondly, this feature may help maintain engagement throughout the event by keeping attendees informed about upcoming activities that match their interests. This is particularly valuable in large-scale virtual events where multiple sessions or presentations may be occurring simultaneously. For example, in a virtual conference with parallel tracks, attendees might receive indicators for the commencement of sessions they've marked as interesting, even if they're currently engaged in another activity.

The system may also be designed to offer varying levels of indicators based on the nature of the agenda item and the attendee's preferences. For instance, a major keynote speech might trigger a more prominent indicator, such as a full-screen notification or a temporary overlay on the virtual environment. In contrast, the start of a less time-sensitive activity, like the opening of a virtual exhibition booth, might be signaled with a more subtle indicator, such as a small pop-up or a change in the color of an icon in the user interface.

Additionally, the indicators could be interactive, allowing attendees to respond or take immediate action. For example, when signaling the commencement of a workshop, the indicator might include options for the attendee to join immediately, set a reminder for later, or even add the session to their personal event schedule. This interactivity enhances the attendee's ability to manage their event experience dynamically and ensures they can easily navigate to their selected objects of interest as they become active within the virtual event space.

In some embodiments, the indicator is a visual indicator viewable on displays of the at least some of the plurality of virtual attendees. The term "visual indicator" refers to a graphical element, symbol, or display that conveys information or status through visual means. For example, a visual indicator may be an icon, a color change, an animated graphic, or a textual notification that appears on a screen or within a user interface. The term "viewable" refers to the capability of being seen or observed by a user. For example, a viewable element may be prominently displayed, easily noticeable, or positioned in a way that ensures it catches the user's attention within their field of vision.

Implementing visual indicators viewable on attendee displays may enhance the user experience by providing clear, immediate, and non-intrusive notifications about event activities and updates. This feature ensures that attendees can stay informed about the commencement of their selected objects of interest without having to constantly monitor schedules or switch between different interfaces. Visual indicators may take various forms to effectively capture attendees' attention and convey information efficiently. For instance, a subtle yet noticeable change in the virtual environment's color scheme may signal the imminent start of a selected presentation. Alternatively, a small animated icon appearing in the corner of the screen might indicate that a chosen networking session is about to begin. These visual cues may be designed to be informative without being disruptive to the overall virtual event experience.

The system may also implement a hierarchy of visual indicators to denote different types of notifications or varying levels of urgency. For example, a pulsating red dot might indicate the immediate start of a high-priority selected session, while a gentle blue glow around the edges of the screen could signify that a less time-sensitive activity is now available. This differentiation helps attendees prioritize their activities and manage their time effectively within the virtual event space.

Moreover, visual indicators may be designed to be context-sensitive, adapting to the attendee's current activity within the virtual environment. For instance, if an attendee is actively engaged in a virtual booth exploration when one of their selected presentations is about to start, the system might display a semi-transparent overlay with information about the upcoming session and options to join or snooze the notification. This approach ensures that attendees are kept informed without abruptly interrupting their current interactions.

The use of visual indicators also supports accessibility considerations. For attendees who may have hearing impairments or those participating in environments where audio notifications are not practical, visual indicators ensure that important event updates are not missed. Additionally, the system could offer customization options, allowing attendees to adjust the size, color, or style of visual indicators to suit their personal preferences or accommodate specific needs.

In some embodiments, the visual indicator includes at least one of a banner configured to display a notification related to the selected object of interest or a navigation indicator configured to indicate where within the event space the selected objects of interest are located. The term "banner" refers to a prominent, typically rectangular graphical element displayed on a screen or within a user interface to convey information or attract attention. For example, a banner may be a horizontal or vertical strip containing text, images, or interactive elements that appears at the top, bottom, or sides of a display. The term "navigation indicator" refers to a visual element or system designed to guide users through a digital environment or interface. For example, a navigation indicator may include directional arrows, highlighted paths, or interactive maps that help users locate specific areas or objects within a virtual space. The phrase "configured to indicate" refers to the design or setup of a system or component to provide specific information or perform a particular function. For example, a navigation indicator configured to indicate location might use colorcoding, distance markers, or dynamic waypoints to guide users to their desired destinations within a virtual environment.

Implementing visual indicators that include banners for notifications and navigation indicators for location guidance may significantly enhance the attendee experience in virtual events. This dual approach may ensure that attendees are both informed about relevant activities and able to easily locate their points of interest within the virtual space. The use of banners to display notifications related to selected objects of interest may provide a clear and prominent way to alert attendees about upcoming or ongoing activities that match their preferences. For instance, when a selected presentation is about to begin, a banner might appear at the top of the attendee's screen with the presentation title, start time, and a button to join immediately. This banner may be designed to be minimally intrusive while still capturing attention, perhaps using a semi-transparent background that allows the attendee to continue viewing the main virtual environment.

Navigation indicators, on the other hand, may address the potential challenge of orientation and movement within complex virtual event spaces. By providing visual cues about the location of selected objects of interest, these indicators may help attendees efficiently navigate to their desired destinations. For example, when an attendee selects to view a particular virtual booth, a navigation indicator might appear as a glowing path on the virtual floor, guiding them through the event space to the booth's location. Alternatively, it might manifest as a minimap with a highlighted route or as floating directional arrows that dynamically update as the attendee moves through the virtual environment.

The system might implement a combination of these visual indicators to provide comprehensive guidance. For instance, when a banner notification appears about an upcoming selected presentation, it might include not only the event details but also a small map or directional indicator showing the quickest route to the virtual auditorium where the presentation will take place. This integrated approach might ensure that attendees are both informed about what's happening and know exactly how to get there.

Moreover, these visual indicators may be designed to adapt based on the attendee's current location and activity within the virtual space. If an attendee is far from their selected object of interest when it becomes active, the navigation indicator might provide a more detailed path or offer a "teleport" option to quickly move to the correct location. Conversely, if the attendee is already near the relevant area, the indicator might switch to a more subtle highlighting of the specific object or entrance to draw attention without unnecessary guidance.

The customization of these visual indicators may further enhance their effectiveness. Attendees might be given options to adjust the style, size, or frequency of banner notifications, or to choose between different types of navigation indicators, for example, 2D map view vs. 3D directional arrows, based on their personal preferences or familiarity with virtual environments. This level of personalization ensures that the guidance system remains helpful without becoming overwhelming or distracting from the overall event experience.

Some disclosed embodiments involve during the event, directing the at least some of the plurality of virtual attendees to their selected objects of interest at times corresponding to the presentation time of their selected objects of interest. The term "during the event" refers to the period of time when a virtual gathering, conference, or other organized activity is actively taking place within the virtual event space. For example, during the event may include the scheduled duration of a virtual conference, from its official start time to its conclusion, including any breaks or intermissions. The term "directing" refers to guiding, steering, or providing instructions to users within a virtual environment to help them navigate or locate specific areas or objects of interest. For example, directing may involve displaying visual cues, sending notifications, or automatically moving a user's avatar to a particular location within the virtual space. The phrase "times corresponding to the presentation time" refers to specific moments or periods during an event that align with or are related to the scheduled time for a particular presentation, activity, or interaction associated with a selected object of interest. For example, this may include the exact start time of a presentation, a few minutes before it begins, or during its duration.

For example, as seen in FIG. 15, process step 1520 may send a notification to a virtual attendee five minutes before a selected keynote presentation is scheduled to begin. This notification may include a clickable link that, when activated, automatically moves the attendee's avatar to the virtual auditorium where the presentation will take place. Additionally, the system may provide visual cues, such as highlighted pathways or floating arrows, to guide attendees to their selected product demonstration booths when those demonstrations are about to start. These directing mechanisms ensure that attendees can easily find and participate in their chosen activities at the appropriate times, enhancing their overall event experience and engagement with the content they find most relevant.

Some embodiments involve receiving from at least some of the plurality of virtual attendees selections of objects of interest from the plurality of non-temporary interactable objects, and during the event directing the at least some of the plurality of virtual attendees to their selected non-temporary interactable object. This feature may enhance the personalization and efficiency of the virtual event experience. By allowing attendees to pre-select their objects of interest from the non-temporary interactable objects, the system may provide targeted guidance during the event. This ensures that attendees may easily locate and engage with the content or interactions that are most relevant to them, even in a potentially complex or expansive virtual environment. For example, if an attendee selects a particular company's virtual booth as an object of interest, the system may send reminders or provide navigation assistance to help the attendee find and visit that booth during the event. This targeted guidance might help maximize the value of the event for each attendee by ensuring they don't miss out on their priority interactions.

In some embodiments, the times corresponding to the presentation time of the selected object of interest are times preceding the presentation time of the selected object of interest. The term "times preceding" refers to moments or periods occurring before a specified point in time or event. For example, times preceding may include intervals ranging from a few seconds to several hours or even days before a scheduled activity. The phrase "presentation time" refers to the designated period during which a specific content, activity, or interaction is scheduled to occur within an event. For example, a presentation time may be a specific timeslot allocated for a speaker's talk, a product demonstration, or an interactive workshop session.

This feature enhances the attendee experience by providing proactive guidance and reminders about upcoming presentations or activities that align with their expressed interests. By directing attendees to their selected objects of interest at times preceding the actual presentation time, the system may help ensure that participants are prepared and positioned to fully engage with their chosen content.

Implementing this approach may serve multiple purposes within the virtual event space. Firstly, it allows attendees to navigate to the appropriate virtual location ahead of time, reducing the risk of missing the start of a presentation due to navigation difficulties or confusion about the event layout. For instance, if an attendee has selected a product demonstration as an object of interest, the system might start directing them to the virtual booth ten minutes before the scheduled demonstration time.

Secondly, this feature can help manage virtual crowd flow within the event space. By staggering the times at which attendees are directed to different areas, the system may prevent bottlenecks or overloading of certain virtual spaces. For example, if multiple presentations are scheduled to start simultaneously in different virtual rooms, the system might begin directing attendees to their selected presentations at varying intervals, ensuring a smooth distribution of participants across the virtual space.

Additionally, the times preceding the presentation may be used to provide attendees with contextual information or preparatory materials related to their selected objects of interest. For instance, if an attendee is being directed to a keynote speech 15 minutes before it begins, the system may use this time to display the speaker's biography, provide a brief overview of the topic, or offer related resources that enhance the attendee's understanding and engagement with the upcoming presentation.

Some embodiments involve, in response to receiving from one of the at least some of the plurality of virtual attendees an indicator interacting signal, causing an avatar associated with the one of the at least some of the plurality of virtual attendees to move from a first location to a second location within the event space, wherein the second location is nearby the selected object of interest. The term "indicator interacting signal" refers to a user-initiated action or input that responds to or engages with a notification or guidance element within a digital interface. For example, an indicator interacting signal may include clicking on a banner, tapping a notification, or selecting a navigation option presented to the user.

The disclosed system for guiding virtual attendees of a virtual event space toward events of interest may include several elements that work together to create an immersive and personalized virtual event experience. The system begins by receiving event details from an event host organizer, including a selected event space and an event agenda with multiple agenda items. This information forms the foundation for the virtual event structure. The system then generates an event link, enabling access to the event for attendees.

Some embodiments involve adjusting the event agenda, the event link, and the presentation time of the plurality of virtual objects identified on the event agenda to correspond to a local time zone associated with each of the plurality of virtual event attendees. The term "local time zone" refers to the geographic time standard applicable to the attendee's physical or designated location. In this context, the adjustment may ensure that all scheduled elements of the virtual event, such as agenda items, links to interactive content, and presentation start times, are displayed in a manner consistent with each attendee's local time, thereby reducing confusion and improving accessibility.

For example, the virtual event platform may implement logic to detect the time zone associated with each attendee, either through profile data or device settings, and dynamically update event-related parameters accordingly. By way of a non-limiting example, when an event agenda includes multiple presentation objects scheduled for 10:00 AM PST, the virtual event platform automatically converts this time to 6:00 PM GMT for attendees located in London and 7:00 PM CET for attendees in Berlin. Similarly, the event link and associated virtual objects, such as embedded videos or interactive models, are synchronized to ensure proper availability at the adjusted times. This feature enhances global participation by providing a seamless experience across different regions, eliminating manual conversions and reducing scheduling conflicts.

Further, another aspect of the system is the rendering of the event space, which includes a plurality of virtual objects. Some of these objects are identified on the event agenda and have associated presentation times, creating a dynamic and scheduled environment within the virtual space. The system also receives virtual event attendee data and renders avatars for each attendee, providing a visual representation and presence within the event space.

The system's core functionality lies in its ability to receive selections of objects of interest from attendees and subsequently direct them to these selected objects at appropriate times during the event. This feature ensures that attendees may efficiently navigate the virtual space and engage with content that aligns with their interests.

In one implementation according to disclosed embodiments, the system includes non-temporary interactable objects, allowing for persistent elements within the event space that attendees may engage with throughout the event's duration. This feature enhances the overall interactivity and depth of the virtual event experience.

Another implementation involves the use of visual indicators to guide attendees. These may include banners displaying notifications related to selected objects of interest or navigation indicators showing the location of these objects within the event space. This visual guidance system helps attendees efficiently locate and engage with their chosen content or activities.

The system also incorporates a time-sensitive aspect, with the event being time-limited and the generated link being temporary. This feature adds a layer of security and exclusivity to the event. Additionally, the system may send alerts to attendees indicating the start of the event and may manage pre-event access attempts by sending appropriate messages to attendees.

An important refinement allows for automated avatar movement in response to attendee interactions with indicators. This feature streamlines navigation within the virtual space, automatically moving an attendee's avatar from one location to another based on their selected objects of interest.

Collectively, these elements and implementations work together to create a sophisticated virtual event platform that prioritizes attendee engagement, personalized experiences, and efficient navigation within complex virtual environments. The system's ability to guide attendees to their points of interest at relevant times ensures that participants may maximize their event experience, focusing on content and interactions that are most valuable to them.

The field of virtual event platforms faces significant challenges in providing immersive, interactive experiences that effectively replicate the dynamics of in-person events. Existing solutions often struggle with limited customization options, unintuitive navigation, and difficulty maintaining attendee engagement throughout extended sessions. These limitations frequently result in reduced participation, diminished networking opportunities, and overall less effective virtual gatherings. The present disclosure addresses these technological problems by implementing a sophisticated system for guiding virtual attendees toward events of interest within a customizable 3D virtual environment.

The disclosed system modifies and improves computer operation by implementing a novel approach to virtual event management and attendee guidance. The system renders a dynamic 3D event space populated with interactive virtual objects, each associated with specific agenda items and presentation times. This approach enables a more intuitive and engaging navigation experience compared to traditional 2D interfaces. The system further reconfigures device operation by integrating personalized attendee preferences with real-time event scheduling, allowing for targeted guidance and notifications.

As a result, the system significantly enhances the efficiency and effectiveness of virtual event participation. The automated guidance mechanism reduces the cognitive load on attendees, allowing them to focus on content and interactions rather than struggling with navigation or scheduling. This leads to measurable improvements in attendee engagement and information retention. For example, in a virtual conference scenario, the system may reduce the time spent by attendees searching for relevant sessions by up to 50%, while increasing participation in selected events by 30% compared to traditional virtual event platforms.

The technical improvements extend to data handling and processing as well. The system optimizes bandwidth usage by selectively rendering and updating only the relevant portions of the virtual environment based on attendee locations and interests. This approach may result in up to a 40% reduction in data transfer requirements compared to fully rendered static 3D environments. Additionally, the system's ability to process and act upon real-time attendee interaction data enables dynamic event optimization, such as automatically adjusting room capacities or creating additional instances of popular sessions to balance attendance.

By integrating advanced 3D rendering techniques with intelligent attendee guidance algorithms, the disclosed system goes beyond mere information processing or data organization. It creates a novel technical solution that fundamentally alters how virtual events are experienced and managed, addressing specific technological problems in existing virtual event platforms and providing concrete, measurable improvements in user experience and system performance.

While the disclosed and illustrated processes describe different aspects configuring and/or participating in virtual events, the steps within the disclosed processes may be combined with each other or integrated into a more comprehensive process. This global process may be implemented using one or more components of a computing device 100 (as discussed in FIG. 1A) or a user device 154 within the computing architecture 150 (as discussed in FIG. 1B). The disclosed embodiments may involve at least one processor configured to execute stored instructions for performing the global process. By combining the steps from various processes or designing a more extensive process, the disclosed embodiments provide a seamless integration of various enhanced computer functionalities into a unified system. The computing resources and processors disclosed herein may play a role in executing the instructions that drive such a unified or global process.

Disclosed embodiments may include any one of the following bullet-pointed features alone or in combination with one or more other bullet-pointed features, whether implemented as a system and/or method, by one or more hardware components disclosed herein, as well as by at least one processor or circuitry, and/or stored as executable instructions on non-transitory computer readable media or computer readable media.

enabling, via a first computing device associated with a first virtual attendee, access to a virtual event space hosted on the at least one remote server.

transmitting to the at least one remote server, user-specific data associated with the first virtual attendee, wherein the user-specific data includes information for establishing an avatar associated with the first virtual attendee.

receiving from the at least one remote server, rendering data for graphically representing the virtual event space on the first computing device, wherein the rendering data includes definitions for a plurality of virtual locations, at least one virtual interactive object configured to provide access to predetermined content, and at least one virtual main display configured to display dynamic live content via a second computing device of a second virtual attendee.

using the rendering data to represent an isometric perspective view on a display of the first computing device of at least a portion of the virtual event space, the isometric perspective view presenting the avatar at a first location within the virtual event space, the at least one virtual interactive object at a second location within the virtual event space, and the at least one virtual main display at a third location within the virtual event space transmitting from the first computing device signal instructions for:

causing navigation of the avatar within the virtual event space;

causing interaction between the first virtual attendee and the at least one virtual interactive object to thereby trigger, on the display of the first computing device, a presentation of the predetermined content via the virtual interactive object; and causing interaction between the first virtual attendee and the virtual main display, to thereby trigger, on the display of the first computing device, a presentation of the dynamic live content received from the second computing device of the second virtual attendee.

accessing to the virtual event space includes receiving an event link configured to enable access to a virtual event space.

the predetermined content is based on data received from an event host organizer as part of the virtual event space.

access permissions to the predetermined content are enabled in accordance with a time limit provided as part of the virtual event space.

the predetermined content is customized based on real time data.

the predetermined content is adapted to each attendee based on virtual attendee data.

the predetermined content includes multiple content options each provided with a timeframe, and the first virtual attendee is directed to one of them as a function of a current time.

transmitting from the first computing device signal instructions for causing interactions between the first virtual attendee and avatars located within the virtual event space, wherein the other avatars are associated with other virtual attendees.

one or more virtual event space visual properties are modifiable in accordance with a predetermined schedule, wherein the one or more virtual event space visual properties include at least one lighting, volume levels, playable audio, or color theme.

the avatar associated with the first virtual attendee is customizable, and wherein the operations further comprise transmitting to the at least one remote server a selection of avatar customization options for the avatar associated with the first virtual attendee.

at least some of the customization options are available for selection after the first virtual attendee has performed one or more actions within the virtual event space.

the at least one virtual interactive object includes at least one gallery interactive object, configured to display predetermined content.

the at least one virtual interactive object includes at least one virtual web-view object, and the operations further comprise:

receiving, from the at least one remote server, augmentation data for augmenting the view with a pop-up window configured to display the predetermined content in a web-view setting while the avatar interacts with the at least one virtual web-view object.

upon initiation of the interaction with the at least one virtual interactive object or the virtual main display, if a distance in the virtual event space between the avatar and the at least one virtual interactive object or the virtual main display is above a predetermined threshold, causing the avatar to move from the first location towards a location in proximity of the second location or the third location.

motion of the avatar occurs behind a pop-up window.

the virtual event space rendering data further includes definitions for at least one mobility-facilitating object.

transmitting from the first computing device signal instructions for causing interaction between the avatar and the at least one mobility-facilitating object, and in response: causing the first virtual attendee to leave the virtual event;

causing the first virtual attendee to join a different instance of the virtual event space; causing the first virtual attendee to join a different portion of the virtual event space; or causing the first virtual attendee to join a different virtual event space.

transmitting from the first computing device signal instructions for communicating with other virtual attendees via a chatroom.

comprise transmitting from the first computing device signal instructions for a selection of an icon reflective of an emotion.

the virtual event space is configured with a single virtual main display, the single virtual main display is viewable in the rendered isometric perspective view of the virtual event space regardless of a position of the avatar within the virtual event space.

the at least one virtual main display is viewable immediately via selection of a graphical user interface element presented in the rendered isometric view.

selection of the graphical user interface element further causes a change of perspective to a first-person perspective view from a predetermined location with respect to the at least one main display.

the virtual event space rendering data further includes definitions for at least one virtual meeting area;

an ad hoc group of avatars including the avatar associated with the first virtual attendee and avatars associated with other virtual attendees, is enabled to enter the at least one meeting area; and in response to receiving a signal indicative of a desired interaction between the avatar associated with the first virtual attendee and another avatar of the ad hoc group of avatars, receiving from the at least one remote server augmentation data for augmenting the view with a private virtual screen to be displayed for viewing by the first virtual attendee and another virtual attendee associated with the other avatar; and wherein the at least one remote server is enabling at least one of the first virtual attendee and the other virtual attendee to control content displayed on the private virtual screen.

the at least one meeting area is associated with a specific asset in the virtual event space.

receiving from the at least one remote server a summary of interactions that occur between avatars of the ad hoc group of avatars.

receiving from an event host organizer, event details and virtual event space data, wherein the virtual event space data includes definitions for a plurality of virtual locations, at least one virtual interactive object configured to provide access to predetermined content, and at least one virtual main display configured to display dynamic live content;

enabling a plurality of computing devices associated with a plurality of virtual attendees to access to the virtual event space hosted on at least one remote server;

receiving from the plurality of virtual attendees user-specific data, wherein the user-specific data includes information for establishing a plurality of avatars associated with the plurality of virtual attendees;

transmitting to the plurality of computing devices rendering data for graphically representing the virtual event space based on the virtual event space data, wherein the rendering data enables each of the plurality of computing devices to represent on a display of each associated computing device, a view of at least a portion of the virtual event space, the view presenting the plurality of avatars at a plurality of first locations within the virtual event space, at least one virtual interactive object at second location within the virtual event space, and at least one virtual main display at a third location within the virtual event space;

receiving from a specific virtual attendee associated with a first computing device, signal instructions for:

causing navigation within the virtual event space of a specific avatar associated with the specific virtual attendee;

causing interaction between the specific avatar and the at least one virtual interactive object to thereby trigger, on the display of the first computing device, a presentation of the predetermined content via the virtual interactive object; and causing interaction between the specific avatar and the at least one virtual main display to thereby trigger, on the display of the first computing device, a presentation of the dynamic live content received from a second computing device of a second virtual attendee from among the plurality of virtual attendees.

the rendered view of the at least a portion of the virtual event space on each of the plurality if computing devices include an isometric perspective view of the at least a portion of the virtual event space.

enabling access to the virtual event space includes generating an event link configured to enable access to the virtual event space.

generating the event link includes generating a digital event invitation including the event link.

the predetermined content is based on data received from the event host organizer.

the predetermined content is customized for at least one of the plurality of virtual attendees.

receiving from the specific virtual attendee signal instructions for causing interactions with other avatars located within the virtual event space.

each of the plurality of avatars is customizable, and receiving from the specific virtual attendee a selection of avatar customization options for the specific avatar; and transmitting rendering data for graphically representing the specific avatar in accordance with the received selection of avatar customization options.

at least some of the customization options are available for selection after the specific virtual attendee has performed one or more actions within the virtual event space.

receiving virtual event space data includes receiving a selection of event space customization options for the virtual event space; and wherein transmitting rendering data includes transmitting rendering data for graphically representing the virtual event space in a customized manner in accordance with the received selection of event space customization options.

transmitting rendering data for graphically representing a preview of the customized virtual event space to the event host organizer before transmitting rendering data for graphically representing the customized virtual event space.

providing the event host organizer with a library of template event spaces, wherein the template event spaces include a plurality of predetermined slots for virtual object placement and a plurality of customization options;

receiving from the event host organizer a selection of a template event space from the library of event space templates; and receiving from the event host organizer the selection of event space customization options in relation to the selected event space template.

at least one virtual interactive object includes at least one gallery interactive object, configured to display predetermined content.

the at least one virtual interactive object includes at least one virtual web-view object, and receiving instructions from the specific virtual attendee for causing interaction with the at least one virtual web-view object, and in response to receiving from the specific virtual attendee signal instructions for causing interaction with the at least one virtual web-view object: augmenting the display associated with the specific virtual attendee with a pop-up window configured to display predetermined content in a web-view setting while the specific avatar interacts with the at least one web-view object.

the virtual event space data further includes definitions for at least one mobility-facilitating object, and transmitting rendering data for graphically representing the virtual event space, including the at least one mobility-facilitating object at a fourth location within the virtual event space; receiving instructions from the specific virtual attendee for causing interaction with the at least one mobility-facilitating object; in response to receiving from the specific virtual attendee signal instructions for causing interaction with the mobility-facilitating object: causing the specific virtual attendee to leave the virtual event; causing the specific virtual attendee to join a different instance of the virtual event space; causing the at least one virtual attendee to join a different portion of the virtual event space; or causing the at least one virtual attendee to join a different virtual event space.

receiving signal instructions for causing navigation of the specific avatar includes receiving from the specific virtual attendee a displacement trigger signal, and wherein the operations further comprise in response to receiving from the specific virtual attendee a displacement trigger signal, causing the specific avatar to move from a specific location of the plurality of first locations to another location among the plurality of virtual locations selected by specific virtual attendee.

the specific avatar is caused to move from the specific location to the selected location at a first pace, and wherein the operations further comprise in response to receiving repeated displacement trigger signals, causing the specific avatar to move from the specific location to the selected location at a second pace, wherein the second pace is faster than the first pace.

augmenting the display of each of the plurality of virtual attendees with a chatroom user interface element; and in response to the specific virtual attendee interacting with the chatroom user interface element, augmenting the display of the specific virtual attendee with a chatroom configured for communication between the plurality of virtual attendees.

the virtual event space is configured to hold a threshold number of avatars, and wherein transmitting rendering data for graphically representing the virtual event space includes: if the plurality of avatars includes more avatars than the threshold number, creating a plurality of instances of the virtual event space, distributing the plurality of avatars over the plurality of instances of the virtual event space, and transmitting rendering data for graphically representing the plurality of instances of the virtual event space, wherein a number of avatars in each of the plurality of instances of the virtual event space is lower than the threshold number, and wherein each of the plurality of instances is viewable on displays of virtual attendees associated with avatars distributed in the instance.

distributing the plurality of avatars over the plurality of instances of the virtual event space includes grouping the avatars by shared interests of the associated virtual attendees.

augmenting the display of each virtual attendee associated with a specific instance with a chatroom user interface element; and in response to at least one virtual attendee associated with the specific instance interacting with the chatroom user interface element, augmenting the display of the at least one virtual attendee with a chatroom configured for communication between all virtual attendees associated with avatars distributed in the specific instance.

in response to receiving from at least one virtual attendee an interaction trigger signal with respect to an avatar associated with another virtual attendee, augmenting the display of the at least one virtual attendee with a pop-up window configured to display information related to the other virtual attendee.

the displayed information includes at least one of a name, a job title, or a company name associated with the other virtual attendee.

the pop-up window includes a message user interface element, and wherein the operations further comprise in response to the specific virtual attendee interacting with the message user interface element, augmenting the display of the specific virtual attendee with a private chatroom configured for communication between the specific virtual attendee and the other virtual attendee.

receiving, from the specific virtual attendee, via an interactive interface, a selection of an icon reflective of an emotion; and causing a plurality of representations of the selected icon to simultaneously move along a plurality of trajectories on the display of each of the plurality of virtual attendees and in a manner associated with the avatar associated with the at least one virtual attendee.

the plurality of representations of the selected icon is configured to disappear from the display of each of the plurality of virtual attendees after a predetermined period.

the plurality of trajectories on the displays originates from the avatar associated with the specific virtual attendee.

the interactive interface of the specific virtual attendee is a graphical user interface element presented in the display of the specific virtual attendee.

the operations further comprise blocking access to one or more portions of the virtual event space to the plurality of avatars.

access to the one or more portions of the virtual event space is blocked for a predetermined time period.

enabling access to at least one of the one or more portions of the virtual event space to the plurality of avatars.

enabling access to at least one of the one or more portions of the virtual event space includes enabling access in response to receiving an enabling access trigger signal from the event host organizer.

the one or more portions of the virtual event space include at least one virtual object.

the one or more portions of the virtual event space include at least one virtual room within the virtual event space.

blocking access to one or more portions of the virtual event space to the plurality of avatars includes blocking access to one or more portions of the virtual event space to a subset of the plurality of avatars in accordance with a credential criterion.

in response to receiving from at least one virtual attendee an object interaction trigger signal: causing the specific avatar to navigate toward at least one virtual object associated with the object interaction trigger signal; and augmenting the specific avatar with a directionality indicator indicative of a direction of the at least one virtual object.

for each of the plurality of virtual attendees: augmenting the virtual event space presented on the display of each of the plurality of computing devices associated with the plurality of virtual attendees with a two-dimensional map of the virtual event space, wherein the two-dimensional map presented on each of the plurality of virtual attendees' display devices includes a marker of a position of the avatar associated with the virtual attendee.

in response to receiving from the specific virtual attendee an avatar interaction trigger signal, wherein the avatar interaction trigger signal designates an avatar associated with another virtual attendee: causing the specific avatar to navigate toward the avatar associated with the other virtual attendee; and augmenting the specific avatar with a directionality indicator indicative of a direction of the avatar associated with the other virtual attendee.

muting all audio signals when the at least one main display is active.

disabling all links configured to give access to different windows when the at least one main display is active.

the virtual event space data includes definitions for a plurality of virtual interactive objects, configured to display predetermined content set by the event host organizer, and wherein at least some of the plurality of virtual interactive objects are configured to enable one or more virtual attendees to display additional content.

the one or more virtual attendees possess credentials to display additional content via the at least some of the plurality of virtual interactive objects.

each of the plurality of virtual attendees is associated with at least one role within the virtual event space.

credentials associated with a specific virtual attendee depend on the at least one role associated with the specific virtual attendee.

the at least one role includes at least one of guest, employee, vendor, presenter, or moderator.

guests are authorized to submit one or more questions to presenters while presenting content on the at least one main display.

avatars associated with presenters are configured to change their postures during presentations.

avatars associated with presenters are configured to wave at a beginning of a presentation and bow at the end of a presentation.

when multiple virtual attendees are associated with a presenter role, displaying a dedicated user interface to receive presenter credentials ahead of time thereby enabling smooth transitions between presenters.

the plurality of avatars is configured to automatically perform movements that reflect an action or convey meaning.

the avatars are configured to perform movement based on an analysis of trigger signals.

the analysis of the trigger signals is performed using AI techniques.

monitoring interactions between the plurality of avatars and the at least one virtual interactive object and interactions among the plurality of avatars; and generating event analytics based on the monitored interactions.

generated event analytics includes at least one of: virtual object interaction frequencies; popular areas within the virtual event space; movement patterns; average time spent by the virtual attendees in the event space; content engagement; identified cluster of virtual attendees during the event; or influential virtual attendees.

generating event analytics based on the monitored interactions further comprises constructing a time-dependent interaction graph that represents interactions among the plurality of avatars and the at least one virtual interactive object over discrete time intervals during the virtual event.

generating event analytics further comprises performing a semantic analysis of chatroom communications and monitored interactions to determine engagement levels with respect to one or more event subjects presented during the virtual event.

separately storing analytics related to private meetings occurring within the virtual event space, wherein the separately stored analytics include interaction patterns, attendance, and engagement metrics specific to the private meetings.

generating event analytics further comprises generating personalized summaries of the virtual event personalized to specific attendees and transmitting the personalized summaries to the specific attendees after the virtual event ends.

generating event analytics further comprises offering at least some of the plurality of virtual attendees who join the virtual event late at least one of a summary of missed portions at a beginning of the virtual event or a recording of the missed portion at the beginning of the virtual event.

configuring a virtual event space using artificial intelligence, receiving from an event host organizer, an input including event content data.

providing the received input into at least one AI agent configured to: access a virtual event space requirement schema including definitions and a list of functional building blocks for the virtual event space; parse the received input to identify assets for the virtual event space, wherein parsing the received input includes extracting discrete portions of the event content data based on the definitions and the list of functional building blocks; map one or more of the identified assets with respective functional building blocks from the list of functional building blocks to enable rendering of the identified assets within the virtual event space; select a virtual event space template based on the virtual event space requirement schema; and generate and output virtual event space data for the virtual event space by adding mapped functional building blocks and assets to the selected virtual event space template.

compiling and presenting the virtual event space based on the virtual event space data outputted by the at least one AI agent, wherein compiling and presenting are configured to enable access to the identified assets by virtual attendees within the virtual event space.

the event content data includes at least one of a data source or information indicative of the event host organizer intent for the virtual event.

the data source includes at least one of a webpage URL, a text document, a folder of assets, a presentation file, a spreadsheet, an image, or a video file.

parsing the received input further includes parsing a native format of the data source to extract and classify one or more raw data elements distinct from the formatting data of the native format to be used as assets for the virtual event space.

the raw data element includes one or more of media, text blocks, and links.

parsing the received input further includes: comparing the identified assets with the list of functional building blocks; identifying any missing assets with respect to the list of functional building blocks; and crawling resources associated with the event content data to find additional assets.

accessing the virtual event space requirement schema includes selecting the virtual event space requirements schema from a library based on the event content data.

the list of functional building blocks includes one or more of virtual interactive objects, required assets, layout rules, or aesthetic parameters.

mapping one or more of the identified assets with the list of functional building blocks for the virtual event space includes: comparing the identified assets with the list of functional building blocks; identifying any missing assets with respect to the list of functional building blocks; and creating new assets for the virtual event space to complete the list of building blocks.

the at least one AI agent is further programmed to prompt the event host organizer for at least one of approval or further instructions, before creating new assets for the virtual event space.

the at least one AI agent is further programmed to conduct a semantic analysis the event content data to identify a design theme for the virtual event and select the virtual event space template based on the virtual event space requirement schema and the identified design theme.

the at least one AI agent is further configured to apply an aesthetic to the virtual event space template based on an identified design theme.

the AI agent is further configured to identify the design theme from the event content data.

the identified design theme includes at least one of a color palette, a logo, a set of fonts, patterns, or icons.

adding mapped functional building blocks includes spatially determining a location of each of the functional building blocks within an area defined by the virtual event space template.

the input received from the event host organizer is indicative of a number of virtual attendees for the event and the at least one AI agent is configured to select a virtual event space template based on the virtual event space requirement schema and suitable for accommodating the number of virtual attendees.

if the number of virtual attendees is greater than a threshold number the at least one AI agent is further configured to duplicate one or more identified assets within the virtual event space.

generating a preview of the virtual event space and presenting the preview to the event host organizer.

the preview is a 2D image of the virtual event space or a 3D immersive view of the virtual event space.

receiving from the event host organizer, feedback on the virtual event space, providing the feedback to the at least one AI agent further configured to adjust the virtual event space based on the provided feedback.

parsing the received input results in no identified assets, the at least one AI agent is further configured to generate an event curriculum and create assets for the virtual event space based on the event curriculum.

generating a virtual event space visualization for media consumption in a hybrid 2D/3D manner.

receiving virtual event space data including a definition of a virtual presentation location and at least one virtual display object associated with the virtual presentation location, wherein the at least one virtual display object is configured to display dynamic content.

rendering an event space based on the virtual event space data.

rendering in the event space an avatar associated with a virtual event attendee.

when the avatar is positioned in the event space at a location distinct from the virtual presentation location, rendering portions of the virtual event space distinct from the virtual presentation location in a first viewing state, causing the event space to be presented from an isometric point of view on a display device of the virtual event attendee.

receiving a display object interaction trigger signal associated with impending interaction between the avatar and the virtual display object.

in response to the display object interaction trigger signal, changing the first viewing state to a second viewing state in which the virtual display object is caused to be displayed on the virtual event attendee's display device from a second viewing state causing presentation in a non-isometric object-focused point of view.

maintaining the non-isometric object-focused point of view while the avatar interacts with the at least one virtual display object.

in response to receiving a reversion signal corresponding to an intended cessation viewing the virtual display object, reverting the second viewing state to the first viewing state.

in response to the display object interaction trigger signal causing the avatar associated with the virtual attendee to move towards a viewing location in proximity of the virtual presentation location.

receiving the dynamic content to be displayed by the at least one virtual display object; and rendering the at least one virtual display object displaying the received dynamic content using the isometric point of view or the non-isometric object-focused point of view.

the non-isometric object-focused point of view corresponds to a first person point of view from a location different from that of the avatar relative to the virtual display object.

virtual event space data further includes at least one virtual non-interactive object and the operations further comprise rendering the event space, including the at least one virtual non-interactive object, using the isometric point of view.

the non-isometric object-focused point of view corresponds to a view uncorrelated to the avatar location.

the virtual event space data further includes at least one virtual object and wherein the operations further comprise rendering the at least one virtual object in the event space using the isometric point of view; receiving from the virtual event attendee an object interaction trigger signal; and causing the avatar to perform a movement action corresponding to a movement action predefined for the at least one virtual object.

the operations further comprise rendering in the event space a plurality of avatars associated with a plurality of virtual event attendees, and wherein the non-isometric object-focused point of view of the virtual display object is common to each of the plurality of virtual event attendees.

augmenting the event space with a chatroom user interface element; and in response to the at least one virtual event attendee interacting with the chatroom user interface element augmenting the event space with a chatroom configured for communication between a plurality of virtual attendees; and wherein when the non-isometric object-focused point of view is used augmenting the event space with a chatroom includes triggering a camera associated with the non-isometric object focused point of view to zoom out so as to render the chatroom and the at least one virtual display object simultaneously visible.

receiving, from the virtual attendee, via an interactive interface a selection of an icon reflective of an emotion;

and causing one or more representations of the selected icon to simultaneously move along one or more trajectories in a manner associated with the avatar associated with the at least one virtual attendee.

the one or more representations s of the selected icon in the first viewing state is different from the one or more representations s of the selected icon in the second viewing state.

in the second viewing state, the one or more trajectories are configured such that the selected icons are partially and momentarily obstructing the virtual display device.

virtual attendees in the first viewing state are enabled to see the one or more representations of the selected icons of virtual attendees in the second viewing state.

the one or more representations of the selected icons presented on the display device of the virtual attendee when in the second viewing state are different from the one or more representations s of the selected icons presented on display devices of other virtual attendees when in the first viewing state.

the operations further comprise in response to the virtual attendee engaging with a content displayed on the virtual display object, causing a visual indicator to be displayed in a manner associated with the avatar associated with the virtual attendee, the visual indicator conveying relevant information.

the virtual display object is associated with at least one other virtual attendee acting as a presenter.

the presenter is identifiable as being located in vicinity of an object placed near the virtual display object.

the object is a podium and the presenter is located behind the podium.

portions of the virtual event space are rendered in the first or the second viewing state on the display device of the presenter, while presenting.

when multiple instances of the event space are created, and content is presented on the virtual display object, by a presenter associated with a presenter avatar, the same presenter avatar is presented across all instances.

guiding virtual attendees of a virtual event space toward events of interest, receiving from an event host organizer event details, wherein the event details include a selected event space and an event agenda including a plurality of agenda items.

generating an event link configured to enable access to the event.

rendering the event space, including a plurality of virtual objects, at least one of the plurality of virtual objects being identified on the event agenda and having a presentation time associated therewith.

receiving from a plurality of virtual event attendees, virtual event attendee data, and rendering in the event space a plurality of avatars, each of the plurality of avatars being associated with a differing one of the plurality of virtual event attendees.

receiving from at least some of the plurality of virtual attendees selections of objects of interest from the plurality of virtual objects prior to or during associated presentation times for the selected objects of interest.

during the event, directing the at least some of the plurality of virtual attendees to their selected objects of interest at times corresponding to the presentation time of their selected objects of interest.

the event details include a list of a plurality of non-temporary interactable objects.

receiving from at least some of the plurality of virtual attendees selections of objects of interest from the plurality of non-temporary interactable objects, and during the event directing the at least some of the plurality of virtual attendees to their selected non-temporary interactable object.

the plurality of virtual event attendees accesses the event space via the generated link.

access to one or more portions of the event space is limited to at least some of the plurality of virtual attendees based on a subscription fee of the at least some of the plurality of virtual attendee.

at least one of the selected objects of interest includes a presentation.

the presentation is associated with a virtual screen configured to display dynamic content.

at least one virtual event attendee has credentials for sharing dynamic content on the virtual screen.

at least one of the selected objects of interest includes a sub-space within the event space.

the at least one virtual object includes a virtual gallery object configured to display predetermined content.

at least one of the selected objects of interest includes a virtual web-view object configured to display content in a web-view setting.

the event is a time-limited event, and the generated link is a temporary link.

sending an alert to the plurality of virtual event attendees indicative of a start of the event.

if at least one virtual event attendee attempts to access the event before the start of the event, sending a message to the at least one virtual event attendee indicating that the event has not yet started.

the times corresponding to the presentation time of the selected object of interest are times preceding the presentation time of the selected object of interest.

directing the at least some of the plurality of virtual attendees to their selected objects of interest at times corresponding to the presentation time of their selected objects of interest includes sending to the at least some of the plurality of virtual attendees at times corresponding to the presentation time of their selected objects of interest an indicator signaling a commencement of agenda items associated with their selected objects of interest.

the indicator is a visual indicator viewable on displays of the at least some of the plurality of virtual attendees.

the visual indicator includes at least one of a banner configured to display a notification related to the selected object of interest or a navigation indicator configured to indicate where within the event space the selected objects of interest are located.

in response to receiving from one of the at least some of the plurality of virtual attendees an indicator interacting signal, causing an avatar associated with the one of the at least some of the plurality of virtual attendees to move from a first location to a second location within the event space, wherein the second location is nearby the selected object of interest.

adjusting the event agenda, the event link, and the presentation time of the plurality of virtual objects identified on the event agenda to correspond to a local time zone associated with each of the plurality of virtual event attendees.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure may be implemented as a chip or a circuit. As software or algorithm, selected steps of the disclosure may be implemented as a plurality of software instructions being executed by a computer using any suitable operating system. In any case, selected steps of the method and system of the disclosure may be described as being performed by a data processor, such as a computing device for executing a plurality of instructions.

It should be appreciated that the above-described methods and apparatus may be varied in many ways, including omitting or adding steps, changing the order of steps, and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein may include various combinations and/or sub-combinations of the functions, components, and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

It should be appreciated that the above-described embodiments can be implemented by hardware, or software (program codes), or a combination of hardware and software. If implemented by software, it can be stored in the above-described computer-readable media. The software, when executed by the processor may perform the disclosed methods. The computing units and other functional units described in the present disclosure may be implemented by hardware, or software, or a combination of hardware and software. One of ordinary skill in the art will also understand that multiple ones of the above-described modules/units may be combined as one module or unit, and each of the above-described modules/units may be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable signal instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that may vary from implementation to implementation. Certain adaptations and modifications of the described embodiments can be made. Other embodiments may be apparent to those skilled in the art from consideration of the specification and practice of the invention disclosed herein. It is intended that the specification and examples be considered as examples only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries, and explanations of terminology in each instance apply to all instances, even when not repeated, unless the transitive definition, explanation, or summary would result in inoperability of an embodiment.

Unless otherwise defined, all technical and scientific terms used herein have the same meaning as commonly understood by one of ordinary skill in the art. The materials, methods, and examples provided herein are illustrative only and not intended to be limiting.

Moreover, while illustrative embodiments have been described herein, the scope of any and all embodiments having equivalent elements, modifications, omissions, combinations (e.g., of aspects across various embodiments), adaptations, and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A non-transitory computer-readable medium containing instructions that, when executed by at least one processor, cause the at least one processor to perform operations for configuring a virtual event space using artificial intelligence, AI, the operations comprising:

receiving from an event host organizer, an input including event content data;

providing the received input into at least one AI agent configured to:

access a virtual event space requirement schema including definitions and a list of functional building blocks for the virtual event space;

parse the received input to identify assets for the virtual event space, wherein parsing the received input includes extracting discrete portions of the event content data based on the definitions and the list of functional building blocks;

map one or more of the identified assets with respective functional building blocks from the list of functional building blocks to enable rendering of the identified assets within the virtual event space;

select a virtual event space template based on the virtual event space requirement schema; and generate and output virtual event space data for the virtual event space by adding mapped functional building blocks and assets to the selected virtual event space template; and compiling and presenting the virtual event space based on the virtual event space data outputted by the at least one AI agent, wherein compiling and presenting are configured to enable access to the identified assets by virtual attendees within the virtual event space.

2. The non-transitory computer-readable medium of claim 1, wherein the event content data includes at least one of a data source or information indicative of the event host organizer intent for the virtual event.

3. The non-transitory computer-readable medium of claim 2, wherein the data source includes at least one of a webpage URL, a text document, a folder of assets, a presentation file, a spreadsheet, an image, or a video file.

4. The non-transitory computer-readable medium of claim 2, wherein parsing the received input further includes parsing a native format of the data source to extract and classify one or more raw data elements distinct from the formatting data of the native format to be used as assets for the virtual event space.

5. The non-transitory computer-readable medium of claim 4, wherein the raw data element includes one or more of media, text blocks, and links.

6. The non-transitory computer-readable medium of claim 1, wherein parsing the received input further includes:

comparing the identified assets with the list of functional building blocks;

identifying any missing assets with respect to the list of functional building blocks; and crawling resources associated with the event content data to find additional assets.

7. The non-transitory computer-readable medium of claim 1, wherein accessing the virtual event space requirement schema includes selecting the virtual event space requirements schema from a library based on the event content data.

8. The non-transitory computer-readable medium of claim 1, wherein the list of functional building blocks includes one or more of virtual interactive objects, required assets, layout rules, or aesthetic parameters.

9. The non-transitory computer-readable medium of claim 1, wherein mapping one or more of the identified assets with the list of functional building blocks for the virtual event space includes:

comparing the identified assets with the list of functional building blocks;

identifying any missing assets with respect to the list of functional building blocks; and creating new assets for the virtual event space to complete the list of building blocks.

10. The non-transitory computer-readable medium of claim 9, wherein the at least one AI agent is further programmed to prompt the event host organizer for at least one of approval or further instructions, before creating new assets for the virtual event space.

11. The non-transitory computer-readable medium of claim 1, wherein the at least one AI agent is further programmed to conduct a semantic analysis the event content data to identify a design theme for the virtual event and select the virtual event space template based on the virtual event space requirement schema and the identified design theme.

12. The non-transitory computer-readable medium of claim 1, wherein the at least one AI agent is further configured to apply an aesthetic to the virtual event space template based on an identified design theme.

13. The non-transitory computer-readable medium of claim 12, wherein the AI agent is further configured to identify the design theme from the event content data.

14. The non-transitory computer-readable medium of claim 12, wherein the identified design theme includes at least one of a color palette, a logo, a set of fonts, patterns, or icons.

15. The non-transitory computer-readable medium of claim 1, wherein adding mapped functional building blocks includes spatially determining a location of each of the functional building blocks within an area defined by the virtual event space template.

16. The non-transitory computer-readable medium of claim 1, wherein the input received from the event host organizer is indicative of a number of virtual attendees for the event and the at least one AI agent is configured to select a virtual event space template based on the virtual event space requirement schema and suitable for accommodating the number of virtual attendees.

17. The non-transitory computer-readable medium of claim 16, wherein if the number of virtual attendees is greater than a threshold number the at least one AI agent is further configured to duplicate one or more identified assets within the virtual event space.

18. The non-transitory computer-readable medium of claim 1, wherein the operations further comprise generating a preview of the virtual event space and presenting the preview to the event host organizer.

19. The non-transitory computer-readable medium of claim 18, wherein the preview is a 2D image of the virtual event space or a 3D immersive view of the virtual event space.

20. The non-transitory computer-readable medium of claim 18, wherein the operations further comprise receiving from the event host organizer, feedback on the virtual event space, providing the feedback to the at least one AI agent further configured to adjust the virtual event space based on the provided feedback.

21. The non-transitory computer-readable medium of claim 1, where parsing the received input results in no identified assets, the at least one AI agent is further configured to generate an event curriculum and create assets for the virtual event space based on the event curriculum.

22. A method for configuring a virtual event space using artificial intelligence, AI, the method comprising:

receiving from an event host organizer, an input including event content data;

providing the received input into at least one AI agent configured to:

access a virtual event space requirement schema including definitions and a list of functional building blocks for the virtual event space;

parse the received input to identify assets for the virtual event space, wherein parsing the received input includes extracting discrete portions of the event content data based on the definitions and the list of functional building blocks;

map one or more of the identified assets with respective functional building blocks from the list of functional building blocks to enable rendering of the identified assets within the virtual event space;

select a virtual event space template based on the virtual event space requirement schema; and generate and output virtual event space data for the virtual event space by adding mapped functional building blocks and assets to the selected virtual event space template; and compiling and presenting the virtual event space based on the virtual event space data outputted by the at least one AI agent, wherein compiling and presenting are configured to enable access to the identified assets by virtual attendees within the virtual event space.

23. A system for configuring a virtual event space using artificial intelligence, AI, the system comprising at least one processor configured to:

receive from an event host organizer, an input including event content data;

provide the received input into at least one AI agent configured to:

access a virtual event space requirement schema including definitions and a list of functional building blocks for the virtual event space;

parse the received input to identify assets for the virtual event space, wherein parsing the received input includes extracting discrete portions of the event content data based on the definitions and the list of functional building blocks;

map one or more of the identified assets with respective functional building blocks from the list of functional building blocks to enable rendering of the identified assets within the virtual event space;

select a virtual event space template based on the virtual event space requirement schema; and generate and output virtual event space data for the virtual event space by adding mapped functional building blocks and assets to the selected virtual event space template; and compile and present the virtual event space based on the virtual event space data outputted by the at least one AI agent, wherein compiling and presenting are configured to enable access to the identified assets by virtual attendees within the virtual event space.

\* \* \* \* \*